US011985463B2

(12) United States Patent
Siahaan et al.

(10) Patent No.: US 11,985,463 B2
(45) Date of Patent: May 14, 2024

(54) HEADPHONES WITH INCREASED BACK VOLUME

(71) Applicant: APPLE INC., Cupertino, CA (US)

(72) Inventors: Edward Siahaan, San Francisco, CA (US); Daniel R. Bloom, Alameda, CA (US); Jason J. LeBlanc, Castro Valley, CA (US); Phillip Qian, Tokyo (JP)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/197,672

(22) Filed: May 15, 2023

(65) Prior Publication Data

US 2023/0328418 A1 Oct. 12, 2023

Related U.S. Application Data

(63) Continuation of application No. 17/804,274, filed on May 26, 2022, now Pat. No. 11,700,471, which is a (Continued)

(51) Int. Cl.
*H04R 25/00* (2006.01)
*H04R 1/10* (2006.01)
(Continued)

(52) U.S. Cl.
CPC ......... *H04R 1/1008* (2013.01); *H04R 1/1033* (2013.01); *H04R 1/1041* (2013.01); (Continued)

(58) Field of Classification Search
CPC .. H04R 1/1008; H04R 1/1033; H04R 1/1041; H04R 1/105; H04R 1/1066
See application file for complete search history.

(56) References Cited

U.S. PATENT DOCUMENTS 2,924,672 A 2/1960 Cagen
3,682,268 A 8/1972 Gorike
(Continued)

FOREIGN PATENT DOCUMENTS

CN 1794751 A 6/2006
CN 101141830 3/2008
(Continued)

OTHER PUBLICATIONS

Article entitled, "G930 Headband Replacement", Flverance Package, YouTube, Available Online at: URL:https://www.youtube.com/watch?v =-1 HfnB 3Ty84, [retrieved on Jun. 17, 2019], Sep. 15, 2015 in 3 pages (of-record in parent application).
(Continued)

*Primary Examiner* — Simon King
(74) *Attorney, Agent, or Firm* — Kilpatrick Townsend & Stockton LLP

(57) ABSTRACT

This disclosure includes several different features suitable for use in circumaural and supra-aural headphones designs. Designs that include earpad assemblies that improve acoustic isolation are discussed. User convenience features that include automatically detecting the orientation of the headphones on a user's head are also discussed. Various power-saving features, design features, sensor configurations and user comfort features are also discussed.

20 Claims, 96 Drawing Sheets

Related U.S. Application Data continuation of application No. 16/878,565, filed on May 19, 2020, now Pat. No. 11,375,306, which is a continuation of application No. PCT/US2018/062143, filed on Nov. 20, 2018.

(60) Provisional application No. 62/588,801, filed on Nov. 20, 2017.

(51) Int. Cl.
*H04R 5/033* (2006.01)
*H04R 5/04* (2006.01)
*G10K 11/178* (2006.01)

(52) U.S. Cl.
CPC ........... *H04R 1/105* (2013.01); *H04R 1/1066* (2013.01); *H04R 1/1075* (2013.01); *H04R 1/1083* (2013.01); *H04R 5/0335* (2013.01); *H04R 5/04* (2013.01); *G10K 11/17861* (2018.01); *G10K 11/17873* (2018.01)

(56) References Cited

U.S. PATENT DOCUMENTS 3,902,120 A 8/1975 Dascal et al.
3,919,501 A 11/1975 Cech et al.
4,027,113 A 5/1977 Matsumoto et al.
4,551,584 A 11/1985 Mathiasen
4,609,786 A 9/1986 Omoto et al.
5,056,161 A 10/1991 Breen
5,099,519 A 3/1992 Guan
5,117,465 A 5/1992 Macdonald
5,233,650 A 8/1993 Chan
5,469,505 A 11/1995 Gattey et al.
5,625,903 A 5/1997 Schultz et al.
5,862,241 A 1/1999 Nelson
5,996,123 A 12/1999 Leight et al.
6,333,982 B1 12/2001 Sapiejewski et al.
6,629,579 B1 10/2003 Hasegawa
7,171,698 B2 2/2007 Saffran
8,050,444 B2 11/2011 Smith
8,170,261 B2 5/2012 Danielson et al.
8,422,718 B2 4/2013 Santiago
8,605,935 B1 12/2013 Huang
8,737,668 B1 5/2014 Blair et al.
8,861,770 B2 10/2014 Blair et al.
9,113,246 B2 8/2015 Bastide et al.
9,148,717 B2 9/2015 Shaffer
9,344,794 B1 5/2016 Blonder
9,467,780 B2 10/2016 Kelly et al.
9,838,776 B2 12/2017 Broadley et al.
9,930,444 B1 3/2018 Stanley et al.
10,034,092 B1 7/2018 Nawfal et al.
10,129,632 B2 11/2018 Chute et al.
10,219,068 B2 2/2019 Cochran et al.
10,277,974 B2 4/2019 Shiomi et al.
10,354,639 B2 7/2019 Scanlan
10,425,716 B1 * 9/2019 Prelogar ............... G06F 3/0448
10,484,793 B1 * 11/2019 Peterson .................. H04R 3/12
10,848,847 B2 11/2020 Degner et al.
10,945,076 B2 3/2021 Degner et al.
11,102,567 B2 8/2021 Leclerc et al.
11,134,327 B2 9/2021 LeBlanc et al.
11,134,328 B2 9/2021 Kole et al.
11,184,695 B2 11/2021 Bloom
11,252,492 B2 2/2022 Kole et al.
11,259,107 B2 2/2022 Minerbi et al.
11,323,793 B2 5/2022 Laurent et al.
11,330,354 B2 5/2022 Degner et al.
11,375,306 B2 6/2022 Andersen et al.
11,477,558 B2 10/2022 Siahaan et al.
11,477,575 B2 10/2022 Degner et al.
11,570,549 B2 1/2023 Degner et al.
2003/0210801 A1 11/2003 Naksen et al.
2004/0011149 A1 1/2004 Carroll
2004/0216946 A1 11/2004 Lenhard-Backhaus
2006/0159279 A1 7/2006 Kuo et al.
2007/0053539 A1 3/2007 Tsunoda et al.
2007/0184881 A1 8/2007 Wahl et al.
2007/0258614 A1 11/2007 Langberg
2008/0056525 A1 3/2008 Fujiwara et al.
2008/0166002 A1 7/2008 Amsel
2008/0175406 A1 7/2008 Smith
2009/0041267 A1 2/2009 Lee et al.
2009/0103762 A1 4/2009 Ishida et al.
2009/0268936 A1 10/2009 Goldberg et al.
2009/0285435 A1 11/2009 Nelson et al.
2011/0002478 A1 1/2011 Pollard et al.
2011/0002497 A1 1/2011 Fukuma
2011/0051973 A1 3/2011 Liu et al.
2011/0051974 A1 3/2011 Liu et al.
2011/0103635 A1 5/2011 Asakura et al.
2011/0129111 A1 6/2011 Santiago
2011/0206216 A1 8/2011 Brunner et al.
2011/0286620 A1 11/2011 Flynn
2012/0014554 A1 1/2012 Santiago
2012/0082321 A1 4/2012 Akaike et al.
2012/0140973 A1 6/2012 Olodort et al.
2012/0269374 A1 10/2012 Lee et al.
2012/0272484 A1 11/2012 Willborn
2012/0275615 A1 11/2012 Kelly et al.
2013/0038458 A1 2/2013 Toivola et al.
2013/0202126 A1 8/2013 Chen et al.
2013/0208910 A1 8/2013 Hansen et al.
2013/0233745 A1 9/2013 Tierney et al.
2013/0272560 A1 10/2013 Dougherty et al.
2013/0279724 A1 10/2013 Stafford et al.
2013/0343592 A1 12/2013 Schmidt et al.
2014/0079238 A1 3/2014 Bastide et al.
2014/0079250 A1 3/2014 Hirota
2014/0205129 A1 7/2014 Blair et al.
2014/0219479 A1 8/2014 Wilk
2014/0226849 A1 8/2014 Porter et al.
2014/0241567 A1 8/2014 Crosby et al.
2014/0254854 A1 9/2014 Blonder
2014/0270228 A1 9/2014 Oishi et al.
2015/0023515 A1 1/2015 Reimert
2015/0193664 A1 7/2015 Marti et al.
2015/0195639 A1 7/2015 Azmi et al.
2015/0195640 A1 7/2015 Essabar et al.
2015/0222980 A1 8/2015 Pizzaro et al.
2015/0245124 A1 8/2015 Lee
2015/0281823 A1 10/2015 Taylor
2015/0281846 A1 10/2015 Locke et al.
2015/0350765 A1 12/2015 David
2016/0014539 A1 1/2016 Yeh
2016/0029137 A1 1/2016 Price
2016/0142809 A1 5/2016 Tanoue et al.
2016/0193085 A1 7/2016 Jenkins et al.
2016/0205459 A1 7/2016 Kamada et al.
2016/0277823 A1 9/2016 Huang et al.
2016/0366506 A1 12/2016 Kim
2016/0373848 A1 12/2016 Tews et al.
2017/0034612 A1 2/2017 Timothy et al.
2017/0094411 A1 * 3/2017 Peterson .................. H04R 5/04
2017/0188132 A1 6/2017 Hirsch et al.
2017/0201820 A1 7/2017 Inoue et al.
2017/0257695 A1 9/2017 Smiechowski
2017/0264984 A1 9/2017 Pelland
2017/0280227 A1 9/2017 Huang
2017/0289671 A1 10/2017 Patel et al.
2017/0374448 A1 12/2017 Patel et al.
2018/0014973 A1 1/2018 Echeverri et al.
2018/0213313 A1 7/2018 Andrikowich et al.
2018/0220213 A1 8/2018 Wu et al.
2018/0220224 A1 8/2018 Chute et al.
2018/0288515 A1 * 10/2018 Peterson ................ G01D 5/241
2019/0007768 A1 1/2019 Kim
2019/0098121 A1 3/2019 Jeon et al.
2019/0104356 A1 4/2019 Daley et al.
2019/0110929 A1 4/2019 Persson et al.
2019/0182580 A1 6/2019 Cochran et al.
2019/0222936 A1 7/2019 Degner et al.
2019/0313172 A1 * 10/2019 Sunshine ............... H05K 1/189

(56) References Cited

U.S. PATENT DOCUMENTS

| | | | |
|---|---|---|---|
| 2020/0029146 A1 | 1/2020 | Kamimura | |
| 2020/0196698 A1 | 6/2020 | Winters et al. | |
| 2020/0280801 A1 | 9/2020 | Andersen et al. | |
| 2021/0029435 A1 | 1/2021 | Siahaan et al. | |
| 2021/0037309 A1 | 2/2021 | Saule et al. | |
| 2021/0064167 A1* | 3/2021 | Hsu | G06F 1/182 |
| 2021/0152941 A1 | 5/2021 | Degner et al. | |
| 2021/0168506 A1 | 6/2021 | Degner et al. | |
| 2022/0386009 A1 | 12/2022 | Siahaan et al. | |

FOREIGN PATENT DOCUMENTS

| | | | |
|---|---|---|---|
| CN | 201100960 | | 8/2008 |
| CN | 201986123 | | 9/2011 |
| CN | 202004940 | U | 10/2011 |
| CN | 202004947 | | 10/2011 |
| CN | 102231866 | A | 11/2011 |
| CN | 102342130 | | 2/2012 |
| CN | 202750206 | | 2/2013 |
| CN | 202799062 | | 3/2013 |
| CN | 202998400 | | 6/2013 |
| CN | 103348698 | | 10/2013 |
| CN | 203233530 | | 10/2013 |
| CN | 103686506 | | 3/2014 |
| CN | 203675282 | | 6/2014 |
| CN | 103945295 | | 7/2014 |
| CN | 104023105 | | 9/2014 |
| CN | 104301826 | | 1/2015 |
| CN | 104469624 | | 3/2015 |
| CN | 104509129 | | 4/2015 |
| CN | 104618830 | | 5/2015 |
| CN | 104954917 | | 9/2015 |
| CN | 104980832 | | 10/2015 |
| CN | 105208475 | | 12/2015 |
| CN | 105323667 | | 2/2016 |
| CN | 105474663 | | 4/2016 |
| CN | 205142456 | | 4/2016 |
| CN | 205142459 | | 4/2016 |
| CN | 105554603 | | 5/2016 |
| CN | 105812977 | | 7/2016 |
| CN | 205450450 | | 8/2016 |
| CN | 106464999 | A | 2/2017 |
| CN | 106998511 | | 8/2017 |
| CN | 107040835 | | 8/2017 |
| CN | 107209069 | | 9/2017 |
| CN | 107277659 | | 10/2017 |
| EP | 1549105 | | 6/2005 |
| EP | 2081404 | | 7/2009 |
| EP | 2963942 | | 1/2016 |
| EP | 3226577 | | 10/2017 |
| EP | 3565271 | | 11/2019 |
| EP | 3734989 | | 11/2020 |
| GB | 223043 | | 10/1924 |
| GB | 2019160 | | 10/1979 |
| GB | 2103902 | | 2/1983 |
| JP | 536220 | | 1/1978 |
| JP | 57005985 | | 2/1982 |
| JP | 6374891 | | 5/1988 |
| JP | 1023586 | | 1/1998 |
| JP | 2005311630 | | 11/2005 |
| JP | 2006304052 | | 11/2006 |
| JP | 2007267310 | | 10/2007 |
| JP | 2008066977 | | 3/2008 |
| JP | 2009105554 | | 5/2009 |
| JP | 2009171342 | A | 7/2009 |
| JP | 2011015235 | A | 1/2011 |
| JP | 2013038671 | | 2/2013 |
| JP | 2013527636 | | 6/2013 |
| JP | 2013138349 | | 7/2013 |
| JP | 2015026948 | | 2/2015 |
| JP | 2015037246 | | 2/2015 |
| JP | 2015050581 | | 3/2015 |
| JP | 2016082561 | | 5/2016 |
| JP | 2018507663 | | 3/2018 |
| KR | 20110011672 | | 2/2011 |
| KR | 101188892 | | 10/2012 |
| KR | 101353588 | B1 | 1/2014 |
| KR | 20160002415 | | 1/2016 |
| KR | 20170039568 | | 4/2017 |
| KR | 20170082405 | | 7/2017 |
| KR | 20170109650 | | 9/2017 |
| KR | 102414633 | B1 | 6/2022 |
| TW | 449222 | U | 8/2001 |
| TW | M370905 | U | 12/2009 |
| WO | 9504347 | | 2/1995 |
| WO | 2008004274 | | 1/2008 |
| WO | 2008089444 | | 7/2008 |
| WO | 2009061223 | | 5/2009 |
| WO | 2009061223 | | 7/2009 |
| WO | 2010008829 | | 1/2010 |
| WO | 2010038299 | | 4/2010 |
| WO | 2011031910 | | 3/2011 |
| WO | 2013099417 | | 7/2013 |
| WO | 2015087431 | | 6/2015 |
| WO | 2015100499 | | 7/2015 |
| WO | 2016002150 | | 1/2016 |
| WO | 2016145443 | | 9/2016 |
| WO | 2017027405 | | 2/2017 |
| WO | 2018057907 | | 3/2018 |

OTHER PUBLICATIONS

Article entitled, "Geekria Replacement Earpads Earpads Cushions Replacement for Logitech G430 G930", Available Online at, URL:https://www.amazon.com/Geekria-Replacement-Cushions-Logitech-Headphones/dp/B074P 338RX?th=I, [retrieved on Jun. 17, 2019], Feb. 1, 2018in 8 pages (of-record in parent application).

Corrected Notice of Allowability issued in U.S. Appl. No. 16/335,846, dated Sep. 10, 2020 in 2 pages (of-record in parent application).

Corrected Notice of Allowability issued in U.S. Appl. No. 16/335,846, dated Sep. 18, 2020 in 2 pages (of-record in parent application).

Non-Final Office Action issued in U.S. Appl. No. 16/335,846, dated Jan. 31, 2020 in 11 pages (of-record in parent application).

Notice of Allowance issued in U.S. Appl. No. 16/335,846, dated Jul. 31, 2020 in 11 pages (of-record in parent application).

Corrected Notice of Allowability issued in U.S. Appl. No. 16/362,386, dated Oct. 28, 2021 in 2 pages (of-record in parent application).

First Action Interview Office Action Summary issued in U.S. Appl. No. 16/362,386, dated Mar. 9, 2021 in 4 pages (of-record in parent application).

First Action Interview Pilot Program Pre-Interview Communication issued in U.S. Appl. No. 16/362,386, dated Oct. 21, 2020 in 5 pages (of-record in parent application).

Notice of Allowance issued in U.S. Appl. No. 16/362,386, dated Jul. 16, 2021 in 9 pages (of-record in parent application).

Corrected Notice of Allowability issued in U.S. Appl. No. 16/362,393, dated Jan. 24, 2022 in 2 pages (of-record in parent application).

Corrected Notice of Allowability issued in U.S. Appl. No. 16/362,393, dated Mar. 31, 2022 in 3 pages (of-record in parent application).

Final Office Action issued in U.S. Appl. No. 16/362,393, dated Apr. 20, 2021 in 12 pages (of-record in parent application).

Non-Final Office Action issued in U.S. Appl. No. 16/362,393, dated Oct. 16, 2020 in 11 pages (of-record in parent application).

Non-Final Office Action issued in U.S. Appl. No. 16/362,393, dated Aug. 5, 2021 in 15 pages (of-record in parent application).

Notice of Allowance issued in U.S. Appl. No. 16/362,393, dated Jan. 5, 2022 in 10 pages (of-record in parent application).

Corrected Notice of Allowability issued in U.S. Appl. No. 16/362,399, dated Jul. 28, 2021 in 2 pages (of-record in parent application).

Corrected Notice of Allowability issued in U.S. Appl. No. 16/362,399, dated Jun. 14, 2021 in 3 pages (of-record in parent application).

First Action Interview Office Action Summary issued in U.S. Appl. No. 16/362,399, dated Feb. 12, 2021 in 4 pages (of-record in parent application).

First Action Interview Pilot Program Pre-Interview Communication issued in U.S. Appl. No. 16/362,399, dated Oct. 29, 2020 in 4 pages (of-record in parent application).

Notice of Allowance issued in U.S. Appl. No. 16/362,399, dated Apr. 27, 2021 in 12 pages (of-record in parent application).

(56) References Cited

OTHER PUBLICATIONS

Non-Final Office Action issued in U.S. Appl. No. 16/362,404, dated May 22, 2020 in 9 pages (of-record in parent application).
Notice of Allowance issued in U.S. Appl. No. 16/362,404, dated Oct. 21, 2020 in 9 pages (of-record in parent application).
Supplemental Notice of Allowability issued in U.S. Appl. No. 16/362,404, dated Dec. 2, 2020 in 2 pages (of-record in parent application).
Supplemental Notice of Allowability issued in U.S. Appl. No. 16/362,404, dated Jan. 28, 2021 in 2 pages (of-record in parent application).
First Action Interview Pilot Program Pre-Interview Communication issued in U.S. Appl. No. 16/878,536, dated Mar. 22, 2021 in 4 pages (of-record in parent application).
Notice of Allowance issued in U.S. Appl. No. 16/878,536, dated Jun. 1, 2021 in 7 pages (of-record in parent application).
Supplemental Notice of Allowability issued in U.S. Appl. No. 16/878,536, dated Aug. 27, 2021 in 2 pages (of-record in parent application).
Supplemental Notice of Allowability issued in U.S. Appl. No. 16/878,536, dated Jul. 12, 2021 in 2 pages (of-record in parent application).
Corrected Notice of Allowability issued in U.S. Appl. No. 16/878,547, dated Nov. 4, 2021 in 2 pages (of-record in parent application).
Notice of Allowance issued in U.S. Appl. No. 16/878,547, dated Oct. 1, 2021 in 8 pages (of-record in parent application).
First Action Interview Pilot Program Pre-Interview Communication issued in U.S. Appl. No. 16/878,556, dated Mar. 19, 2021 in 4 pages (of-record in parent application).
Notice of Allowance issued in U.S. Appl. No. 16/878,556, dated Jun. 16, 2021 in 8 pages (of-record in parent application).
Supplemental Notice of Allowability issued in U.S. Appl. No. 16/878,556, dated Aug. 27, 2021 in 2 pages (of-record in parent application).
Supplemental Notice of Allowance issued in U.S. Appl. No. 16/878,556, dated Jul. 9, 2021 in 2 pages (of-record in parent application).
Corrected Notice of Allowability issued in U.S. Appl. No. 16/878,561, dated Nov. 24, 2021 in 2 pages (of-record in parent application).
Non-Final Office Action issued in U.S. Appl. No. 16/878,561, dated Jun. 18, 2021 in 16 pages (of-record in parent application).
Notice of Allowance issued in U.S. Appl. No. 16/878,561, dated Oct. 14, 2021 in 7 pages (of-record in parent application).
Final Office Action issued in U.S. Appl. No. 16/878,565, dated Oct. 5, 2021 in 7 pages (of-record in parent application).
First Action Interview Pilot Program Pre-Interview Communication issued in U.S. Appl. No. 16/878,565, dated May 12, 2021 in 5 pages (of-record in parent application).
Notice of Allowance issued in U.S. Appl. No. 16/878,565, dated Mar. 28, 2022 in 9 pages (of-record in parent application).
Supplemental Notice of Allowability issued in U.S. Appl. No. 16/878,565, dated Apr. 20, 2022 in 2 pages (of-record in parent application).
First Action Interview Office Action Summary issued in U.S. Appl. No. 17/061,098, dated Oct. 20, 2021 in 8 pages (of-record in parent application).
First Action Interview Pilot Program Pre-Interview Communication issued in U.S. Appl. No. 17/061,098, dated Sep. 8, 2021 in 7 pages (of-record in parent application).
U.S. Appl. No. 17/061,098 , Non-Final Office Action issued in U.S. Appl. No. 17/061,098, dated Feb. 28, 2022 in 15 pages (of-record in parent application).
Notice of Allowance issued in U.S. Appl. No. 17/061,098, dated Jun. 8, 2022 in 8 pages (of-record in parent application).
Supplemental Notice of Allowability issued in U.S. Appl. No. 17/061,098, dated Jul. 28, 2022 in 2 pages (of-record in parent application).
Corrected Notice of Allowability issued in U.S. Appl. No. 17/071,819, dated Apr. 4, 2022 in 2 pages (of-record in parent application).
First Action Interview Pilot Program Pre-Interview Communication issued in U.S. Appl. No. 17/071,819, dated Sep. 15, 2021 in 4 pages (of-record in parent application).
Notice of Allowance issued in U.S. Appl. No. 17/071,819, dated Jan. 31, 2022 in 10 pages (of-record in parent application).
Non-Final Office Action issued in U.S. Appl. No. 17/158,810, dated Jan. 25, 2022 in 10 pages (of-record in parent application).
Notice of Allowance issued in U.S. Appl. No. 17/804,274, dated Feb. 24, 2023 in 9 pages.
Boxer , "Gioteck EX-05 Review | T3", T3, Available Online at: URL:https://www.t3.com/reviews/gioteck-ex-05-review, [retrieved on Jun. 17, 2019], Apr. 4, 2012 in 5 pages (of-record in parent application).
Notice of Decision to Grant issued in China Application No. CN201780058416.0, dated May 25, 2021 in 4 pages (of-record in parent application).
Office Action issued in China Application No. CN201780058416.0, dated Jul. 3, 2020 in 14 pages (of-record in parent application).
Office Action issued in China Application No. CN201780058416.0, dated Mar. 1, 2021 in 3 pages (of-record in parent application).
Notice of Decision to Grant issued in China Application No. CN201910341349.4, dated Sep. 23, 2021 in 2 pages (of-record in parent application).
Office Action issued in China Application No. CN201910341349.4, dated Feb. 21, 2020 in 13 pages (of-record in parent application).
Office Action issued in China Application No. CN201910341349.4, dated Dec. 2, 2020 in 16 pages (of-record in parent application).
Office Action issued in China Application No. CN201910341349.4, dated Apr. 25, 2021 in 3 pages (of-record in parent application).
Notice of Decision to Grant issued in China Application No. CN201910341350.7, dated Jul. 2, 2021 in 2 pages (of-record in parent application).
Office Action issued in China Application No. CN201910341350.7, dated Mar. 15, 2021 in 13 pages (of-record in parent application).
Office Action issued in China Application No. CN201910341350.7, dated Jul. 20, 2020 in 20 pages (of-record in parent application).
Notice of Decision to Grant issued in China Application No. CN201910341357.9, dated Sep. 14, 2021 in 2 pages (of-record in parent application).
Office Action issued in China Application No. CN201910341357.9, dated Mar. 3, 2021 in 12 pages (of-record in parent application).
Office Action issued in China Application No. CN201910341357.9, dated Aug. 31, 2020 in 15 pages (of-record in parent application).
Office Action issued in China Application No. CN201910341357.9, dated Nov. 27, 2019 in 20 pages (of-record in parent application).
Notice of Decision to Grant issued in China Application No. CN201910341358.3, dated Nov. 26, 2020 in 2 pages (of-record in parent application).
Office Action issued in China Application No. CN201910341358.3, dated Jul. 29, 2020 in 12 pages (of-record in parent application).
Office Action issued in China Application No. CN201910341358.3, dated Nov. 4, 2019 in 22 pages (of-record in parent application).
Notice of Decision to Grant issued in China Application No. CN201980019404.6, dated Jan. 11, 2023 in 4 pages (of-record in parent application).
Office Action issued in China Application No. CN201980019404.6, dated Apr. 21, 2021 in 20 pages (of-record in parent application).
Office Action issued in China Application No. CN201980019404.6, dated Apr. 8, 2022 in 7 pages (of-record in parent application).
Office Action issued in China Application No. CN201980019404.6, dated Jul. 13, 2022 in 7 pages (of-record in parent application).
Office Action issued in China Application No. CN201980019404.6, dated Nov. 15, 2021 in 8 pages (of-record in parent application).
Notice of Decision to Grant issued in China Application No. CN202010571760.3, dated Dec. 12, 2022 in 4 pages (of-record in parent application).
Office Action issued in China Application No. CN202010571760.3, dated Dec. 3, 2021 in 11 pages (of-record in parent application).
Office Action issued in China Application No. CN202010571760.3, dated Dec. 3, 2021 in 5 pages (of-record in parent application).
Office Action issued in China Application No. CN202010571760.3, dated Aug. 3, 2022 in 9 pages (of-record in parent application).

(56) References Cited

OTHER PUBLICATIONS

Office Action issued in China Application No. CN202010571796.1, dated Jan. 6, 2022 in 10 pages (of-record in parent application).
Office Action issued in China Application No. CN202010571796.1, dated Oct. 10, 2022 in 6 pages (of-record in parent application).
Office Action issued in China Application No. CN202110242815.0, dated Jan. 5, 2023 in 10 pages (of-record in parent application).
Office Action issued in China Application No. CN202110242819.9, dated Jan. 28, 2023 in 9 pages (of-record in parent application).
Office Action issued in European Application No. EP17778143.2, dated Dec. 2, 2021 in 6 pages (of-record in parent application).
Office Action issued in European Application No. EP18815488.4, dated Apr. 30, 2021 in 4 pages (of-record in parent application).
Office Action issued in European Application No. EP18815488.4, dated Feb. 5, 2021 in 4 pages (of-record in parent application).
Office Action issued in European Application No. EP18815488.4, dated Feb. 18, 2022 in 6 pages (of-record in parent application).
Office Action issued in European Application No. EP18815488.4, dated Nov. 29, 2022 in 6 pages (of-record in parent application).
Office Action issued in European Application No. EP18815488.4, dated Jul. 21, 2021 in 9 pages (of-record in parent application).
Extended European Search Report issued in European Application No. EP19178742.3, dated Jul. 29, 2019 in 6 pages (of-record in parent application).
Office Action issued in European Application No. EP19178742.3, dated Dec. 2, 2021 in 6 pages (of-record in parent application).
Extended European Search Report issued in European Application No. EP19179498.1, dated Aug. 8, 2019 in 8 pages (of-record in parent application).
Office Action issued in European Application No. EP19179498.1, dated Jan. 23, 2023 in 4 pages (of-record in parent application).
Office Action issued in European Application No. EP19179498.1, dated Jun. 2, 2021 in 4 pages (of-record in parent application).
Office Action issued in European Application No. EP19717705.8, dated Sep. 12, 2022 in 6 pages (of-record in parent application).
Extended European Search Report issued in European Application No. EP20178836.1, dated Nov. 13, 2020 in 11 pages (of-record in parent application).
Office Action issued in European Application No. EP20178836.1, dated Feb. 3, 2022 in 5 pages (of-record in parent application).
Office Action issued in European Application No. EP20178836.1, dated Jul. 16, 2021 in 6 pages (of-record in parent application).
Partial European Search Report issued in European Application No. EP20178836.1, dated Aug. 17, 2020 in 11 pages (of-record in parent application).
First Examination Report issued in India Application No. IN201917010989, dated Feb. 18, 2021 in 7 pages (of-record in parent application).
First Examination Report issued in India Application No. IN201918013164, dated Feb. 18, 2021 in 6 pages (of-record in parent application).
First Examination Report issued in India Application No. IN202017039606, dated May 27, 2021 in 6 pages (of-record in parent application).
First Examination Report issued in India Application No. IN202118052983, dated Jun. 30, 2022 in 6 pages (of-record in parent application).
First Examination Report issued in India Application No. IN202118052984, dated Jun. 30, 2022 in 6 pages (of-record in parent application).
Notice of Allowance issued in Japan Application No. JP2019-070683, dated Mar. 29, 2021 in 5 pages (of-record in parent application).
Office Action issued in Japan Application No. JP2019-070683, dated May 22, 2020 in 12 pages (of-record in parent application).
Notice of Decision to Grant issued in Japan Application No. JP2019-070684, dated Apr. 12, 2021 in 5 pages (of-record in parent application).
Office Action issued in Japan Application No. JP2019-070684, dated May 22, 2020 in 12 pages (of-record in parent application).
Notice of Allowance issued in Japan Application No. JP2019-515893, dated May 21, 2021 in 3 pages (of-record in parent application).
Office Action issued in Japan Application No. JP2019-515893, dated Mar. 9, 2020 in 14 pages (of-record in parent application).
Office Action issued in Japan Application No. JP2019-515893, dated Oct. 16, 2020 in 15 pages (of-record in parent application).
Notice of Allowance issued in Japan Application No. JP2020-549624, dated Nov. 7, 2022 in 3 pages (of-record in parent application).
Office Action issued in Japan Application No. JP2020-549624, dated Jun. 13, 2022 in 18 pages (of-record in parent application).
Office Action issued in Japan Application No. JP2020-549624, dated Sep. 27, 2021 in 9 pages (of-record in parent application).
Notice of Allowance issued in Japan Application No. JP2021-102592, dated Dec. 23, 2022 in 3 pages (of-record in parent application).
Office Action issued in Japan Application No. JP2021-102592, dated Jun. 6, 2022 in 8 pages (of-record in parent application).
Office Action issued in Japan Application No. JP2021-102593, dated May 13, 2022 in 12 pages (of-record in parent application).
Notice of Decision to Grant issued in Korea Application No. KR10-2019-7008043, dated Oct. 22, 2020 in 5 pages (of-record in parent application).
Office Action issued in Korea Application No. KR10-2019-7008043, dated Jan. 29, 2020 in 12 pages (of-record in parent application).
KR10-2019-7009018 , Notice of Decision to Grant issued in Korea Application No. dated Oct. 27, 2020 in 3 pages (of-record in parent application).
Office Action issued in Korea Application No. KR10-2019-7009018, dated Dec. 24, 2019 in 13 pages (of-record in parent application).
Office Action issued in Korea Application No. KR10-2019-7009018, dated Apr. 28, 2020 in 5 pages (of-record in parent application).
Notice of Decision to Grant issued in Korea Application No. KR10-2019-7009025, dated Mar. 29, 2021 in 5 pages (of-record in parent application).
Office Action issued in Korea Application No. KR10-2019-7009025, dated Feb. 18, 2020 in 12 pages (of-record in parent application).
Office Action issued in Korea Application No. KR10-2019-7009025, dated Oct. 22, 2020 in 9 pages (of-record in parent application).
Notice of Decision to Grant issued in Korea Application No. KR10-2020-7012847, dated Jul. 27, 2021 in 6 pages (of-record in parent application).
Office Action issued in Korea Application No. KR10-2020-7012847, dated Mar. 31, 2021 in 7 pages (of-record in parent application).
Notice of Decision to Grant issued in Korea Application No. KR10-2020-7013623, dated Jul. 27, 2021 in 5 pages (of-record in parent application).
Office Action issued in Korea Application No. KR10-2020-7013623, dated Mar. 31, 2021 in 10 pages (of-record in parent application).
Notice of Decision to Grant issued in Korea Application No. KR10-2020-7026645, dated Mar. 29, 2022 in 2 pages (of-record in parent application).
Office Action issued in Korea Application No. KR10-2020-7026645, dated Aug. 27, 2021 in 16 pages (of-record in parent application).
Office Action issued in Korea Application No. KR10-2020-7026645, dated Aug. 27, 2021 in 7 pages (of-record in parent application).
Notice of Decision to Grant issued in Korea Application No. KR10-2021-7002922, dated Oct. 29, 2021 in 3 pages (of-record in parent application).
Office Action issued in Korea Application No. KR10-2021-7002922, dated Apr. 27, 2021 in 15 pages (of-record in parent application).

(56) References Cited

OTHER PUBLICATIONS

Notice of Decision to Grant issued in Korea Application No. KR10-2021-7015409, dated Feb. 24, 2022 in 3 pages (of-record in parent application).
Office Action issued in Korea Application No. KR10-2021-7015409, dated Aug. 27, 2021 in 9 pages (of-record in parent application).
Notice of Decision to Grant issued in Korea Application No. KR10-2021-7016617, dated Mar. 30, 2022 in 3 pages (of-record in parent application).
Office Action issued in Korea Application No. KR10-2021-7016617, dated Jul. 27, 2021 in 11 pages (of-record in parent application).
Notice of Decision to Grant issued in Korea Application No. KR10-2021-7016621, dated Mar. 30, 2022 in 3 pages (of-record in parent application).
Office Action issued in Korea Application No. KR10-2021-7016621, dated Jul. 27, 2021 in 5 pages (of-record in parent application).
Office Action issued in Korea Application No. KR10-2022-7014204, dated Dec. 5, 2022 in 9 pages (of-record in parent application).
Office Action issued in Korea Application No. KR10-2022-7021465, dated Dec. 23, 2022 in 3 pages (of-record in parent application).
Office Action issued in Korea Application No. KR10-2022-7021721, dated Feb. 27, 2023 in 6 pages (of-record in parent application).
Kuipers , "Gioteck EX-05, Draadloze Headset Review Voor Xbox 360, Playstation 3 en PC", Available Online at, URL:https://nl.hardware.infojreviews/2719/2/gioteck-ex-05-draadloze-headset-review-feature-set, [retrieved on Jun. 17, 2019], May 12, 2012 in, 2 pages (of-record in parent application).
Marcus , "AKG K872 Review", Headfonics, Available Online at, URL:https://headfonics.com/2016/12/the-k872-by-akg/, [Retrieved on Jun. 17, 2019], Dec. 21, 2016 in 14 pages (of-record in parent application).
International Preliminary Report on Patentability Action issued in PCT Application No. PCT/US2017/052978, dated Apr. 4, 2019 in 8 pages (of-record in parent application).
International Search Report and Written Opinion issued in PCT Application No. PCT/US2017/052978, dated Nov. 22, 2017 in 14 pages (of-record in parent application).
International Preliminary Report on Patentability issued in PCT Application No. PCT/US2018/062143, dated Jun. 4, 2020 in 12 pages (of-record in parent application).
International Search Report and Written Opinion issued in PCT Application No. PCT/US2018/062143, dated Jun. 12, 2019 in 18 pages (of-record in parent application).
Invitation to Pay Additional Fees and, Where Applicable, Protest Fee issued in PCT Application No. PCT/US2018/062143, dated Mar. 6, 2019 in 11 pages (of-record in parent application).
International Preliminary Report on Patentability issued in PCT Application No. PCT/US2019/025384, dated Oct. 15, 2020 in 10 pages (of-record in parent application).
International Search Report and Written Opinion issued in PCT Application No. PCT/US2019/025384, dated Jun. 25, 2019 in 14 pages (of-record in parent application).
Ramo et al., "An Allpass Hear-Through Headset", 22nd European Signal Processing Conference (EUSIPCO), Sep. 2014 in 5 pages (of-record in parent application).
Notice of Decision to Grant issued in Taiwan Application No. TW108111777, dated Jun. 17, 2022 in 3 pages (of-record in parent application).
Office Action issued in Taiwan Application No. TW108111777, dated Jun. 10, 2020 in 15 pages (of-record in parent application).
Office Action issued in Taiwan Application No. TW108111777, dated Jun. 10, 2020 in 8 pages (of-record in parent application).
Office Action issued in Taiwan Application No. TW108111777, dated Mar. 14, 2022 in 3 pages (of-record in parent application).
Office Action issued in Taiwan Application No. TW108111777, dated Mar. 15, 2021 in 4 pages (of-record in parent application).
Tyler, "How to Replace G930 Headband and Ear Pads", YouTube, XP 55958011, Available Online at: https://www.youtube.com/watch?v=efnCnEgzqxU, dated Mar. 9, 2016 in 2 pages (of-record in parent application).
Office Action issued in European Application No. EP18815488.4, dated Oct. 6, 2023 in 7 pages.
Office Action issued in European Application No. EP19178742.3, dated Sep. 20, 2023 in 4 pages.
Notice of Allowance issued in U.S. Appl. No. 17/158,810, dated Jun. 16, 2022 in 9 pages.
Supplemental Notice of Allowability issued in U.S. Appl. No. 17/158,810, dated Aug. 3, 2022 in 2 pages.
Non-Final Office Action issued in U.S. Appl. No. 17/177,063, dated May 11, 2022 in 13 pages.
Notice of Allowance issued in U.S. Appl. No. 17/177,063, dated Sep. 27, 2022 in 11 pages.
Supplemental Notice of Allowability issued in U.S. Appl. No. 17/177,063, dated Dec. 28, 2022 in 2 pages.
Corrected Notice of Allowability issued in U.S. Appl. No. 17/804,274, dated Apr. 25, 2023 in 2 pages.
Office Action issued in China Application No. CN202110242819.9, dated May 13, 2023 in 14 pages.
Intention to Grant issued in European Application No. EP17778143.2, dated Jun. 2, 2023 in 8 pages.
Intention to Grant issued in European Application No. EP20178836.1, dated Mar. 21, 2023 in 9 pages.
Office Action issued in China Application No. CN202110242815.0, dated Aug. 16, 2023 in 3 pages.
Office Action issued in China Application No. CN202110242819.9, dated Aug. 18, 2023 in 5 pages.
Office Action issued in Korea Application No. KR10-2022-7021721, dated Aug. 30, 2023 in 6 pages.
Office Action issued in Japan Application No. JP2022-156406, dated Dec. 8, 2023 in 4 pages.
Office Action issued in Japan Application No. JP2023006677, dated Feb. 13, 2024 in 15 pages.
Summons to Attend Oral Proceedings in European Application No. EP19179498.1, dated Jan. 30, 2024 in 6 pages.
Office Action issued in China Application No. CN202110899469.3, dated Mar. 2, 2024 in 5 pages.
Office Action issued in Korea Application No. KR10-2023-7021720, dated Feb. 29, 2024 in 5 pages.

* cited by examiner

*B-B*

C-C

HEADPHONES WITH INCREASED BACK VOLUME

CROSS REFERENCES TO RELATED APPLICATIONS

This application is a continuation of U.S. application Ser. No. 17/804,274 filed May 26, 2022, which is a continuation of U.S. application Ser. No. 16/878,565 filed May 19, 2020, now U.S. Pat. No. 11,375,306, entitled "HEADPHONES WITH INCREASED BACK VOLUME," which is a continuation of International Application No. PCT/US2018/062143 filed Nov. 20, 2018, which claims priority to U.S. Provisional Application No. 62/588,801 filed Nov. 20, 2017. The disclosure of each of the Ser. No. 16/878,565, PCT/US2018/062143 and 62/588,801 applications are herein incorporated by reference in their entirety for all purposes.

FIELD

The described embodiments relate generally to various headphone features. More particularly, the various features help improve the overall user experience by incorporating an array of sensors and new mechanical features into the headphones.

BACKGROUND

Headphones have now been in use for over 100 years, but the design of the mechanical frames used to hold the earpieces against the ears of a user have remained somewhat static. For this reason, some over-head headphones are difficult to easily transport without the use of a bulky case or by wearing them conspicuously about the neck when not in use. Conventional interconnects between the earpieces and band often use a yoke that surrounds the periphery of each earpiece, which adds to the overall bulk of each earpiece. Furthermore, headphones users are required to manually verify that the correct earpieces are aligned with the ears of a user any time the user wishes to use the headphones. Consequently, improvements to the aforementioned deficiencies are desirable.

SUMMARY

This disclosure describes several improvements on circumaural and supra-aural headphone frame designs.

A portable listening device is disclosed and includes the following: first and second earpieces; an adjustable length headband assembly coupling the first earpiece to the second earpiece, the adjustable length headband assembly comprising: a housing component defining an interior volume; and a hollow stem coupling the first earpiece to the housing component and being configured to telescope into and out of the interior volume; and a data synchronization cable extending through the hollow stem and the interior volume to electrically couple the first and second earpieces, a coiled portion of the data synchronization cable being disposed within the hollow stem.

Headphones are disclosed and include the following: first and second earpieces; an adjustable length headband assembly coupling the first earpiece to the second earpiece, the adjustable length headband assembly comprising: a housing component defining an interior volume; a hollow stem coupling the first earpiece to the housing component and being configured to telescope into and out of the interior volume; a first stabilizing element disposed at a distal end of the hollow stem; a second stabilizing element disposed at a distal end of the housing component; and a data synchronization cable extending through both the hollow stem and the interior volume to electrically couple the first and second earpieces.

A portable listening device is disclosed and includes the following: an earpiece, comprising: an earpiece housing; and a latching mechanism disposed within the earpiece housing, the latching mechanism having a latch plate defining an aperture and a switch configured to shift a position of the latch plate from a first position to a second position; and a headband assembly coupled to the earpiece by the latching mechanism, the headband assembly comprising a stem base positioned at a first end of the headband assembly, the stem base extending through the aperture.

An earpiece is disclosed and includes the following: an earpiece housing defining a stem opening; a speaker disposed within the earpiece housing; and a latching mechanism disposed within the earpiece housing, the latching mechanism having a latch plate defining an asymmetric aperture and a switch configured to shift a position of the latch plate from a first position in which a first portion of the asymmetric aperture is aligned with the stem opening to a second position in which a second portion of the asymmetric aperture is aligned with the stem opening, wherein the first portion of the asymmetric aperture is smaller than the second portion.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1A:
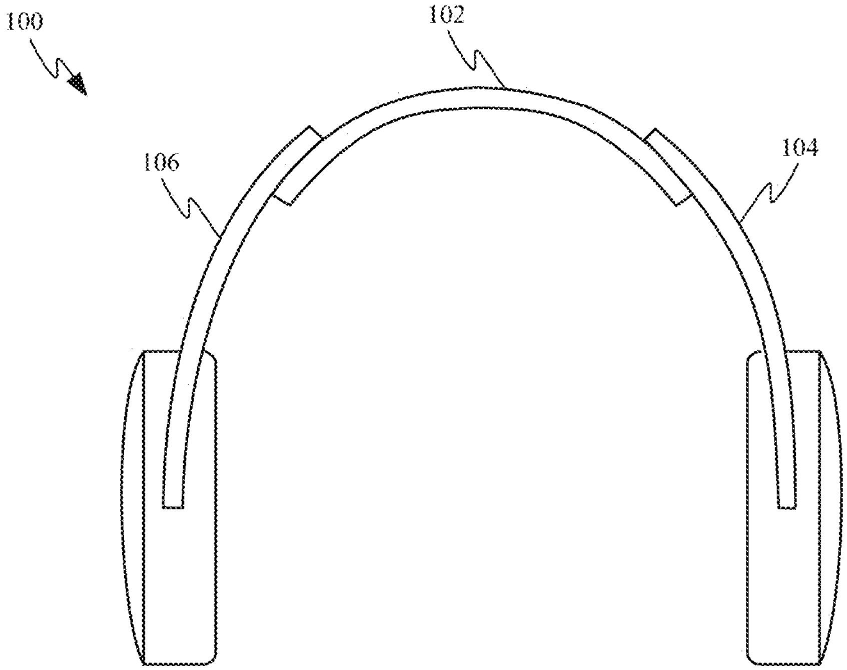
FIG. 1A shows a front view of an exemplary set of over ear or on-ear headphones.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Headphones have been in production for many years, but numerous design problems remain. For example, the functionality of headbands associated with headphones has generally been limited to a mechanical connection functioning only to maintain the earpieces of the headphones over the ears of a user and provide an electrical connection between the earpieces. Furthermore, the incorporation of headphones into other types of portable listening devices, such as augmented reality and virtual reality headsets has also been slow due to an unwillingness to adapt headphones to new and improved form factors. The headband tends to add substantially to the bulk of the headphones, thereby making storage of the headphones problematic. Stems connecting the headband to the earpieces that are designed to accommodate adjustment of an orientation of the earpieces with respect to a user's ears also add bulk to the headphones. Stems connecting the headband to the earpieces that accommodate elongation of the headband generally allow a central portion of the headband to shift to one side of a user's head. This shifted configuration can look somewhat odd and depending on the design of the headphones can also make the headphones less comfortable to wear.

While some improvements such as wireless delivery of media content to the headphones has alleviated the problem of cord tangle, this type of technology introduces its own batch of problems. For example, because wireless headphones require battery power to operate, a user who leaves the wireless headphones turned on could inadvertently exhaust the battery of the wireless headphones, making them unusable until a new battery can be installed or for the device to be recharged. Another design problem with many headphones is that a user must generally figure out which earpiece corresponds to which ear to prevent the situation in which the left audio channel is presented to the right ear and the right audio channel is presented to the left ear.

A solution to the unsynchronized positioning of the earpieces is to incorporate an earpiece synchronization component taking the form of a mechanical mechanism disposed within the headband that synchronizes the distance between the earpieces and respective ends of the headband. This type of synchronization can be performed in multiple ways. In some embodiments, the earpiece synchronization component can be a cable extending between both stems that can be configured to synchronize the movement of the earpieces. The cable can be arranged in a loop where different sides of the loop are attached to respective stems of the earpieces so that motion of one earpiece away from the headband causes the other earpiece to move the same distance away from the opposite end of the headband. Similarly, pushing one earpiece towards one side of the headband translates the other earpiece the same distance towards the opposite side of the headband. In some embodiments, the earpiece synchronization component can be a rotating gear embedded within the headband can be configured to engage teeth of each stem to keep the earpieces synchronized.

One solution to the conventional bulky connections between headphones stems and earpieces is to use a spring-driven pivot mechanism to control motion of the earpieces with respect to the band. The spring-driven pivot mechanism can be positioned near the top of the earpiece, allowing it to be incorporated within the earpiece instead of being external to the earpiece. In this way, pivoting functionality can be built into the earpieces without adding to the overall bulk of the headphones. Different types of springs can be utilized to control the motion of the earpieces with respect to the headband. Specific examples that include torsional springs and leaf springs are described in detail below. The springs associated with each earpiece can cooperate with springs within the headband to set an amount of force exerted on a user wearing the headphones. In some embodiments, the springs within the headband can be low spring-rate springs configured to minimize the force variation exerted across a large spectrum of users with different head sizes. In some embodiments, the travel of the low-rate springs in the headband can be limited to prevent the headband from clamping to tightly about the neck of a user when being worn around the neck.

One solution to the large headband form-factor problem is to design the headband to flatten against the earpieces. The flattening headband allows for the arched geometry of the headband to be compacted into a flat geometry, allowing the headphones to achieve a size and shape suitable for more convenient storage and transportation. The earpieces can be attached to the headband by a foldable stem region that allows the earpieces to be folded towards the center of the headband. A force applied to fold each earpiece in towards the headband is transmitted to a mechanism that pulls the corresponding end of the headband to flatten the headband. In some embodiments, the stem can include an over-center locking mechanism that prevents inadvertent return of the headphones to an arched state without requiring the addition of a release button to transition the headphones back to the arched state.

A solution to the power management problems associated with wireless headphones includes incorporating an orientation sensor into the earpieces that can be configured to monitor an orientation of the earpieces with respect to the band. The orientation of the earpieces with respect to the band can be used to determine whether or not the headphones are being worn over the ears of a user. This information can then be used to put the headphones into a standby mode or shut the headphones down entirely when the headphones are not determined to be positioned over the ears of a user. In some embodiments, the earpiece orientation sensors can also be utilized to determine which ears of a user the earpieces are currently covering. Circuitry within the headphones can be configured to switch the audio channels routed to each earpiece in order to match the determination regarding which earpiece is on which ear of the user.

These and other embodiments are discussed below with reference to FIGS. 1-31E; however, those skilled in the art will readily appreciate that the detailed description given herein with respect to these figures is for explanatory purposes only and should not be construed as limiting.

Symmetric Telescoping Earpieces

Figure 1B:
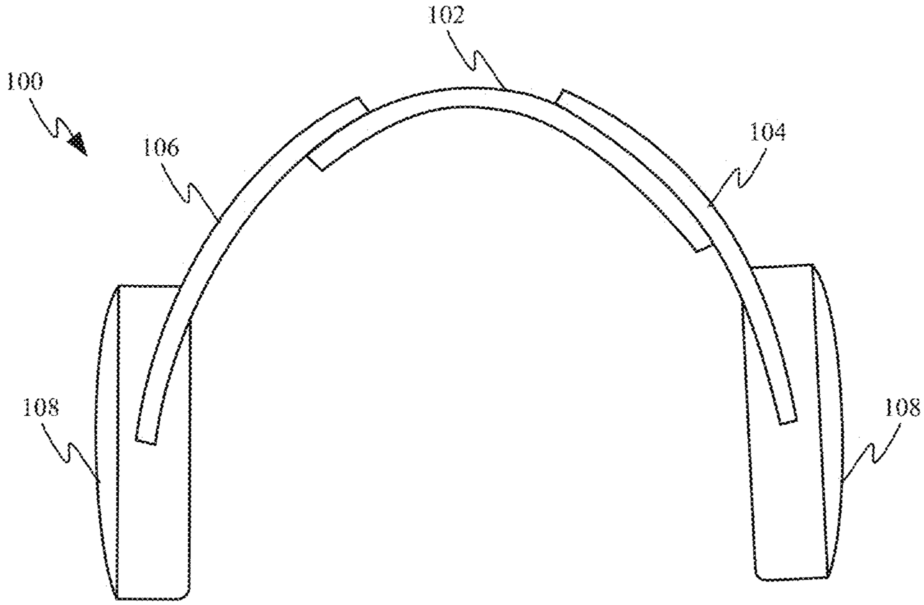
FIG. 1B shows headphone stems extending different distances from a headband assembly.

FIG. 1A shows a front view of an exemplary set of over ear or on-ear headphones 100. Headphones 100 includes a band 102 that interacts with stems 104 and 106 to allow for adjustability of the size of headphones 100. In particular, stems 104 and 106 are configured to shift independently with respect to band 102 in order to accommodate multiple different head sizes. In this way, the position of earpieces 108 and 110 can be adjusted to position earpieces 108 and 110 directly over the ears of a user. Unfortunately, as can be seen in FIG. 1B, this type of configuration allows stems 104 and 106 to become mismatched with respect to band 102. The configuration shown in FIG. 1B can be less comfortable for a user and additionally lack cosmetic appeal. To remedy these issues, the user would be forced to manually adjust stems 104 and 106 with respect to band 102 in order to achieve a desirable look and comfortable fit. FIGS. 1A-1B also show how stems 104 and 106 extend down to a central portion of earpieces 108 in order to allow earpieces 108 to rotate to accommodate the curvature of a user's head. As mentioned above the portions of stems 104 and 106 that extend down around earpieces 108 increase the diameters of earpieces 108.

Figure 2A:
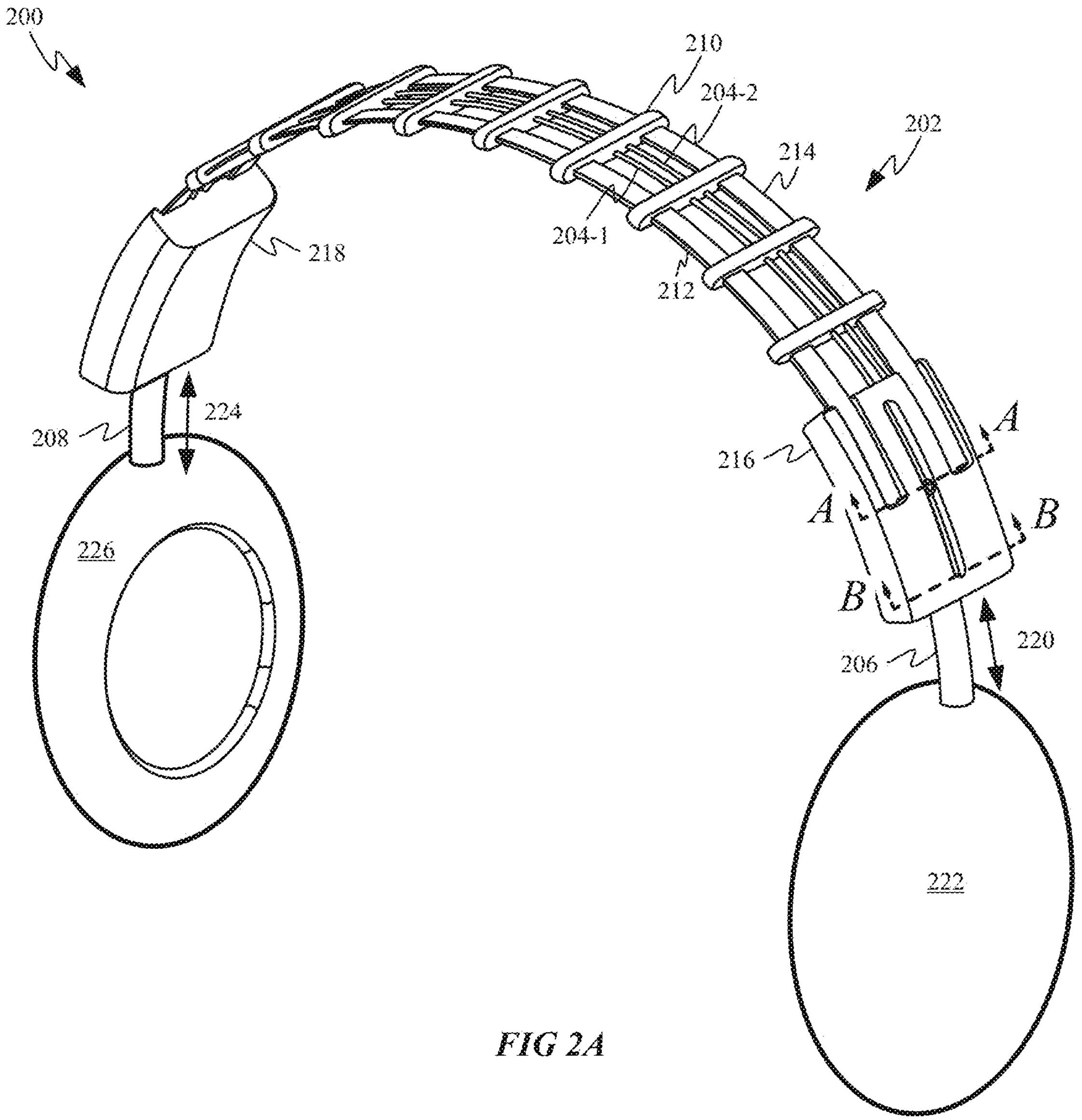
FIG. 2A shows a perspective view of a first side of headphones with synchronized headphone stems.

FIG. 2A shows a perspective view of headphones 200 with a headband 202 configured to solve the problems depicted in FIGS. 1A-1B. Headband 202 is depicted without a cosmetic covering to reveal internal features. In particular, headband 202 can include a wire loop 204 configured to synchronize the movement of stems 206 and 208. Wire guides 210 can be configured to maintain a curvature of wire loop 204 that matches the curvature of leaf springs 212 and 214. Leaf springs 212 and 214 can be configured to define the shape of headband 202 and to exert a force upon the head of a user. Each of wire guides 210 can include openings through which opposing sides of wire loop 204 and leaf springs 212 and 214 can pass. In some embodiments, the openings for wire loop 204 can be defined by low-friction bearings to prevent noticeable friction from impeding the motion of wire loop 204 through the openings. In this way, wire guides 210 define a path along which wire loop 204 extends between stem housings 216 and 218. Wire loop 204 is coupled to both stem 206 and stem 208 and functions to maintain a distance 120 between an earpiece 122 and stem housing 116 substantially the same as a distance 124 between earpiece 126 and stem housing 118. A first side 204-1 of wire loop 204 is coupled to stem 206 and a second side 204-2 of wire loop 204 is coupled to stem 208. Because opposite sides of the wire loop are attached to stems 206 and 208 movement of one of the stems results in movement of the other stem in the same direction.

Figure 2B:
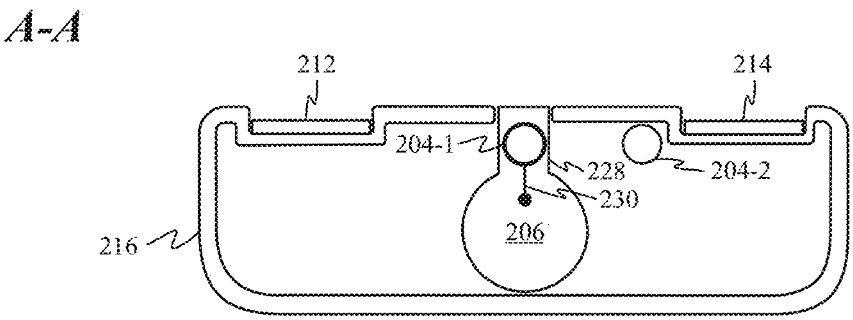
FIGS. 2B-2C show cross-sectional views of the headphones depicted in FIG. 2A in accordance with section lines A-A and B-B, respectively.

FIG. 2B shows a cross-sectional view of a portion of stem housing 116 in accordance with section line A-A. In particular, FIG. 2B shows how a protrusion 228 of stem 206 engages part of wire loop 204. Because protrusion 228 of stem 206 is coupled with wire loop 204, when a user of headphones 100 pulls earpiece 222 farther away from stem housing 216, wire loop 204 is also pulled causing wire loop 204 to circulate through headband 202. The circulation of wire loop 204 through headband 202 adjusts the position of earpieces 226, which is similarly coupled to wire loop 204 by a protrusion of stem 208. In addition to forming a mechanical coupling with wire loop 204, protrusion 228 can also be electrically coupled to wire loop 204. In some embodiments, protrusion 228 can include an electrically conductive pathway 230 that electrically couples wire loop 204 to electrical components within earpiece 222. In some embodiments, wire loop 204 can be formed from an electrically conductive material, so that signals can be transferred between components within earpieces 222 and 226 by way of wire loop 204.

Figure 2C:
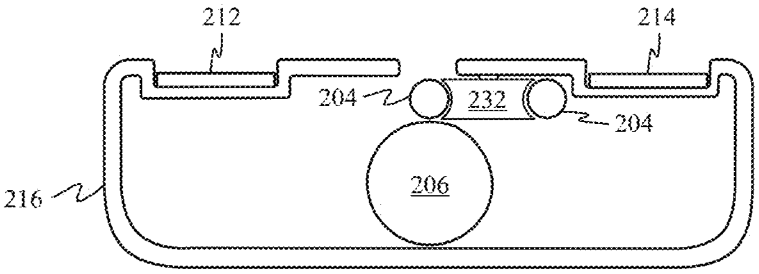

FIG. 2C shows another cross-sectional view of stem housing 116 in accordance with section line B-B. In particular, FIG. 2C shows how wire loop 204 engages pulley 232 within stem housing 216. Pulley 232 minimizes any friction generated by the movement of earpiece 222 closer or farther away from stem housing 216. Alternatively, wire loop 204 can be routed through a static bearing within stem housing 216.

Figure 2D:
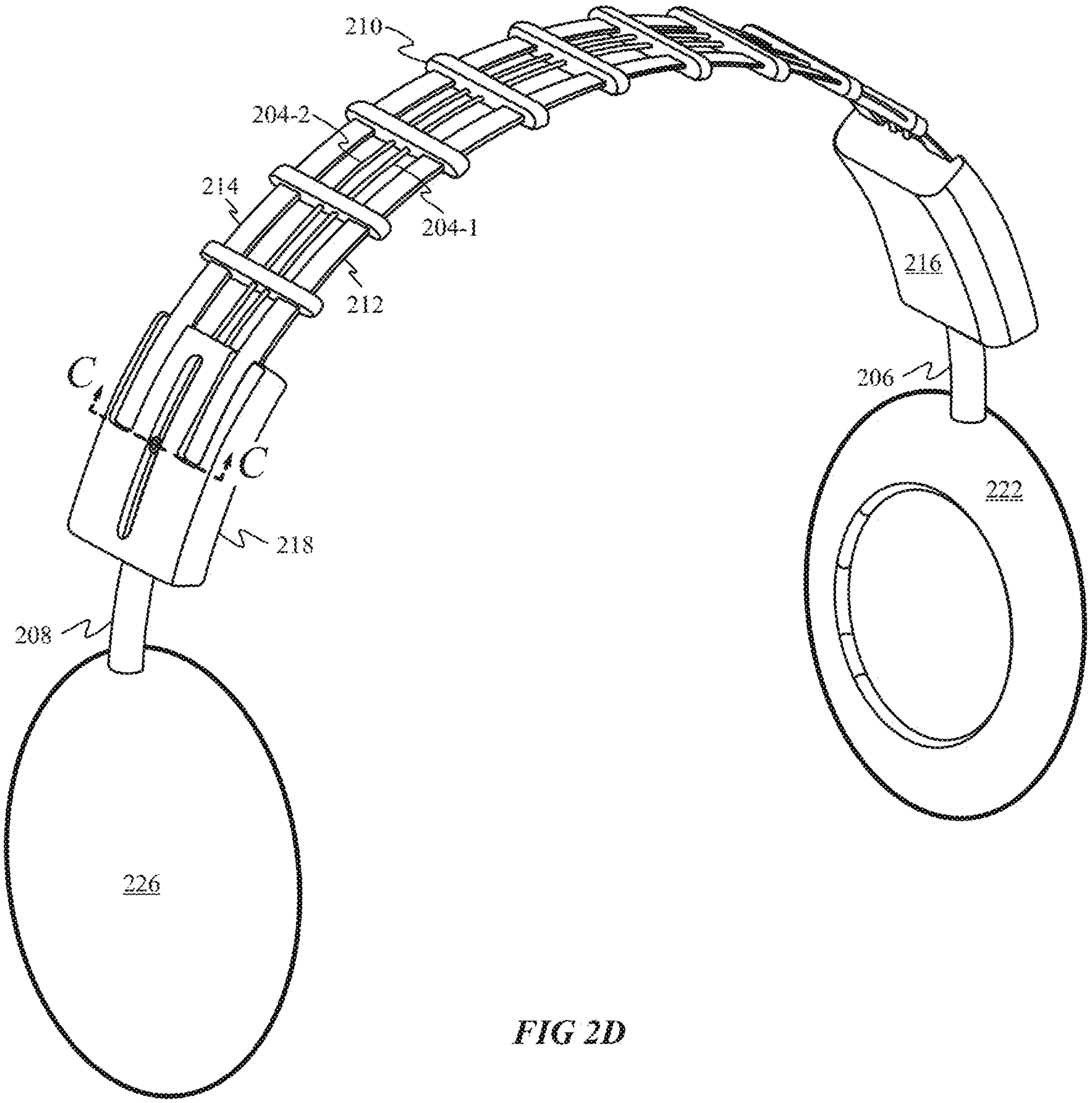
FIG. 2D shows a perspective view of an opposite side of the headphones depicted in FIG. 2A.

FIG. 2D shows another perspective view of headphones 200. In this view, it can be seen that first side 204-1 and second side 204-2 of wire loop 204 shift laterally as they cross from one side of headband 202 to the other. This can be accomplished by the openings defined by wire guides 210 being gradually offset so that by the time sides 204-1 and 204-2 reach stem housing 218, second side 204-2 is centered and aligned with stem 208, as depicted in FIG. 2E.

Figure 2E:
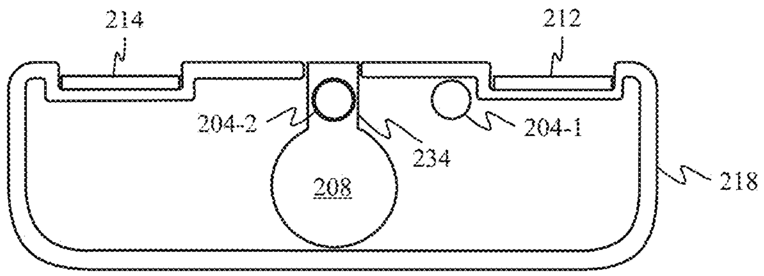
FIG. 2E shows a cross-sectional view of the headphones depicted in FIG. 2D in accordance with section line C-C.

FIG. 2E shows how second side 204-2 is engaged by protrusion 234. Because stems 206 and 208 are attached to respective first and second sides of wire loop 204, pushing earpiece 226 towards stem housing 218 also results in earpiece 222 being pushed towards stem housing 216. Another advantage of the configuration depicted in FIGS. 2A-2E is that regardless of the direction of travel of stems 206 and 208, wire loop 204 always stays in tension. This keeps the amount of force needed to extend or retract earpieces 222 and 226 consistent regardless of direction.

Figure 2F:
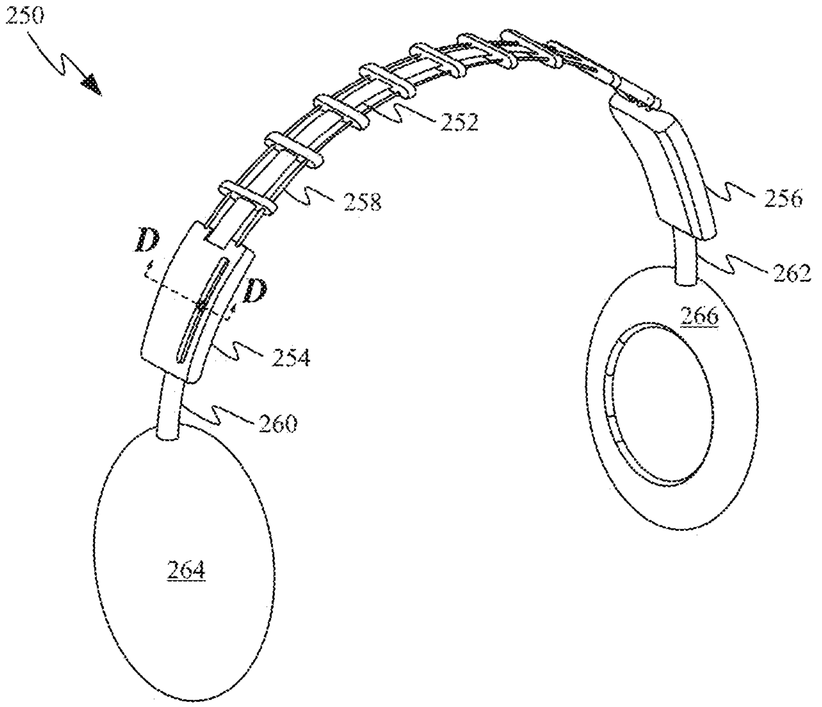
FIGS. 2F-2G show perspective views of a second side of headphones with synchronized headphone stems and a unitary spring band.
Figure 2G:
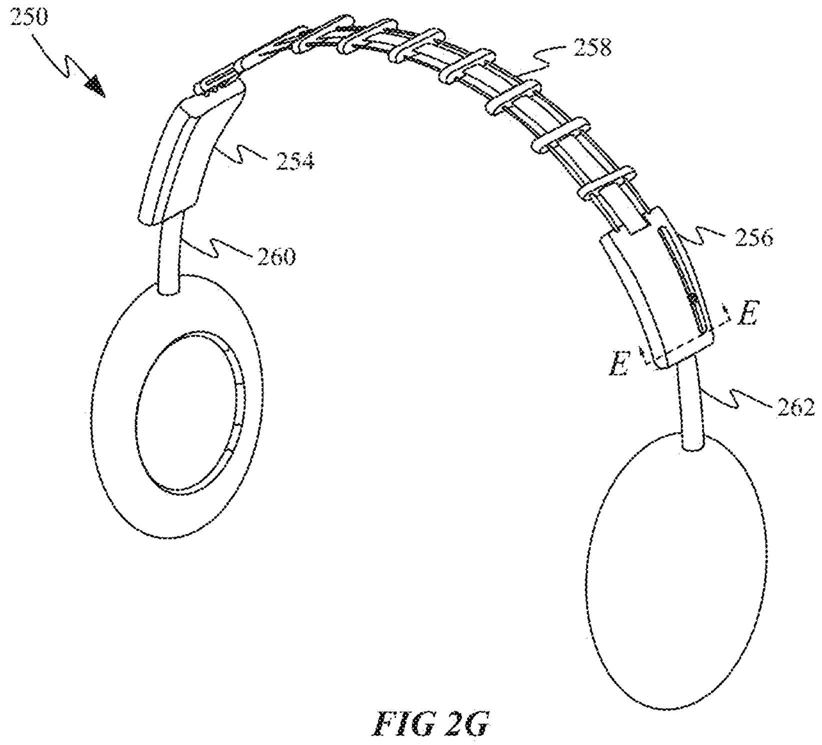

FIGS. 2F-2G show perspective views of headphones 250. Headphones 250 are similar to headphones 200 with the exception that only a single leaf spring 252 is used to connect stem housing 254 to stem housing 256. In this embodiment, wire loop 258 can be positioned to either side of leaf spring 252. Instead of being positioned directly below one side of wire loop 258, stems 260 and 262 can be positioned directly between the two sides of wire loop 258 and connected to one side of wire loop 258 by an arm of stems 260 and 262.

Figure 2H:
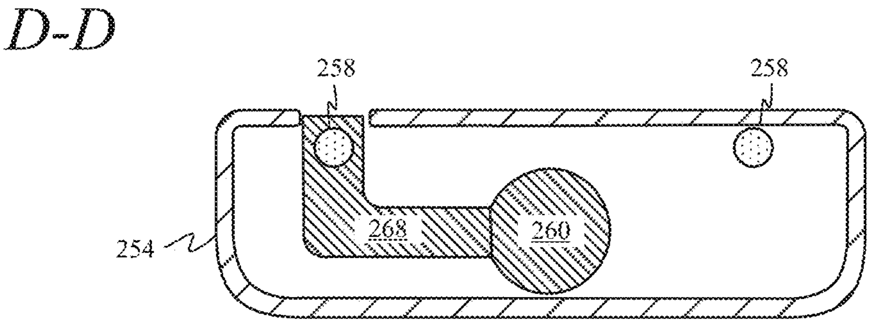
FIGS. 2H-2I show cross-sectional views of the headphones depicted in FIGS. 2F-2G in accordance with section lines D-D and E-E, respectively.
Figure 2I:
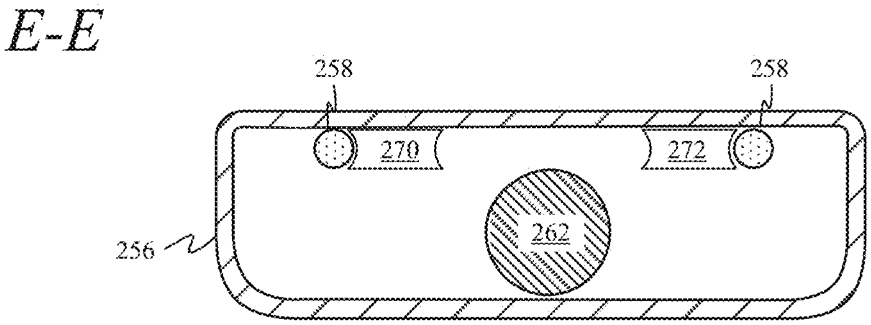

FIGS. 2H and 2I show cross-sectional views of an interior portion of stem housings 254 and 256. FIG. 2H shows a cross-sectional view of stem housing 254 in accordance with section line D-D. FIG. 2H shows how stem 260 can include a laterally protruding arm 268 that engages wire loop 258. In this way, laterally protruding arm 268 couples stem 260 to wire loop 258 so that when earpiece 264 is moved earpiece 266 is kept in an equivalent position. FIG. 2I shows a cross-sectional view of stem housing 256 in accordance with section line E-E. FIG. 2I also shows how wire loop 258 can be routed within stem housing 256 by pulleys 270 and 272. By routing wire loop 258 above stem 262 any interference between wire loop 258 and stem 206 can be avoided.

Figure 3A:
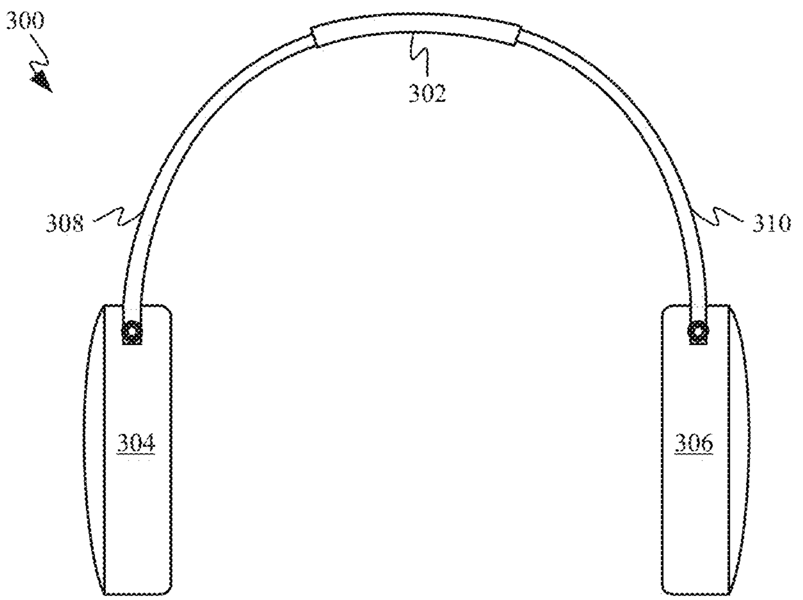
FIG. 3A shows exemplary headphones having a headband assembly configured to synchronize adjustment of the positions of its earpieces.
Figure 3B:
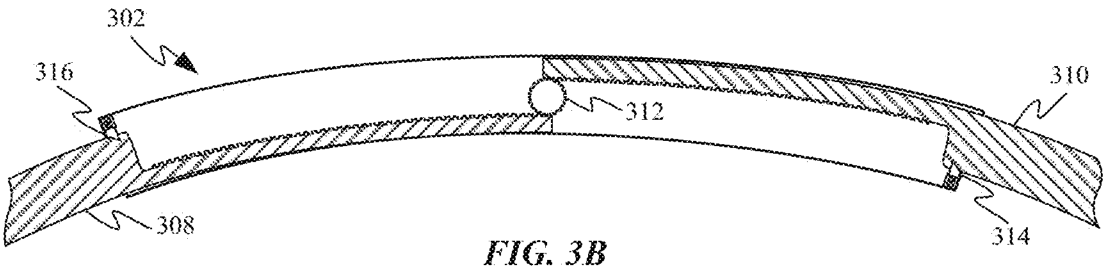
FIG. 3B shows a cross-sectional view of a headband assembly when the headphones are expanded to their largest size.
Figure 3C:
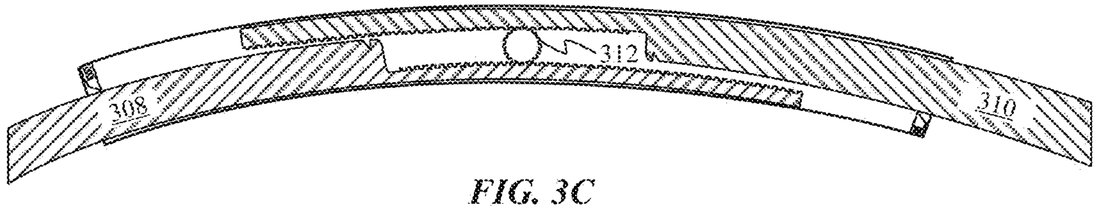
FIG. 3C shows a cross-sectional view of the headband assembly when the headphones are contracted to a smaller size.

FIGS. 3A-3C show another headphones embodiment configured to solve problems described in FIGS. 1A-1B. FIG. 3A shows headphones 300, which includes headband assembly 302. Headband assembly 302 is joined to earpieces 304 and 306 by stems 308 and 310. A size and shape of headband assembly 302 can vary depending on how much adjustability is desirable for headphones 300.

FIG. 3B shows a cross-sectional view of headband assembly 302 when headphones 300 are expanded to their largest size. In particular, FIG. 3B shows how headband assembly 302 includes a gear 312 configured to engage teeth defined by the ends of each of stems 308 and 310. In some embodiments, stems 308 and 310 can be prevented from pulling completely out of headband assembly 302 by spring pins 314 and 316 by engaging openings defined by stems 308 and 310.

FIG. 3C shows a cross-sectional view of headband assembly 302 when headphones 300 are contracted to a smaller size. In particular, FIG. 3C shows how gear 312 keeps the position of stems 308 and 310 synchronized on account of any movement of stem 308 or stem 310 being translated to the other stem by gear 312. In some embodiments, a stiffness of the housing defining the exterior of headband assembly 302 can be selected to match the stiffness of stems 308 and 310 to provide a user of headphones 300 with a headband having a more consistent feel.

Figure 3D:
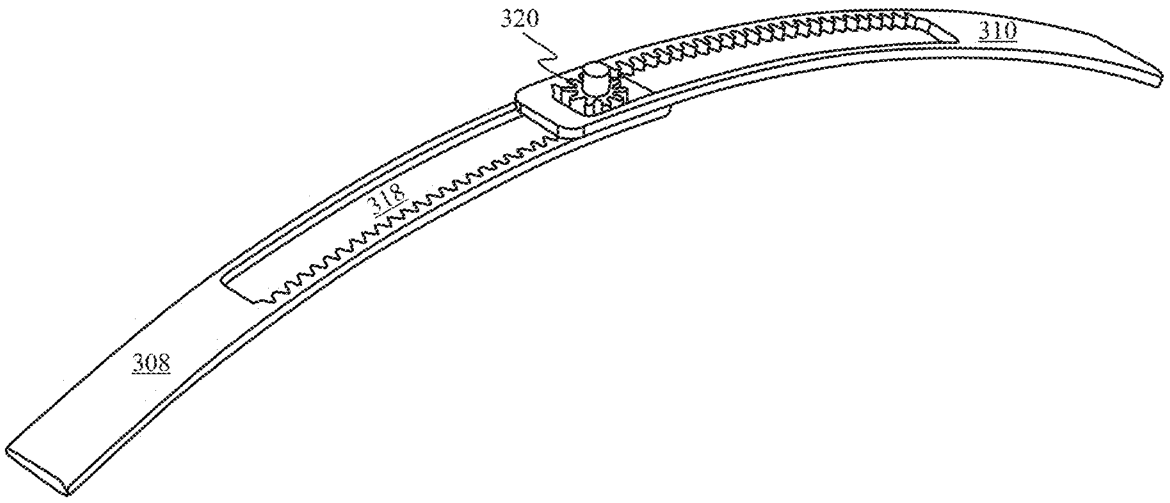
FIGS. 3D-3F show perspective top and cross-sectional views of a headband assembly configured to synchronize earpiece position.

FIG. 3D shows an alternative embodiment of stems 308 and 310. A cover concealing the ends of stems 308 and 310 has been removed to more clearly show the features of the mechanism synchronizing the positions of the stems. Stem 308 defines an opening 318 extending through a portion of stem 308. One side of opening 318 has teeth configured to engage gear 320. Similarly, stem 310 defines an opening 322 extending through a portion of stem 310. One side of opening 322 has teeth configured to engage gear 320. Because opposing sides of openings 318 and 322 engage gear 320, any motion of one of stems 308 and 310 causes the other stem to move. In this way, earpieces positioned at the ends of each of stem 308 and stem 310 are synchronized.

Figure 3E:
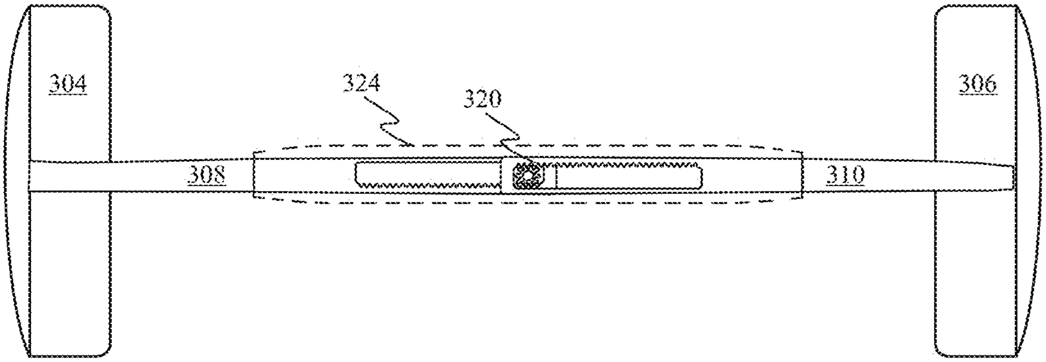
Figure 3F:
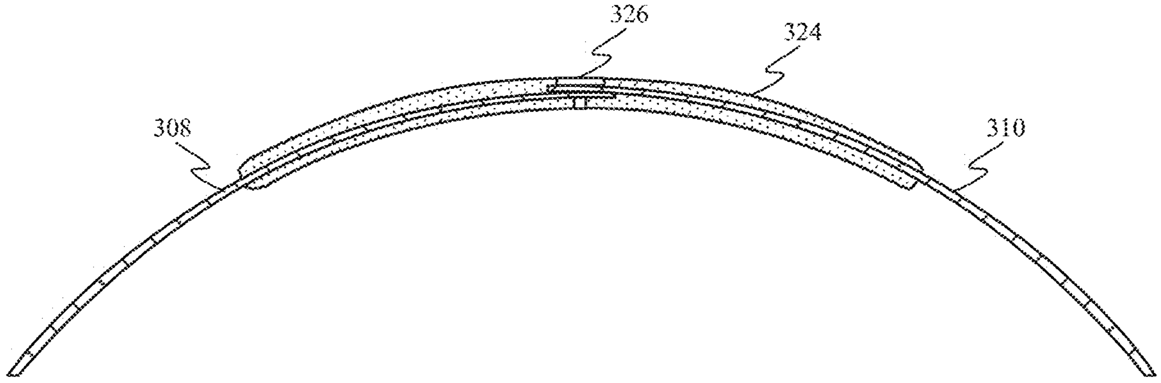

FIG. 3E shows a top view of stems 308 and 310. FIG. 3E also shows an outline of a cover 324 for concealing the geared openings defined by stems 308 and 310 and controlling the motion of the ends of stems 308 and 310. FIG. 3F shows a cross-sectional side view of stems 308 and 310 covered by cover 324. Gear 320 can include bearing 326 for defining the axis of rotation for gear 320. In some embodiments, the top of bearing 326 can protrude from cover 324, allowing a user to adjust the earpiece positions by manually rotating bearing 326. It should be appreciated that a user could also adjust the earpiece positions by simply pushing or pulling on one of stems 308 and 310.

Figure 3G:
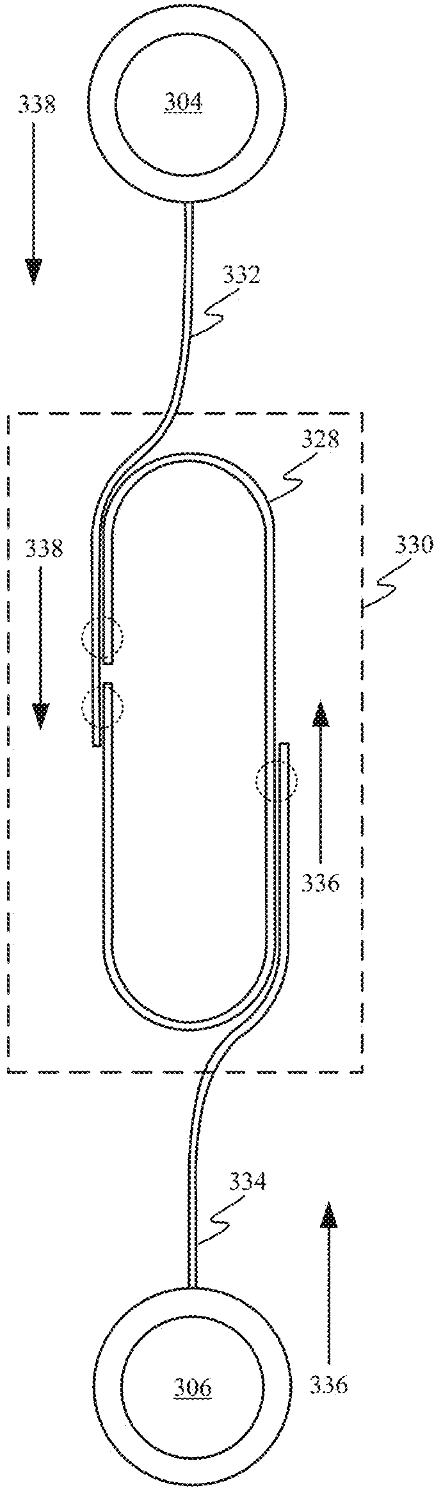
FIGS. 3G-3H show a top view of an earpiece synchronization assembly.
Figure 3H:
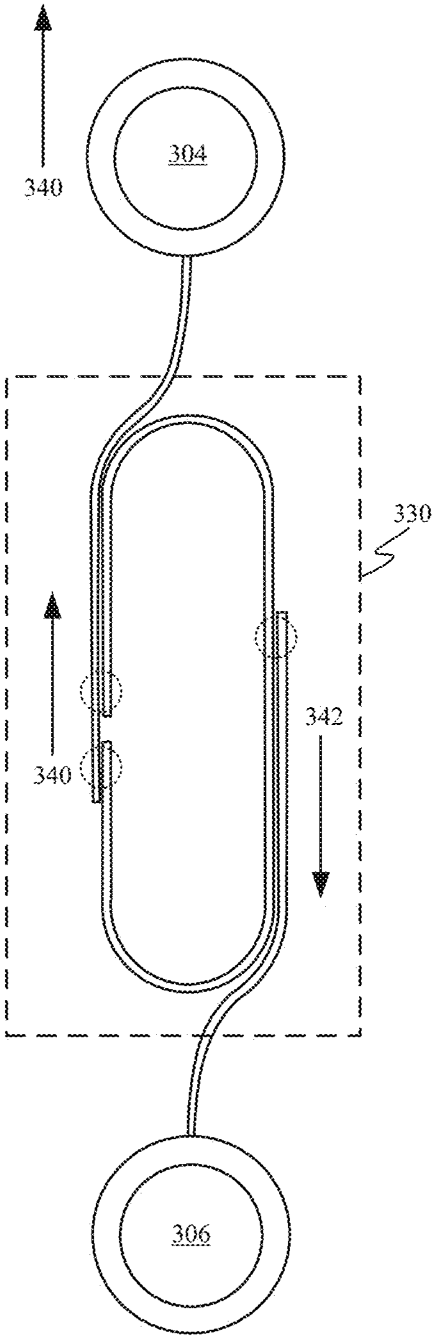

FIG. 3G shows a flattened schematic view of another earpiece synchronization system that utilizes a loop 328 within a headband 330 (the rectangular shape is used merely to show the location of headband 330 and should not be construed as for exemplary purposes only) to keep a distance between each of earpieces 304 and 306 and headband 330 synchronized. Stem wires 332 and 334 couple respective earpieces 304 and 306 to loop 328. Stem wires 332 and 334 can be formed of metal and soldered to opposing sides of loop 328. Because stem wires 332 and 334 are coupled to opposing sides of loop 328, movement of earpiece 306 in direction 336 results in stem wire 332 moving in direction 338. Consequently, moving earpiece 306 into closer proximity with headband 330 also moves stem wire 332, which results in earpiece 304 being brought into closer proximity with headband 330. In addition to showing a new location of earpieces 304 and 306 after being moved into closer proximity to headband 330, FIG. 3H shows how moving earpiece 304 in direction 340 automatically moves earpiece 306 in direction 342 and farther away from headband 330. While not depicted it should be appreciated that headband 330 could include various reinforcement members to keep loop 328 and stem wires 332 and 334 in the depicted shapes.

Figure 3I:
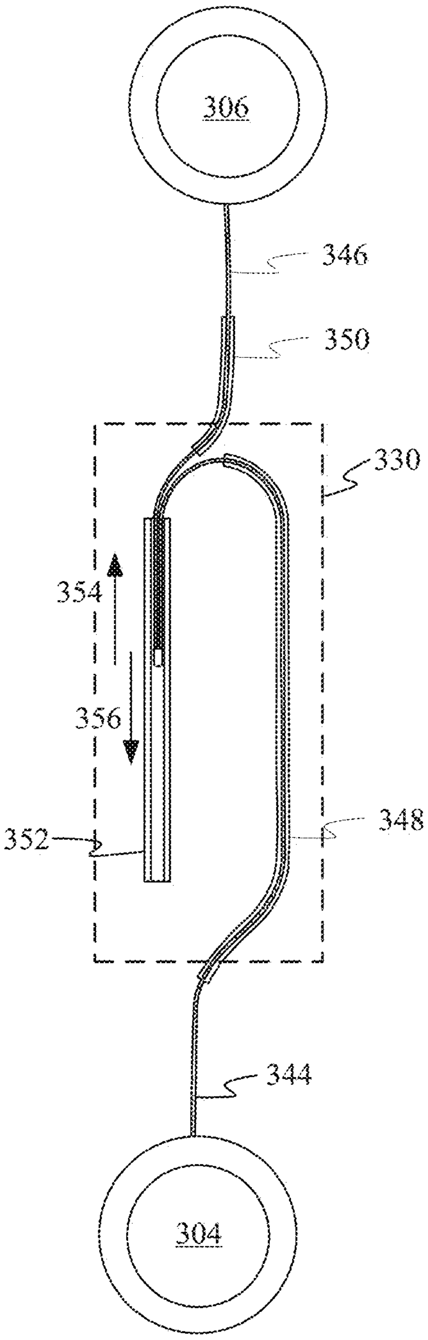
FIGS. 3I-3J show a flattened schematic view of another earpiece synchronization system similar to the one depicted in FIGS. 3G-3H.
Figure 3J:
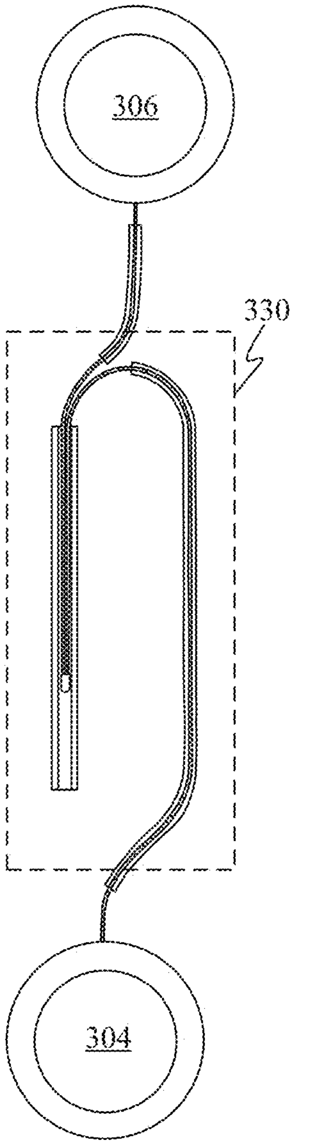

FIGS. 3I-3J show a flattened schematic view of another earpiece synchronization system similar to the one depicted in FIGS. 3G-3H. FIG. 3I shows how the ends of stems 344 and 346 can be coupled directly to each other without an intervening loop. By extending stems 344 and 346 into a pattern having a similar shape as loop 328 a similar outcome can be achieved without the need for an additional loop structure. Movement of stems 344 and 346 is assisted by reinforcement members 348, 350 and 352, which help to prevent buckling of stems 344 and 346 while the position of earpieces 304 and 306 are being adjusted. Reinforcement members 348-352 can define channels through which stems 344 and 346 smoothly pass. These channels can be particularly helpful in locations where stems 344 and 346 curve. While not defining a curved channel, reinforcement member 352 still serves an important purpose of limiting the direction of travel of the ends of stems 344 and 346 to directions 354 and 356. Movement in direction 356 results in earpieces moving toward headband 330, as depicted in FIG. 3J. Movement in direction 354 results in earpieces 304 and 306 moving farther away from headband 330.

Figure 3K:
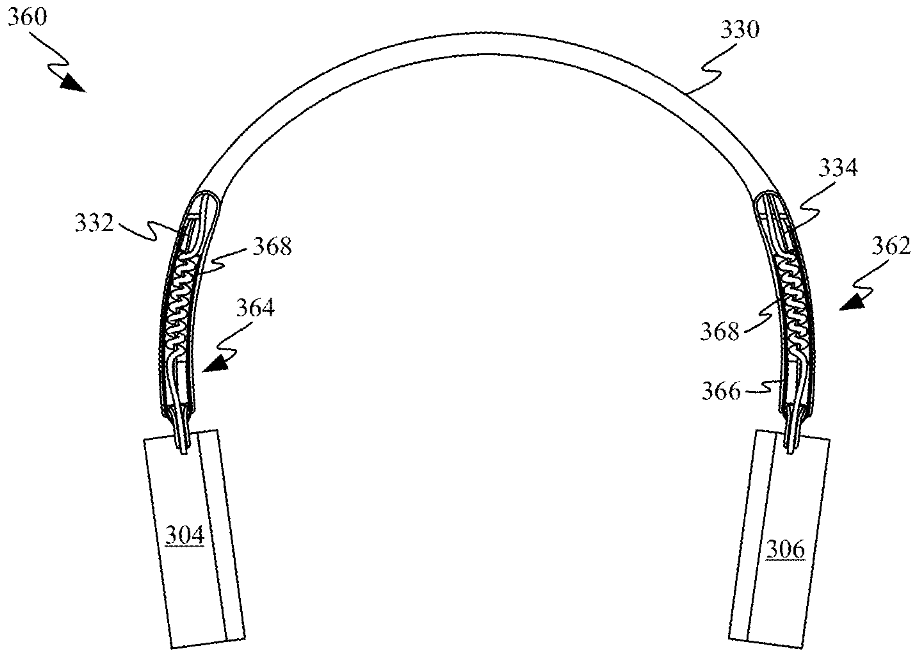
FIGS. 3K-3L show cutaway views of headphones 360 that are suitable for incorporation of either one of the earpiece synchronization systems depicted in FIGS. 3G-3J.
Figure 3L:
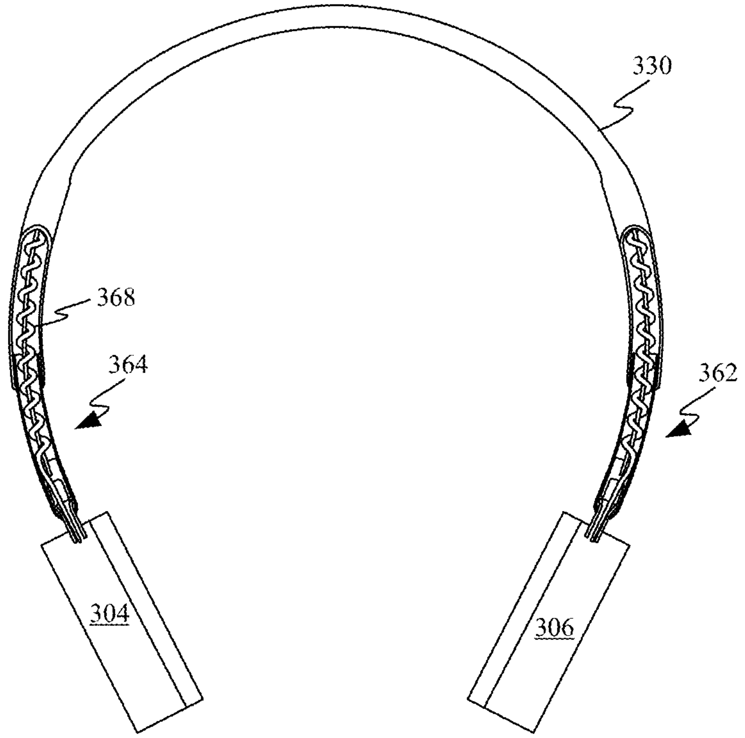

FIGS. 3K-3L show cutaway views of headphones 360 that are suitable for incorporation of either one of the earpiece synchronization systems depicted in FIGS. 3G-3J. FIG. 3K shows headphones 360 with earpieces retracted and stem wires 332 and 334 extending out of headband 330 to engage and synchronize a position of stem assembly 362 with a position of stem assembly 364. Stem 334 is depicted coupled to support structure 366 within stem assembly 364, which allows extension and retraction of stem 334 to keep stem assembly 362 synchronized with stem assembly 364. As depicted, stem assembly 362 is disposed within a channel defined by headband 330, which allows stem assembly 362 to move relative to headband 330. FIG. 3K also shows how data synchronization cable 368 can extend through headband 330 and wrap around a portion of both stem wire 334 and stem wire 332. By wrapping around stem wires 332 and 334, data synchronization cable 368 is able to act as a reinforcement member to prevent buckling of stem wires 332 and 334. Data synchronization cable 368 is generally configured to exchange signals between earpieces 304 and 306 in order to keep audio precisely synchronized during playback operations of headphones 360.

FIG. 3L shows how the coil configuration of data synchronization cable 368 accommodates extension of stem assemblies 362 and 364. Data synchronization cable 368 can have an exterior surface with a coating that allows stem wires 332 and 334 to slide through a central opening defined by the coils. FIG. 3L also shows how earpieces 304 and 306 maintain the same distance from a central portion of headband 330.

Figure 3M:
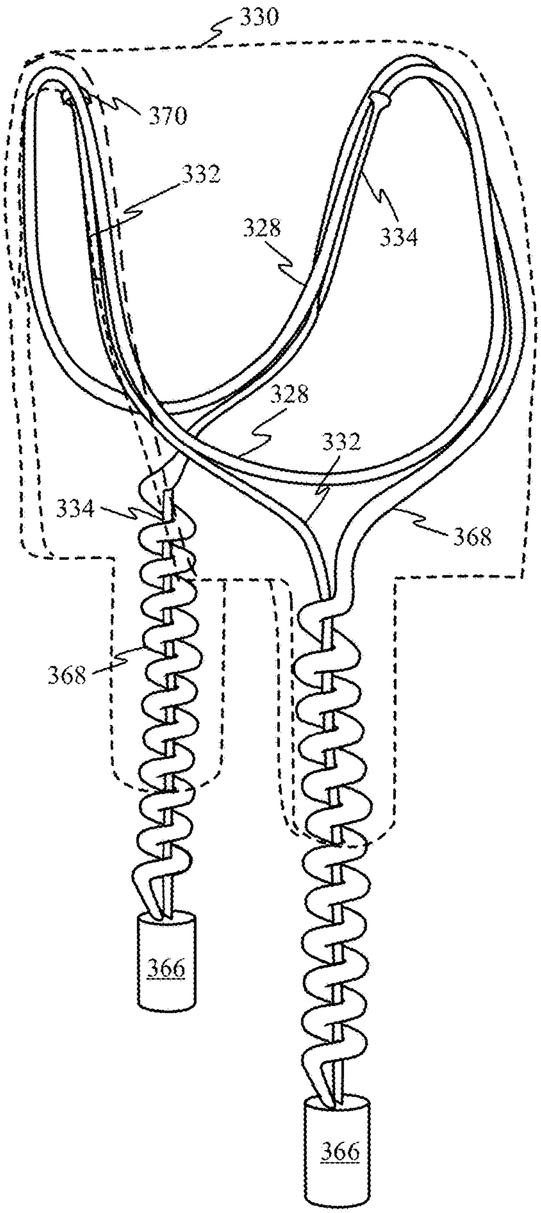
FIGS. 3M-3N show perspective views of the earpiece synchronization system depicted in FIGS. 3G-3H in retracted and extended positions as well as a data synchronization cable.
Figure 3N:
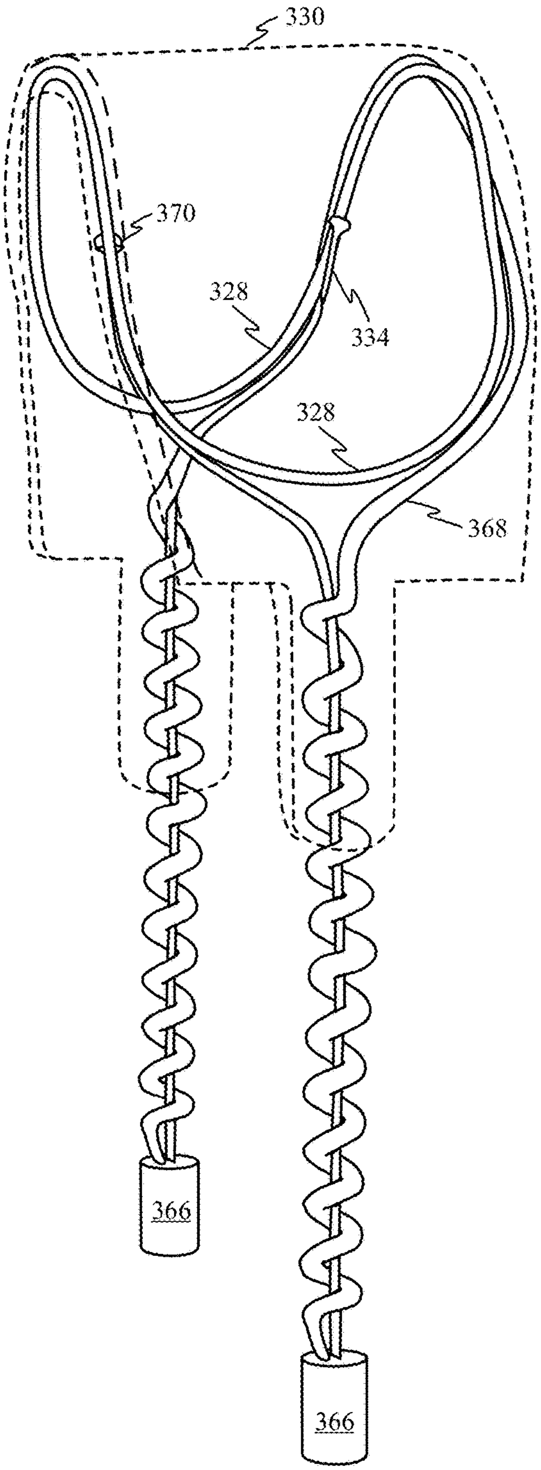

FIGS. 3M-3N show perspective views of the earpiece synchronization system depicted in FIGS. 3G-3H in retracted and extended positions as well as a data synchronization cable 368. FIG. 3M shows how stem wire 332 includes an attachment feature 370 that at least partially surrounds a portion of loop 328. In this way, stem wire 332, stem wire 334 and support structures 366 move along with loop 328. FIG. 3M also shows a dashed line illustrating how a covering for headband 330 can at least partially conform with loop 328, stem wire 332 and stem wire 334.

Figure 3O:
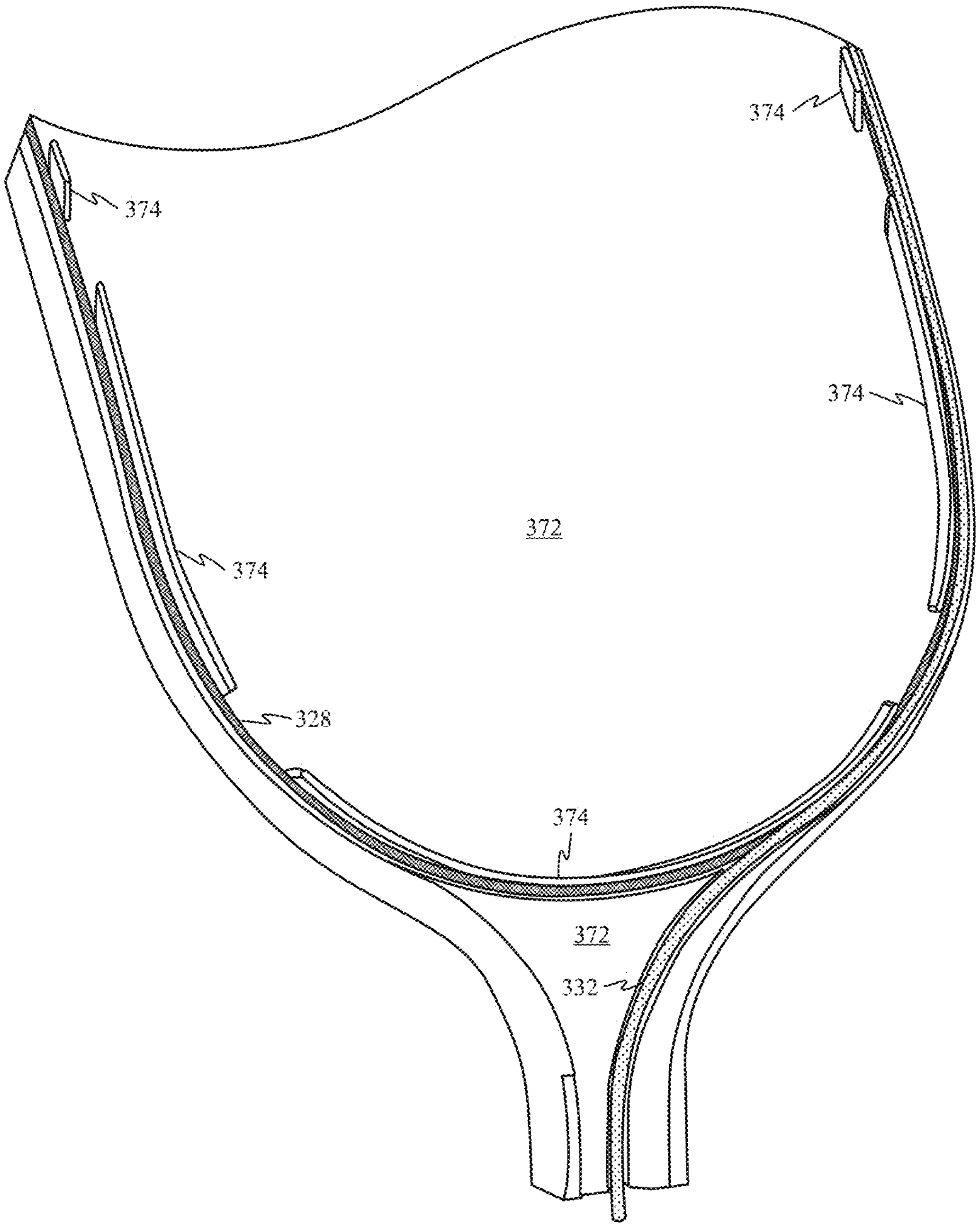
FIG. 3O shows a portion of a canopy structure and how an earpiece synchronization system can be routed through reinforcement members of the canopy structure.

FIG. 3O shows a portion of canopy structure 372 and how an earpiece synchronization system can be routed through reinforcement members 374 of canopy structure 372. Reinforcement members 374 help guide loop 328 and stem wire 332 along a desired path. In some embodiments, canopy structure 372 can include a spring mechanism that helps keep earpieces secured to a user's ears.

Figure 3P:
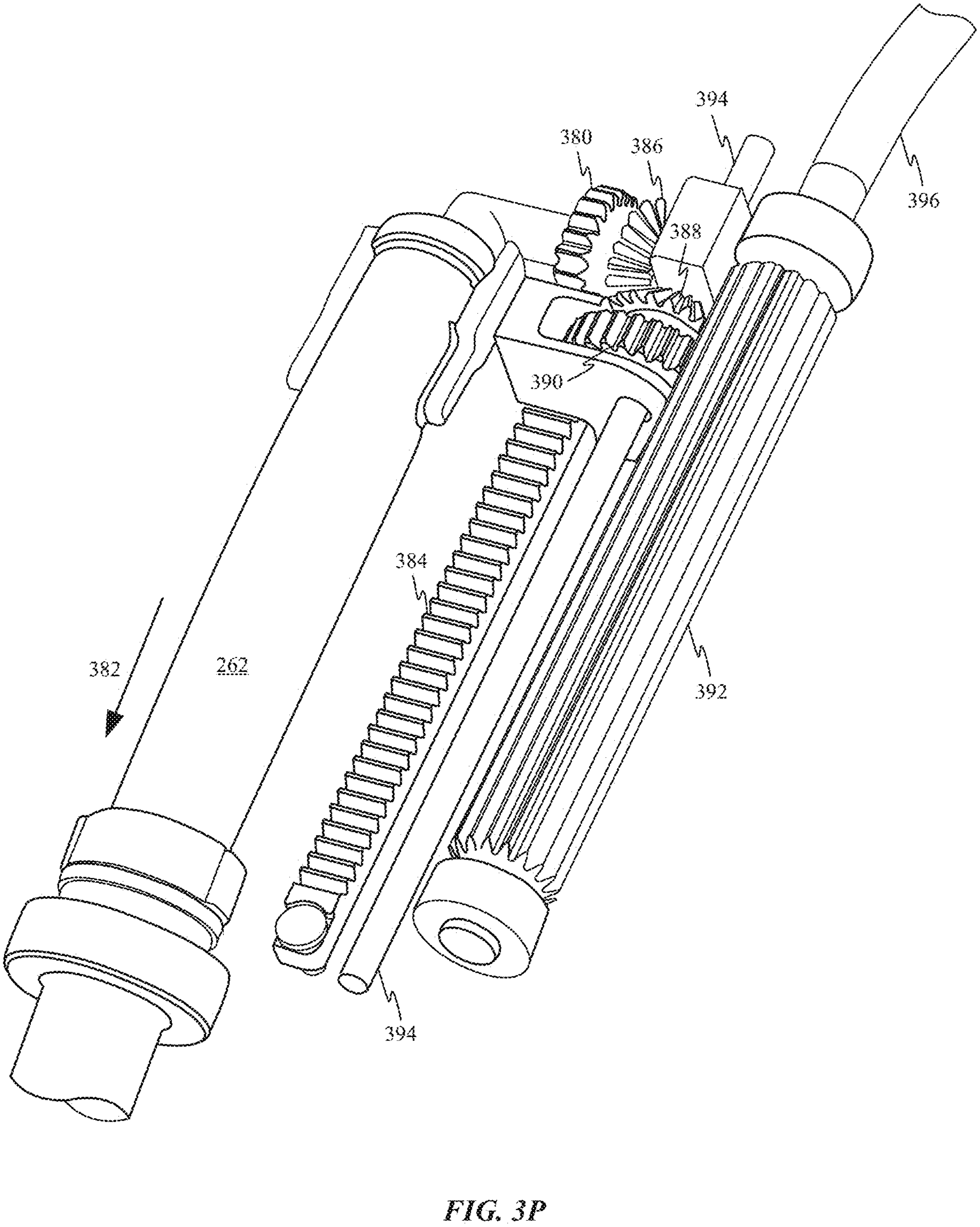
FIGS. 3P-3Q show gearing located at opposing ends of a headband assembly for another alternative earpiece synchronization system.
Figure 3Q:
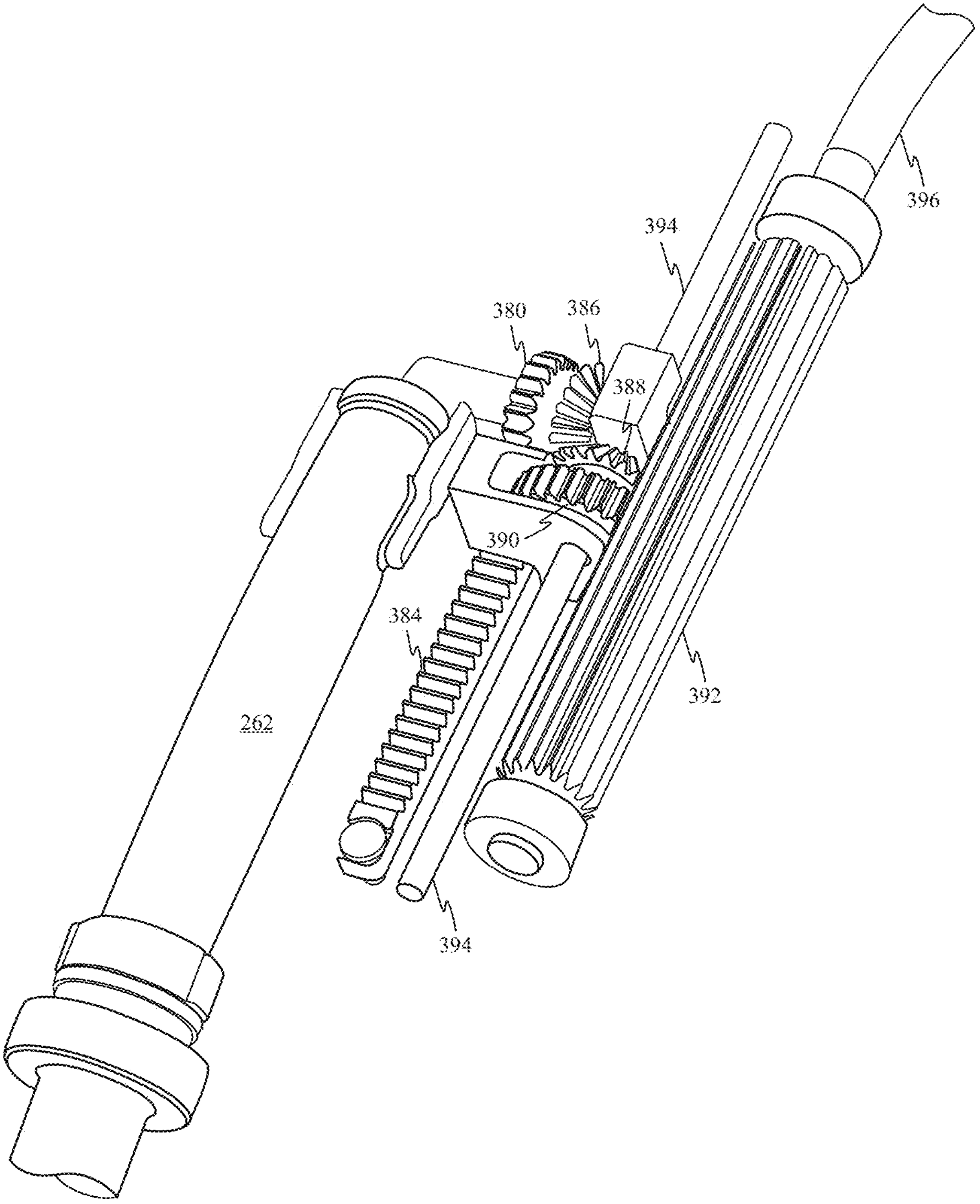

FIGS. 3P-3Q show gearing located at opposing ends of a headband assembly for another alternative earpiece synchronization system. In particular, FIG. 3P shows how stem 262 has a first end coupled to an earpiece (not depicted) and a second end coupled to gear 380. By pulling on the earpiece a force 382 can be exerted upon stem 262, which causes gear 380 to rotate due to its engagement of rack gear 384. Gear 380 is rigidly coupled to beveled gear component 386. Beveled gear component 386 in turn induces rotation of beveled gear component 388. Beveled gear component 388 is rigidly coupled to gear 390. Rotation of gear 390 in turn induces rotation of elongated gear 392. Gears 380, 386, 388 and 390 all move together and are guided along a periphery of elongated gear 392 by bearing 394. Elongated gear 392 is in turn coupled to a flexible rotary shaft that includes a cable 396 routed through an associated headband assembly. Cable 396 can include layers of high-tensile wire wound over each other at opposing pitch angles that are configured to efficiently transmit rotational motion from one end of cable 396 to another. Rotation of the other end of cable 396 in turn moves a stem at the other end of the headband assembly in sync with stem 262. A diameter of cable 396 can be between about 0.02 inches and 0.25 inches. FIG. 3Q shows a second position of gears 380, 386, 388 and 390 after having adjusted a position of stem 262.

Off-Center Pivoting Earpieces

Figure 4A:
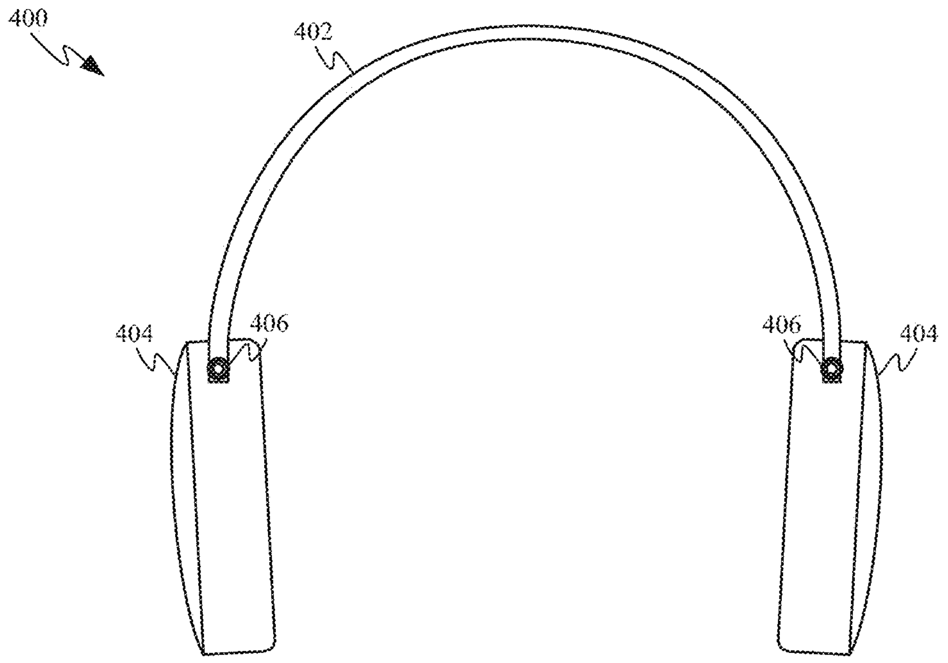
FIGS. 4A-4B show front views of headphones having off-center pivoting earpieces.
Figure 4B:
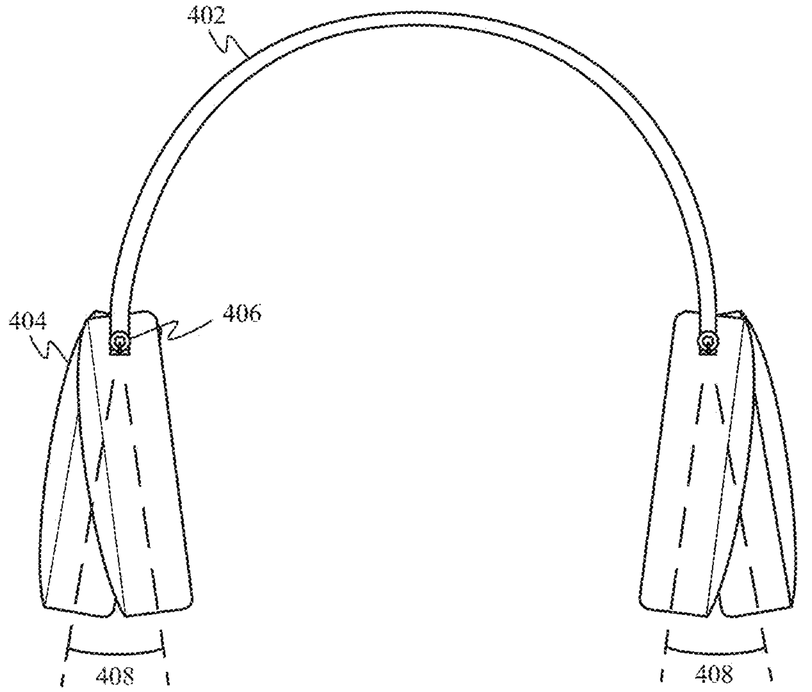

FIGS. 4A-4B show front views of headphones 400 having off-center pivoting earpieces. FIG. 4A shows a front view of headphones 400, which includes headband assembly 402. In some embodiments, headband assembly 402 can include an adjustable band and stems for customizing the size of headphones 400. Each end of headband assembly 402 is depicted being coupled to an upper portion of earpieces 404. This differs from conventional designs, which place the pivot point in the center of earpieces 404 so that earpieces can naturally pivot in a direction that allows earpieces 404 to move to an angle in which earpieces 404 are positioned parallel to a surface of a user's head. Unfortunately, this type of design generally requires bulky arms that extend to either side of earpiece 404, thereby substantially increasing the size and weight of earpieces 404. By locating pivot point 406 near the top of earpieces 404, associated pivot mechanism components can be packaged within earpieces 404.

FIG. 4B shows an exemplary range of motion 408 for each of earpieces 404. Range of motion 408 can be configured to accommodate a majority of users based on studies performed on average head size measurements. This more compact configuration can still perform the same functions as the more traditional configuration described above, which includes applying a force through the center of the earpiece and establishing an acoustic seal. In some embodiments, range of motion 408 can be about 18 degrees. In some embodiments, range of motion 408 may not have a defined stop but instead grow progressively harder to deform as it gets farther from a neutral position. The pivot mechanism components can include spring elements configured to apply a modest retaining force to the ears of a user when the headphones are in use. The spring elements can also bring earpieces back to a neutral position once headphones 400 are no longer being worn.

Figure 5A:
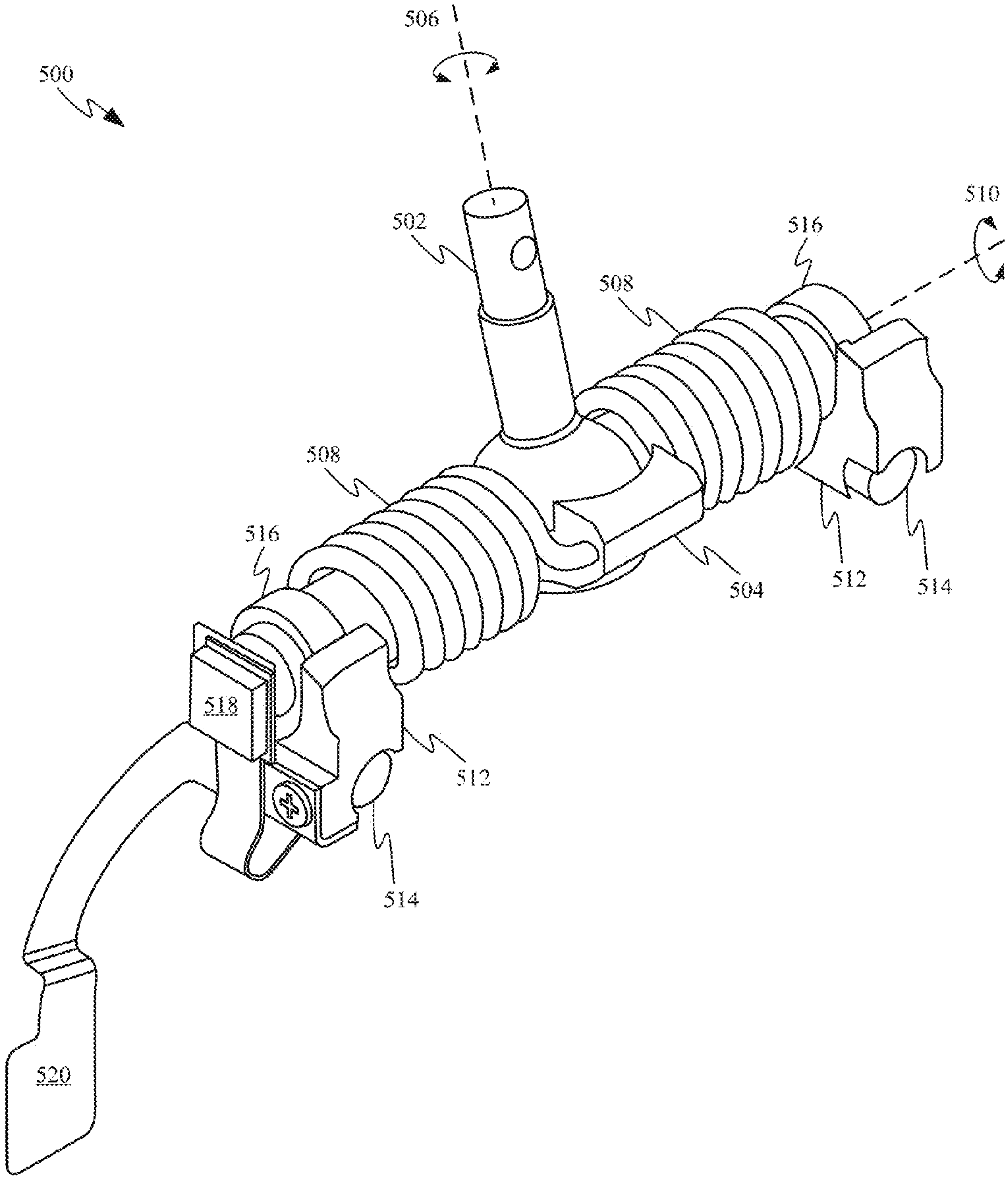
FIG. 5A shows an exemplary pivot mechanism that includes torsion springs.

FIG. 5A shows an exemplary pivot mechanism 500 for use in the upper portion of an earpiece. Pivot mechanism 500 can be configured to accommodate motion around two axes, thereby allowing adjustments to both roll and yaw for earpieces 404 with respect to headband assembly 402. Pivot mechanism 500 includes a stem 502, which can be coupled to a headband assembly. One end of stem 502 is positioned within bearing 504, which allows stem 502 to rotate about yaw axis 506. Bearing 504 also couples stem 502 to torsional springs 508, which oppose rotation of stem 502 with respect to earpiece 404 about roll axis 510. Each of torsional springs 508 can also be coupled to mounting blocks 512. Mounting blocks 512 can be secured to an interior surface of earpiece 404 by fasteners 514. Bearing 504 can be rotationally coupled to mounting blocks 512 by bushings 516, which allow bearing 504 to rotate with respect to mounting blocks 512. In some embodiments, the roll and yaw axes can be substantially orthogonal with respect to one another. In this context, substantially orthogonal means that while the angle between the two axes might not be exactly 90 degrees that an angle between the two axes would stay between 85 and 95 degrees.

FIG. 5A also depicts magnetic field sensor 518. Magnetic field sensor 518 can take the form of a magnetometer or Hall Effect sensor capable of detecting motion of a magnet within pivot mechanism 500. In particular, magnetic field sensor 518 can be configured to detect motion of stem 502 with respect to mounting blocks 512. In this way, magnetic field sensor 518 can be configured to detect when headphones associated with pivot mechanism 500 are being worn. For example, when magnetic field sensor 518 takes the form of a Hall Effect sensor, rotation of a magnet coupled with bearing 504 can result in the polarity of the magnetic field emitted by that magnet saturating magnetic field sensor 518. Saturation of the Hall Effect sensor by a magnetic field causes the Hall Effect sensor to send a signal to other electronic devices within headphones 400 by way of flexible circuit 520.

Figure 5B:
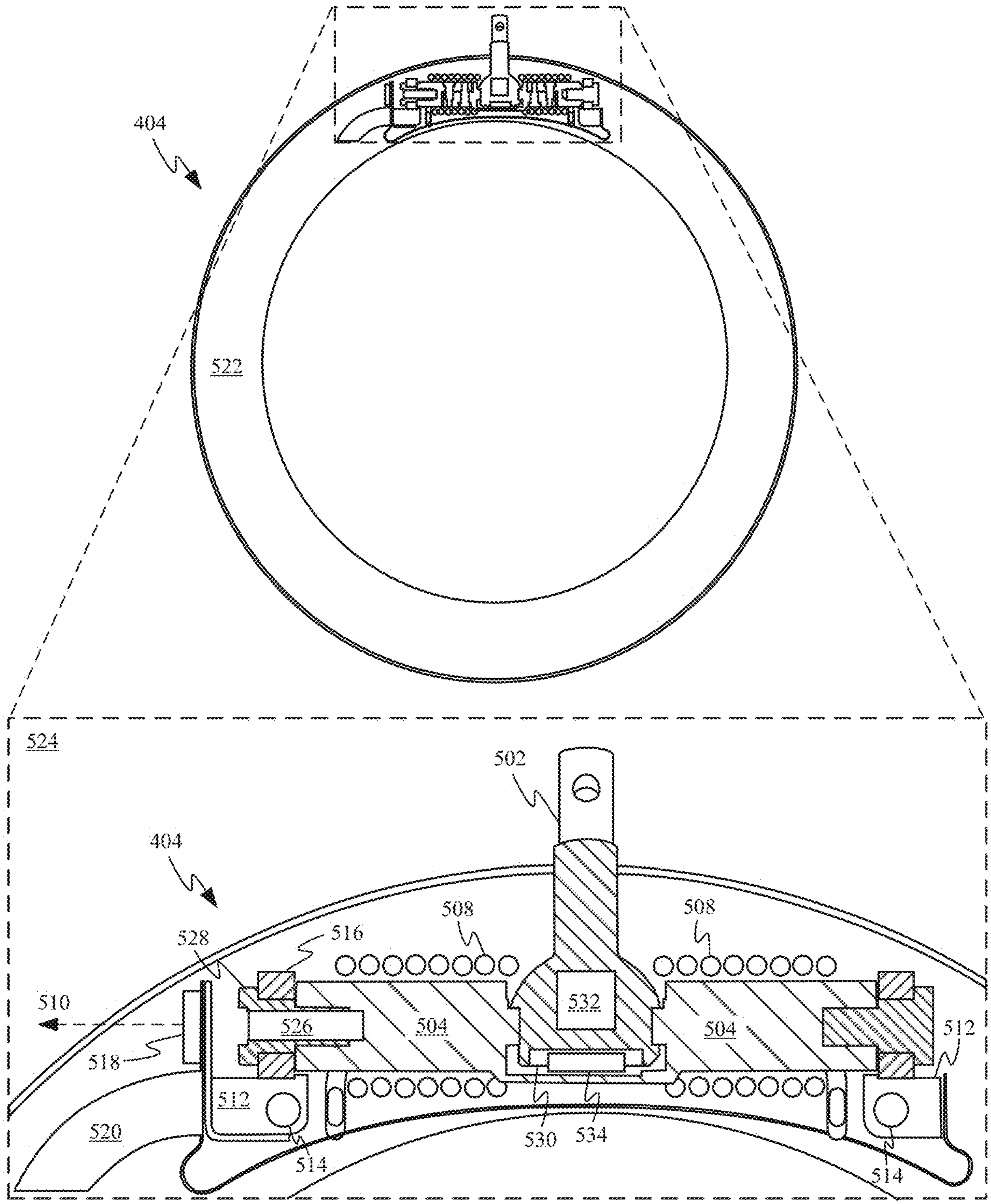
FIG. 5B shows the pivot mechanism depicted in FIG. 5A positioned behind a cushion of an earpiece.

FIG. 5B shows a pivot mechanism 500 positioned behind a cushion 522 of earpiece 404. In this way, pivot mechanism 500 can be integrated within earpiece 404 without impinging on space normally left open to accommodate the ear of a user. Close-up view 524 shows a cross-sectional view of pivot mechanism 500. In particular, close-up view 524 shows a magnet 526 positioned within a fastener 528. As stem 502 is rotated about roll axis 510, magnet 526 rotates with it. Magnetic field sensor 518 can be configured to sense rotation of the field emitted by magnet 526 as it rotates. In some embodiments, the signal generated by magnetic field sensor 518 can be used to activate and/or deactivate headphones 400. This can be particularly effective when the neutral state of earpiece 404 corresponds to the bottom end of each earpiece 404 is oriented towards the user at an angle that causes earpiece 404 to be rotated away from the users head when worn by most users. By designing headphones 400 in this manner, rotation of magnet 526 away from its neutral position can be used as a trigger that headphones 400 are in use. Correspondingly, movement of magnet 526 back to its neutral position can be used as an indicator that headphones 400 are no longer in use. Power states of headphones 400 can be matched to these indications to save power while headphones 400 are not in use.

Close up view 524 of FIG. 5B also shows how stem 502 is able to twist within bearing 504. Stem 502 is coupled to threaded cap 530, which allows stem 502 to twist within bearing 504 about yaw axis 506. In some embodiments, threaded cap 530 can define mechanical stops that limit the range of motion through which stem 502 can twist. A magnet 532 is disposed within stem 502 and is configured to rotate along with stem 502. A magnetic field sensor 534 can be configured to measure the rotation of a magnetic field emitted by magnet 532. In some embodiments, a processor receiving sensor readings from magnetic field sensor 534 can be configured to change an operating parameter of headphones 400 in response to the sensor readings indicating a threshold amount of change in the angular orientation of magnet 532 relative to the yaw axis has occurred.

Figure 6A:
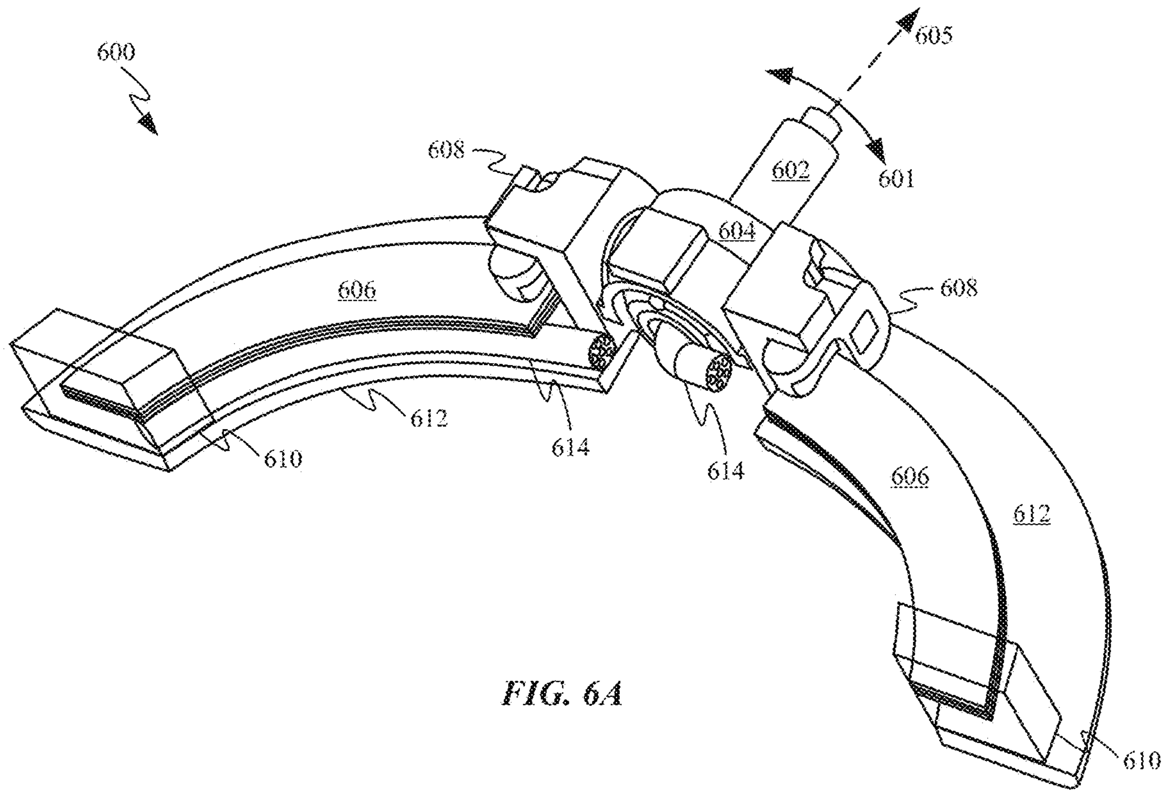
FIG. 6A shows a perspective view of another pivot mechanism that includes leaf springs.

FIG. 6A shows a perspective view of another pivot mechanism 600 that is configured to fit within a top portion of earpieces 404 of headphones. The overall shape of pivot mechanism 600 is configured to conform with space available within the top portion of the earpieces. Pivot mechanism 600 utilizes leaf springs instead of torsion springs to oppose motion in the directions indicated by arrows 601 of earpieces 404. Pivot mechanism 600 includes stem 602, which has one end disposed within bearing 604. Bearing 604 allows for rotation of stem 602 about yaw axis 605. Bearing 604 also couples stem 602 to a first end of leaf spring 606 through spring lever 608. A second end of each of leaf springs 606 is coupled to a corresponding one of spring anchors 610. Spring anchors 610 are depicted as being transparent so that the position at which the second end of each of leaf springs 606 engages a central portion of spring anchors 610 can be seen. This positioning allows leaf springs 606 to bend in two different directions. Spring anchors 610 couple the second end of each leaf spring 606 to earpiece housing 612. In this way, leaf springs 606 create a flexible coupling between stem 602 and earpiece housing 612. Pivot mechanism 600 can also include cabling 614 configured to route electrical signals between two earpieces 404 by way of headband assembly 402 (not depicted).

Figure 6B:
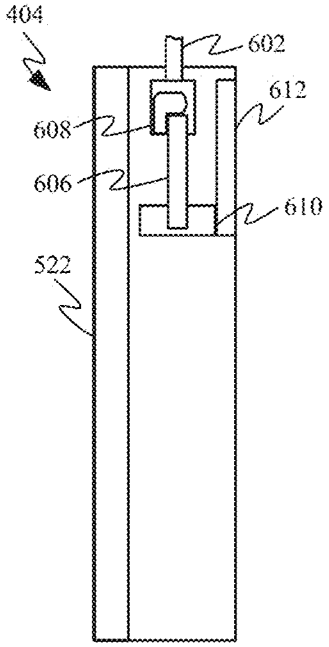
FIG. 6B-6D show a range of motion of an earpiece using the pivot mechanism depicted in FIG. 6A.
Figure 6C:
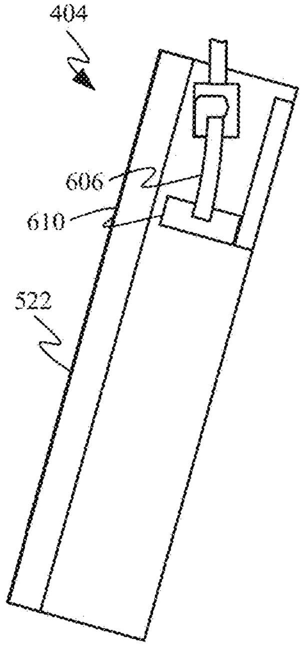
Figure 6D:
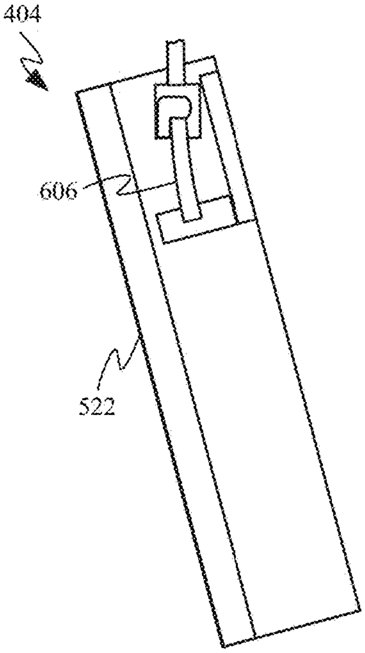

FIGS. 6B-6D show a range of motion of earpiece 404. FIG. 6B shows earpiece 404 in a neutral state with leaf springs 606 in an undeflected state. FIG. 6C shows leaf springs 606 being deflected in a first direction and FIG. 6D shows leaf spring 606 being deflected in a second direction opposite the first direction. FIGS. 6C-6D also show how the area between cushion 522 and earpiece housing 612 can accommodate the deflection of leaf springs 606.

Figure 6E:
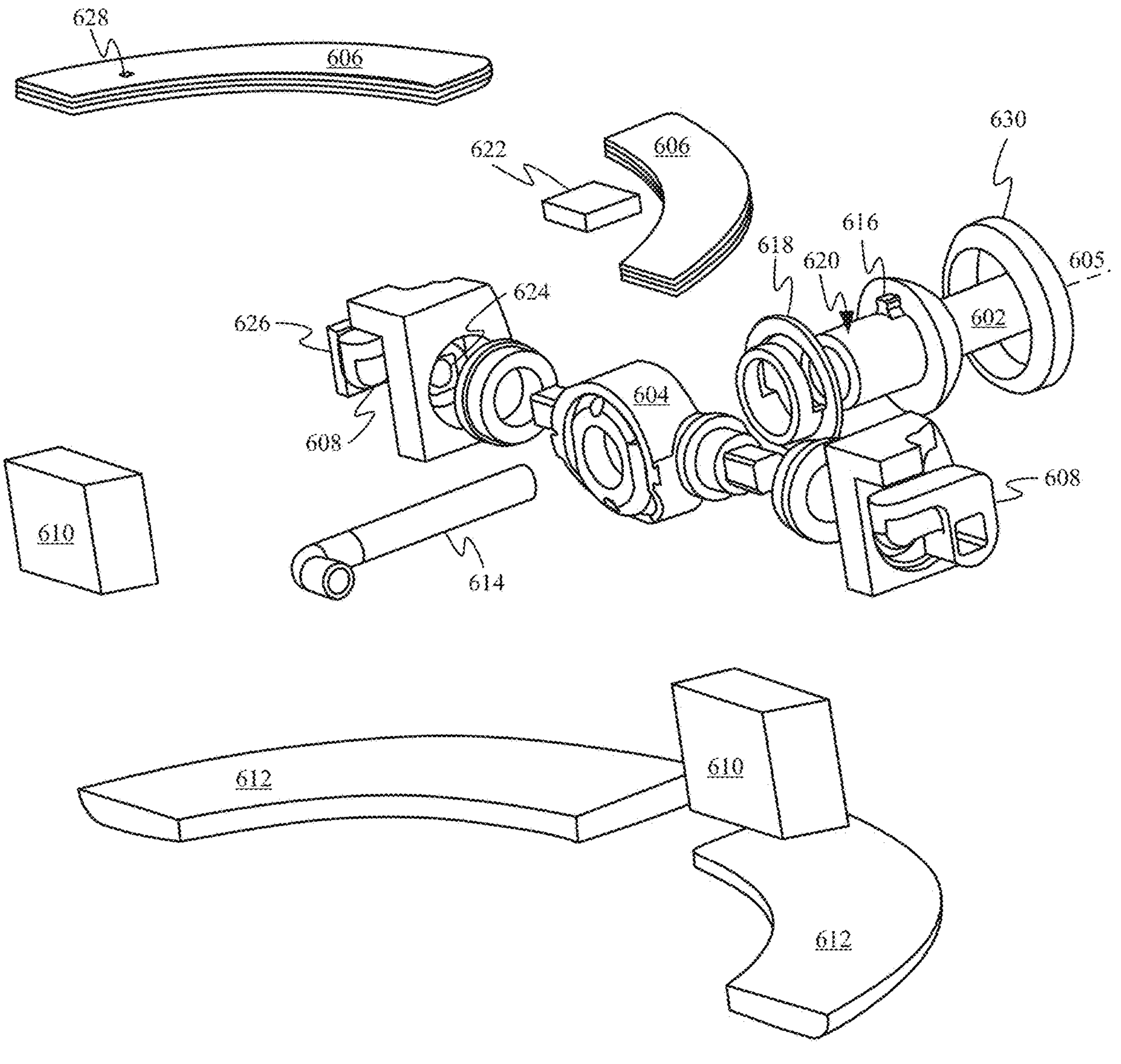
FIG. 6E shows an exploded view of the pivot mechanism depicted in FIG. 6A.

FIG. 6E shows an exploded view of pivot mechanism 600. FIG. 6E depicts mechanical stops that govern the amount of rotation possible about yaw axis 605. Stem 602 includes a protrusion 616, which is configured to travel within a channel defined by an upper yaw bushing 618. As depicted, the channel defined by upper yaw bushing 618 has a length that allows for greater than 180 degrees of rotation. In some embodiments, the channel can include a detent configured to define a neutral position for earpiece 404. FIG. 6E also depicts a portion of stem 602 that can accommodate yaw magnet 620. A magnetic field emitted by magnet 620 can be detected by magnetic field sensor 622. Magnetic field sensor 622 can be configured to determine an angle of rotation of stem 602 with respect to the rest of pivot mechanism 600. In some embodiments, magnetic field sensor 622 can be a Hall Effect sensor.

FIG. 6E also depicts roll magnet 624 and magnetic field sensor 626, which can be configured to measure an amount of deflection of leaf springs 606. In some embodiments, pivot mechanism 600 can also include strain gauge 628 configured to measure strain generated within leaf spring 606. The strain measured in leaf spring 606 can be used to determine which direction and how much leaf spring is being deflected. In this way, a processor receiving sensor readings recorded by strain gauge 628 can determine whether and in which direction leaf springs 606 are bending. In some embodiments, readings received from strain gauge can be configured to change an operating state of headphones associated with pivot mechanism 600. For example, the operating state can be changed from a playback state in which media is being presented by speakers associated with pivot mechanism 600 to a standby or inactive state in response to the readings from the strain gauge. In some embodiments, when leaf springs 606 are in an undeflected state this can be indicative of headphones associated with pivot mechanism 600 not being worn by a user. In other embodiments, the strain gauge can be positioned upon a headband spring. For this reason, ceasing playback based on this input can be very convenient as it allows a user to maintain a location in a media file until putting the headphones back on the head of the user at which point the headphones can be configured to resume playback of the media file. Seal 630 can close an opening between stem 602 and an exterior surface of an earpiece in order to prevent the ingress of foreign particulates that could interfere with the operation of pivot mechanism 600.

Figure 6F:
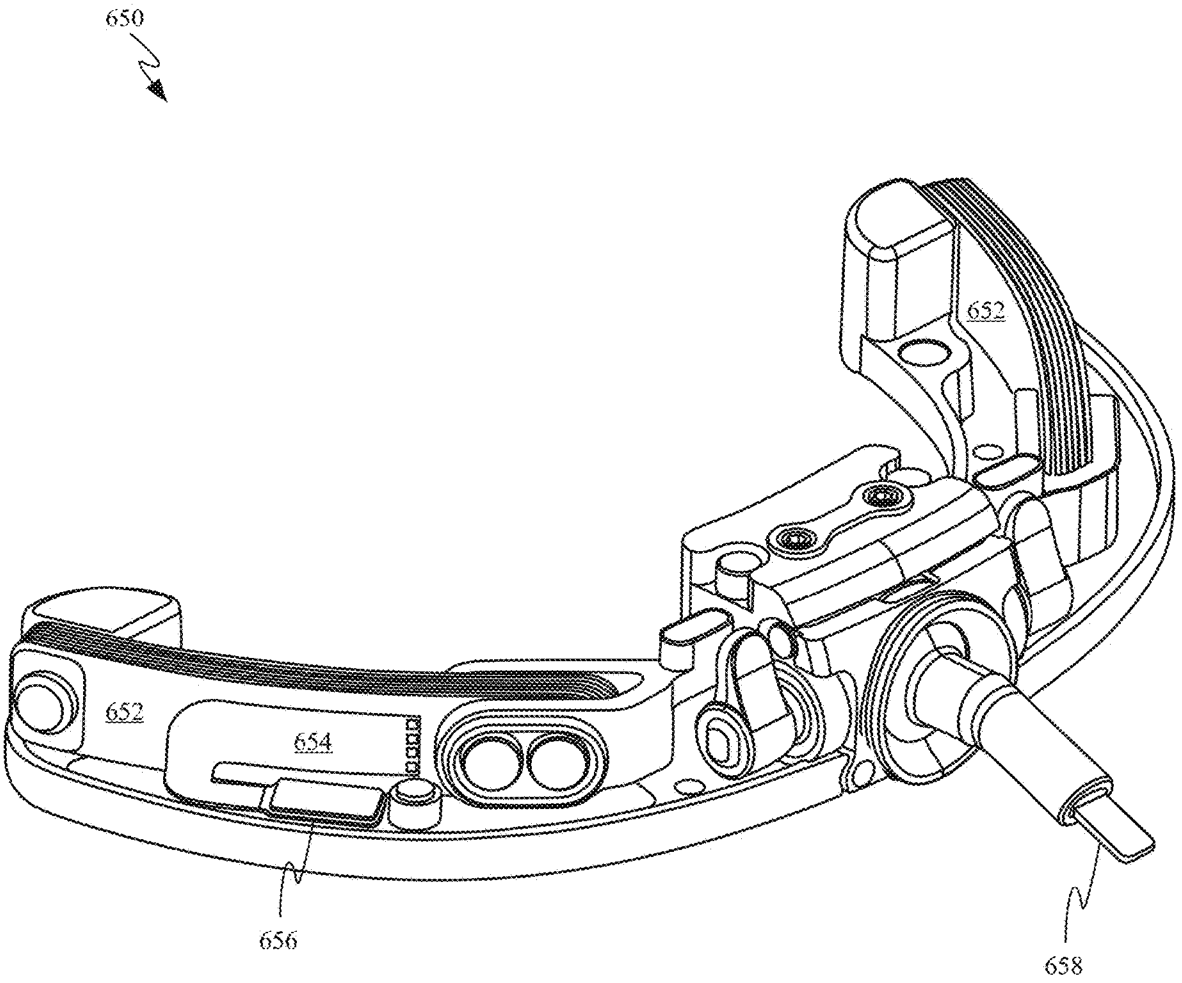
FIG. 6F shows a perspective view of another pivot mechanism.

FIG. 6F shows a perspective view of another pivot mechanism 650, which differs in some ways from pivot mechanism 600. Leaf springs 652 have a different orientation than leaf springs 606 of pivot mechanism 600. In particular, leaf springs 652 are oriented about 90 degrees different than leaf springs 606. This results in a thick dimension of leaf springs 652 opposing rotation of an earpiece associated with pivot mechanism 650. FIG. 6F also shows flexible circuit 654 and board-to-board connector 656. Flexible circuit can electrically couple a strain gauge positioned upon leaf spring 652 to a circuit board or other electrically conductive pathways on pivot mechanism 650. In some embodiments, sensor data provided by the strain gauge can be configured to determine whether or not headphones associated with pivot mechanism 650 are being worn by a user of the headphones. Pivot mechanism 650 is also depicted including a portion 658 of a stem configured to attach pivot mechanism 650 to a headband.

Figure 6G:
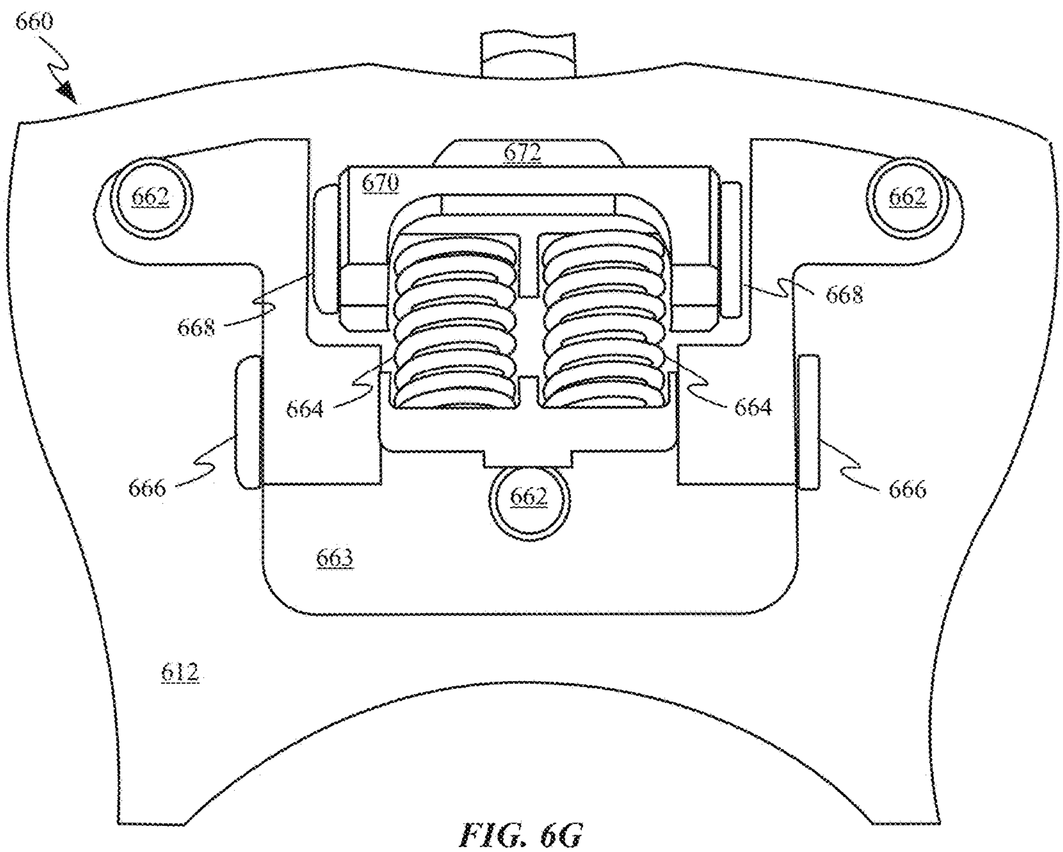
FIG. 6G shows yet another pivot mechanism.

FIG. 6G shows another pivot assembly 660 attached to earpiece housing 612 by fasteners 662 and bracket 663. Pivot assembly 660 can include multiple helical springs 664 arranged side by side. In this way, helical coils 664 can act in parallel increasing the amount of resistance provided by pivot assembly 660. Helical springs 664 are held in place and stabilized by pins 666 and 668. Actuator 670 translates any force received from rotation of stem base 658 to helical springs 664. In this way, helical springs 664 can establish a desired amount of resistance to rotation of stem base 658.

Figure 6H:
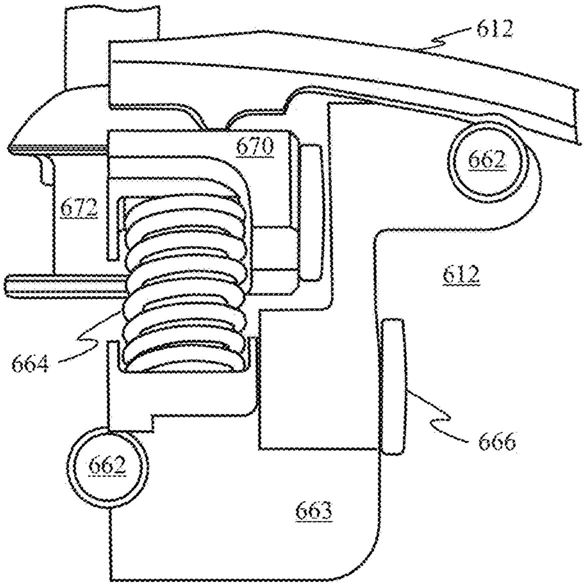
FIGS. 6H-6I show the pivot mechanism depicted in FIG. 6G with one side removed in order to illustrate rotation of a stem base in different positions.
Figure 6I:
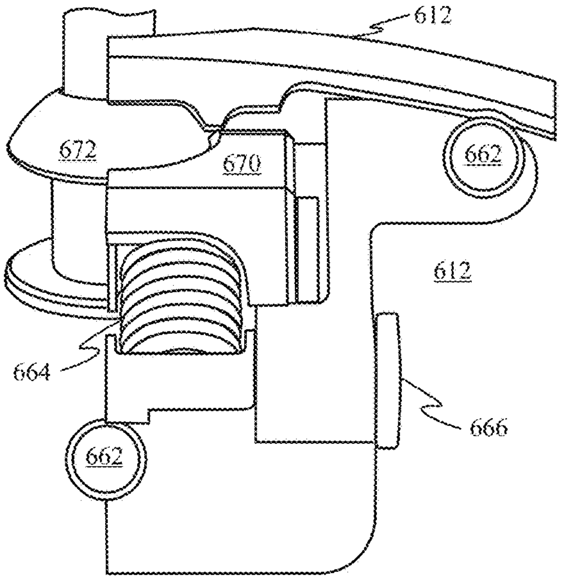

FIGS. 6H-6I show pivot assembly 660 with one side removed in order to illustrate rotation of stem base 658 in different positions. In particular, FIGS. 6H-6I shows how rotation of stem base 658 results in rotation of actuator 670 and compression of helical springs 664.

Figure 6J:
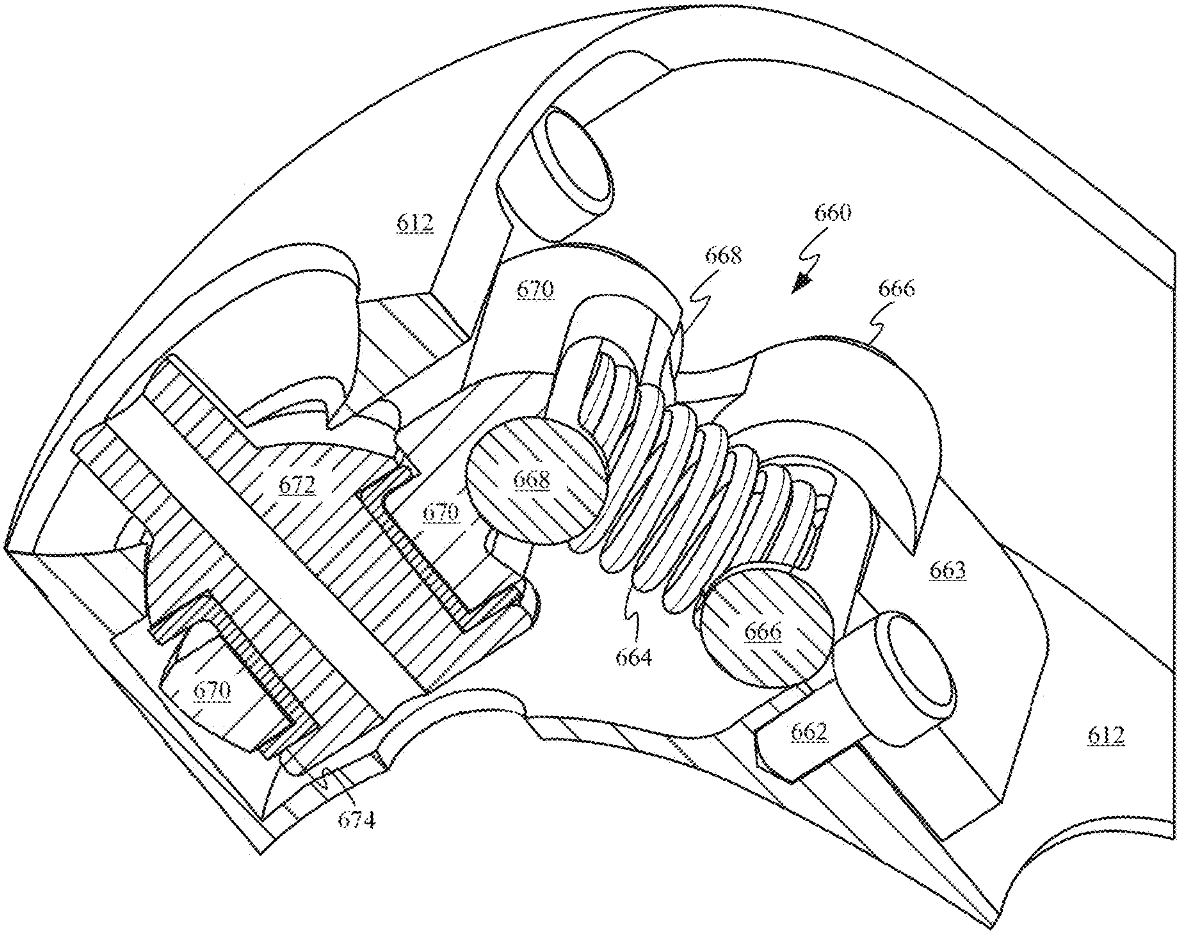
FIG. 6J shows a cutaway perspective view of the pivot assembly of FIG. 6G disposed within an earpiece housing.

FIG. 6J shows a cutaway perspective view of pivot assembly 660 disposed within earpiece housing 612. In some embodiments, stem base 658 can include a bearing 674, as depicted, to reduce friction between stem base 658 and actuator 670. FIG. 6J also shows how bracket 663 can define a bearing for securing pin 666 in place. Pins 666 and 668 are also shown defining flattened recesses for keeping helical springs 664 securely in place. In some embodiments, the flattened recess can include protrusions that extends into central openings of helical springs 664.

Figure 6K:
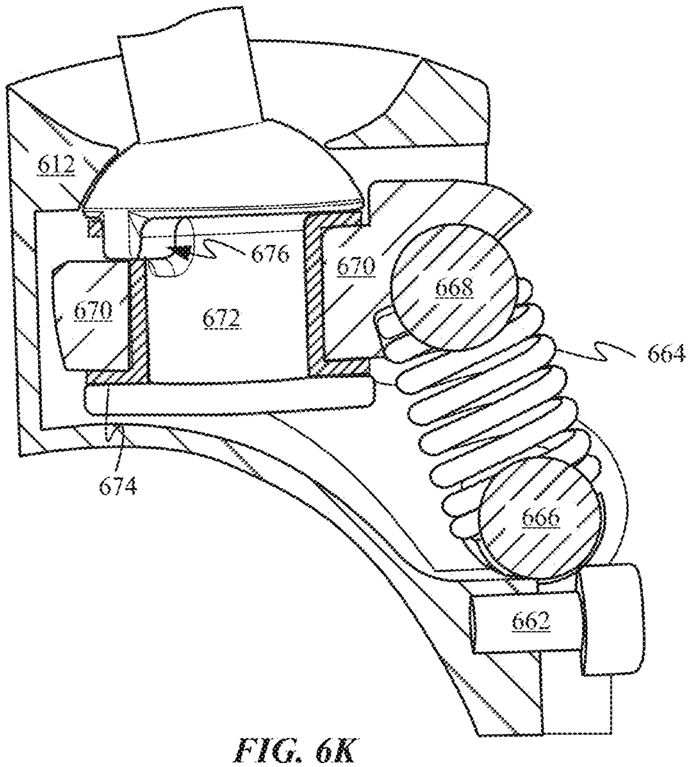
FIGS. 6K-6L show partial cross-sectional side views of the pivot assembly positioned within the earpiece housing with helical springs in relaxed and compressed states.
Figure 6L:
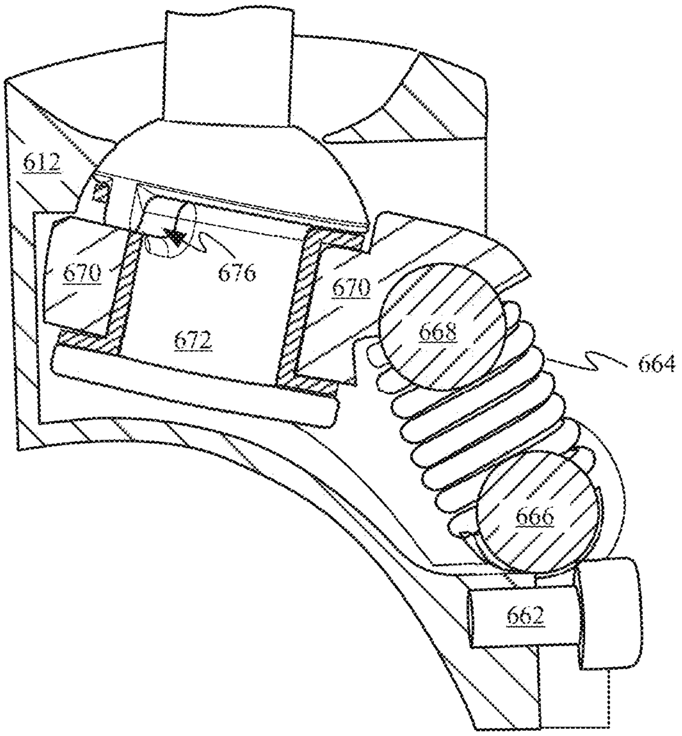

FIGS. 6K-6L show partial cross-sectional side views of pivot assembly 660 positioned within earpiece housing with helical springs 664 in relaxed and compressed states. In particular, the motion undergone by actuator 670 when shifting from a first position in FIG. 6K to a second position of maximum deflection is clearly depicted. FIGS. 6K and 6L also depict mechanical stop 676 which helps limit an amount of rotation earpiece housing can achieve relative to stem base.

Figure 6M:
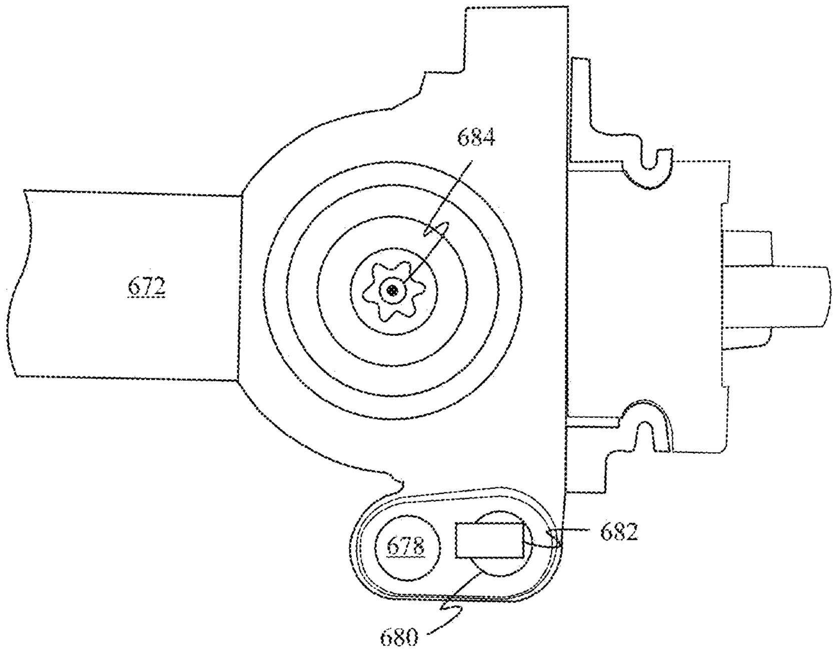
FIGS. 6M-6N show side views of two different rotational positions of stem base isolated from its pivot assembly.
Figure 6N:
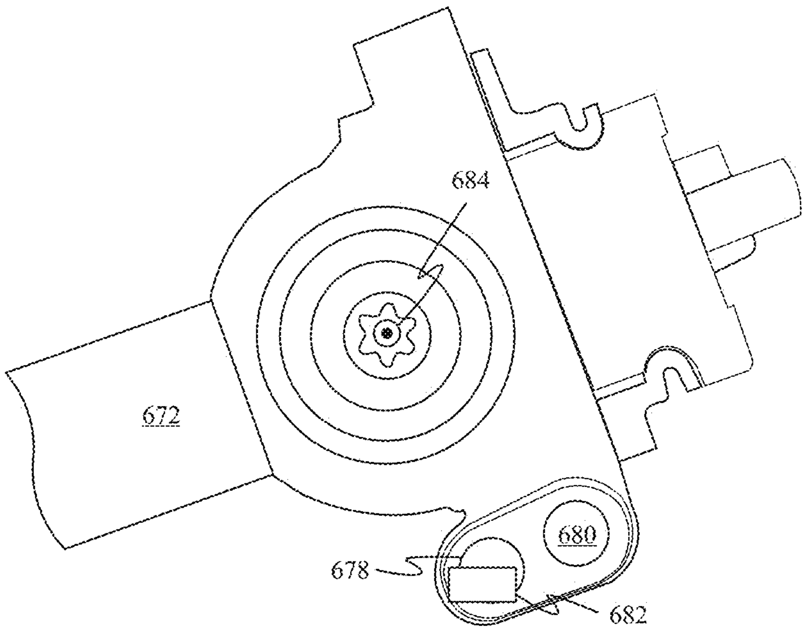

FIGS. 6M-6N show side views of two different rotational positions of stem base 672 isolated from its pivot assembly. In particular two permanent magnets 678 and 680 are shown rigidly coupled to stem base 672. Permanent magnets 678 and 680 emit magnetic fields with polarities oriented in opposing directions. Magnetic field sensor 682 is mounted to earpiece housing 612 such that magnetic field sensor 682 remains motionless relative to stem base 672 during rotation of stem base 672 about axis of rotation 684. In this way, at a first position depicted in FIG. 6M, magnetic field sensor 682 is positioned proximate permanent magnet 680 and at a second position depicted in FIG. 6N, magnetic field sensor 682. The opposing polarities of permanent magnets 678 and 682 allow magnetic field sensor 682 to distinguish between the two depicted positions. In some embodiments, the positions can vary by about 20 degrees; however, a total range of motions of stem base 672 can vary between about 10 and 30 degrees. In some embodiments, magnetic field sensor 682 can take the form of a magnetometer or a Hall Effect sensor. Depending on a sensitivity of magnetic field sensor 682, magnetic field sensor 682 can be configured to measure an approximate angle of stem base 672 relative to earpiece housing 612. For example, where the depicted rotational positions differ by 20 degrees an intermediate position of 10 degrees could be inferred by sensor readings from magnetic field sensor 682 where the magnetic field directions transition from one direction to another. In some embodiments, magnetic field sensor 682 can be configured to operate with only a single permanent magnet and be configured to determine rotational position of stem base 672 based solely on a magnetic field strength detected by magnetic field sensor 682. It should be noted that in alternative embodiments magnetic field sensor 682 can be coupled to stem base 672 and permanent magnets 678 and 680 can be coupled to earpiece housing resulting in magnetic field sensor 682 moving within the earpiece housing.

Low Spring-Rate Band

Figure 7A:
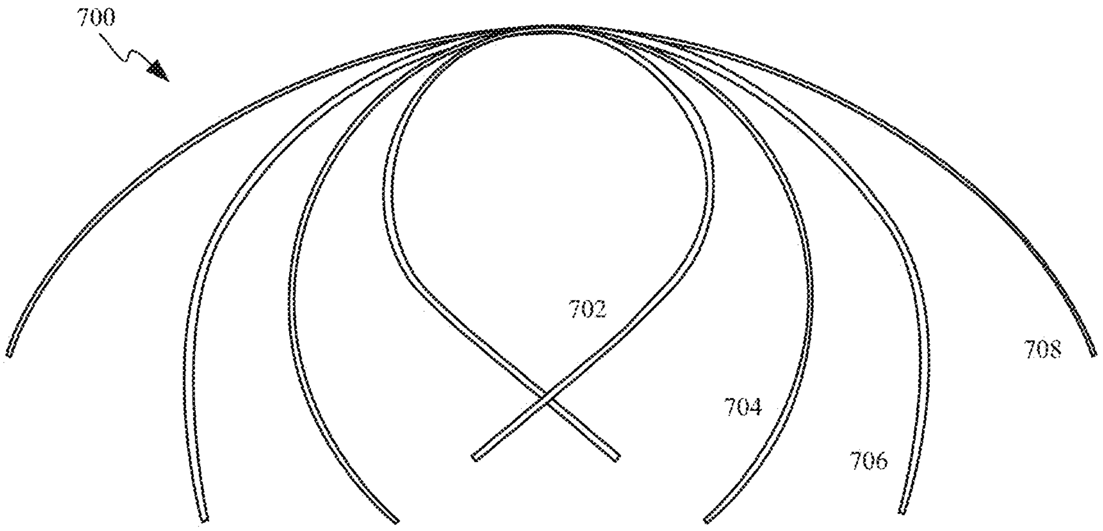
FIG. 7A shows multiple positions of a spring band suitable for use in a headband assembly.

FIG. 7A shows multiple positions of a spring band 700 suitable for use in a headband assembly. Spring band 700 can have a low spring rate that causes a force generated by the band in response to deformation of spring band 700 to change slowly as a function of displacement. Unfortunately, the low spring rate also results in the spring having to go through a larger amount of displacement before exerting a particular amount of force. Spring band 700 is depicted in different positions 702, 704, 706 and 708. Position 702 can correspond to spring band 700 being in a neutral state at which no force is exerted by spring band 700. At position 704, a spring band 700 can begin exerting a force pushing spring band 700 back toward its neutral state. Position 706 can correspond to a position at which users with small heads bend spring band 700 when using headphones associated with spring band 700. Position 708 can correspond to a position of spring band 700 in which the users with large heads bend spring band 700. The displacement between positions 702 and 706 can be sufficiently large for spring band 700 to exert an amount of force sufficient to keep headphones associated with spring band 700 from falling off the head of a user. Further, due to the low spring rate the force exerted by spring band 700 at position 708 can be small enough so that use of headphones associated with spring band 700 is not high enough to cause a user discomfort. In general, the lower the spring rate of spring band 700, the smaller the variation in force exerted by spring band 700. In this way, use of a low spring-rate spring band 700 can allow headphones associated with spring band 700 to give users with different sized heads a more consistent user experience.

Figure 7B:
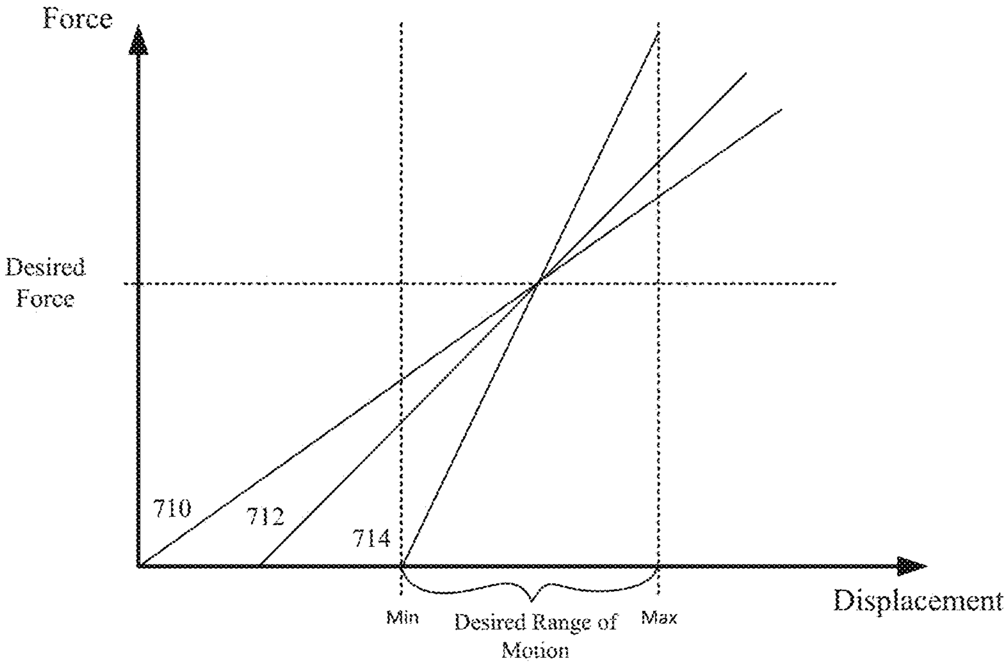
FIG. 7B shows a graph illustrating how spring force varies based on spring rate as a function of displacement of the spring band depicted in FIG. 7A.

FIG. 7B shows a graph illustrating how spring force varies based on spring rate as a function of displacement of spring band 700. Line 710 can represent spring band 700 having its neutral position equivalent to position 702. As depicted, this allows spring band 700 to have a relatively low spring rate that still passes through a desired force in the middle of the range of motion for a particular pair of headphones. Line 712 can represent spring band 700 having its neutral position equivalent to position 704. As depicted, a higher spring rate is required to achieve a desired amount of force being exerted in the middle of the desired range of motion. Finally, line 714 represents spring band 700 having its neutral position equivalent to position 706. Setting spring band 700 to have a profile consistent with line 714 would result in no force being exerted by spring band 700 at the minimum position for the desired range of motion and over twice the amount of force exerted compared with spring band 700 having a profile consistent with line 710 at the maximum position. While configuring spring band 700 to travel through a greater amount of displacement prior to the desired range of motion has clear benefits when wearing headphones associated with spring band 700, it may not be desirable for the headphones to return to position 702 when worn around the neck of a user. This could result in the headphones uncomfortably clinging to the neck of a user.

Figure 8A:
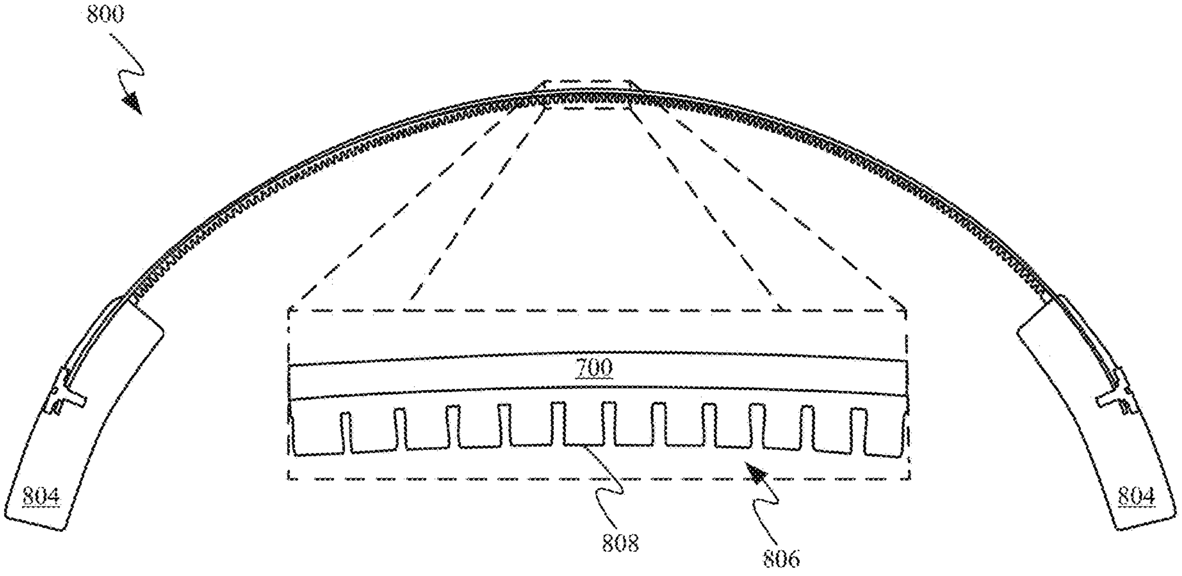
FIGS. 8A-8B show a solution for preventing discomfort caused by headphones wrapping too tightly around the neck of a user.
Figure 8B:
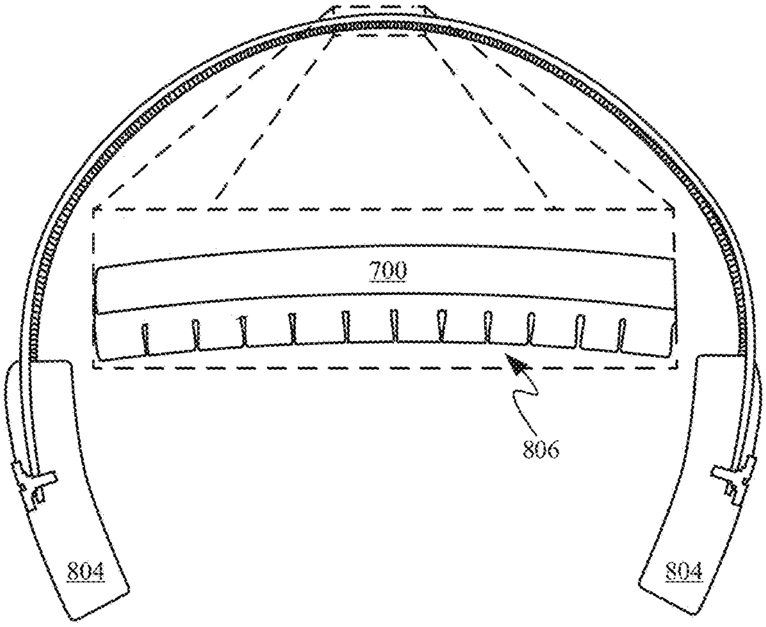

FIG. 8A-8B show a solution for preventing discomfort caused by headphones 800 utilizing a low spring-rate spring band from wrapping too tightly around the neck of a user. Headphones 800 include a headband assembly 802 joining earpieces 804. Headband assembly 802 includes compression band 806 coupled to an interior-facing surface of spring band 700. FIG. 8A shows spring band 700 in position 708, corresponding to a maximum deflection position of headphones 800. The force exerted by spring band 700 can act as a deterrent to stretching headphones 800 past this maximum deflection position. In some embodiments, an exterior facing surface of spring band 700 can include a second compression band configured to oppose deflection of spring band 700 past position 708. As depicted, knuckles 808 of compression band 806 serve little purpose when spring band is in position 708 on account of none of the lateral surfaces of knuckles 808 being in contact with adjacent knuckles 808.

Figure 8C:
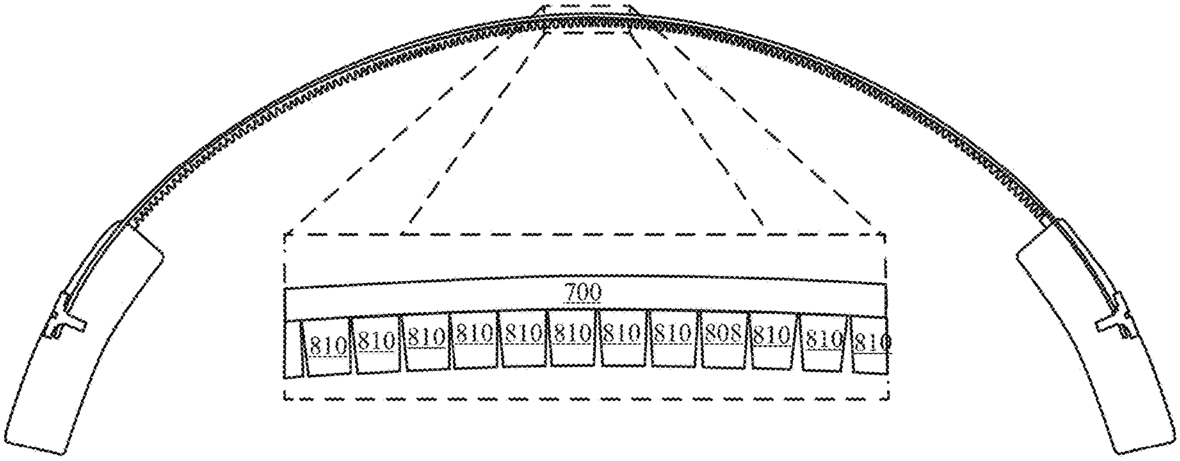
FIGS. 8C-8D show how separate and distinct knuckles can be arranged along the lower side of a spring band to prevent the spring band from returning to a neutral position.
Figure 8D:
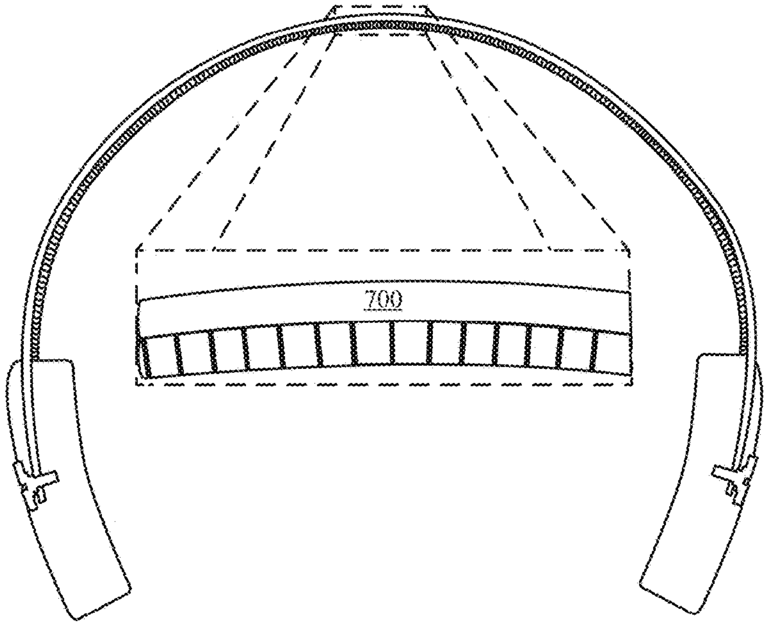

FIG. 8B shows spring band 700 in position 706. At position 706, knuckles 808 come into contact with adjacent knuckles 808 to prevent further displacement of spring band 700 towards position 704 or 702. In this way, compression band 806 can prevent spring band 700 from squeezing the neck of a user of headphones 800 while maintaining the benefits of the low-spring rate spring band 700. FIGS. 8C-8D show how separate and distinct knuckles 808 can be arranged along the lower side of spring band 700 to prevent spring band 700 from returning past position 706.

Figure 8E:
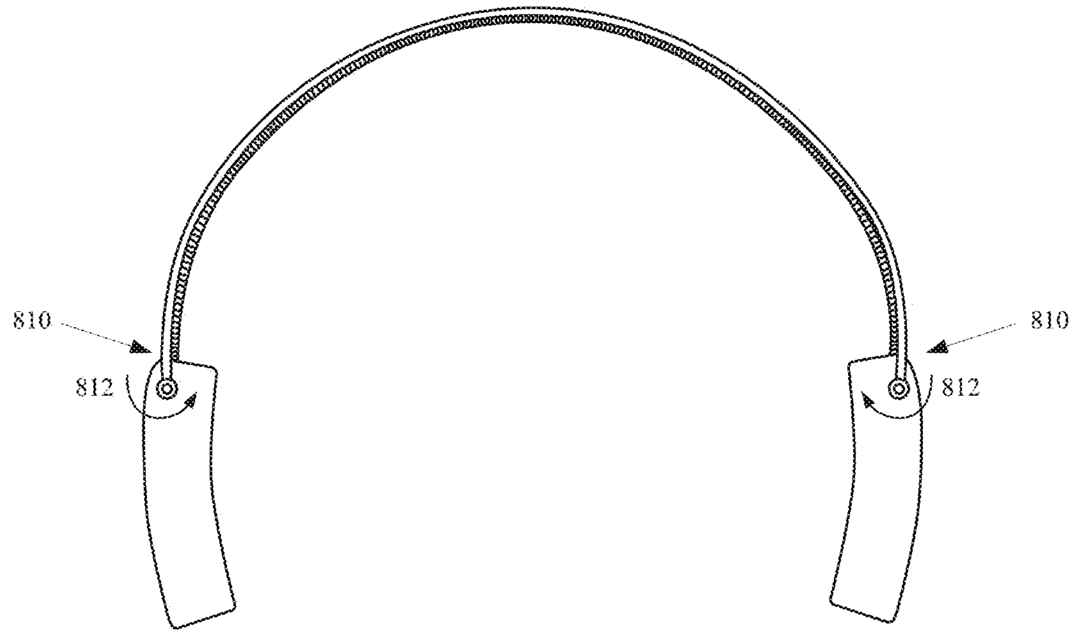
FIGS. 8E-8F show how springs joining a headband assembly to earpieces can cooperate with a spring band to set the actual amount of force applied to a user by headphones.
Figure 8F:
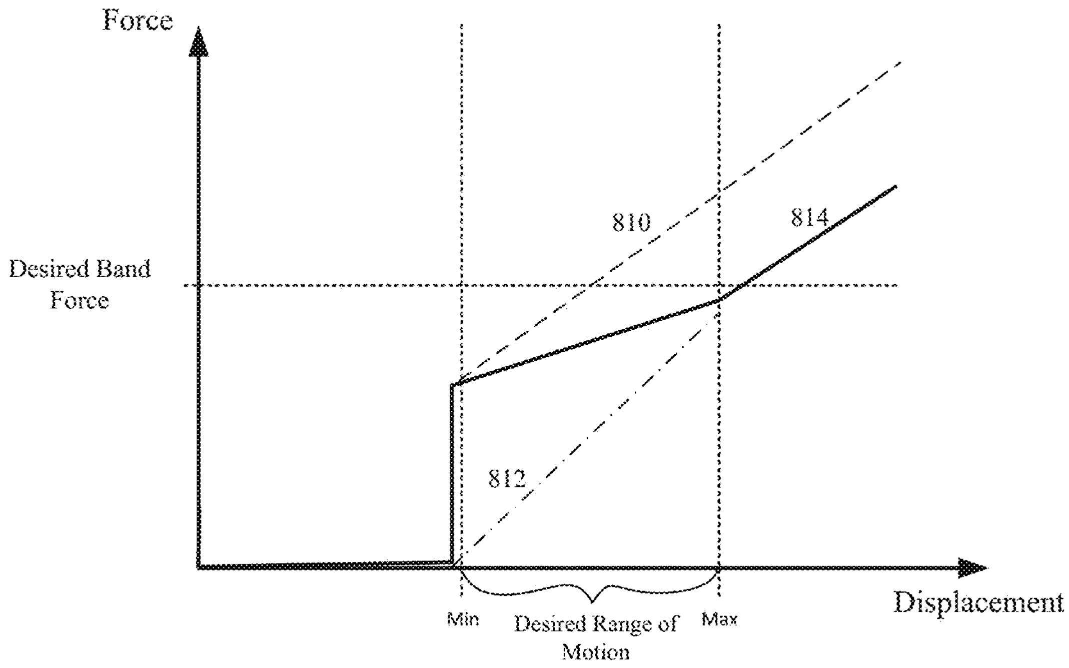

FIGS. 8E-8F show how the use of springs to control the motion of headband assembly 802 with respect to earpieces 804 can change the amount of force applied to a user by headphones 800 when compared to the force applied by spring band 700 alone. FIG. 8E shows forces 810 exerted by spring band 700 and forces 812 exerted by springs controlling the motion of earpieces 804 with respect to headband assembly 802. FIG. 8F shows exemplary curves illustrating how forces 810 and 812 supplied by at least two different springs can vary based on spring displacement. Force 810 does not begin to act until just prior to the desired range of motion on account of the compression band preventing spring band 700 from returning all the way to a neutral state. For this reason, the amount of force imparted by force 810 begins at a much higher level, resulting in a smaller variation in force 810. FIG. 8F also illustrates force 814, the result of forces 810 and 812 acting in series. By arranging the springs in series, a rate at which the resulting force changes as headphones 800 change shape to accommodate the size of a user's head is reduced. In this way, the dual spring configuration helps to provide a more consistent user experience for a user base that includes a great diversity of head shapes.

Figure 8G:
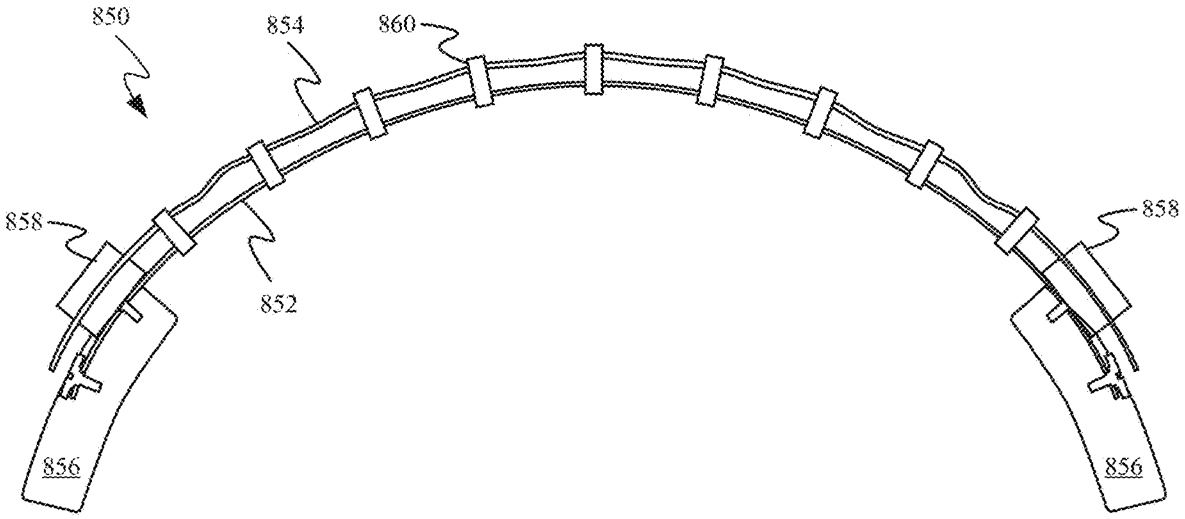
FIGS. 8G-8H show another way in which to limit the range of motion of a pair of headphones using a low spring-rate band.
Figure 8H:
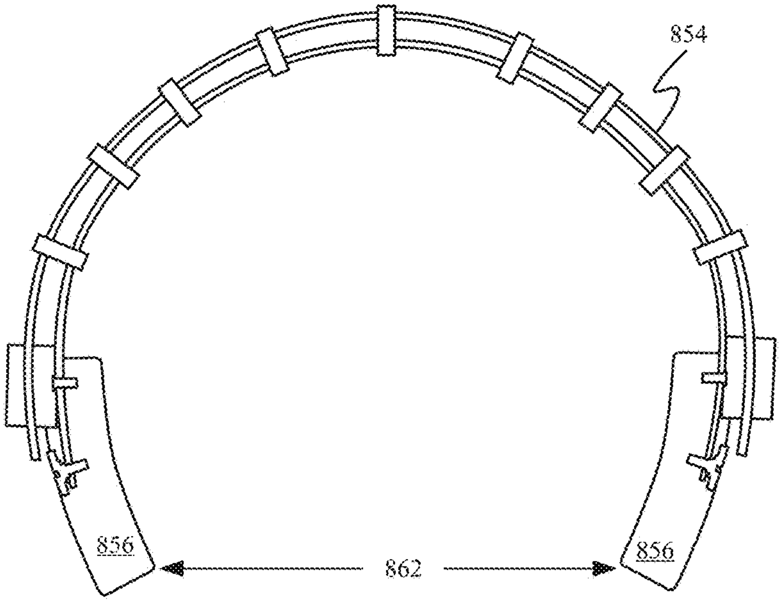

FIGS. 8G-8H show another way in which to limit the range of motion of a pair of headphones 850 using a low spring-rate band 852. FIG. 8G shows cable 854 in a slack state on account of earpieces 856 being pulled apart. The range of motion of low spring-rate band 852 can be limited by cable 854 achieving a similar function to the function of compression band 806, engaging as a result of function of tension instead of compression. Cable 854 is configured to extend between earpieces 856 and is coupled to each of earpieces 856 by anchoring features 858. Cable 854 can be held above low spring-rate band 852 by wire guides 860. Wire guides 860 can be similar to wire guides 210 depicted in FIGS. 2A-2G, with the difference that wire guides 860 are configured to elevate cable 854 above low spring-rate band 852. Bearings of wire guides 860 can prevent cable 854 from catching or becoming undesirably tangled. It should be noted that cable 854 and low spring-rate band 852 can be covered by a cosmetic cover. It should also be noted that in some embodiments, cable 854 could be combined with the embodiments shown in FIGS. 2A-2G to produce headphones capable of synchronizing earpiece position and controlling the range of motion of the headphones.

FIG. 8H shows how when earpieces 856 are brought closer together cable 854 tightens and eventually stops further movement of earpieces 856 closer together. In this way, a minimum distance 862 between earpieces 856 can be maintained that allows headphones 850 to be worn around the neck of a broad population of users without squeezing the neck of the user too tightly.

Left/Right Ear Detection

Figure 9A:
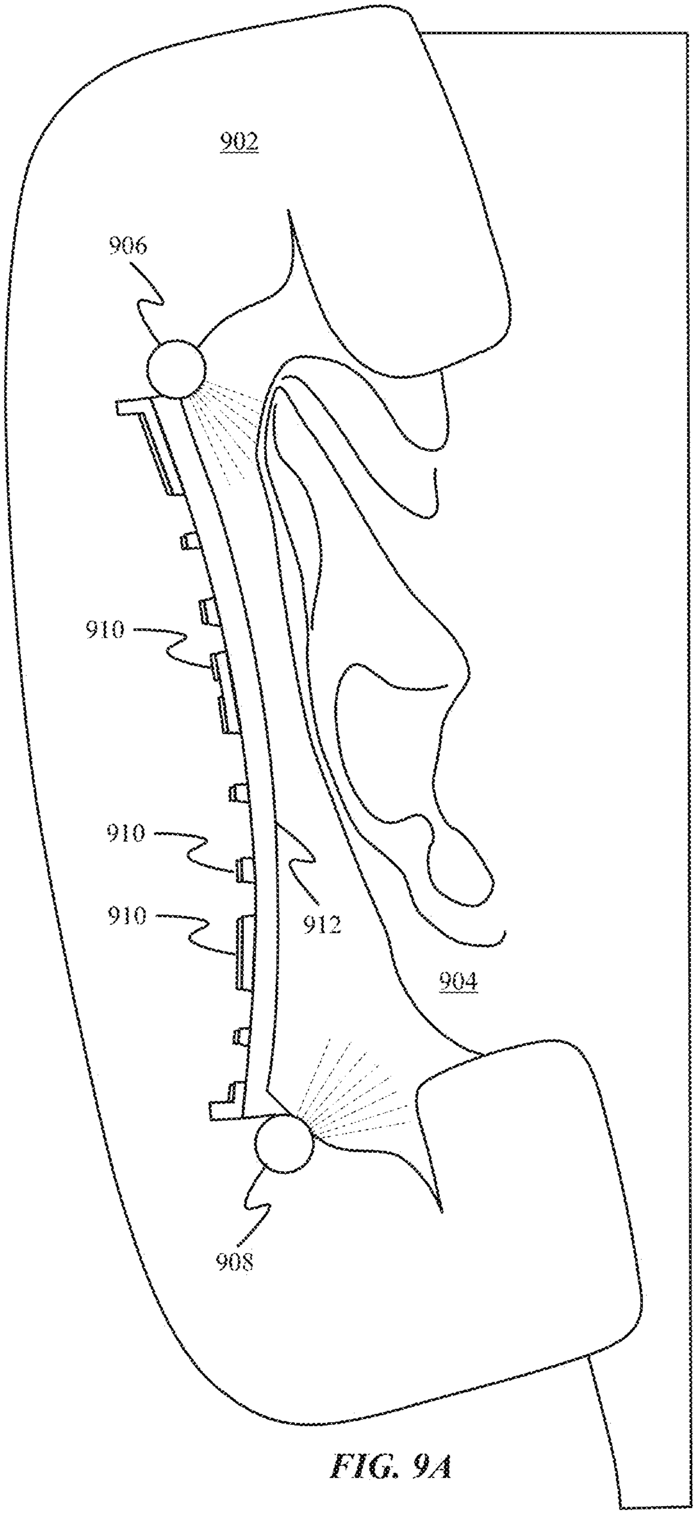
FIG. 9A shows an earpiece of headphones positioned over an ear of a user.

FIG. 9A shows an earpiece 902 of headphones positioned over an ear 904 of a user. Earpiece 902 includes at least proximity sensors 906 and 908. Proximity sensors 906 and 908 are positioned within a recess defined by earpiece 902 resulting in detectably different readings being returned by proximity sensors 906 and 908 depending on which ear earpiece 902 is positioned over. This is possible due to the asymmetric geometry of most user's ears. In some embodiments, proximity sensor 906 includes a light emitter configured to emit infrared light and an optical receiver configured to detect the emitted light reflecting off ear 904 of the user. A processor incorporated within or electrically coupled to proximity sensor 906 can be configured to determine a distance between proximity sensor 906 and proximate portions of ear 904 by measuring the amount of time it takes for infrared pulses emitted by the light emitter to return back to the light detector. In some embodiments, proximity sensor 906 can also be configured to map a contour of a portion of the ear. This can be accomplished with multiple emitters configured to emit light of different frequencies in different directions. Sensor readings collected by one or more optical receivers configured to detect and distinguish the different frequencies can then be used to determine a distance between proximity sensor 906 and different locations on the ear. In some embodiments, proximity sensors 906 can be distributed around a circumference of earpiece 902 when even more detail about the shape and position of the ear with respect to the earpiece is desired. For example, in some embodiments, it may be desirable to in addition to identifying which ear the earpiece is positioned upon, identify a rotational position of the ear with respect to the earpiece. Sensor readings could be of sufficiently high quality to identify certain features of ear 904 such as for example an earlobe or a pinna. In some embodiments and as depicted an angle at which infrared light is emitted from proximity sensor 908 can be different than an angle at which infrared light is emitted from proximity sensor 906. In this way, a likelihood of detecting an ear or the side of a user's head can be increased. As depicted, proximity sensor 908 would be able to achieve earlier detection due to it being pointed farther outside of the interior of earpiece 902. Proximity sensor 906 with its shallower angle would be able to cover a larger area of ear 904 of the user. In some embodiments, a capacitive sensor array can be positioned just beneath the surface of earpiece 902 and be configured to identify protruding features of the ear that contact or are in close proximity to surface 912 of earpiece 902.

Figure 9B:
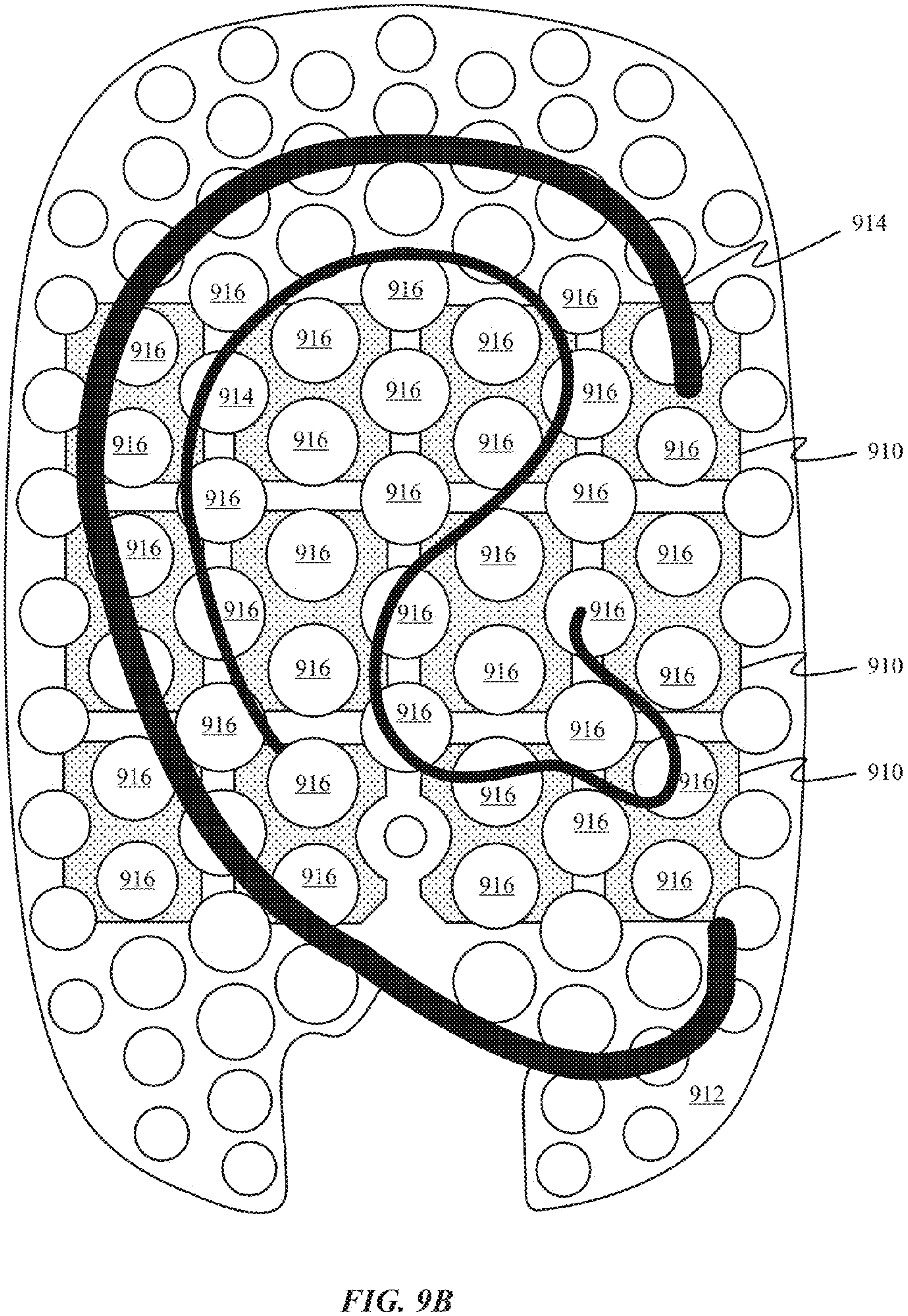
FIG. 9B shows positions of capacitive sensors beneath a surface and proximate ear contours associated with the ear.

FIG. 9B shows positions of capacitive sensors 910 beneath surface 912 and proximate ear contours 914 associated with ear 904. Ear contours 914 represent those contours of ear 904 most likely to protrude closest to the array of capacitive sensors 910. Capacitive sensors 910 can be configured to identify portions of the detected contours of ear 904 to determine which ear earpiece 902 is positioned upon as well as any rotation of earpiece 902 relative to ear 904. FIG. 9B also indicates how both surface 912 and the array of capacitive sensors 910 define openings 916 or perforations through which audio waves are able to pass substantially unattenuated. While the array of capacitive sensors 910 are shown disposed beneath only a central portion of surface 912, it should be appreciated that in some embodiments the array of capacitive sensors 912 could be arranged in different patterns resulting in a greater or smaller amount of coverage. For example, in some embodiments capacitive sensors 910 can be distributed across a majority of surface 912 in order to more completely characterize the shape and orientation of ear 904. In some embodiments, the location and orientation data captured by capacitive sensors 910 and/or proximity sensors 906/908 can be used to optimize audio output from speaker disposed within earpiece 902. For example, an earpiece with an array of audio drivers could be configured to actuate only those audio drivers centered upon or proximate ear 904.

Figure 10A:
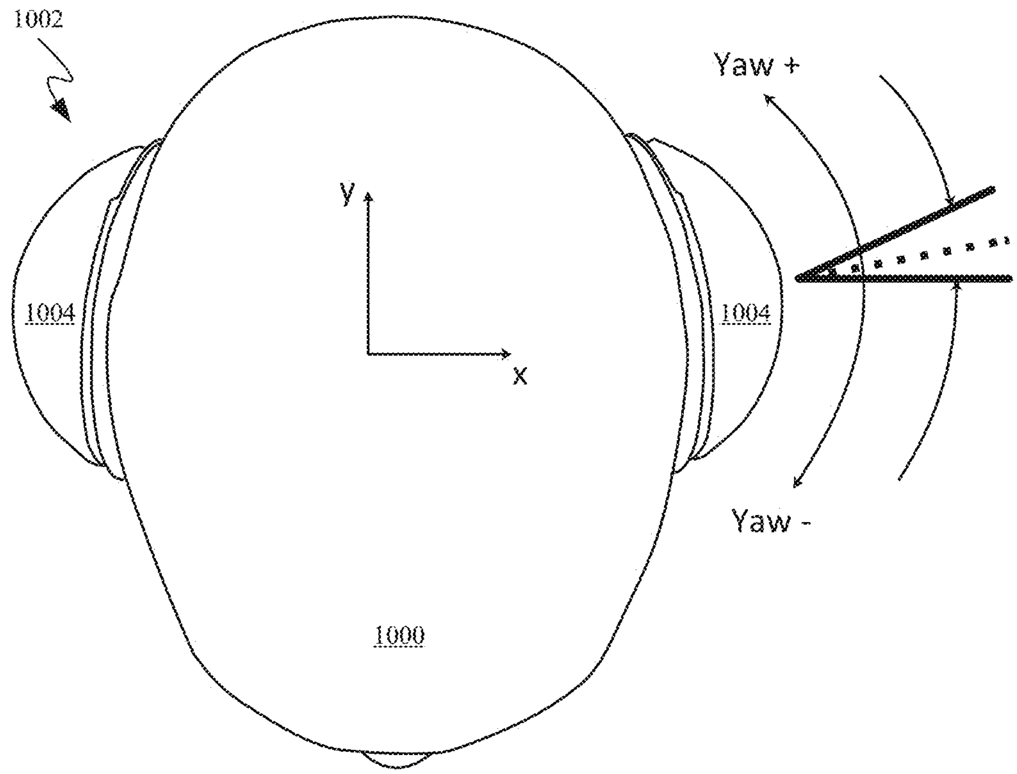
FIG. 10A shows a top view of an exemplary head of a user wearing headphones.
Figure 10B:
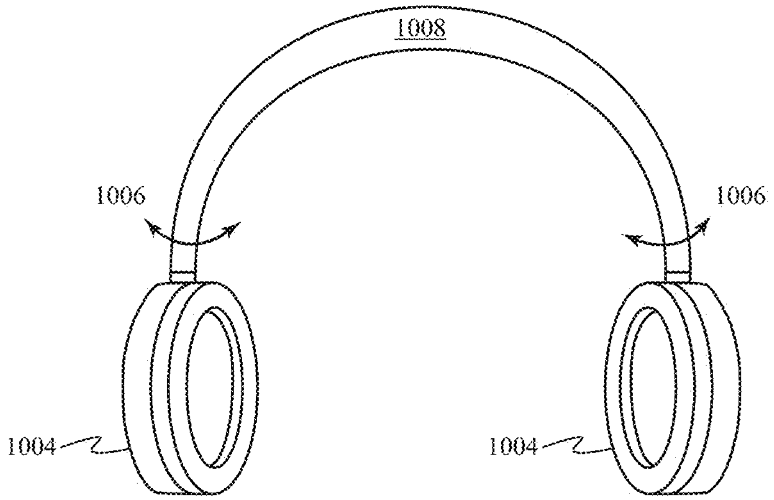
FIG. 10B shows a front view of the headphones depicted in FIG. 10A.

FIG. 10A shows a top view of an exemplary head of a user 1000 wearing headphones 1002. Earpieces 1004 are depicted on opposing sides of user 1000. A headband joining earpieces 1004 is omitted to show the features of the head of user 1000 in greater detail. As depicted, earpieces 1004 are configured to rotate about a yaw axis so they can be positioned flush against the head of user 1000 and oriented slightly towards the face of user 1000. In a study performed upon a large group of users it was found that on average, earpieces 1004 when situated over the ears of a user were offset above the x-axis as depicted. Furthermore, for over 99% of users the angle of earpieces 1004 with respect to the x-axis was above the x-axis. This means that only a statistically irrelevant portion of users of headphones 1002 would have head shapes causing earpieces 1004 to be oriented forward of the x-axis. FIG. 10B shows a front view of headphones 1002. In particular, FIG. 10B shows yaw axes of rotation 1006 associated with earpieces 1004 and how earpieces 1004 are both oriented toward the same side of headband 1008 joining earpieces 1004.

Figure 10C:
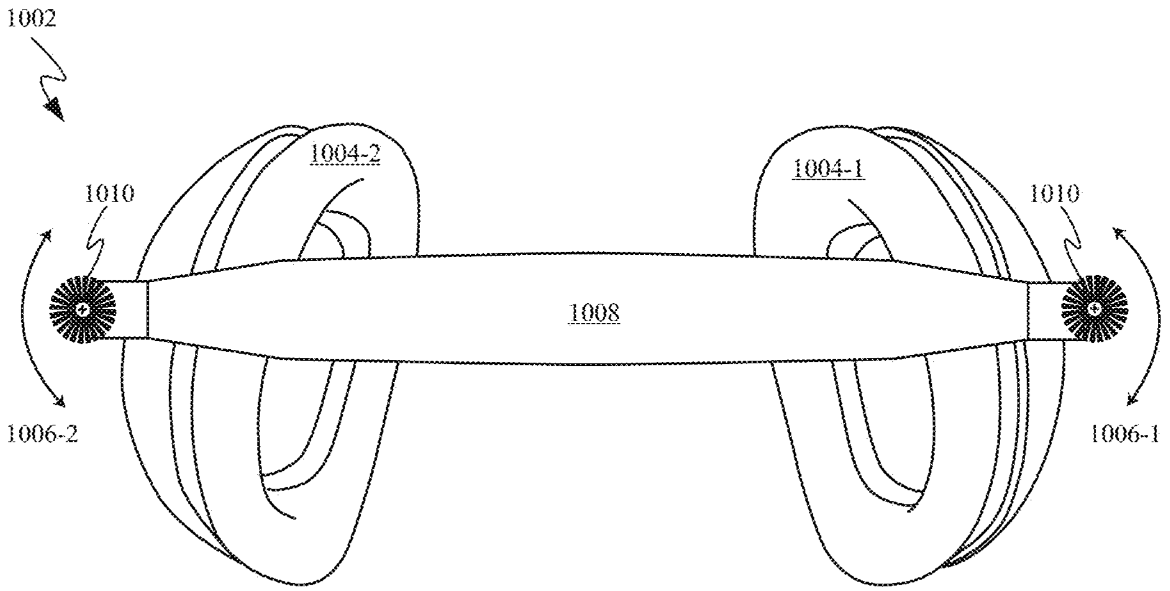
FIGS. 10C-10D show top views of the headphones depicted in FIG. 10A and how earpieces of the headphones are able to rotate about respective yaw axes.
Figure 10D:
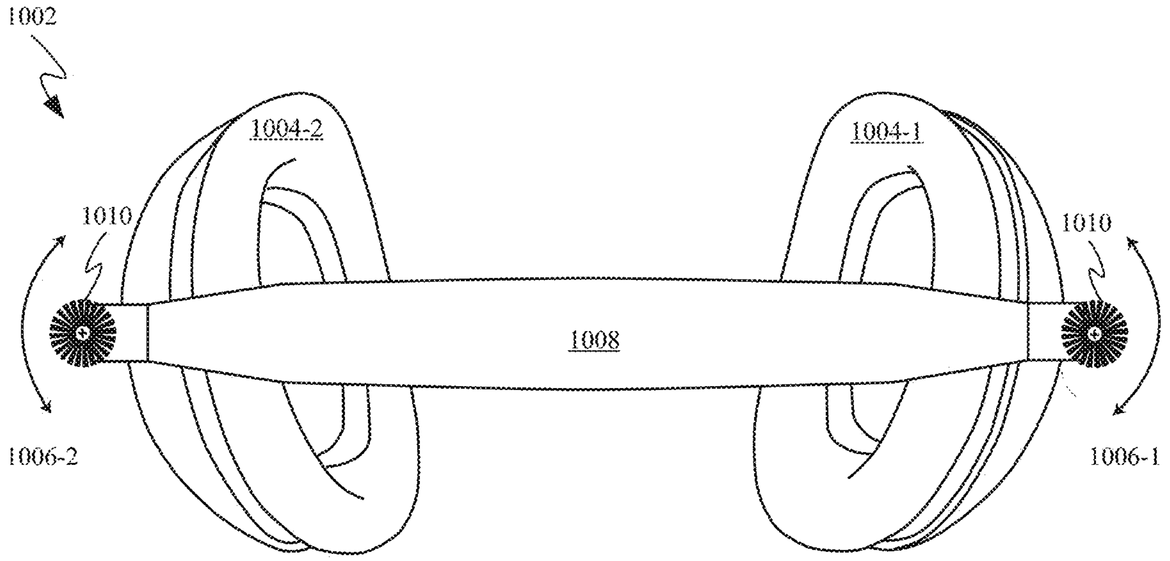

FIGS. 10C-10D show top views of headphones 1002 and how earpieces 1004 are able to rotate about yaw axes of rotation 1006. FIGS. 10C-10D also show earpieces 1004 being joined together by headband 1008. Headband 1008 can include yaw position sensors 1010, which can be configured to determine an angle of each of earpieces 1004 with respect to headband 1008. The angle can be measured with respect to a neutral position of earpieces with respect to headband 1008. The neutral position can be a position in which earpieces 1004 are oriented directly toward a central region of headband 1008. In some embodiments, earpieces 1004 can have springs that return earpieces 1004 to the neutral position when not being acted upon by an external force. The angle of earpieces relative to the neutral position can change in a clockwise direction or counter clockwise direction. For example, in FIG. 10C earpiece 1004-1 is biased about axis of rotation 1006-1 in a counter clockwise direction and earpiece 1004-2 is biased about axis of rotation 1006-2 in a clockwise direction. In some embodiments, sensors 1010 can be time of flight sensors configured to measure angular change of earpieces 1004. The depicted pattern associated and indicated as sensor 1010 can represent an optical pattern allowing accurate measurement of an amount of rotation of each of the earpieces. In other embodiments, sensors 1010 can take the form of magnetic field sensors or Hall Effect sensors as described in conjunction with FIGS. 5B and 6E. In some embodiments, sensors 1010 can be used to determine which ear each earpiece is covering for a user. Because earpieces 1004 are known to be oriented behind the x-axis for almost all users, when sensors 1010 detect both earpieces 1004 oriented to towards one side of the x-axis headphones 1002 can determine which earpieces are on which ear. For example, FIG. 10C shows a configuration in which earpiece 1004-1 can be determined to be on the left ear of a user and earpiece 1004-2 is on the right ear of the user. In some embodiments, circuitry within headphones 1002 can be configured to adjust the audio channels so the correct channel is being delivered to the correct ear.

Similarly, FIG. 10D shows a configuration in which earpiece 1004-1 is on the right ear of a user and earpiece 1004-2 is on the left ear of a user. In some embodiments, when earpieces are not oriented towards the same side of the x-axis, headphones 1002 can request further input prior to changing audio channels. For example, when earpieces 1004-1 and 1004-2 are both detected as being biased in a clockwise direction, a processor associated with headphones 1002 can determine headphones 1002 are not in current use. In some embodiments, headphones 1002 can include an override switch for the case where the user wants to flip the audio channels independent of the L/R audio channel routing logic associated with yaw position sensors 1010. In other embodiments, another sensor or sensors can be activated to confirm the position of headphones 1002 relative to the user.

Figure 10E:
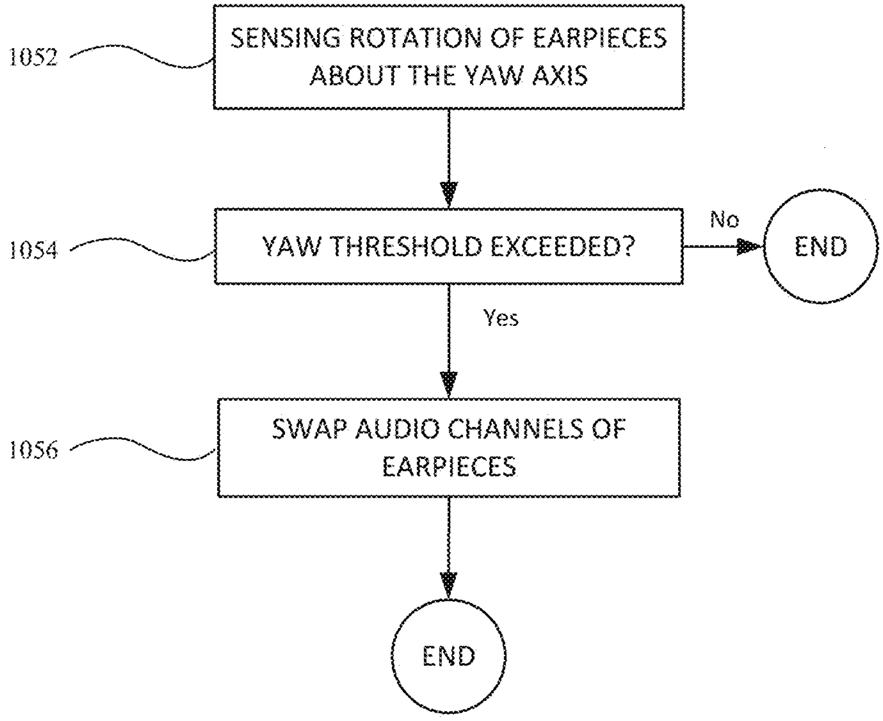
FIGS. 10E-10F show flow charts describing control methods that can be carried out when roll and/or yaw of the earpieces with respect to the headband is detected.
Figure 10F:
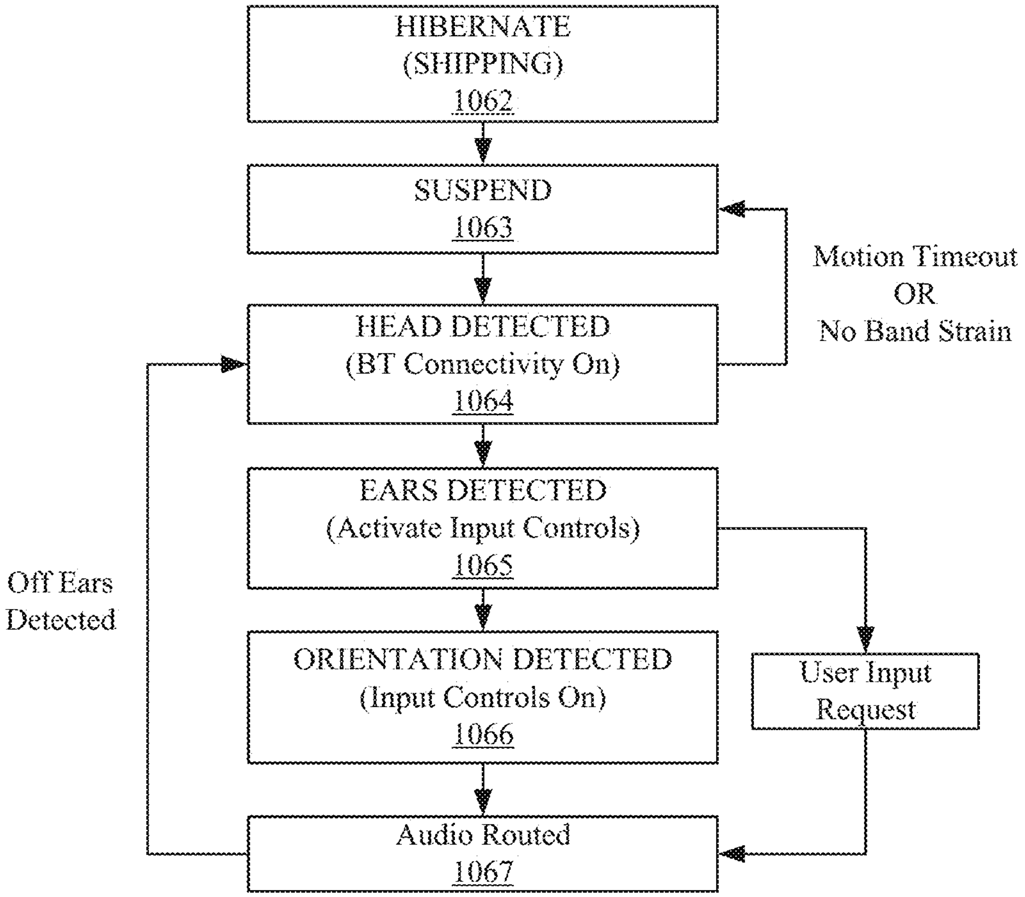

FIGS. 10E-10F show flow charts describing control methods that can be carried out when roll and/or yaw of the earpieces with respect to the headband is detected. FIG. 10E shows a flow chart that describes a response to detection of rotation of earpieces with respect to a headband of headphones about a yaw axis. The yaw axes can extend through a point located near the interface between each earpiece and the headband. When the headphones are being used by a user, the yaw axes can be substantially parallel to a vector defining the intersection of the sagittal and coronal anatomical planes of the user. At 1052, rotation of the earpieces about the yaw axes can be detected by a rotation sensor associated with a pivot mechanism. In some embodiments, the pivot mechanism can be similar to pivot mechanism 500 or pivot mechanism 600, which depict yaw axes 506 and 605. At 1054, a determination can be made regarding whether a threshold associated with rotation about the yaw axis has been exceeded. In some embodiments, the yaw threshold can be met anytime the earpieces pass through a position where the ear-facing surfaces of the two earpieces can be facing directly towards one another. At 1056, in the case where at least one of the earpieces passes through the threshold and both earpieces are determined to be oriented in the same direction, the audio channels being routed to the two earpieces can be swapped. In some embodiments, the user can be notified of the change in audio channels. In some embodiments, an amount of roll detected by the pivot mechanism can be factored into a determination of how to assign the audio channels.

FIG. 10F shows a flow chart that describes a method for changing the operating state of headphones based on sensor readings from one or more sensors of the headphones. At 1062, prior to a final packaging operation headphones can be put in a hibernating state in which little or no power is expended. In this way, headphones 1062 can have a substantial amount of battery power left on delivery. Delivery personnel could carry out a special procedure in order to remove the headphones from the hibernation state. For example, a data connector engaged with a charging port of the headphones could be removed triggering removal from the hibernation state. At 1063, the headphones can be in a suspended state whenever they have not been used for a threshold amount of time. In the suspended state sensor polling rates can be substantially reduced to further conserve power. In some embodiments, the headphones may take longer than normal to identify a user attempting to use the headphones. At 1064, a strain gauge or capacitive sensor can be used to identify placement of the headphones on a user's head. In some embodiments, the method can include returning to the suspended state at 1063 when a motion time out occurs or a strain gauge indicates the headphones are not being worn. At 1065, capacitive or proximity type sensors can be used to sense the presence and/or orientation of ears within the earpieces. At 1066, once an orientation of the headphones on the user's head is identified, input controls can be activated. At 1067, media playback can begin by routing audio channels received wirelessly or via a wired cable to corresponding earpieces. Removing headphones from a user's ears can result in a return to 1064 at which time the sensors can go back through the various steps to correctly identify earpiece locations and orientations.

Figure 10G:
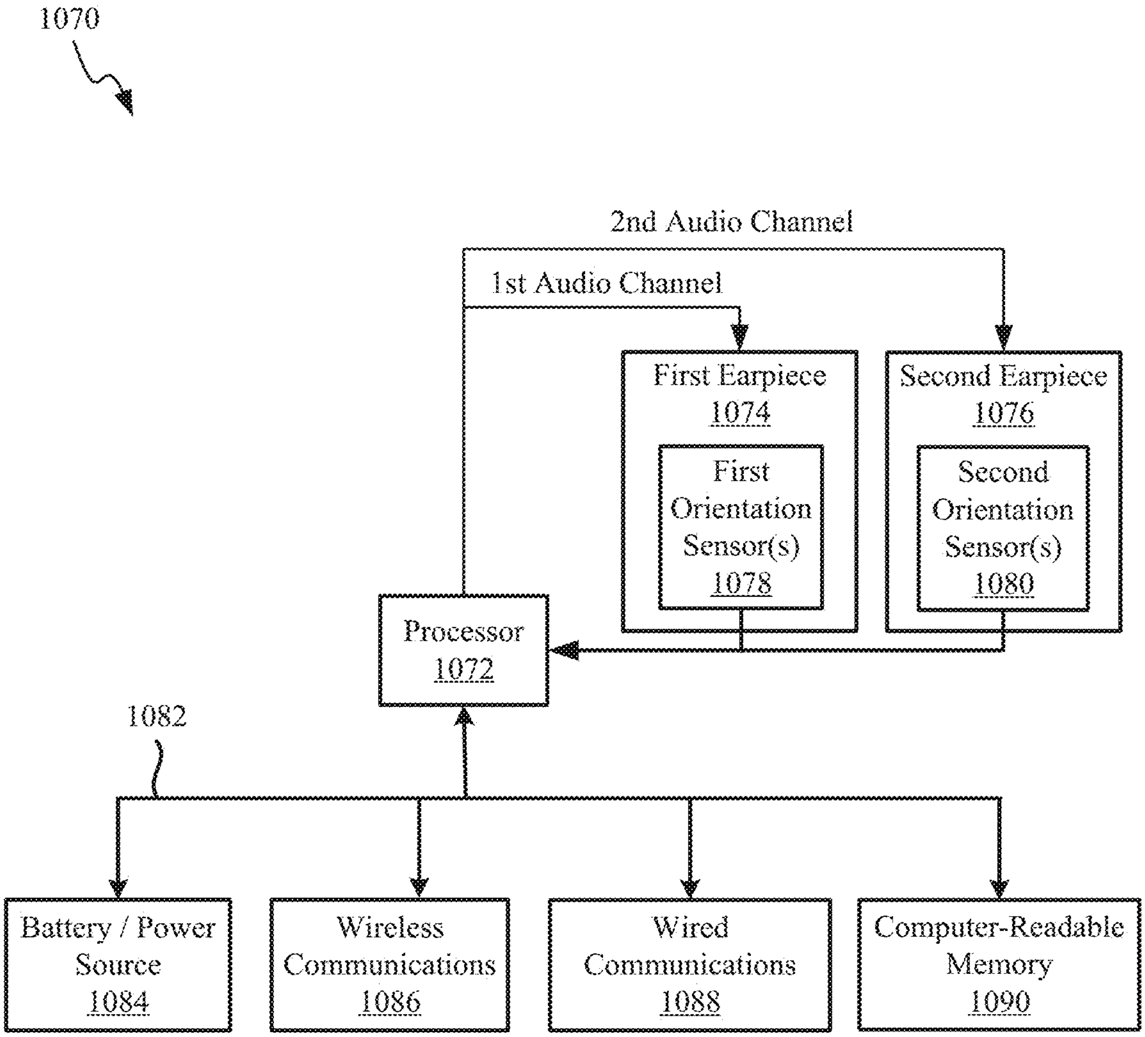
FIG. 10G shows a system level block diagram of a computing device 1070 that can be used to implement the various components described herein.

FIG. 10G shows a system level block diagram of a computing device 1070 that can be used to implement the various components described herein, according to some embodiments. In particular, the detailed view illustrates various components that can be included in headphones 1002 illustrated in FIGS. 10A-10D. As shown in FIG. 10G, the computing device 1070 can include a processor 1072 that represents a microprocessor or controller for controlling the overall operation of computing device 1070. The computing device 1070 can include first and second earpieces 1074 and 1076 joined by a headband assembly, the earpieces including speakers for presenting media content to the user. Processor 1072 can be configured to transmit first and second audio channels to first and second earpieces 1074 and 1076. In some embodiments, first orientation sensor(s) 1078 can be configured to transmit orientation data of first earpiece 1074 to processor 1072. Similarly, second orientation sensor(s) 1080 can be configured to transmit orientation data of second earpiece 1076 to processor 1072. Processor 1072 can be configured to swap the 1st Audio Channel with the 2nd Audio Channel in accordance with information received from first and second orientation sensors 1078 and 1080. A data bus 1082 can facilitate data transfer between at least battery/power source 1084, wireless communications circuitry 1084, wired communications circuitry 1082 computer readable memory 1080 and processor 1072. In some embodiments, processor 1072 can be configured to instruct battery/power source 1084 in accordance with information received by first and second orientation sensors 1078 and 1080. Wireless communications circuitry 1086 and wired communications circuitry 1088 can be configured to provide media content to processor 1072. In some embodiments, processor 1072, wireless communications circuitry 1086 and wired communications circuitry 1088 can be configured to transmit and receive information from computer-readable memory 1090. Computer readable memory 1090 can include a single disk or multiple disks (e.g. hard drives) and includes a storage management module that manages one or more partitions within computer readable memory 1090.

Foldable Headphones

Figure 11A:
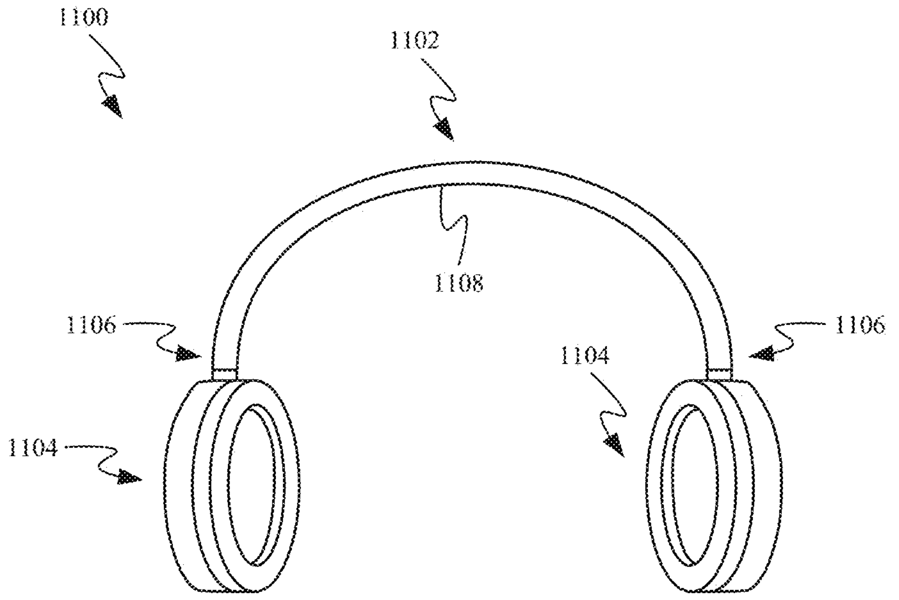
FIGS. 11A-11C show foldable headphones.
Figure 11B:
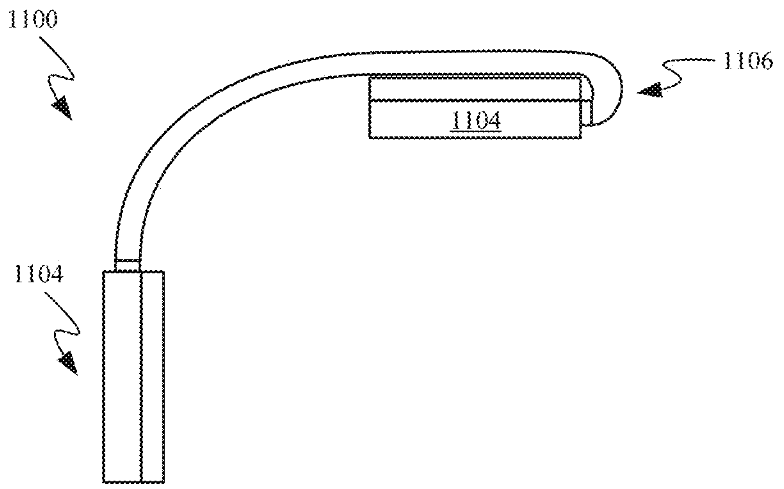

FIGS. 11A-11B show headphones 1100 having a deformable form factor. FIG. 11A shows headphones 1100 including deformable headband assembly 1102, which can be configured to mechanically and electrically couple earpieces 1104. In some embodiments, earpieces 1104 can be ear cups and in other embodiments, earpieces 1104 can be on-ear earpieces. Deformable headband assembly 1102 can be joined to earpieces 1104 by foldable stem regions 1106 of headband assembly 1102. Foldable stem regions 1106 are arranged at opposing ends of deformable band region 1108. Each of foldable stem regions 1106 can include an over-center locking mechanism that allows each of earpieces 1104 to remain in a flattened state after being rotated against deformable band region 1108. The flattened state refers to the curvature of deformable band region 1108 changing to become flatter than in the arched state. In some embodiments, deformable band region 1108 can become very flat but in other embodiments the curvature can be more variable (as shown in the following figures). The over-center locking mechanism allows earpieces 1104 to remain in the flattened state until a user rotates the over-center locking mechanism back away from deformable band region 1108. In this way, a user need not find a button to change the state, but simply perform the intuitive action of rotating the earpiece back into its arched state position.

Figure 11C:
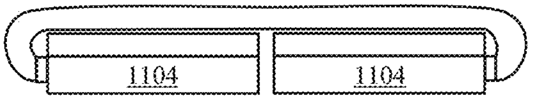

FIG. 11B shows one of earpieces 1104 rotated into contact with deformable band region 1108. As depicted, rotation of just one of earpieces 1104 against deformable band region 1108 causes half of deformable band region 1108 to flatten. FIG. 11C shows the second one of earpieces rotated against deformable band region 1108. In this way, headphones 1100 can be easily transformed from an arched state (i.e. FIG. 11A) to a flattened state (i.e. FIG. 11C). In the flattened state headphones, the size of headphones 1100 can be reduced to a size equivalent to two earpieces arranged end to end. In some embodiments, deformable band region can press into cushions of earpieces 1104, thereby substantially preventing headband assembly 1102 from adding to the height of headphones 1100 in the flattened state.

Figure 11D:
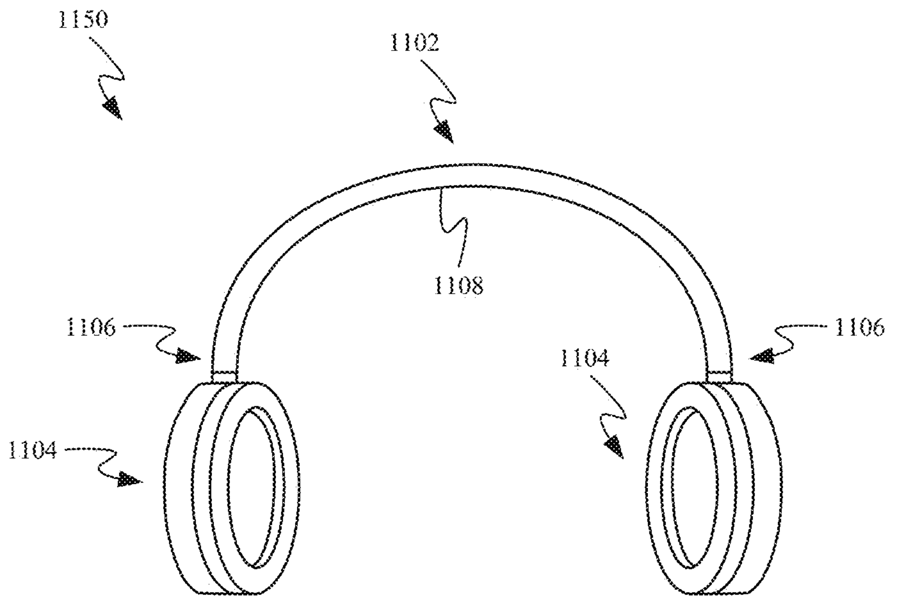
FIGS. 11D-11F show how earpieces of foldable headphones can be folded towards an exterior-facing surface of a deformable band region.
Figure 11E:
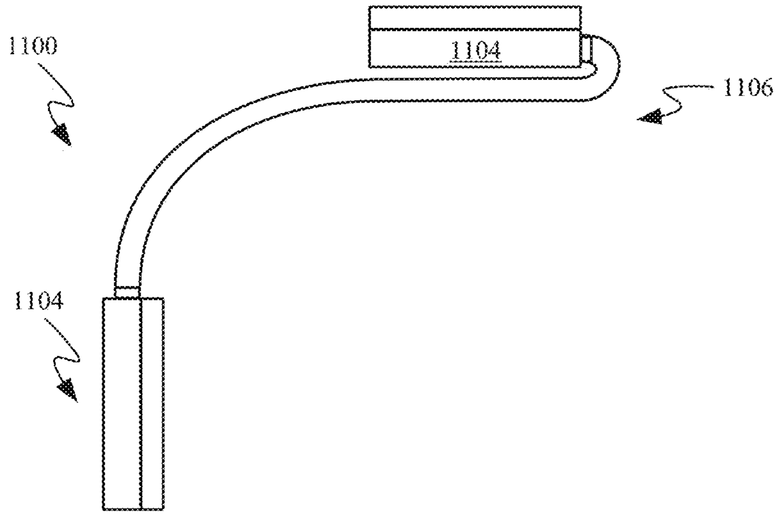
Figure 11F:
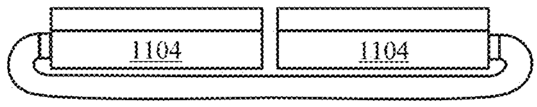
Figure 12A:
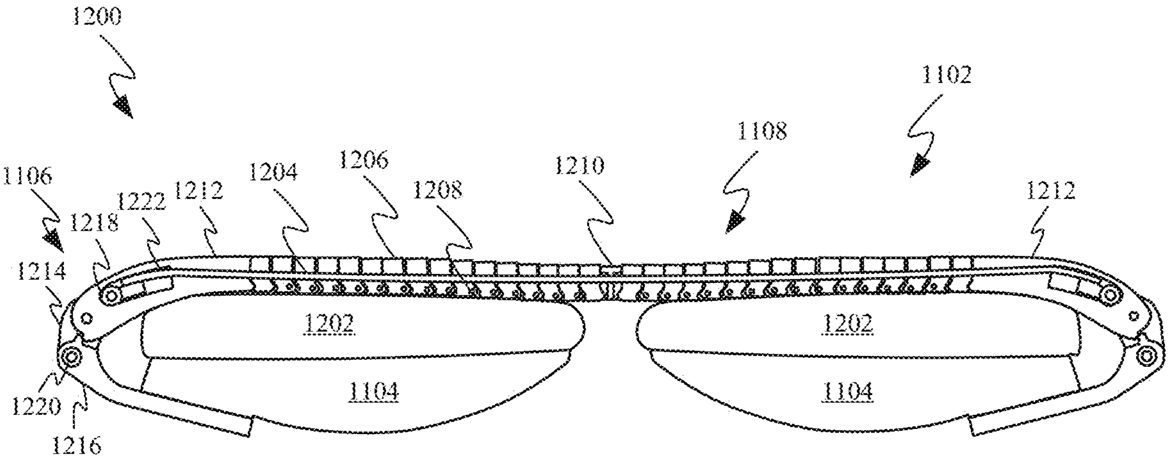
FIGS. 12A-12B show a headphones embodiment that can be transitioned from an arched state to a flattened state by pulling on opposing sides of a spring band.
Figure 12B:
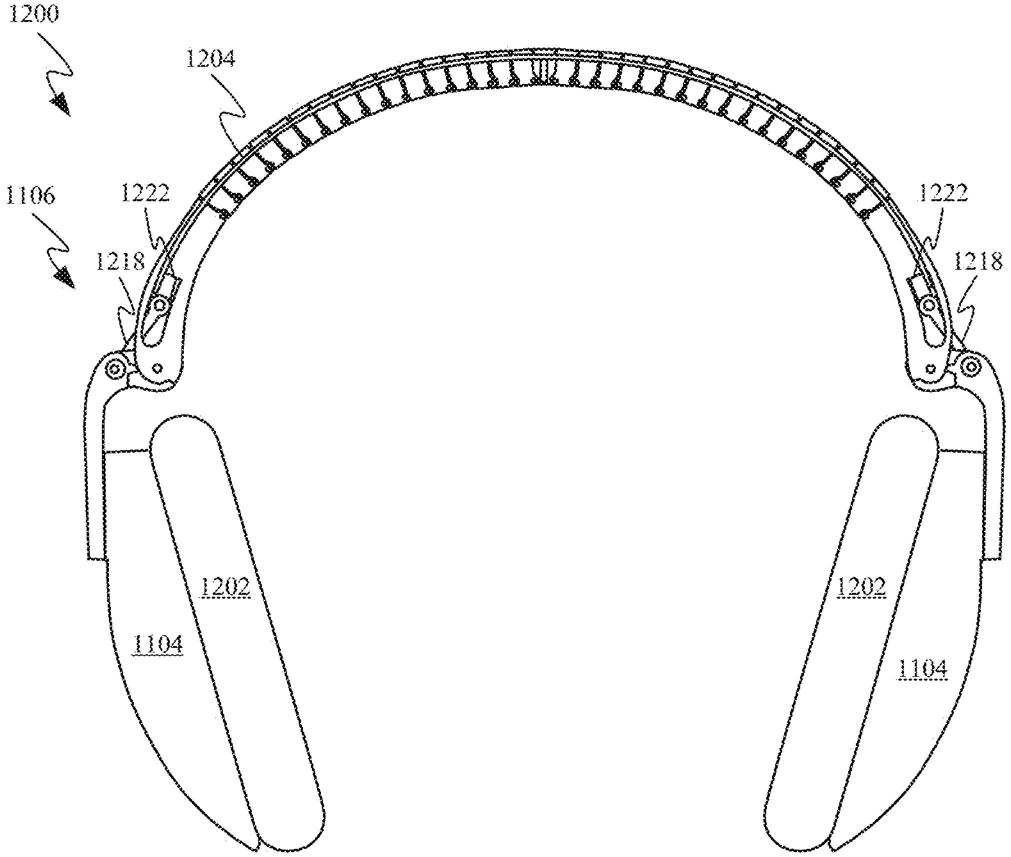

FIGS. 11D-11F show how earpieces 1104 of headphones 1150 can be folded towards an exterior-facing surface of deformable band region 1108. FIG. 11D shows headphones 11D in an arched state. In FIG. 11E, one of earpieces 1104 is folded towards the exterior-facing surface of deformable band region 1108. Once earpiece 1104 is in place as depicted, the force exerted in moving earpiece 1104 to this position can place one side of deformable headband assembly 1102 in a flattened state while the other side stays in the arched state. In FIG. 11F, the second earpiece 1104 is also shown folded against the exterior-facing FIGS. 12A-12B show a headphones embodiment in which the headphones can be transitioned from an arched state to a flattened state by pulling on opposing ends of a spring band. FIG. 12A shows headphones 1200, which can be, for example, headphones 1100 shown in FIG. 11, in a flattened state. In the flattened state, earpieces 1104 are aligned in the same plane so that each of earpads 1202 face in substantially the same direction. In some embodiments, headband assembly 1102 contacts opposing sides of each of earpads 1202 in the flattened state. Deformable band region 1108 of headband assembly 1102 includes spring band 1204 and segments 1206. Spring band 1204 can be prevented from returning headphones 1200 to the arched state by locking components of foldable stem regions 1106 exerting pulling forces on each end of spring band 1204. Segments 1206 can be connected to adjacent segments 1206 by pins 1208. Pins 1208 allow segments to rotate relative to one another so that the shape of segments 1206 can be kept together but also be able to change shape to accommodate an arched state. Each of segments 1206 can also be hollow to accommodate spring band 1204 passing through each of segments 1206. A central or keystone segment 1206 can include fastener 1210, which engages the center of spring band 1204. Fastener 1210 isolates the two side of spring band 1204 allowing for earpieces 1104 to be sequentially rotated into the flattened state as depicted in FIG. 11B.

FIG. 12A also shows each of foldable stem regions 1106 which include three rigid linkages joined together by pins that pivotally couple upper linkage 1212, middle linkage 1214 and lower linkage 1216 together. Motion of the linkages with respect to each other can also be at least partially governed by spring pin 1218, which can have a first end coupled to a pin 1220 joining middle linkage 1214 to lower linkage 1216 and a second end engaged within a channel 1222 defined by upper linkage 1212. The second end of spring pin 1218 can also be coupled to spring band 1204 so that as the second end of spring pin 1218 slides within channel 1222 the force exerted upon spring band 1204 changes. Headphones 1200 can snap into the flattened state once the first end of spring pin 1218 reaches an over-center locking position. The over-center locking position keeps earpiece 1104 in the flattened position until the first end of spring pin 1218 is moved far enough to be released from the over-center locking position. At that point, earpiece 1104 returns to its arched state position.

FIG. 12B shows headphones 1200 arranged in an arched state. In this state, spring band 1204 is in a relaxed state where a minimal amount of force is being stored within spring band 1204. In this way, the neutral state of spring band 1204 can be used to define the shape of headband assembly 1102 in the arched state when not being actively worn by a user. FIG. 12B also shows the resting state of the second end of spring pins 1218 within channels 1222 and how the corresponding reduction in force on the end of spring band 1204 allows spring band 1204 to help headphones 1200 assume the arched state. It should be noted that while substantially all of spring band 1204 is depicted in FIGS. 12A-12B that spring band 1204 would generally be hidden by segments 1206 and upper linkages 1212.

Figure 12C:
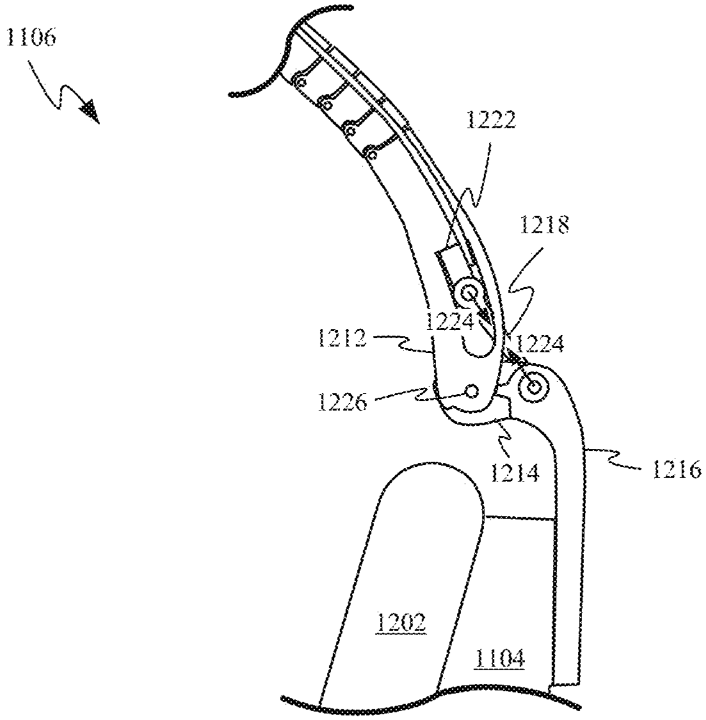
FIGS. 12C-12D show side views of a foldable stem region in arched and flattened states, respectively.
Figure 12D:
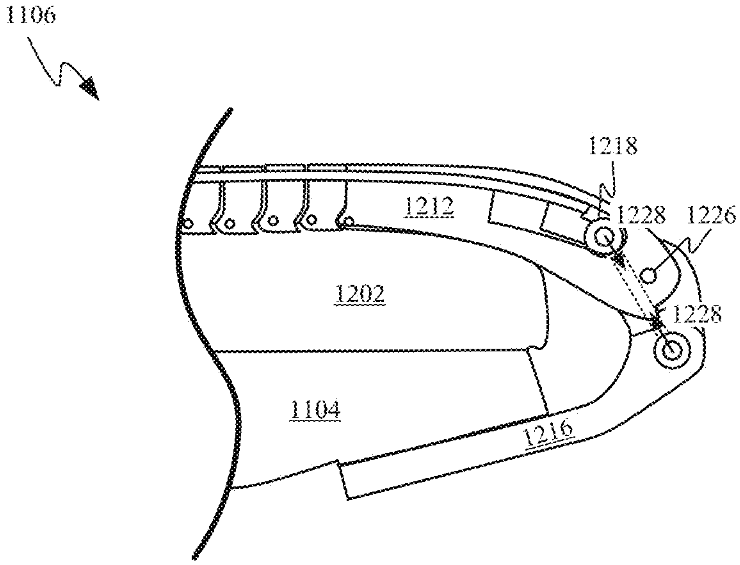

FIGS. 12C-12D show side views of foldable stem region 1106 in arched and flattened states, respectively. FIG. 12C shows how forces 1224 exerted by spring pin 1218 operate to keep linkages 1212, 1214 and 1216 in the arched state. In particular, spring pin 1218 keeps the linkages in the arched state by preventing upper linkage 1212 from rotating about pin 1226 and away from lower linkage 1216. FIG. 12D shows how forces 1228 exerted by spring pin 1218 operate to keep linkages 1212, 1214 and 1216 in the flattened state. This bi-stable behavior is made possible by spring pin 1218 being shifted to an opposite side of the axis of rotation defined by pin 1226 in the flattened state. In this way, linkages 1212-1216 are operable as an over-center locking mechanism. In the flattened state, spring pin 1218 resists transitioning the headphones from moving from the flattened state to the arched state; however, a user exerting a sufficiently large rotational force on earpiece 1104 can overcome the forces exerted by spring pin 1218 to transition the headphones between the flat and arched states.

Figure 12E:
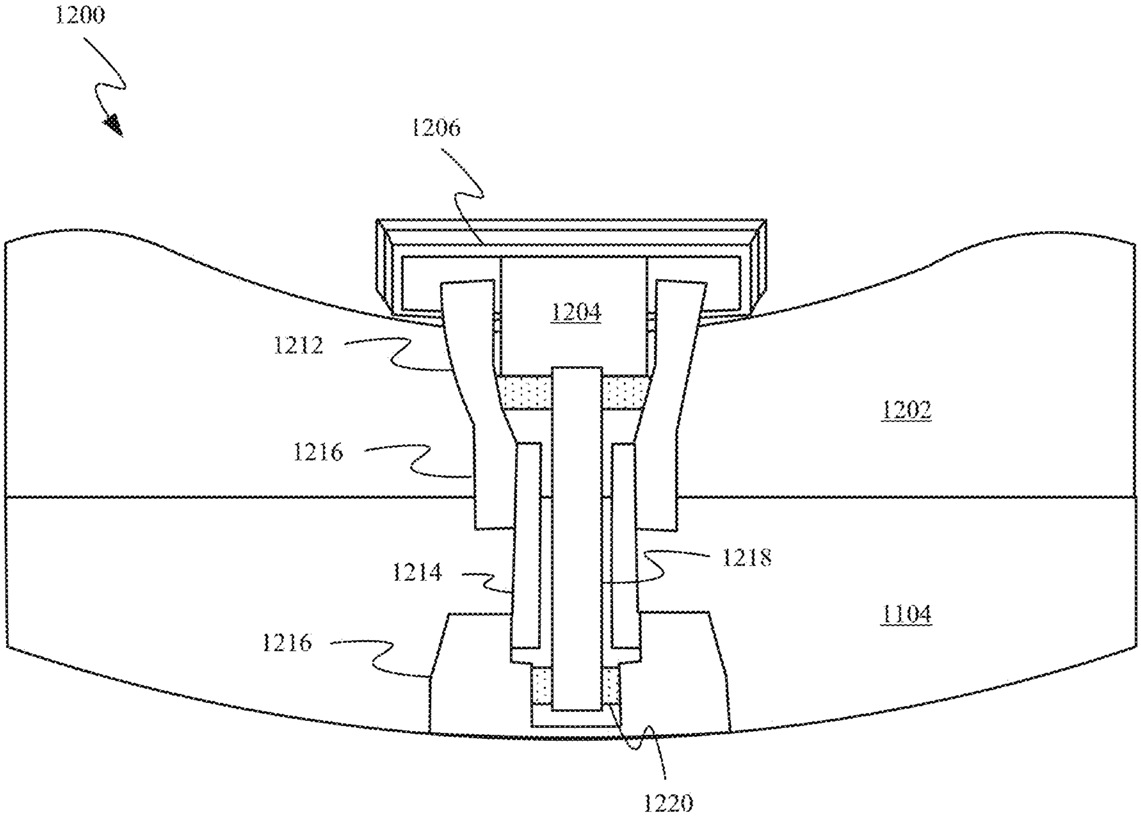
FIG. 12E shows a side view of one end of the headphones depicted in FIG. 12D.

FIG. 12E shows a side view of one end of headphones 1200 in the flattened state. In this view, earpads 1202 are shown with a contour configured to conform to the curvature of the head of a user. The contour of earpads 1202 can also help to prevent headband assembly 1102 and particularly segments 1206 making up headband assembly 1102 from protruding substantially farther vertically than earpads 1202. In some embodiments, the depression of the central portion of earpads 1202 can be caused at least in part by pressure exerted on them by segments 1206.

Figure 13A:
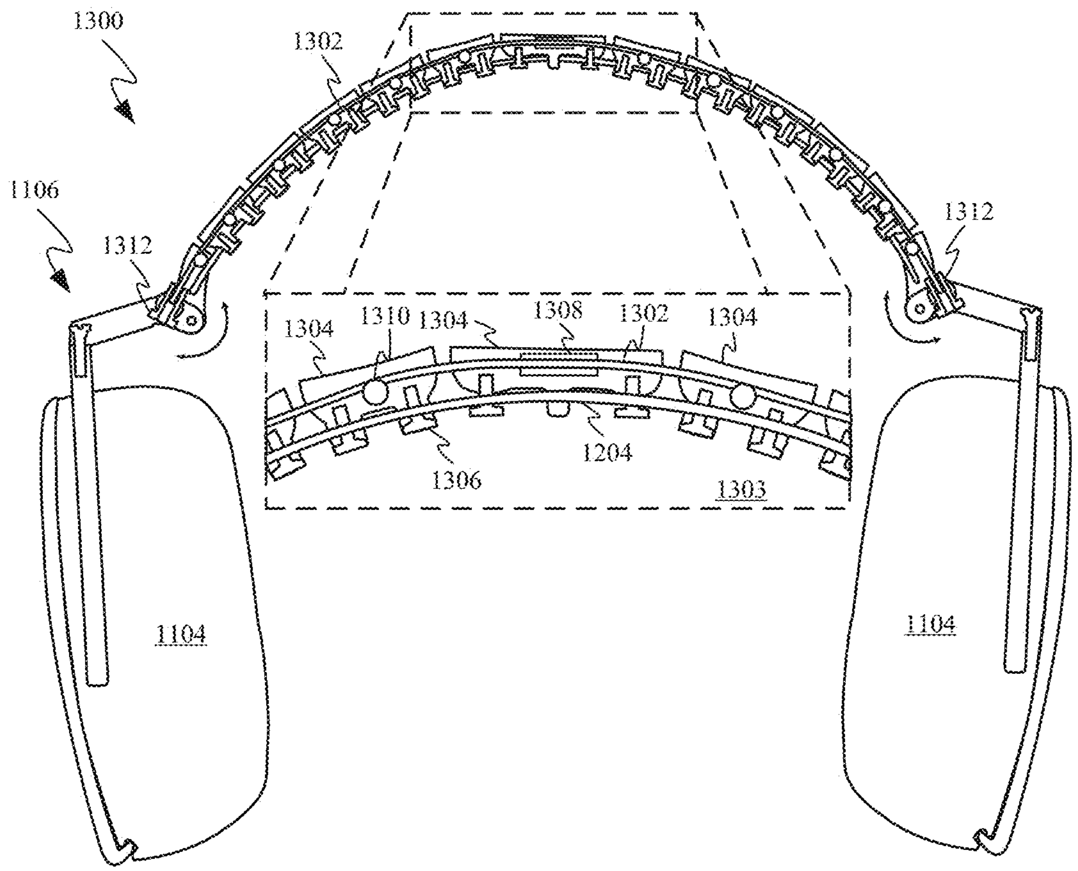
FIGS. 13A-13B show partial cross-sectional views of headphones using an off-axis cable to transition between an arched state and a flattened states.
Figure 13B:
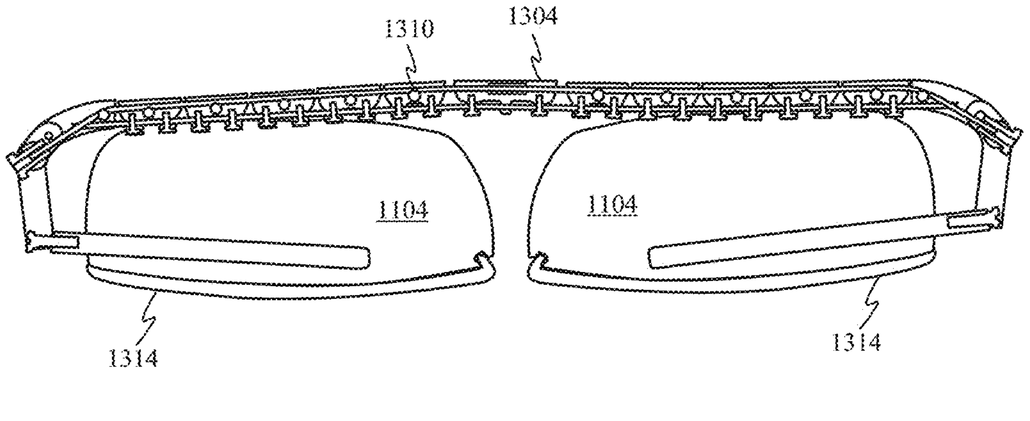

FIGS. 13A-13B show partial cross-sectional views of headphones 1300, which use an off-axis cable to transition between an arched state and a flattened state. FIG. 13A shows a partial cross-sectional view of headphones 1300 in an arched state. Headphones 1300 differ from headphones 1200 in that when earpieces 1104 are rotated towards headband assembly 1102 a cable 1302 is tightened in order to flatten deformable band region 1108 of headband assembly 1102. Cable 1302 can be formed from a highly elastic cable material such as Nitinol™, a Nickel Titanium alloy. Close-up view 1303 shows how deformable band region 1108 can include many segments 1304 that are fastened to spring band 1204 by fasteners 1306. In some embodiments, fasteners 1306 can also be secured to spring band 1204 by an O-ring to prevent any rattling of fasteners 1306 while using headphones 1300. A central one of segments 1304 can include a sleeve 1308 that prevents cable 1302 from sliding with respect to the central one of segments 1304. The other segments 1304 can include metal pulleys 1310 that keep cable 1302 from experiencing substantial amounts of friction as cable 1302 is pulled on to flatten headphones 1300. FIG. 13A also shows how each end of cable 1302 is secured to a rotating fastener 1312. As foldable stem region 1106 rotates, rotating fasteners 1312 keeps the ends of cable 1302 from twisting.

FIG. 13B shows a partial cross-sectional view of headphones 1300 in a flattened state. Rotating fasteners 1312 are shown in a different rotational position to accommodate the change in orientation of cable 1302. The new location of rotating fasteners 1312 also generates an over-center locking position that prevents headphones 1300 from being inadvertently returned to the arched state as described above with respect to headphones 1200. FIG. 13B also shows how the curved geometry of each of segments 1304 allows segments 1304 to rotate with respect to one another in order to transition between the arched and flattened states. In some embodiments, cable 1302 can also be operative to limit a range of motion of spring band 1204 similar in some ways to the embodiment shown in FIGS. 9A-9B. Headphones 1300 also include input panels 1314 affixed to an outward facing surface of headphones 1300 in the flattened state. Input panels 1314 can define a touch sensitive input surface allowing users to input operating instructions into headphones 1300 when headphones 1300 are in the flattened state. For example, a user might wish to continue media playback with headphones 1300 in the flattened state. Easy access to input panels 1314 would make controlling operation of headphones 1300 in this state straightforward and convenient.

Figure 14A:
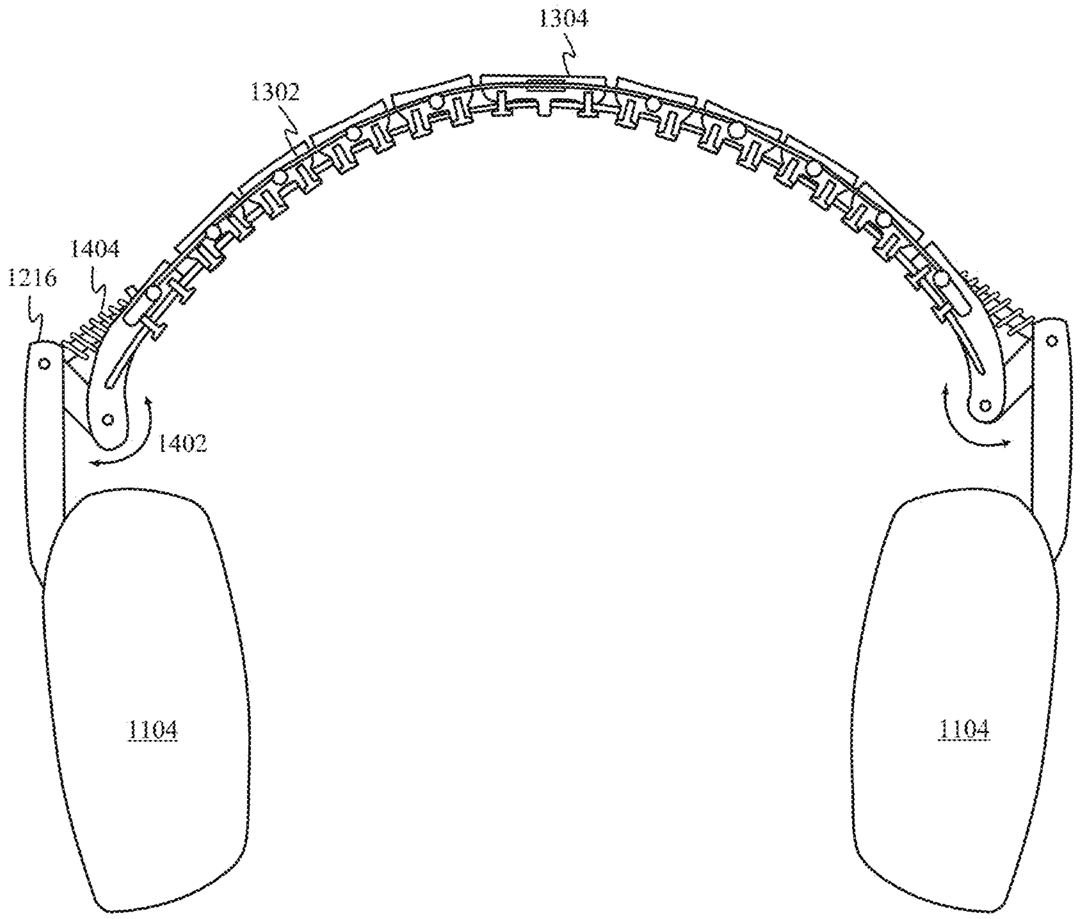
FIGS. 14A-14C show partial cross-sectional views of headphones having a foldable stem region constrained at least in part by an elongating pin that delays flattening of the headphones through a first portion of the travel of the earpieces of the headphones.
Figure 14B:
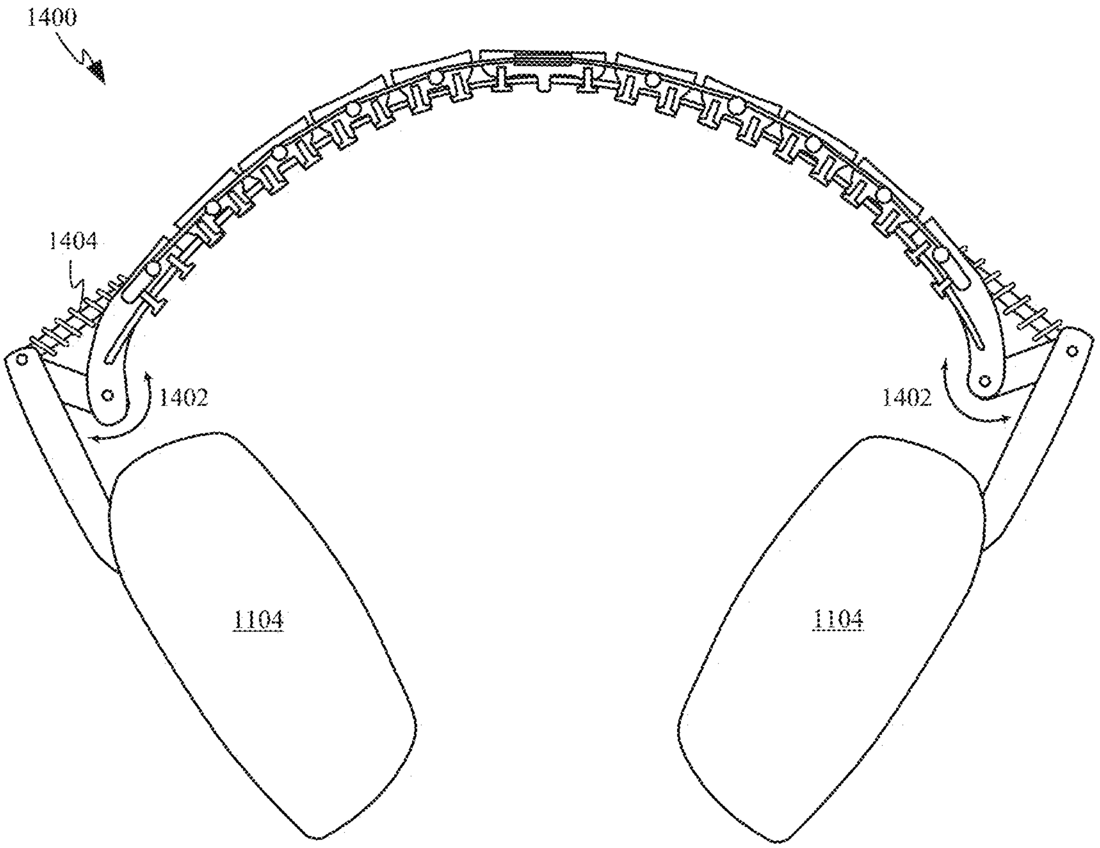
Figure 14C:
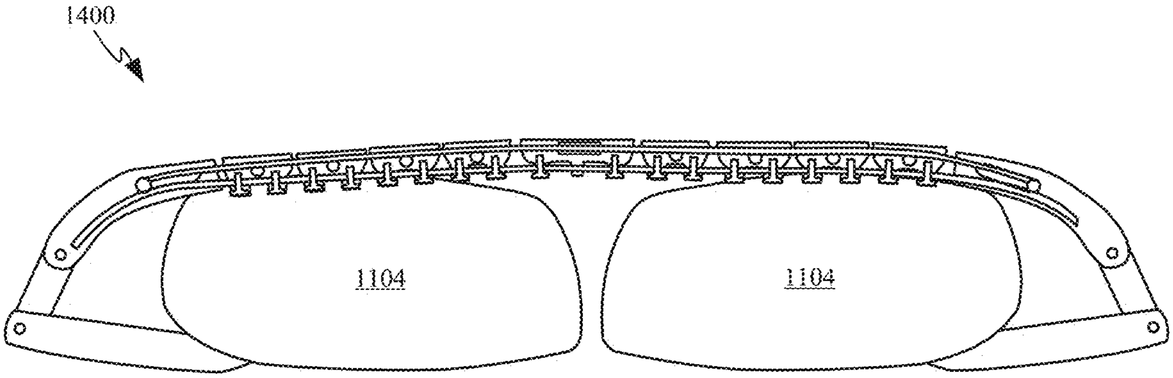

FIG. 14A shows headphones 1400 that are similar to headphones 1300. In particular, headphones 1400 also use cable 1302 to flatten deformable band region 1108. Furthermore, a central portion of cable 1302 is retained by the central segment 1304. In contrast, lower linkage 1216 of foldable stem region 1106 is shifted upward with respect to lower linkage 1216 depicted in FIG. 12A. When earpiece 1104 is rotated about axis 1402 towards deformable band region 1108, spring pin 1404 is configured to elongate as shown in FIG. 14B during a first portion of the rotation. In some embodiments, elongation of spring pin 1404 can allow earpiece to rotate about 30 degrees from an initial position. Once spring pins 1404 reach their maximum length further rotation of earpieces 1104 about axes 1402 results in cable 1302 being pulled, which causes deformable band region 1108 to change from an arched geometry to a flat geometry as shown in FIG. 14C. The delayed pulling motion changes the angle from which cable 1302 is initially pulled. The changed initial angle can make it less likely for cable 1302 to bind when transitioning headphones 1400 from the arched state to the flattened state.

Figure 15A:
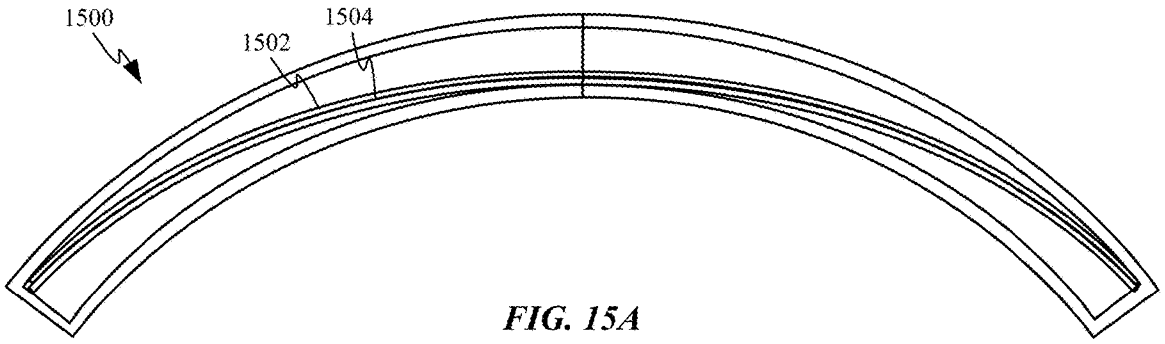
FIGS. 15A-15F show various views of headband assembly 1500 from different angles and in different states.
Figure 15B:
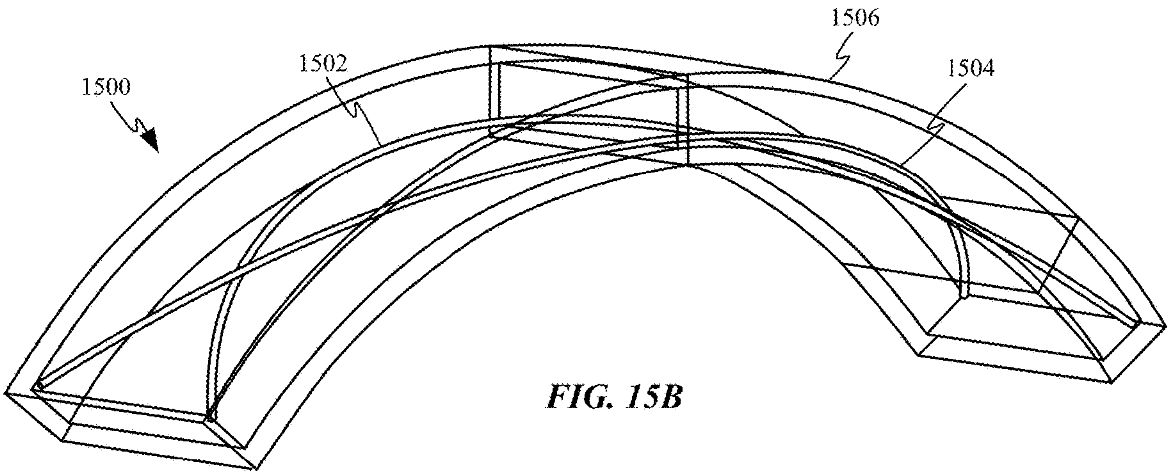
Figure 15C:
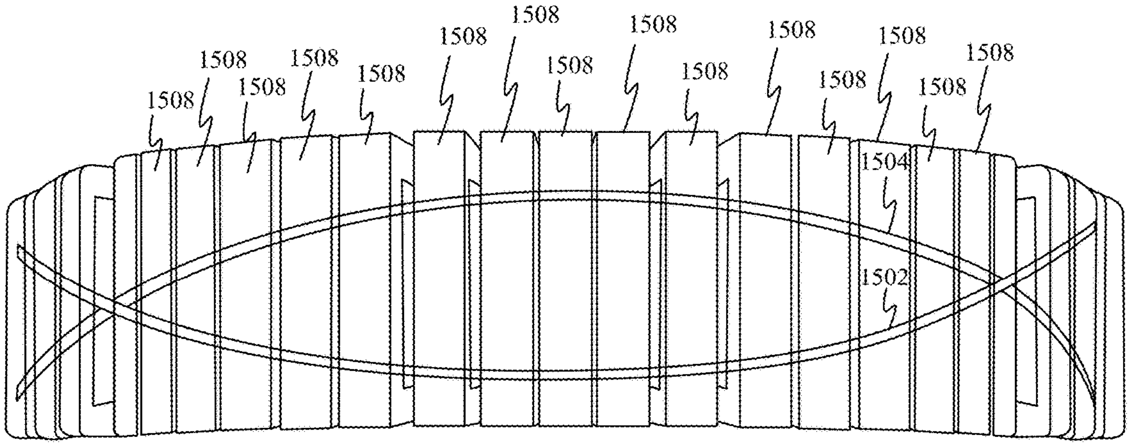

FIGS. 15A-15F show various views of headband assembly 1500 from different angles and in different states. Headband assembly 1500 has a bi-stable configuration that accommodates transitioning between flattened and arched states. FIGS. 15A-15C depict headband assembly 1500 in an arched state. Bi-stable wires 1502 and 1504 are depicted within a flexible headband housing 1506. Headband housing can be configured to change shape to accommodate at least the flattened and arched states. Bi-stable wires 1502 and 1504 extend from one end of headband housing 1506 to another and are configured to apply a clamping force through earpieces attached to opposing ends of headband assembly 1500 to a user's head to keep an associated pair of headphone securely in place during use. FIG. 15C in particular shows how headband housing 1506 can be formed from multiple hollow links 1508, which can be hinged together and cooperatively form a cavity within which bi-stable wires 1502 are able to transition between configurations corresponding to the arched and flattened states. Because links 1508 are only hinged on one side, the links are only able to move to the arched state in one direction. This helps avoid the unfortunate situation where headband assembly 1500 is bent the wrong direction, thereby position the earpieces in the wrong direction.

Figure 15D:
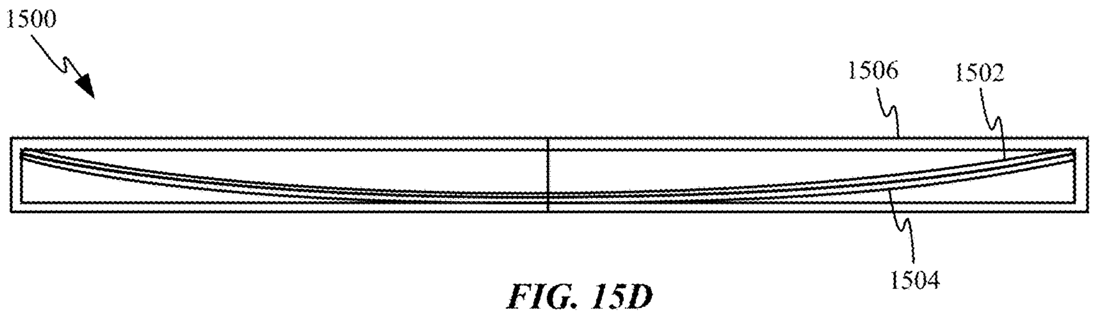
Figure 15E:
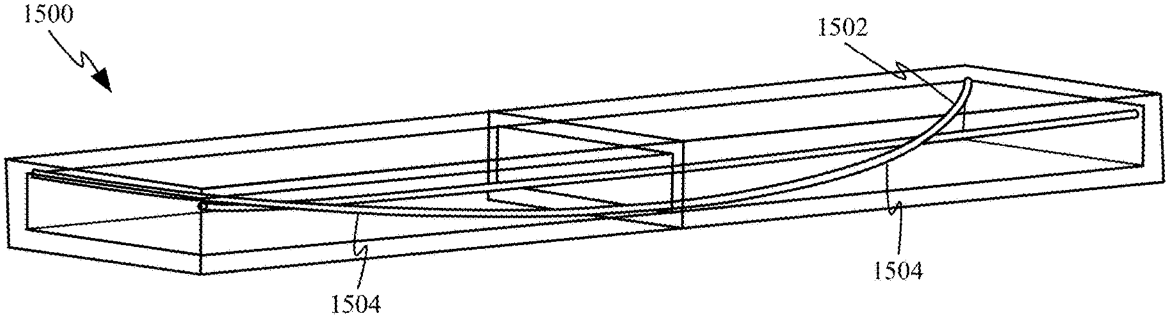
Figure 15F:
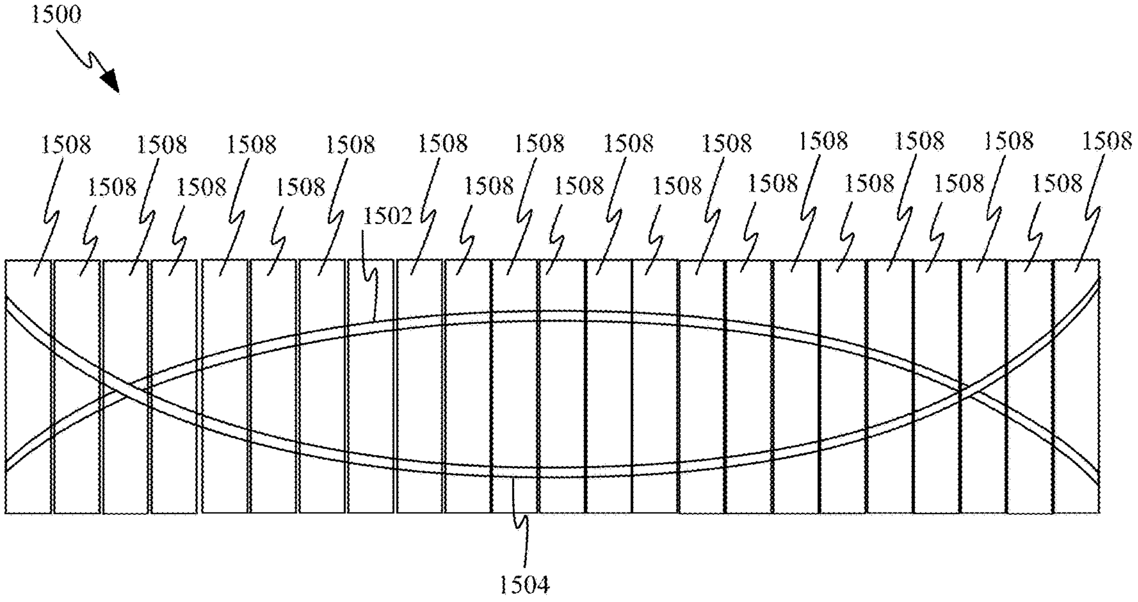

FIGS. 15D-15F show headband assembly in a flattened state. Because the ends of bi-stable wires 1502 and 1504 have passed an over-center point where the ends of wires 1502 and 1504 are higher than a central portion of bi-stable wires 1502 and 1504, the bi-stable wires 1502 now help keep headband assembly 1500 in the flattened state. In some embodiments, bi-stable wires 1502 can also be used to carry signals and/or power through headband assembly 1500 from one earpiece to another.

Figure 16A:
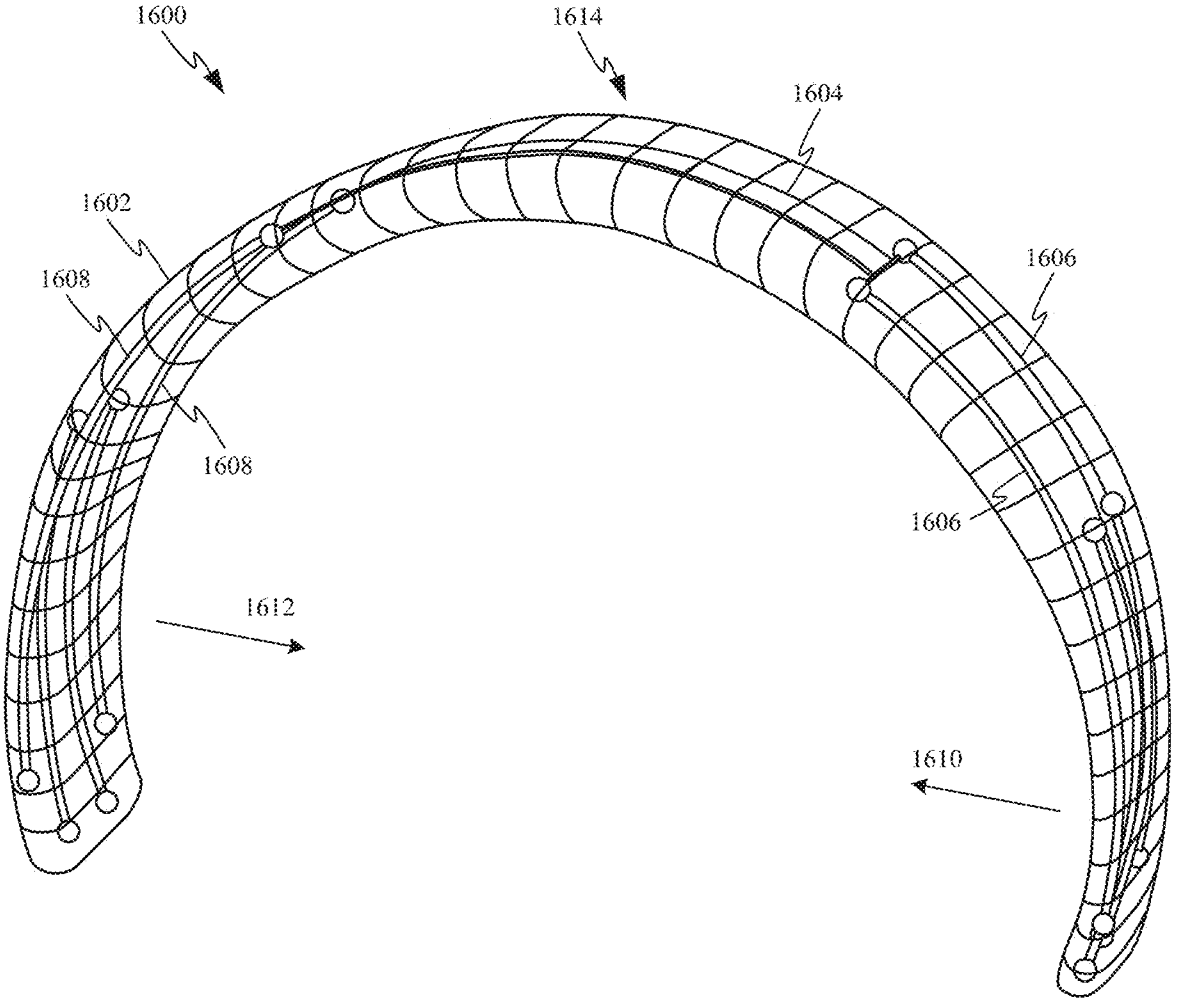
FIGS. 16A-16B show a headband assembly in folded and arched states.
Figure 16B:
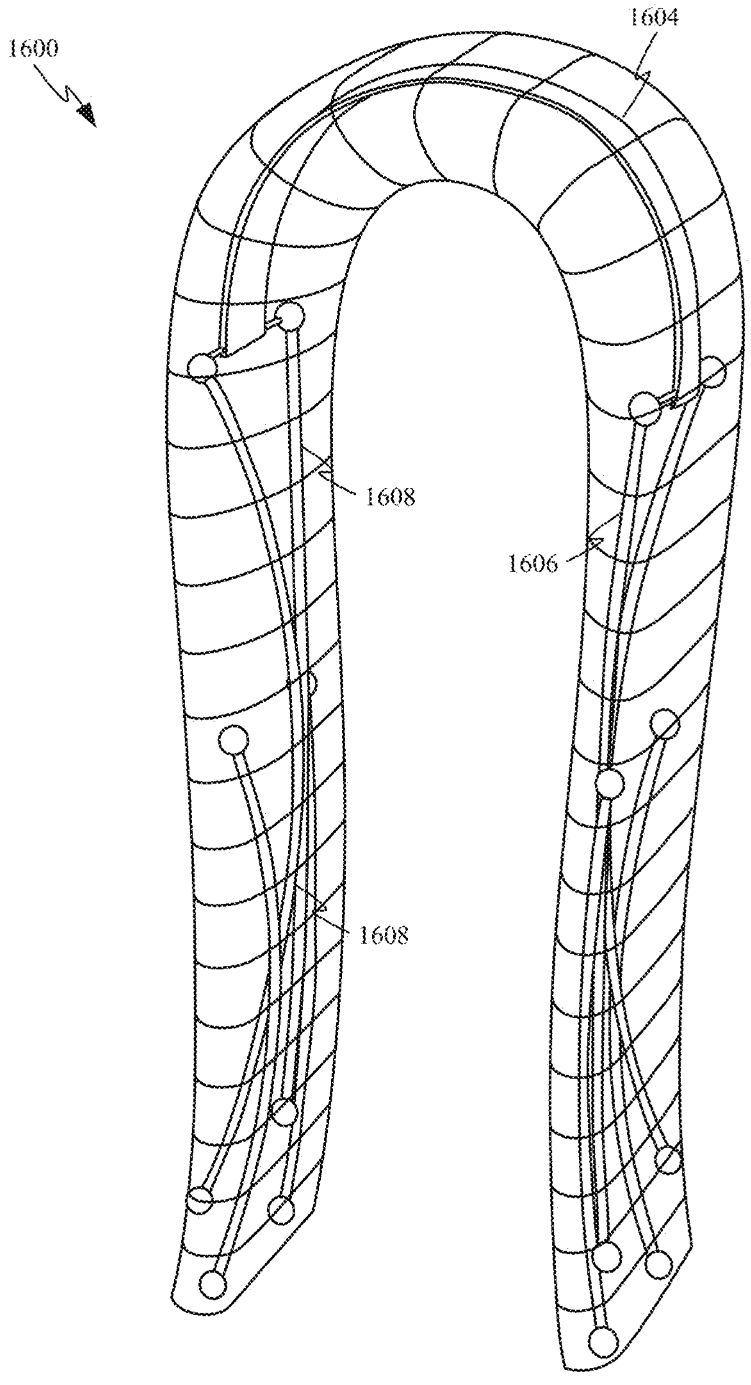

FIGS. 16A-16B show headband assembly 1600 in folded and arched states. FIG. 16A shows headband assembly 1600 in the arched state. Headband assembly, similarly to the embodiment shown in FIGS. 15C and 15F includes multiple hollow links 1602 that cooperatively form a flexible headband housing that define an interior volume. Passive linkage hinge 1604 can be positioned within a central portion of the interior volume and link bi-stable elements 1606 together. FIG. 16A shows bi-stable elements 1606 and 16008 in arched configurations that resist forces acting to squeeze opposing sides of headband assembly 1600. Once opposing sides of headband assembly 1600 are pushed together, in the directions indicated by arrows 1610 and 1612, with enough force to overcome the resistance forces generated by bi-stable elements 1606 and 1608, headband assembly 1600 can transition from the arched state depicted in FIG. 16A to the folded state depicted in FIG. 16B. Passive linkage hinge 1604 accommodates headphone assembly 1600 being folding around a central region 1614 of headband assembly 1600. FIG. 16B shows how passive linkage hinge 1604 bends to accommodate the folded state of headband assembly 1600. Bi-stable elements 1606 and 1608 are shown configured in folded configurations in order to bias the opposing sides of headband assembly 1600 toward one another, thereby opposing an inadvertent change in state. The folded configuration, depicted in FIG. 16B, has the benefit of taking up a substantially smaller amount of space by allowing the open area defined by headband assembly 1600 for accommodating the head of a user to be collapsed so that headband assembly 1600 can take up less space when not in active use.

Figure 17:
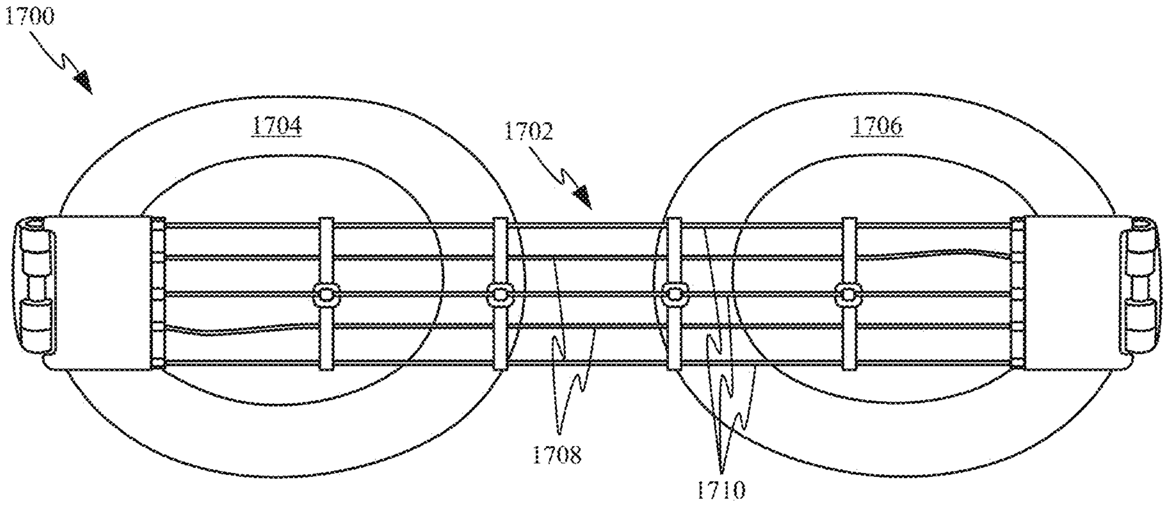
FIGS. 17-18 show views of another foldable headphones embodiment.
Figure 18:
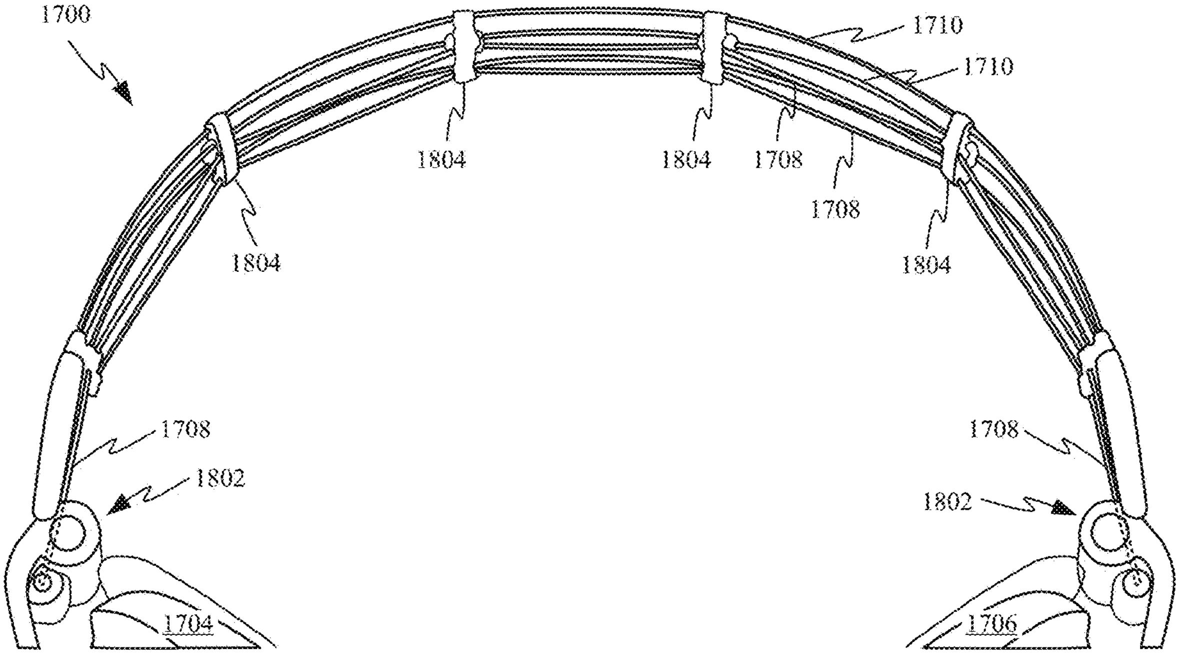

FIGS. 17-18 show various views of foldable headphones 1700. In particular, FIG. 17 shows a top view of headphones 1700 in a folded state. Headband 1702, which extends between earpieces 1704 and 1706, includes wires 1708 and springs 1710. In the depicted folded state, wires 1708 and spring 1710 are straight and in a relaxed state or neutral state. FIG. 18 shows a side view of headphones 1700 in an arched state. Headphones 1700 can be transitioned from the folded state depicted in FIG. 17 to the arched state depicted in FIG. 18 by rotating earpieces 1704 and 1706 away from headband 1702. Earpieces 1704 and 1706 each include an over-center mechanism 1802 that applies tension to the ends of wires 1708 to keep wires 1708 in tension in order to maintain an arched state of headband 1702. Wires 1708 help maintain the shape of headband 1702 by exerting forces at multiple locations along springs 1710 through wire guides 1804, which are distributed at regular intervals along headband 1702.

Telescoping Stem Assembly

Figure 19:
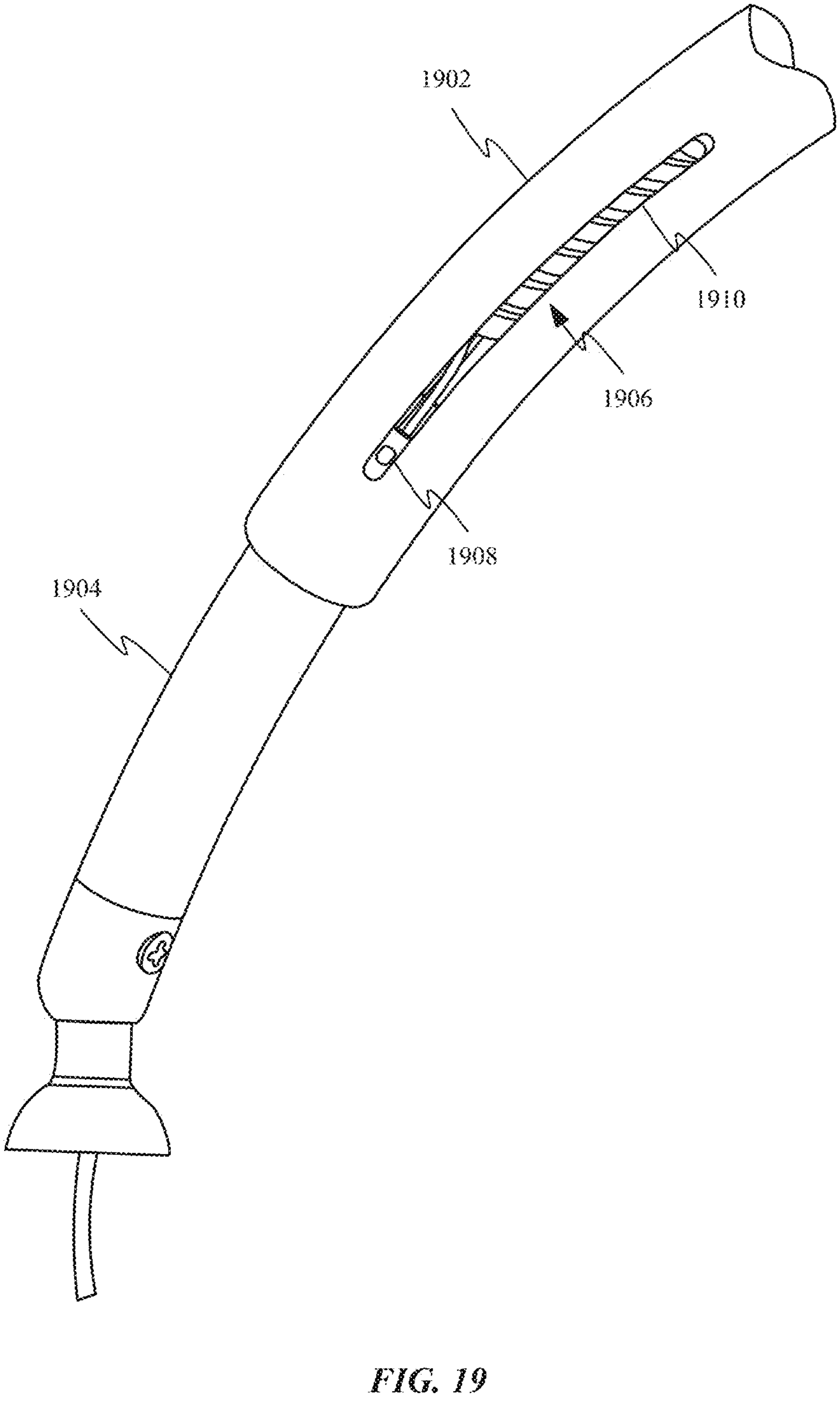
FIG. 19 shows one side of a headband housing as well as a telescoping member extending from the end of a headband housing.

FIG. 19 shows one side of a headband housing 1902 as well as telescoping member 1904 extending from the end of headband housing 1902. Headband housing 1902 can be configured to accommodate telescoping motion of telescoping member 1904. Headband housing 1902 defines multiple channels 1906, which help guide spring fingers 1908 associated with telescoping member 1904 as telescoping member 1904 slides into and out of lower headband housing 1902. FIG. 19 also depicts a portion of synchronization cable 1910 visible through channel 1906 and coiled within headband housing 1902. The coiled configuration of synchronization cable 1910 allows synchronization cable 1910 to accommodate the changes in length caused by telescoping of telescoping member 1904 relative to headband housing 1902.

Figure 20A:
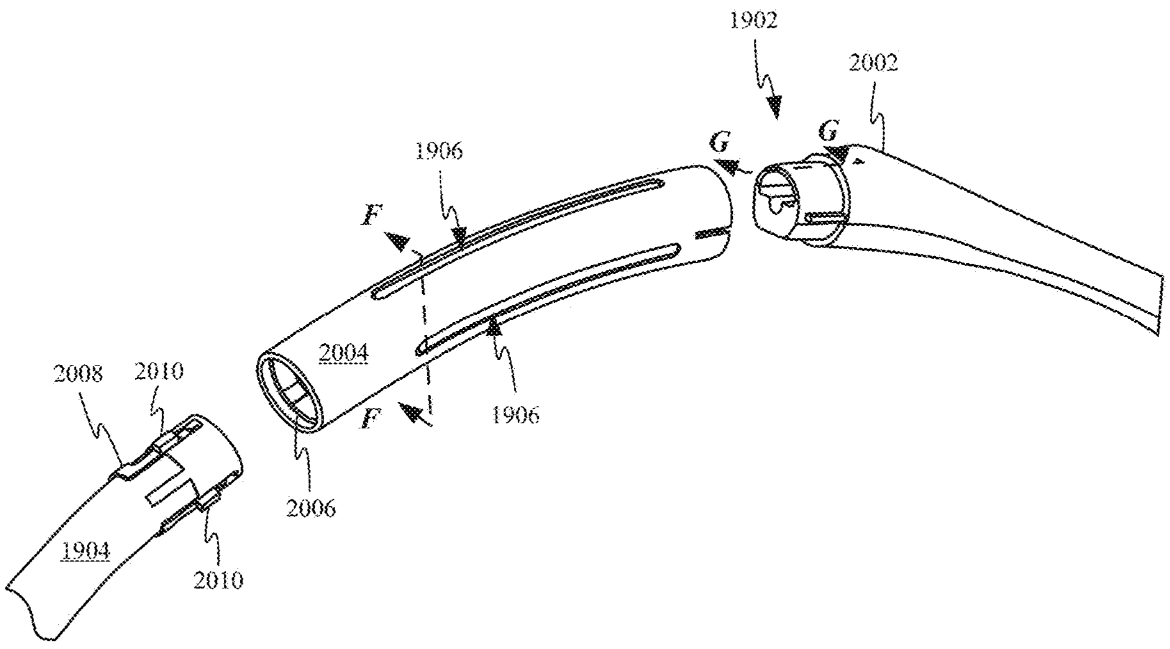
FIG. 20A shows an exploded view of the side of the headband housing depicted in FIG. 20A.

FIG. 20A shows an exploded view of the side of headband housing 1902 depicted in FIG. 19. In particular, headband housing 1902 is depicted including upper housing component 2002 and lower housing component 2004. Lower housing component 2004 is configured to receive telescoping member 1904. Lower housing component 2004 is depicted defining multiple channels 1906 and an annular bushing 2006 is disposed within one end of lower housing component 2004 and configured to control the motion of telescoping member 1904 relative to lower housing component 2004 by generating friction during movement of telescoping member 1904. FIG. 20A also depicts spring member 2008 as a single piece that includes multiple spring fingers 2010 configured to engage channels 1906.

Figure 20B:
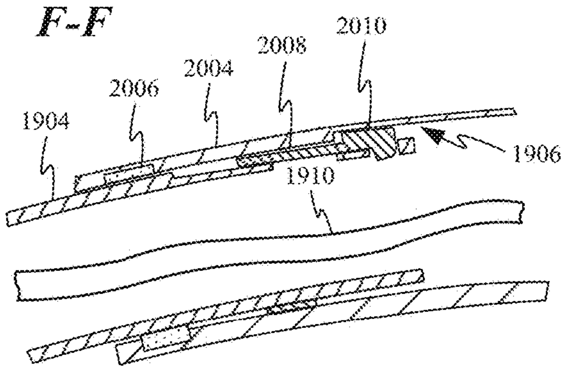
FIG. 20B shows a cross-sectional view of a first end of a lower housing component in accordance with section line F-F depicted in FIG. 20A.
Figure 20C:
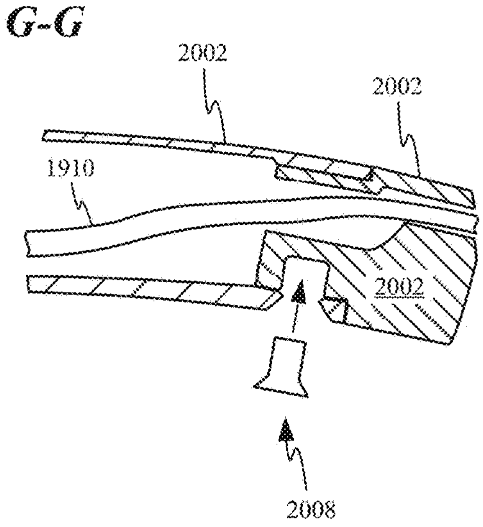
FIG. 20C shows a cross-sectional view of a second end of the lower housing component in accordance with section line G-G depicted in FIG. 20A.

FIG. 20B shows a cross-sectional view of a first end of lower housing component 2004 in accordance with section line F-F. Lower housing component 2004 is depicted engaged with telescoping member 1810 and bushing 2012 is positioned within telescoping member 1810. One of spring fingers 2008 is shown engaged within channel 1906 of lower housing component 2004. In some embodiments, channel 1906 does not extend entirely through a wall of lower housing component 2004 as depicted in FIG. 20C. This allows spring finger 2008 to be engaged within channel 1906 without it being cosmetically visible from an exterior of lower housing component 2004.

FIG. 20C shows a cross-sectional view of a second end of lower housing component 2004 in accordance with section line G-G. The second end of lower housing component 2004 is depicted engaged with upper housing component 2002. Synchronization cable 1910 is shown extending through an opening defined by both upper housing component 2002 and lower housing component 2004.

Figure 20D:
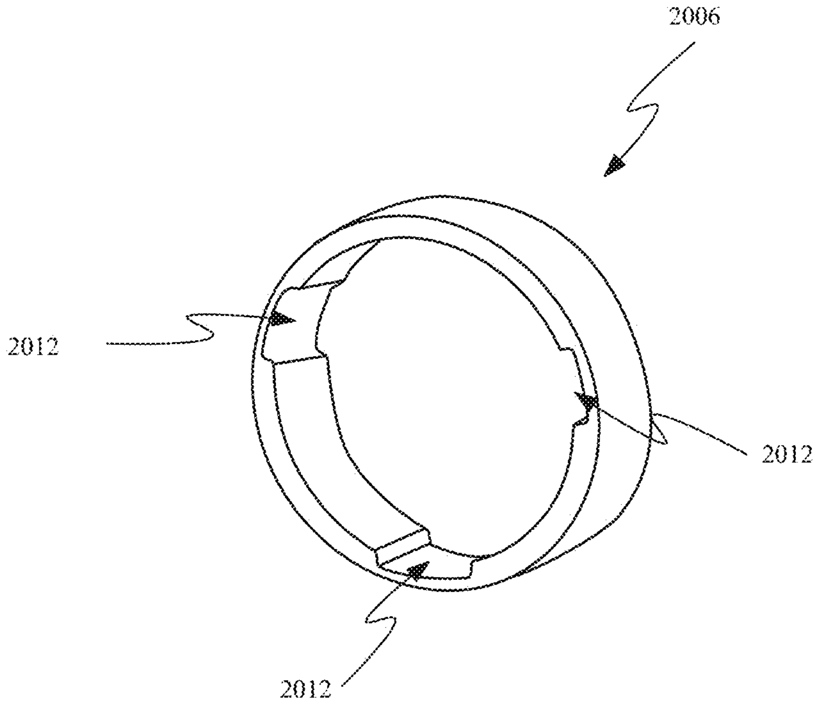
FIG. 20D shows a perspective view of a bushing, which defines multiple finger channels spaced radially around an interior-facing surface of the bushing.

FIG. 20D shows a perspective view of bushing 2006, which defines multiple finger channels 2012 spaced radially around an interior-facing surface of bushing 2006. Finger channels 2012 can be configured to align spring fingers 2010 with finger channels 2012 of lower housing component 2004.

Figure 21A:
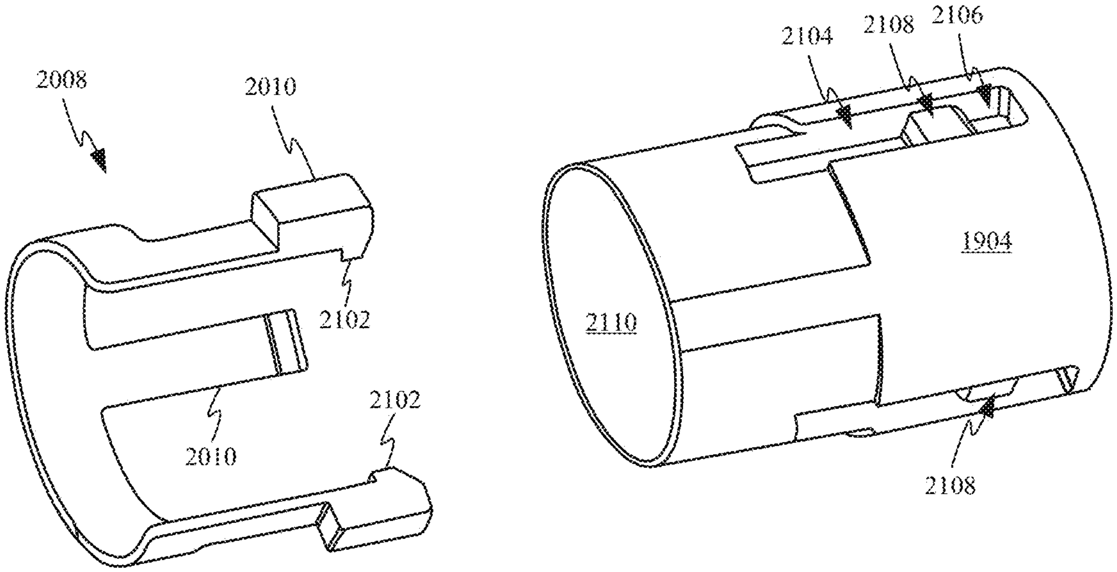
FIG. 21A shows a perspective view of a spring member and one end of a telescoping member.

FIG. 21A shows a perspective view of spring member 2014 and one end of telescoping member 1810. As depicted, spring member 2014 includes three spring fingers 2008. Each of spring fingers 2008 includes a locking feature 2102 configured to prevent disengagement of spring member 2014 from telescoping member 1810. Telescoping member 1810 defines a set of corresponding openings 2104 and 2106 divided by a bridging member 2108. When spring fingers 2008 are engaged within openings 2104 a length of opening 2104 allows each of spring fingers 2008 to be deflected through openings 2104 so that telescoping member 1810 can be inserted into lower housing component 2004.

Figure 21B:
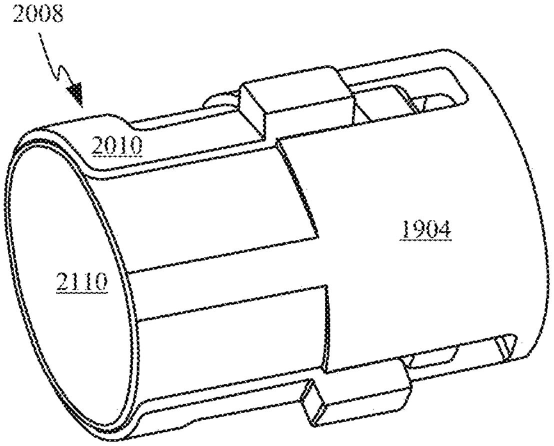
FIG. 21B shows spring fingers of the spring member engaged within a first set of opening defined by the end of the telescoping member.
Figure 21C:
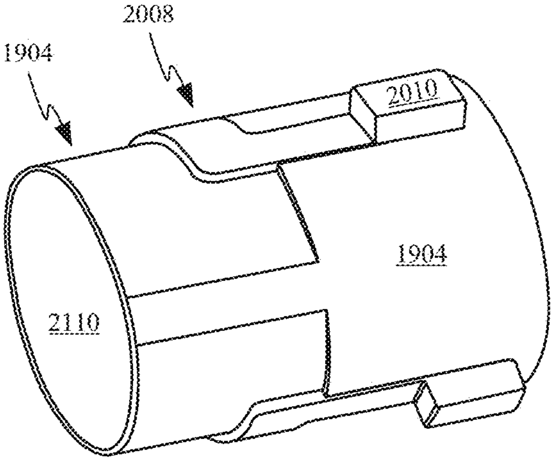
FIG. 21C shows the spring member shifted so that the spring fingers are engaged within a second set of openings defined by the end of the telescoping member.

FIG. 21B shows spring fingers 2008 engaged within openings 2104 and FIG. 21C shows spring fingers 2008 engaged within openings 2106. When locking features 2102 are engaged within openings 2106, spring member 2014 cannot be removed and remain engaged within channels 1906. Furthermore, bridging members 2108 prevent spring fingers 2008 from deflecting any farther into an interior volume 2110 defined by telescoping member 1810. This keeps protruding portions of spring fingers 2008 securely engaged within corresponding channels 1906. In some embodiments, spring member 2014 can be shifted from the position depicted in FIG. 21B by pulling back on telescoping member 1810 once spring fingers 2008 are engaged within channels 1906. In this way, spring fingers 2008 can be shifted from openings 2104 into openings 2106.

Figure 21D:
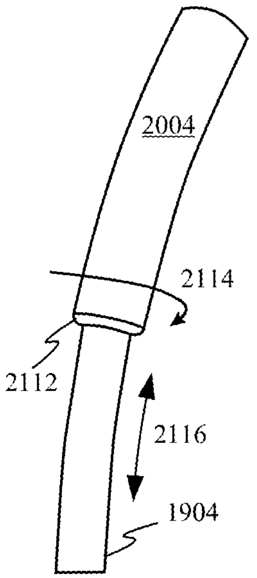
FIGS. 21D-21G show various locking mechanisms positioned at an opening defined by a lower housing assembly through which a telescoping assembly extends.
Figure 21E:
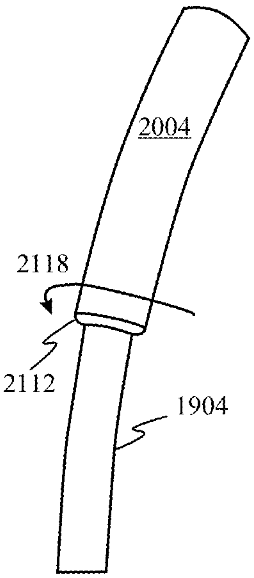
Figure 21F:
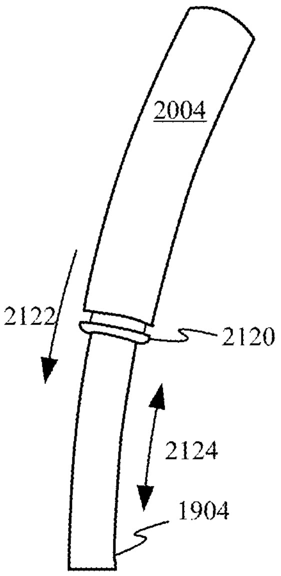
Figure 21G:
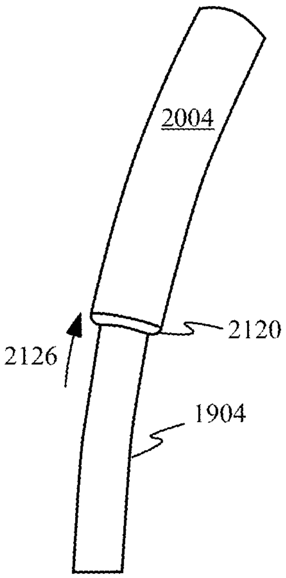

FIGS. 21D-21G show various locking mechanisms positioned at an opening defined by lower housing component 2004 through which telescoping member 1810 extends. FIGS. 21D-21E show locking mechanism 2112. In FIG. 21D, when locking mechanism 2112 is turned in a first direction 2114, telescoping member 1810 is able to be translated into or out of lower housing component 2004, as indicated by two-sided arrow 2116. FIG. 21E shows how subsequently turning locking mechanism 2112 in direction 2118 causes a position of telescoping member 1810 to be fixed relative to lower housing component 2004. FIGS. 21F-21G show locking mechanism 2120. FIG. 21F shows how when locking mechanism 2120 is pulled away from lower housing component 2004 and toward telescoping member 1810 in direction 2122, telescoping member 1810 is able to be translated into or out of lower housing component 2004, as depicted by two-sided arrow 2124. FIG. 21G shows how when locking mechanism 2120 is then pushed toward lower housing component 2004 in direction 2126, a position of telescoping member 1810 relative to lower housing component 2004 is fixed.

Anti-Buckling Assembly

Figure 22A:
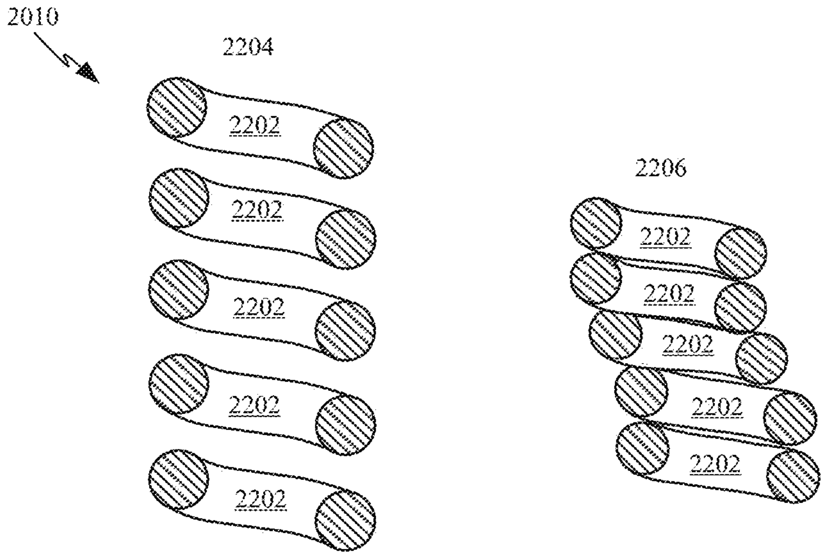
FIGS. 22A-22E depict various extended and contracted coil configurations for a portion of a synchronization cable disposed within a lower housing component.

FIGS. 22A-22E depict various extended and contracted coil configurations for a portion of synchronization cable 2010 disposed within lower housing component 2004. FIG. 22A shows a partial cross-sectional view of a portion of synchronization cable 2010 in a conventional helical coil configuration. Unfortunately, this configuration can be susceptible to individual loops 2202 shifting laterally when transitioning from the extended configuration 2204 to contracted configuration 2206 as depicted. Misalignment can lead to synchronization cable 2010 rubbing an interior of lower housing component 2004 and becoming frayed over time due to undesired friction inducing failure by fatigue of synchronization cable 2010.

Figure 22B:
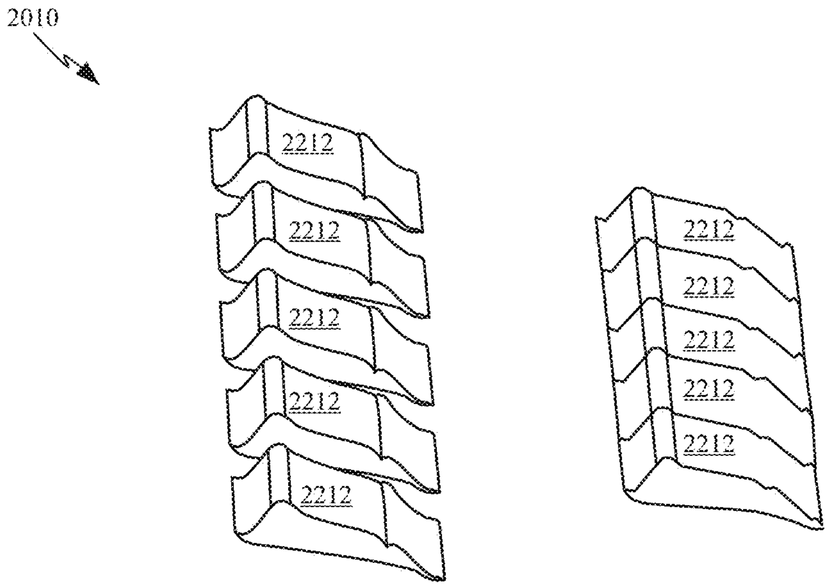

FIG. 22B shows how a cross-sectional shape of synchronization cable 2010 can be adjusted to include alignment features that help prevent loops 2212 of synchronization coil 2010 from becoming misaligned. In particular, opposing sides of loops 2212 can include alignment features having complementary geometries that help to self-align loops 2212 of synchronization coil 2010 when contracted, as depicted.

Figure 22C:
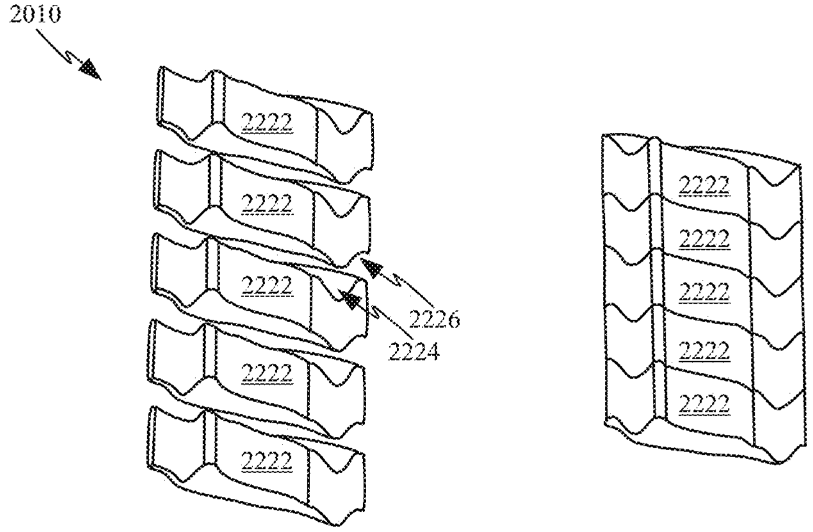

FIG. 22C shows how a cross-sectional shape of synchronization cable 2010 can be adjusted to include alignment features that help prevent loops 2222 of synchronization coil 2010 from becoming misaligned. In particular, opposing sides of loops 2222 can include alignment features taking the form of concave channels 2224 and convex ridges 2226 that help to self-align loops 2212 of synchronization coil 2010 when contracted, as depicted.

Figure 22D:
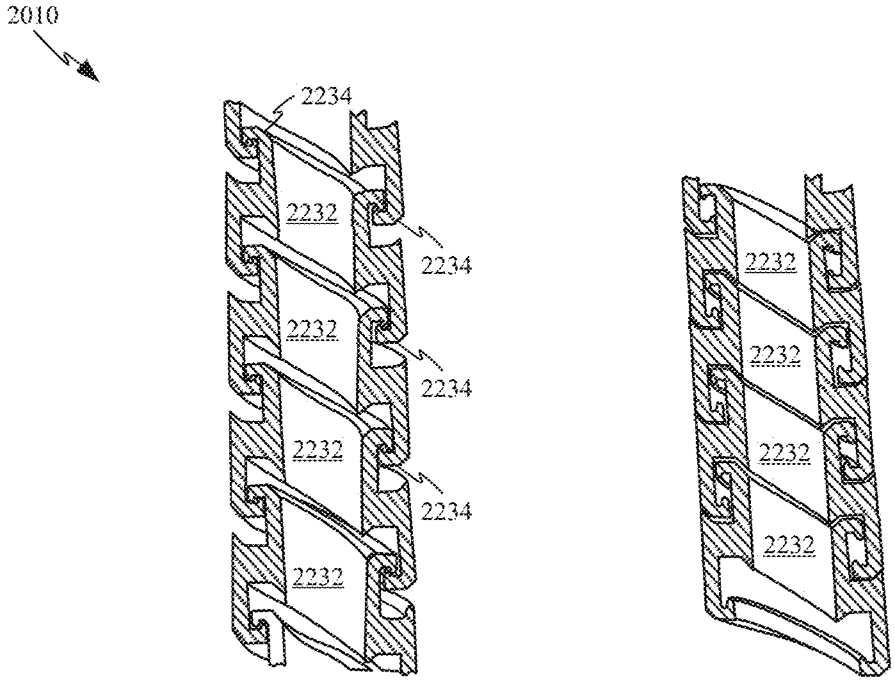

FIG. 22D shows how a cross-sectional shape of synchronization cable 2010 can be adjusted to include linking features that help prevent loops 2232 of synchronization coil 2010 from becoming misaligned. In particular, opposing sides of loops 2232 can include linking features taking the form of complementary hooks 2234 and convex ridges 2226 that help to self-align loops 2212 of synchronization coil 2010 when contracted, as depicted. The linking features also help to define a maximum amount of longitudinal extension of synchronization cable 2010.

Figure 22E:
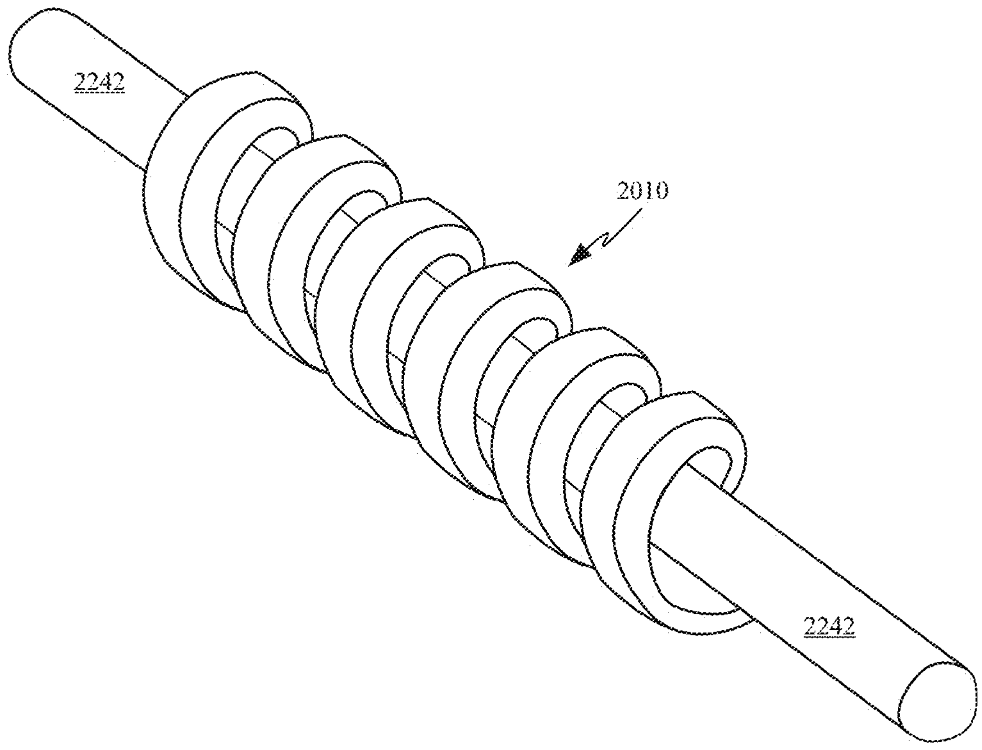

FIG. 22E shows another configuration in which synchronization cable 2010 can be prevented from becoming misaligned. By winding synchronization cable 2010 around a shaft 2342, synchronization cable 2010 can be kept from becoming misaligned even though it is arranged as a helical coil. Shaft 2342 should be formed from a stiff material unlikely to go substantial amounts of bending, while also allowing for slight changes in curvature to accommodate motion of telescoping member 1810. In some embodiments, shaft 2242 can be formed from NITINOL (a nickel-titanium alloy) wire.

Figure 23A:
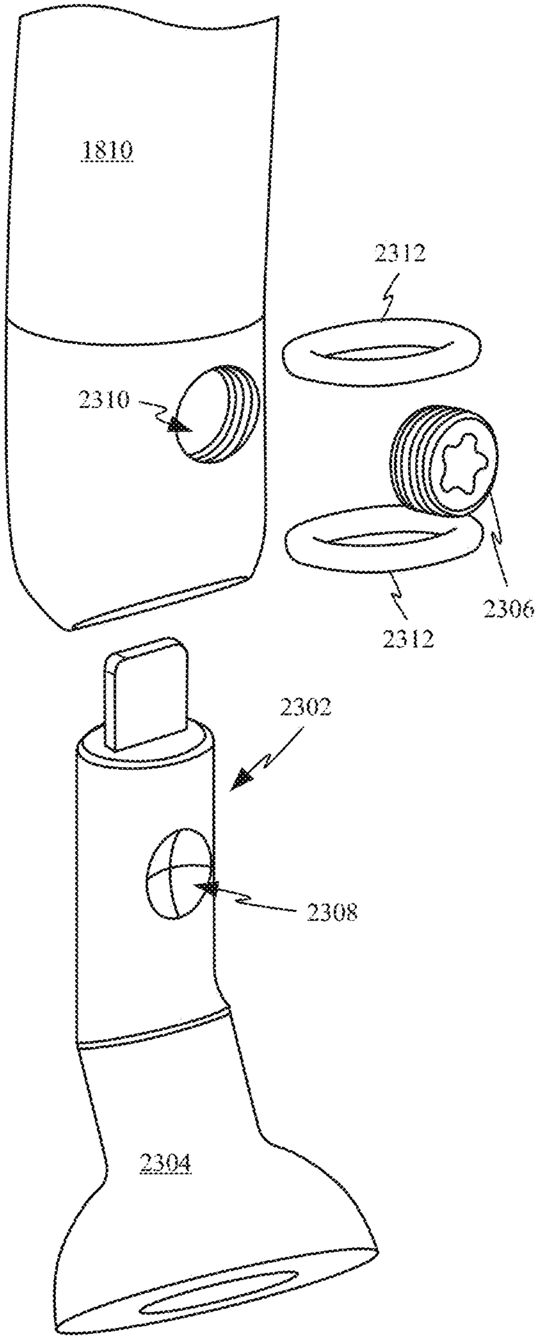
FIG. 23A shows an exploded view of components associated with a data plug.
Figure 23B:
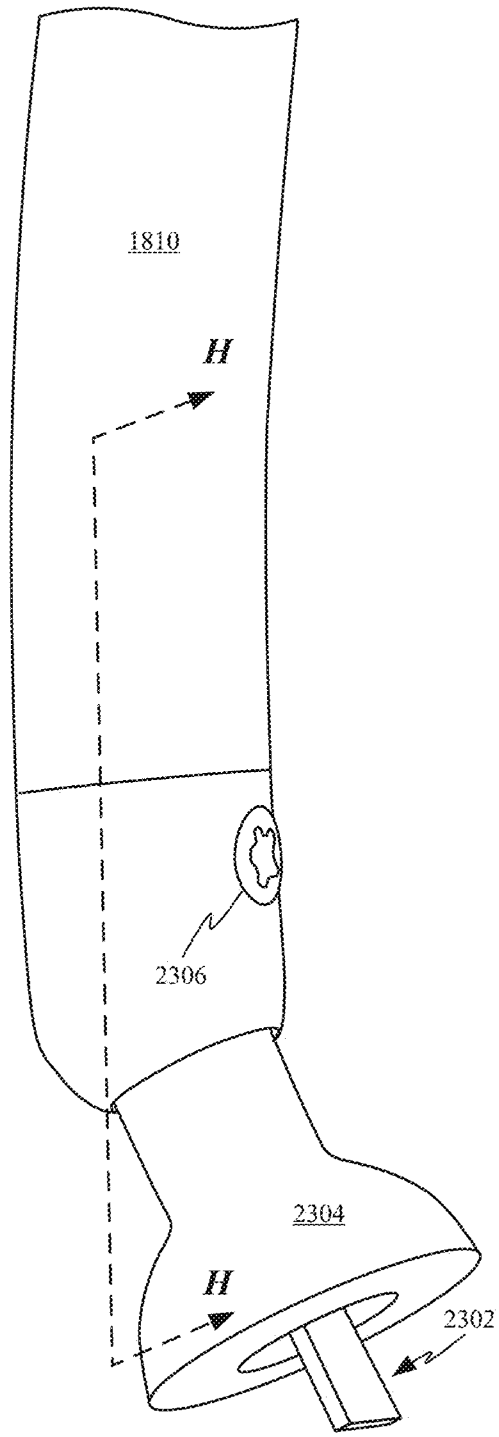
FIG. 23B shows a telescoping member fully assembly with threaded fastener fully engaged within a threaded opening in order to keep a data plug securely positioned.

FIG. 23A shows an exploded view of components associated with a data plug 2302. In particular, data plug 2302, which extends from one end of stem base 2304 is configured to engage a receptacle within telescoping member 1810. Once engaged within the receptacle, data plug 2302 can be kept securely in place using threaded fastener 2306, which is configured to engage a recess 2308 defined by a base portion of data plug 2302 through threaded opening 2310. Seal rings 2312 can also be used to further secured data plug 2302 within telescoping member 1810. FIG. 23B shows telescoping member 1810 fully assembly with threaded fastener 2306 fully engaged within threaded opening 2310 in order to keep data plug 2302 securely positioned.

Figure 23C:
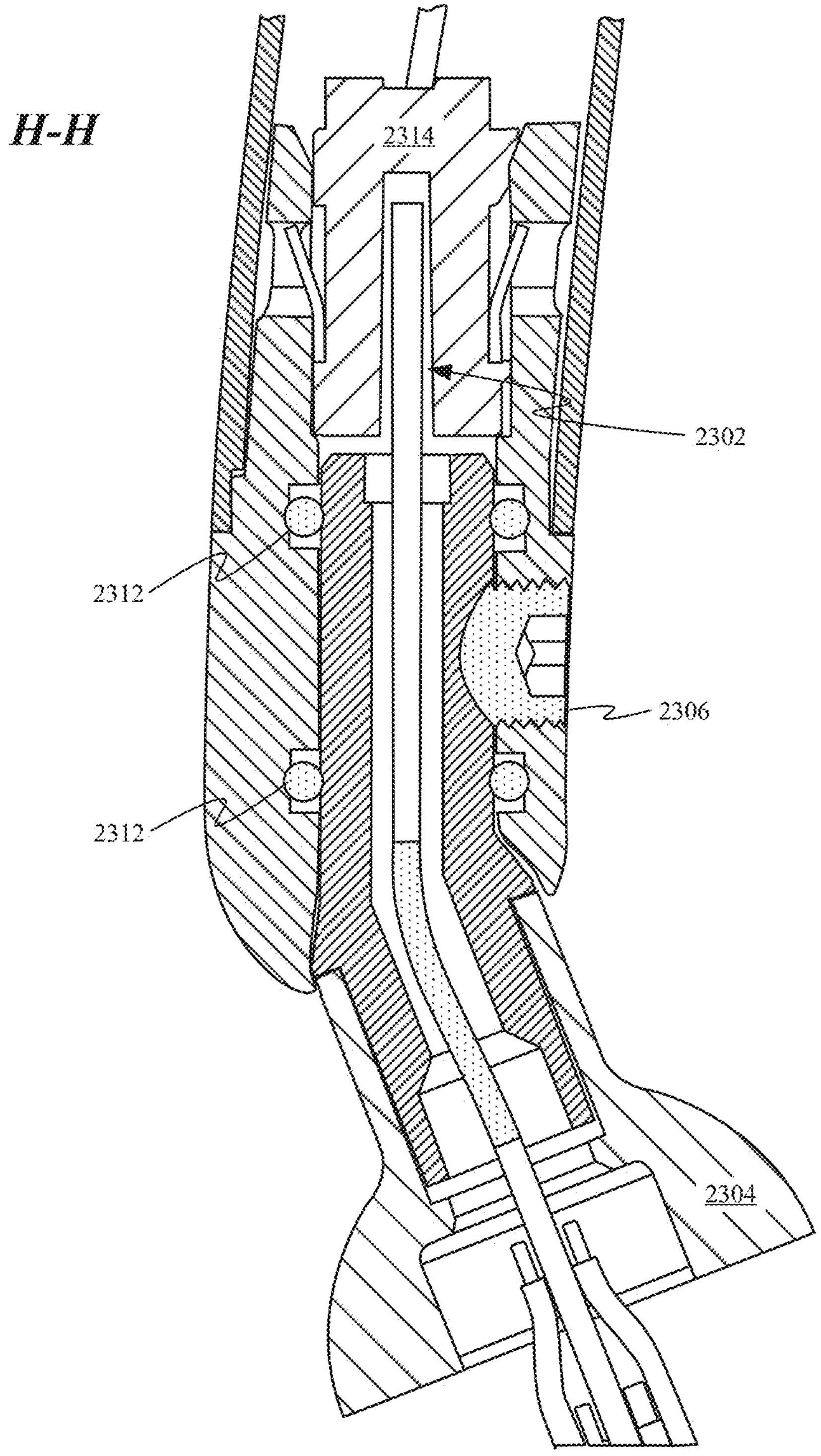
FIG. 23C shows a cross-sectional view of telescoping member in accordance with section line H-H of FIG. 23B.

FIG. 23C shows a cross-sectional view of telescoping member 1810 in accordance with section line H-H of FIG. 23B. In particular, FIG. 23C shows one end of data plug 2302 engaged within plug receptacle 2314. FIG. 23C also shows how threaded fastener cooperates with recess 2308 to keep data plug 2302 secured in place. A position of seal rings 2312 is also shown relative to data plug 2302. It should be noted that in some embodiments data plug 2302 could be omitted in lieu of a cable terminating in a board to board connect that engages a printed circuit board within an associated earpiece of the headphones.

Figure 23D:
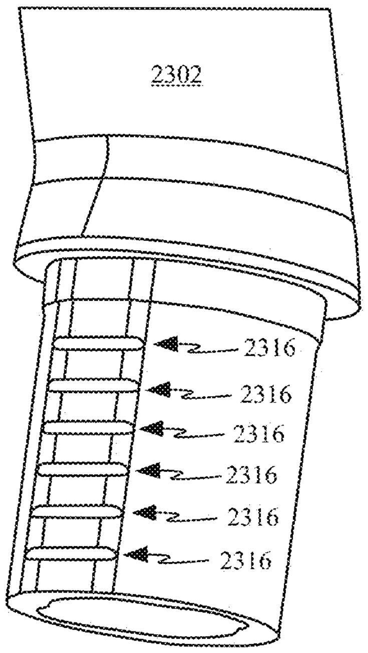
FIG. 23D shows a perspective view of a portion of a data plug.
Figure 23E:
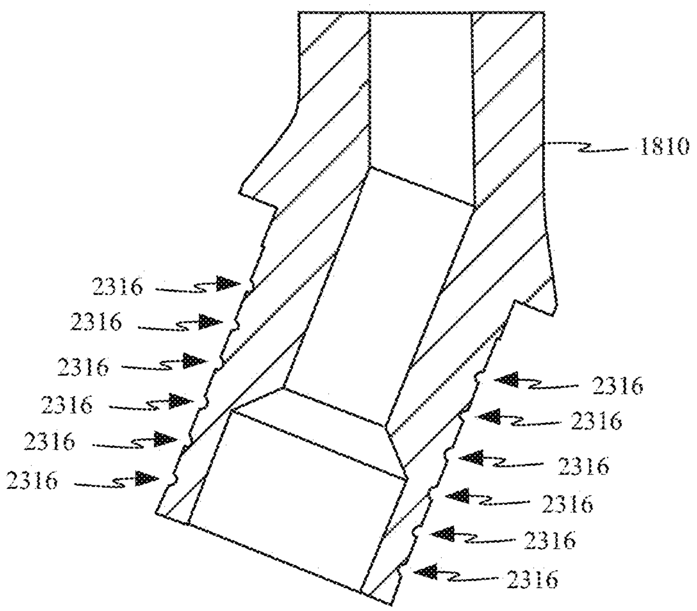
FIG. 23E shows a cross-sectional side view of the portion of the data plug and depicts multiple glue channels positioned on opposing sides of the body of the data plug.

FIG. 23D shows a perspective view of a portion of data plug 2302. In particular, the body of data plug 2302 has a stepped geometry and defines multiple glue channels 2316 spaced at a regular interval. In some embodiments, glue channels 2316 can be laser cut into an exterior side surface of the body of data plug 2302. FIG. 23E shows a cross-sectional side view of the portion of data plug 2302 and depicts multiple glue channels 2316 positioned on opposing sides of the body of data plug 2302.

Figure 23F:
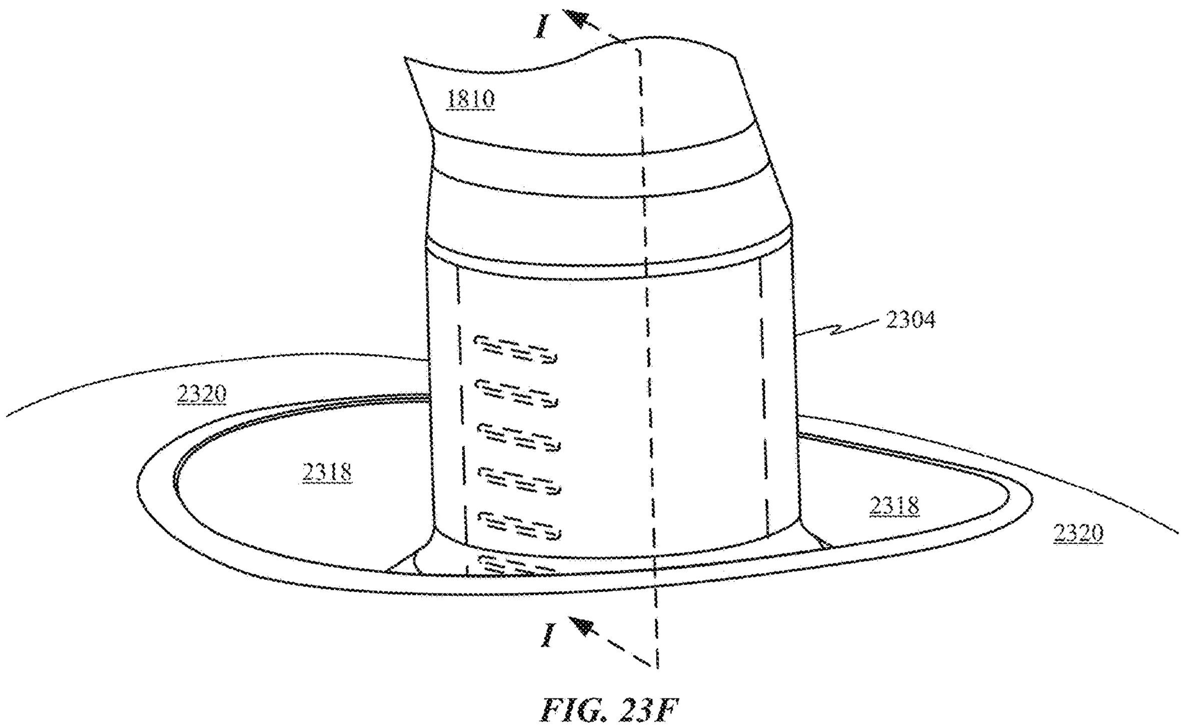
FIG. 23F shows a data plug glued to a stem base, which is in turn positioned within a recess defined by an earpiece.
Figure 23G:
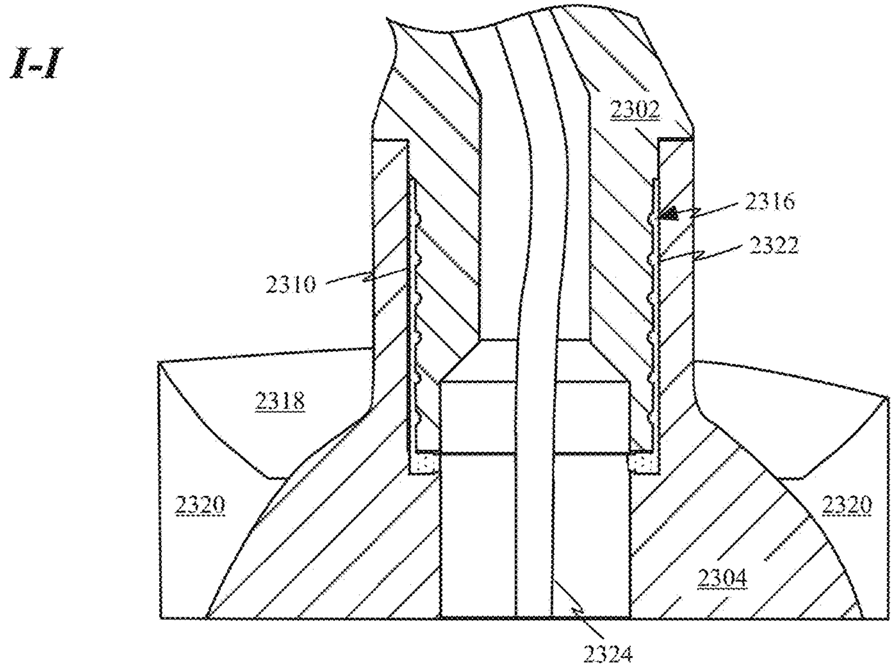
FIG. 23G shows a cross-sectional view of the data plug disposed within a recess defined by the stem base, which is in turn positioned within a recess of an earpiece.

FIG. 23F shows data plug 2302 glued to stem base 2304, which is in turn positioned within a recess 2318 defined by earpiece 2320. FIG. 23G shows a cross-sectional view of data plug 2302 disposed within a recess defined by stem base 2304, which is in turn positioned within recess 2318 of earpiece 2320. FIG. 23G corresponds to section line I-I as depicted in FIG. 23F and also shows how data plug 2302 is adhered to stem base 2304 by an adhesive layer 2322. A strength of a bond formed by adhesive layer 2322 between stem base 2304 and the body of data plug 2302 is substantially increased due to adhesive layer 2322 being able to engage glue channels 2316. In some embodiments, an interior-facing surface of stem base 2304 can also include glue channels similar to glue channels 2316 for even greater adhesion. In some embodiments, one or both of the surfaces contacting adhesive layer 2322 can be roughened, thereby increasing the surface energy of the surfaces and improving the strength of a resulting adhesive coupling. FIG. 23G also depicts a data synchronization cable 2324 extending through channels defined by both data plug 2302 and stem base 2304.

Earpad Configurations and Optimization

Figure 24A:
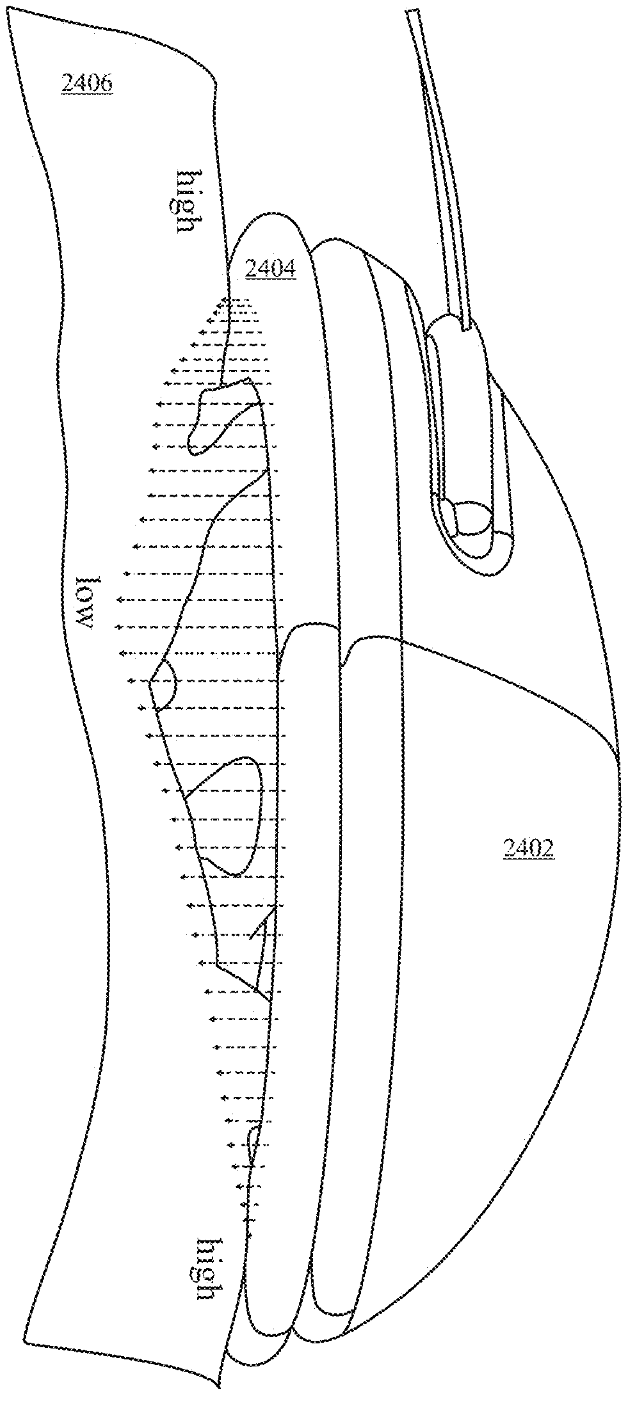
FIG. 24A shows perspective views of an earpiece and an earpad.

FIG. 24A shows perspective views of earpiece 2402 and earpad 2404. Earpad 2404 is shown having a planar shape illustrating how the side of a user's head 2406 is anything but flat. One reason most earpads are quite robust in thickness is to accommodate the cranial contours of the side of a user's head. The dashed arrows depicted in FIG. 24A illustrate the variance in distance earpads need to overcome to conform with the cranial contours.

Figure 24B:
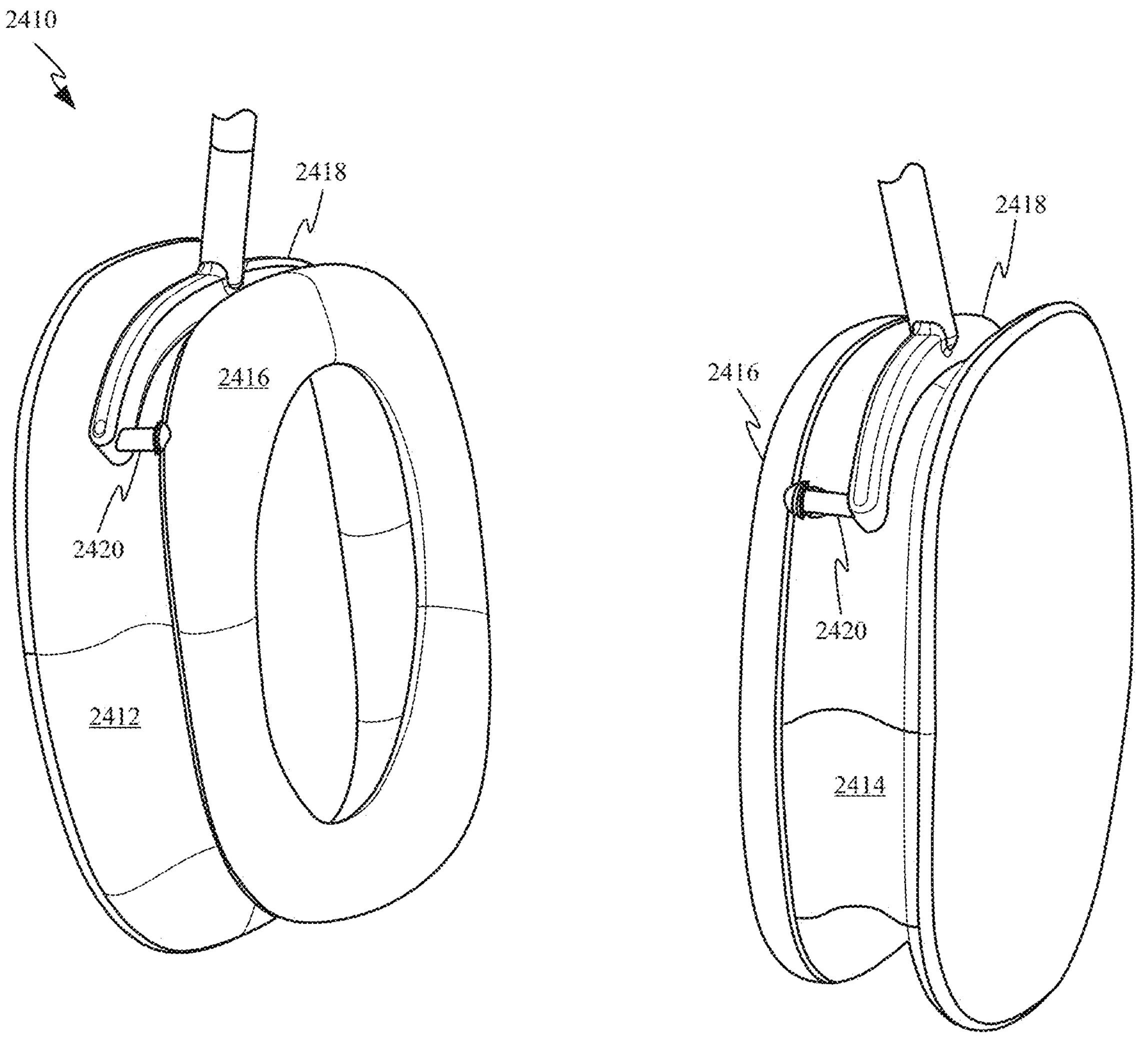
FIG. 24B shows how earpieces of a pair of headphones can have thin earpads without sacrificing user comfort.

FIG. 24B shows how earpieces 2412 and 2414 of headphones 2410 can have thin earpads 2416 without sacrificing user comfort. Earpads 2416 can include a flexible substrate that allows for a predetermined amount of flexure to accommodate variations in cranial contours. Earpads 2416 can be coupled to earpiece yokes 2418 with two posts 2420 positioned in locations corresponding to normally low points on a user's head. In the depicted configuration, the portions of earpads 2416 encountering protruding cranial contours can bend back to prevent pressure points on a user's head. In this way, a substantial amount of weight and material cost can be saved since thinner pads can be utilized without sacrificing user comfort.

Figure 24C:
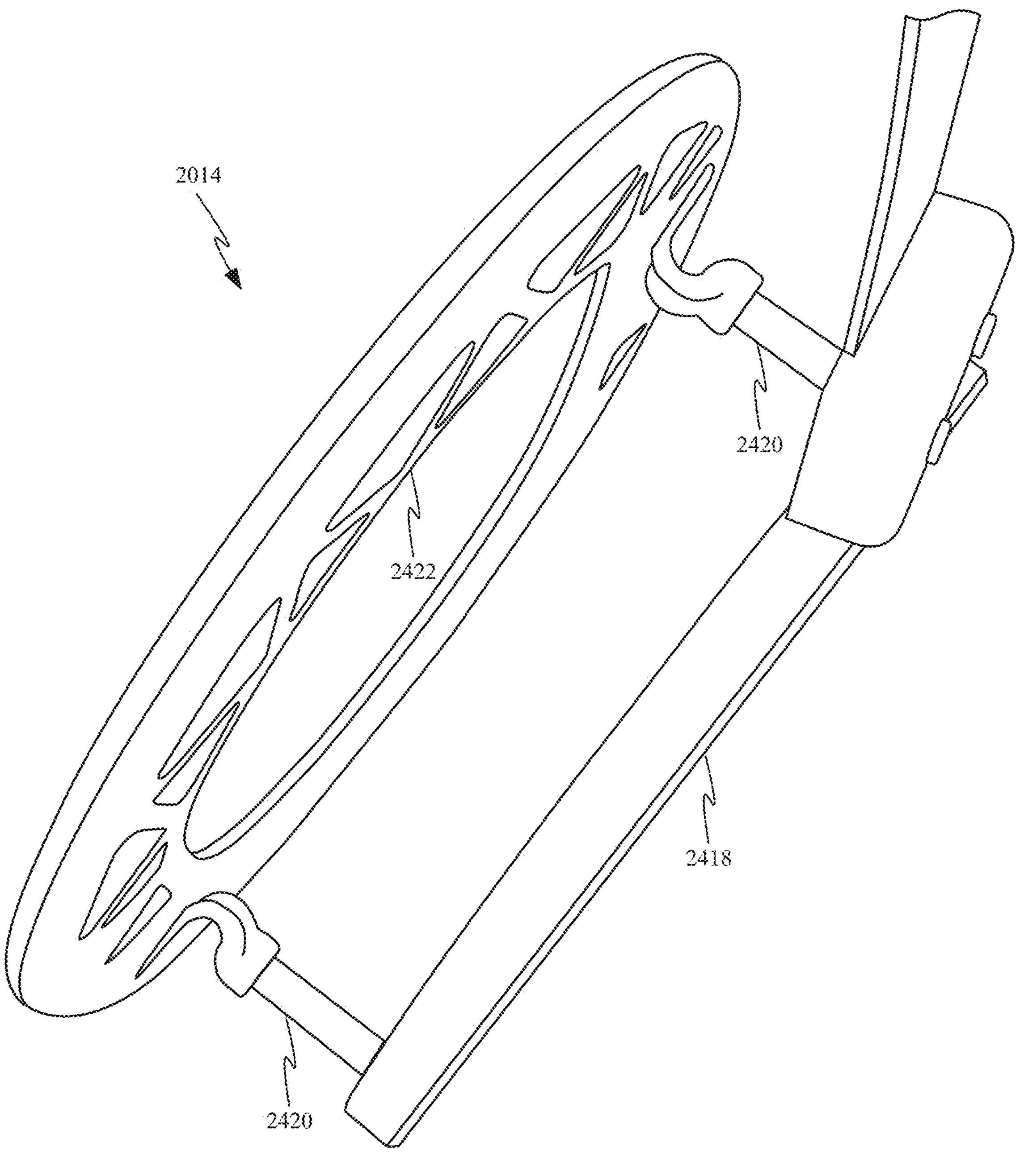
FIG. 24C shows how posts couple a flexible substrate supporting the earpad to earpiece yokes.
Figure 24D:
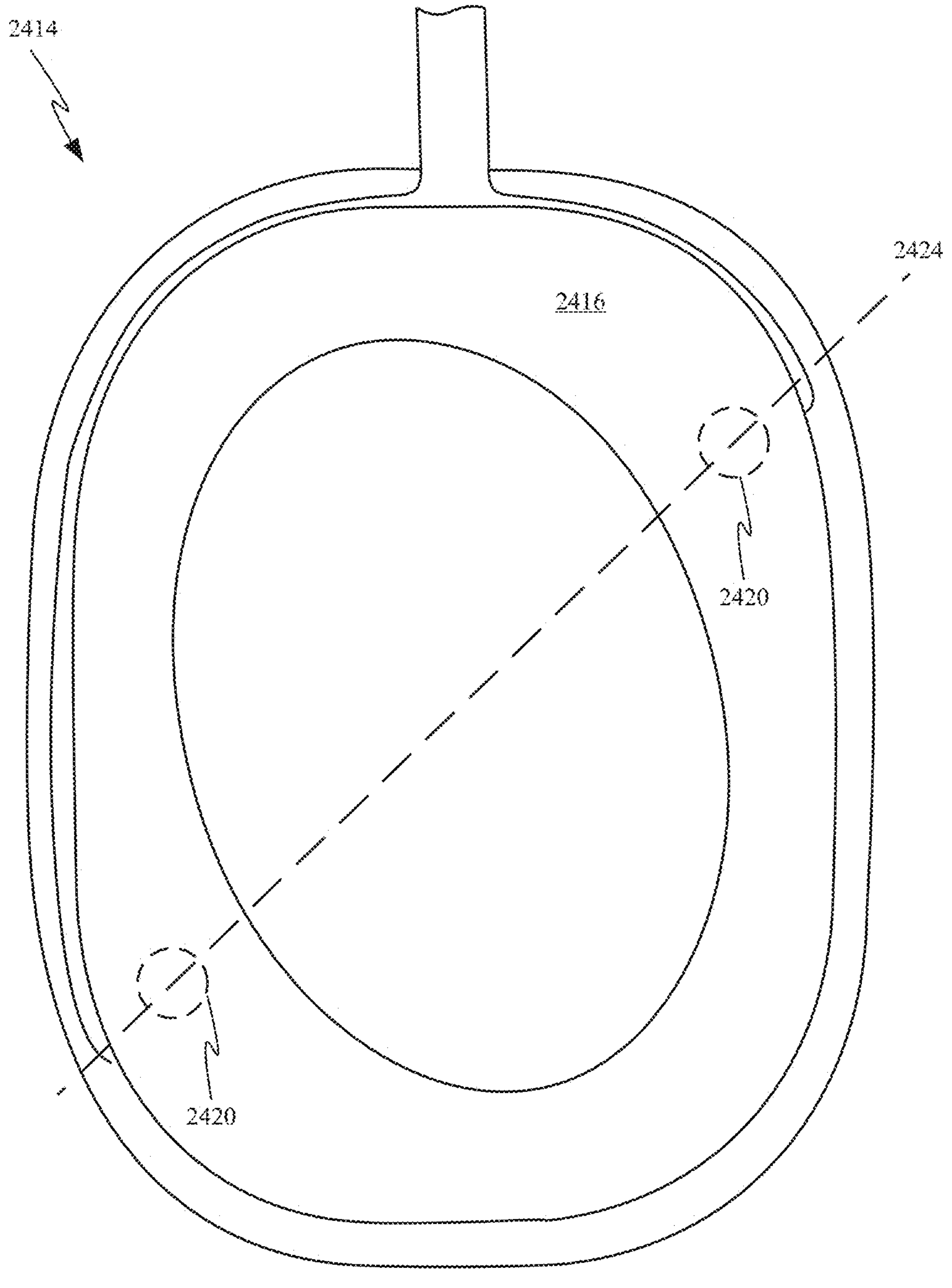
FIG. 24D shows an earpiece and an axis of rotation about which an earpad is configured to bend to accommodate cranial contours of a user's head.

FIG. 24C shows how posts 2420 couple flexible substrate 2422 to earpiece yokes 2418. Flexible substrate 2422 is formed from a substrate having a flexibility sufficient to allow for deformation of earpads 2416 mounted to flexible substrate 2422. It should be noted that many components have been removed from earpiece 2414 in FIG. 24C to clearly show how flexible substrate 2422 is connected to earpiece yoke 2418. FIG. 24D shows earpiece 2414 and an axis of rotation 2424 about which earpad 2416 is configured to bend to accommodate cranial contours of a user's head. Axis of rotation 2424 is defined by the locations at which posts 2420 attach to a rear-facing surface of flexible substrate 2422 and consequently earpad 2416.

Figure 24E:
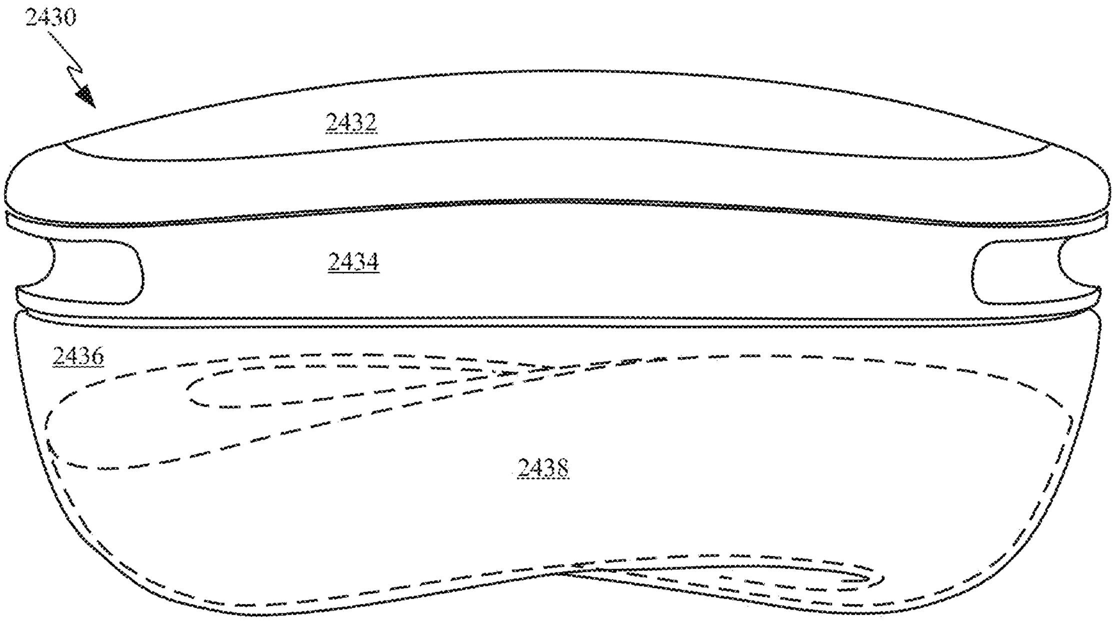
FIG. 24E-24G depict another earpiece in a configuration designed to account for cranial contours of a user's head.

FIG. 24E-24H depict another earpiece in a configuration designed to account for cranial contours of a user's head. FIG. 24E shows a side view of earpiece 2430. Earpiece 2430 includes convex input panel 2432, earpiece housing 2434 and earpad assembly 2436. Convex input panel 2432 can be affixed to one side of earpiece housing 2434 and include sensors for receiving touch inputs to headphones associated with the earpiece. FIG. 24E also depicts compressible earpad 2438 of earpad assembly 2436. Compressible earpad 2438 can be formed from foam and have a substantially uniform thickness. By bending compressible earpad 2438 as depicted into a curved geometry a user-facing surface of earpad assembly 2436 can be shaped to match cranial contours of a user's head.

Figure 24F:
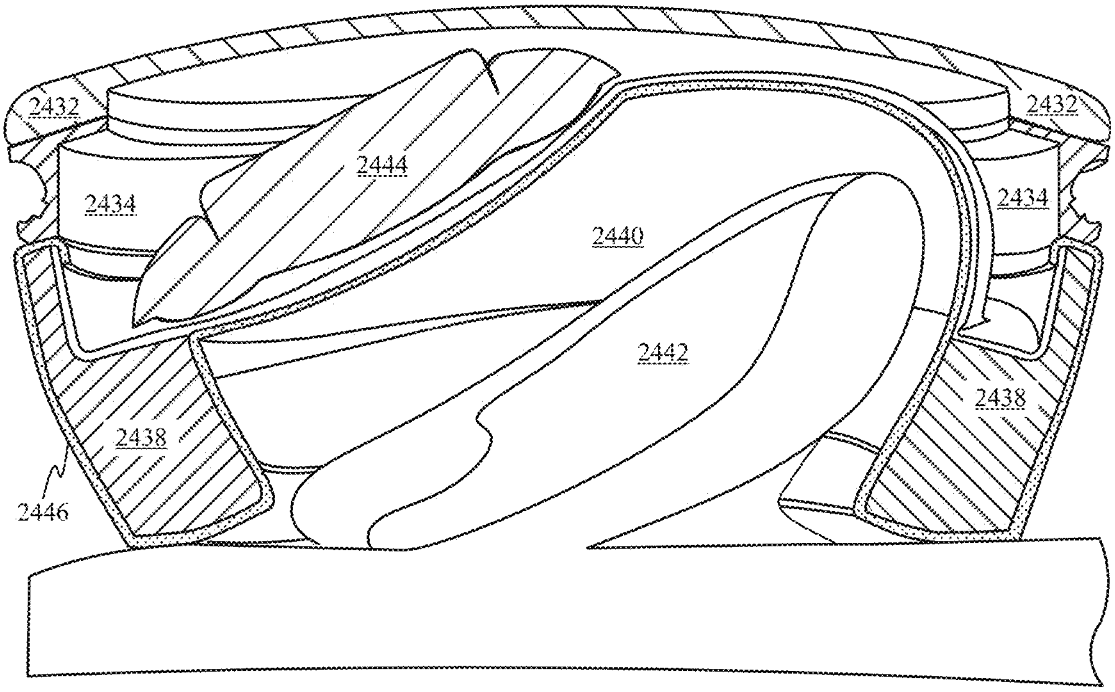

FIG. 24F shows a cross-sectional view of earpiece 2430 as well as a shape of a cavity 2440 for accommodating an ear 2442. With headphones designs that are not configured to accommodating placing earpiece 2430 over either ear, speaker assembly 2444 can protrude into cavity 2440 without affecting the amount of space available for ear 2442. In some embodiments, pushing speaker assembly 2444 forward in this manner can reduce the overall size of earpiece 2430. FIG. 24F also demonstrates how an undercut geometry of earpad 2438 allows earpiece 2430 to seal around a portion of the user's head closer to ear 2442, thereby reducing the length of a perimeter of the portion earpad assembly 2436 contacting the head of the user. In some embodiments, this can improve passive noise isolation. Earpad 2438 can be covered by textile material 2446 to provide a pleasant feel to the portion of earpad assembly 2436 contacting the user. In some embodiments, various treatments can be applied to textile material 2446 to improve the acoustic isolation provided by textile material 2446. For example, a heat treatment could be applied to at least the portion of textile material 2446 most likely to contact the user's head in order to reduce a pore size of textile material 2446, thereby boosting acoustic resistance.

Figure 24G:
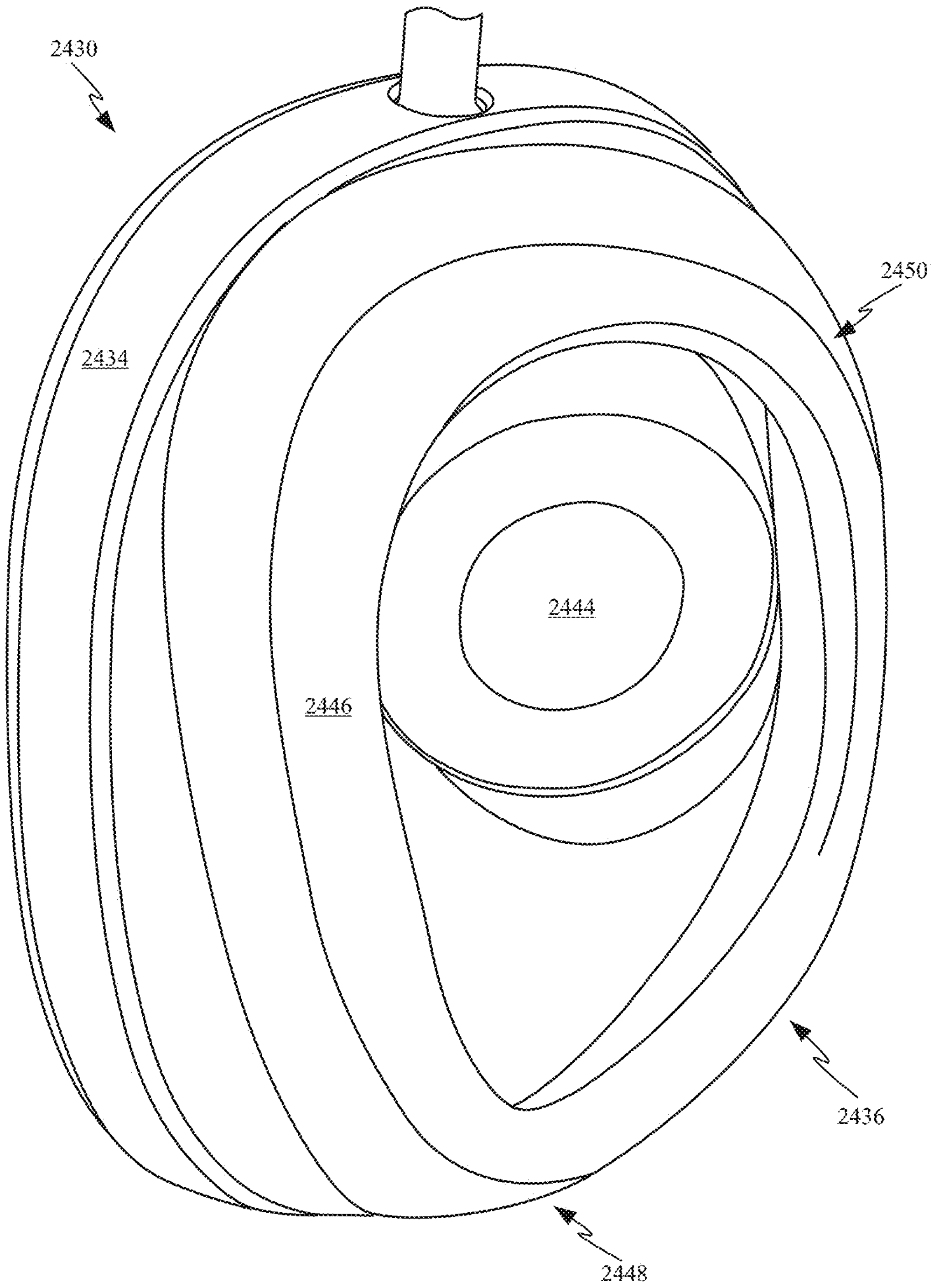

FIG. 24G shows a perspective view of earpiece 2430 and more clearly illustrates the varying curvature of earpad assembly 2436 around a periphery of earpad assembly 2436. In particular, region 2448 of earpad assembly 2436 is configured to contact a portion of a user's head beneath and to the rear of the ear where the head starts to slope back toward the neck. For this reason, region 2448 protrudes substantially farther out from earpiece 2430 than any other portion of earpad assembly 2436. To a somewhat lesser extent region 2450 of earpad assembly 2436 also protrudes away from earpiece 2430 to accommodate another low spot on a user's head generally located forward and slightly above the user's ear.

Figure 25A:
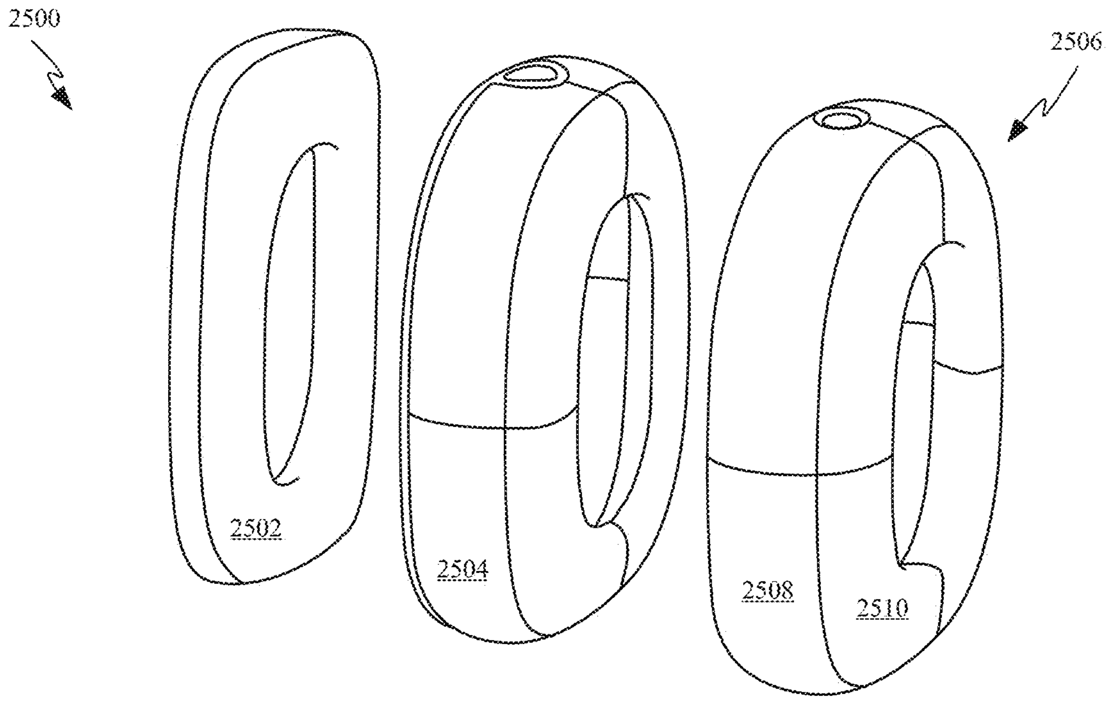
FIGS. 25A-25C show various views of another earpad configuration formed from multiple layers of material.
Figure 25B:
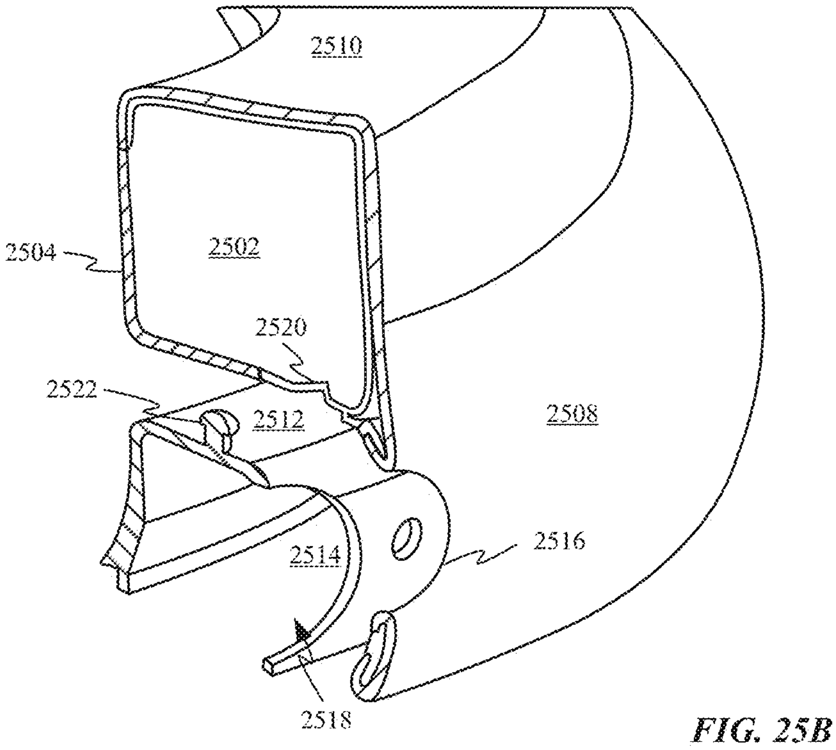
Figure 25C:
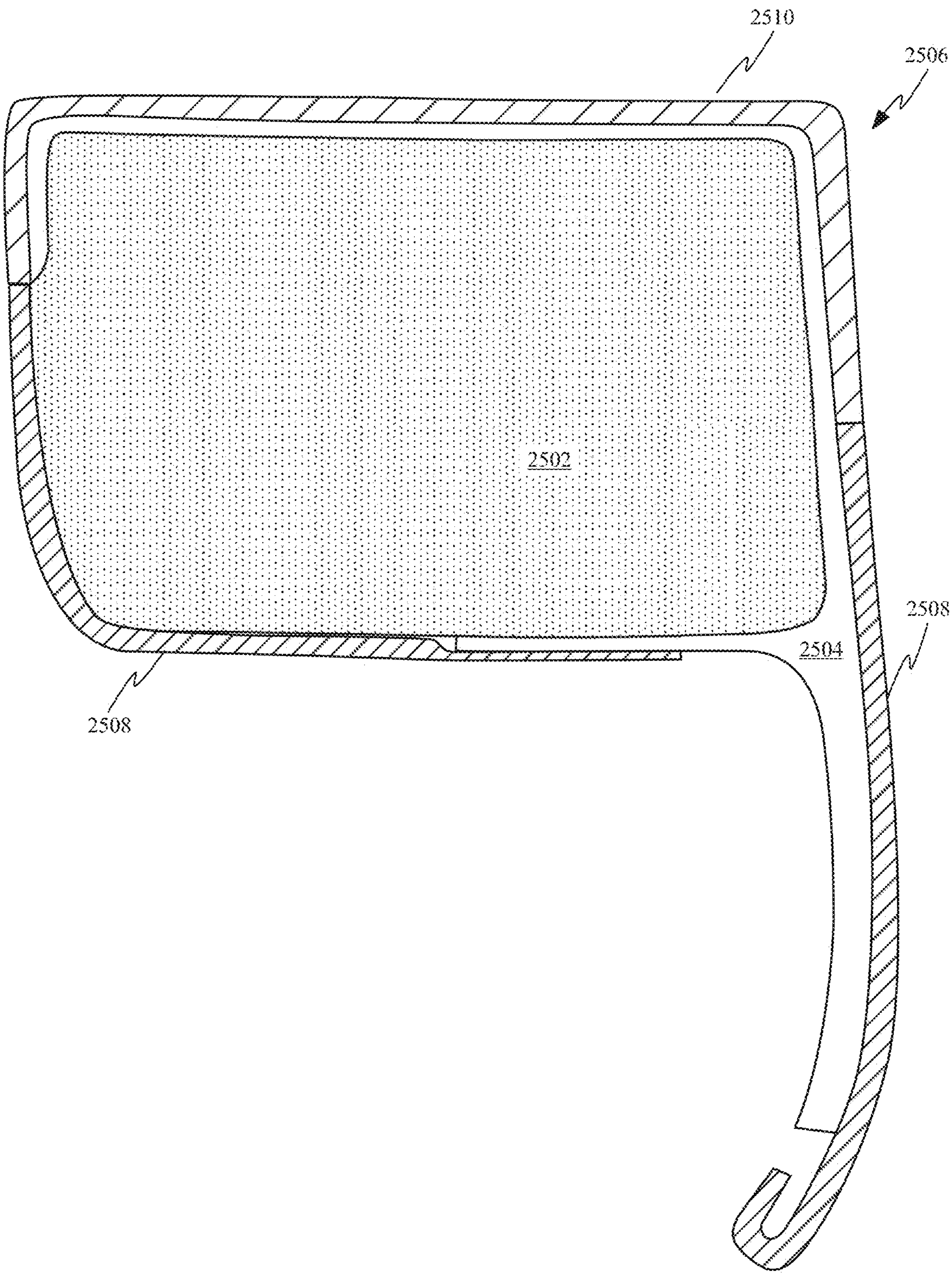

FIGS. 25A-25C show various views of another earpad configuration 2500 formed from multiple layers of material. FIG. 25A shows an exploded view of earpad configuration 2500 that includes three different component layers, namely cushion 2502, compliant structural layer 2504 and textile layer 2506. In some embodiments, cushion 2502 can be formed from foam and shaped during a machining process, which will be described in greater detail below. Compliant structural layer 2504 can help define a shape of a periphery of cushion 2502, while giving an exterior of the earpiece an amount of compliance. In some embodiments, compliant structural layer 2504 can be formed from an ethylene-vinyl acetate rubber blend. Textile layer 2506 can be formed from a sheet of fabric and includes multiple distinct regions 2508 and 2510. Region 2510, which makes up a majority of the fabric in direct contact with a user's head, can be heat treated to seal any gaps in the fabric in order to improve passive acoustic isolation. This can be particularly important with headphones with an active noise cancelling system as improved passive acoustic isolation reduces the amount of noise needing to be cancelled out by the active noise cancelling system. In some embodiments, region 2510 can be heat-treated so that its porosity is substantially smaller than the porosity of regions 2508. Lower porosity textile materials are generally more effective at providing passive noise attenuation.

FIG. 25B shows how foam cushion 2502 along with compliant structural layer 2504 and textile layer 2506 can be formed around an electronics housing component 2512 defining an interior volume 2514 configured to accommodate various electrical components supporting playback of media files received by headphones associated with earpad configuration 2500. FIG. 25B also illustrates the importance of aligning textile layer 2506 with openings defined by electronics housing component 2512, since opening 2516 of textile layer 2506 is configured to align with opening 2518 of electronics housing component 2512 to accommodate an I/O port or input control. Furthermore, opening 2520 may also need to be aligned with post 2522 of housing component 2512.

Figure 25D:
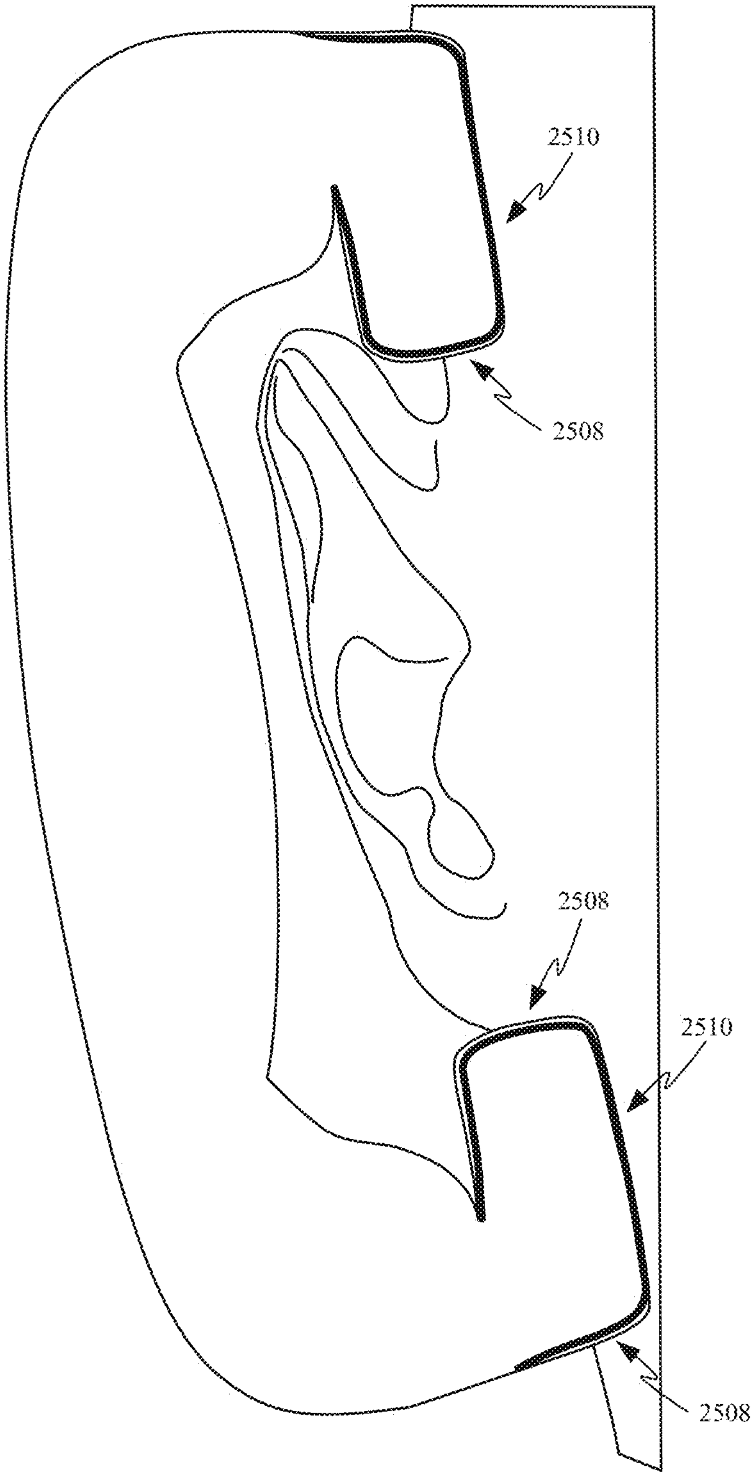
FIG. 25D shows how heat-treated regions of a textile layer are in direct contact with the side of a user's head when the headphones are in active use.

FIG. 25C shows a cross-sectional side view of earpad configuration 2500. In particular, FIG. 25C shows how textile layer 2506 includes two regions 2508 positioned on different sides of heat-treated region 2510 and how compliant structural layer 2504 extends beneath region 2510 of textile layer 2506. FIG. 25D shows how heat-treated regions 2510 of textile layer 2506 are in direct contact with the side of a user's head when the headphones are in active use. In this way, an effective barrier is formed by heat-treated regions 2510 against the passage of audio waves between the user's head and earpad configuration 2500, which would generally not be considered viable for a headphones using textile material to cover the earpads. While region 2510 is shown extending entirely across a surface contacting a user's face it should be understood that in certain embodiments, only a portion of the textile fabric contacting a user has undergone the heat treatment.

Figure 26A:
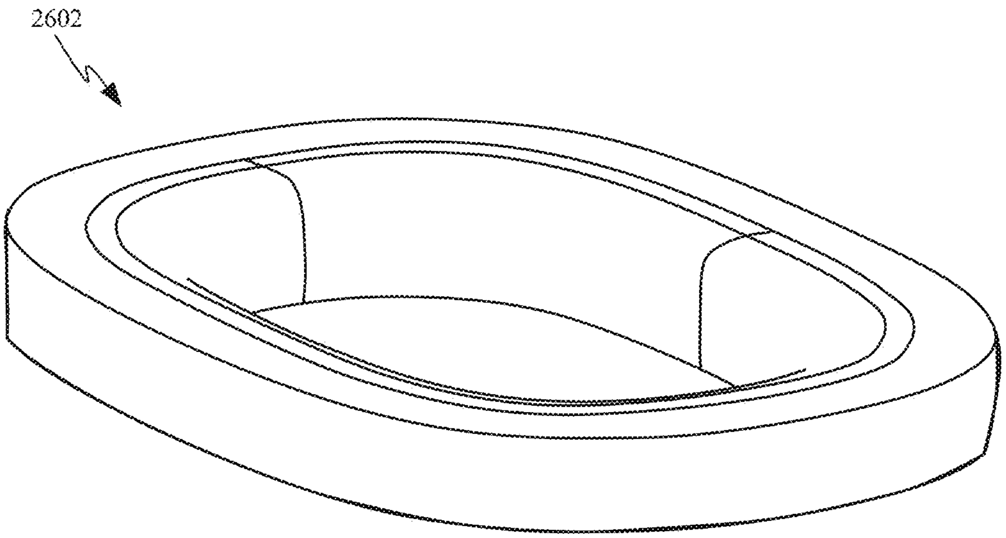
FIGS. 26A-26B show perspective views of an earpad in different orientations.
Figure 26B:
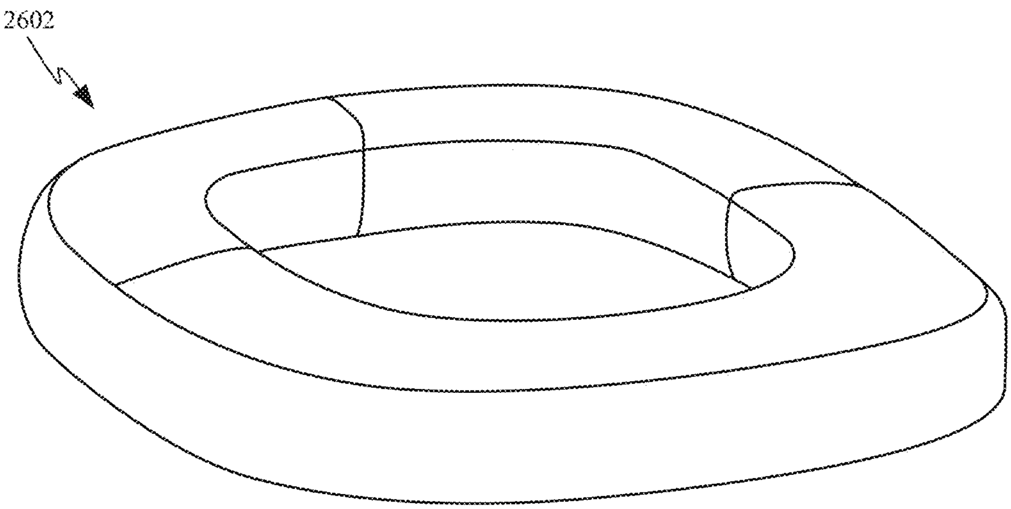

FIGS. 26A-26B show perspective views of earpad 2602, which can be formed from a conformable material such as open cell foam. Conventional foam pads for headphones are formed from rectangular blocks and if formed using machining methods at all would be formed by a stamping process. By machining earpads 2602 from a larger block a precise three-dimensional shape can be achieved. Machining is also superior over performing injection since while these types of processes could include a mold to achieve a desired shape the surface consistency often is materially different due to the heating processes that take place during the molding process. For at least these reasons, performance of a machined foam as an earpad cushion is substantially better than the alternatives since it allows for a customized responsiveness to pressure and reducing the overall weight of each earpad cushion by allowing for unneeded portions of the foam to be easily cut away. As depicted, earpad 2602 has a gradual sloping geometry on both sides, as depicted by FIGS. 26A-26B, that give earpad 2602 an undercut geometry helping to establish a desired firmness of earpad 2602.

Figure 26C:
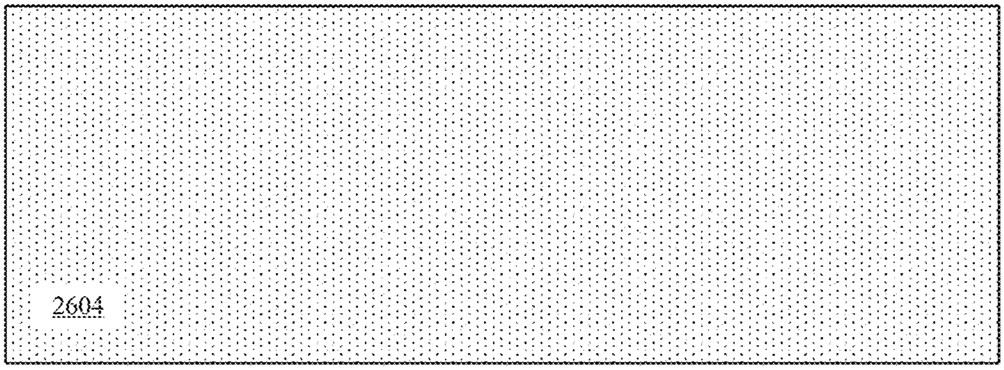
FIG. 26C-26G show various manufacturing operations for forming an earpad from a block of foam.
Figure 26D:
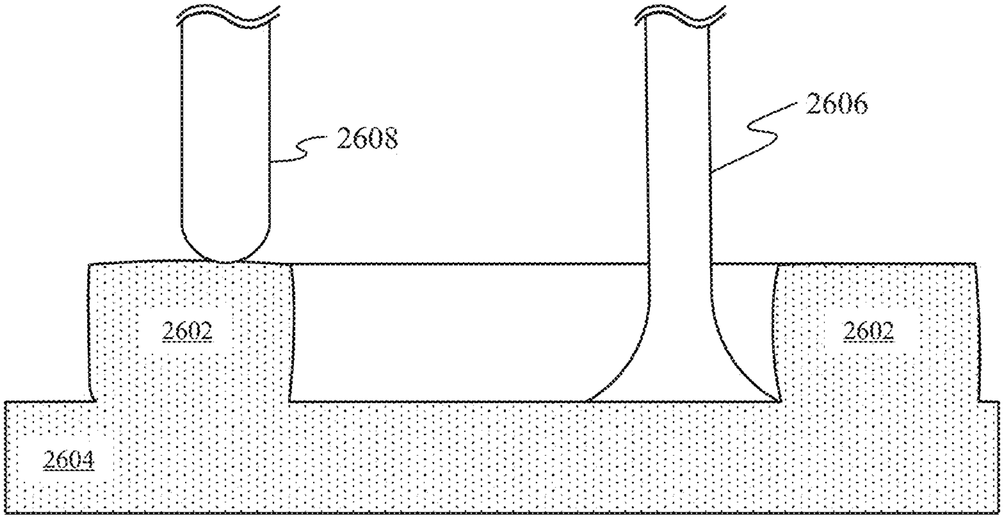
Figure 26E:
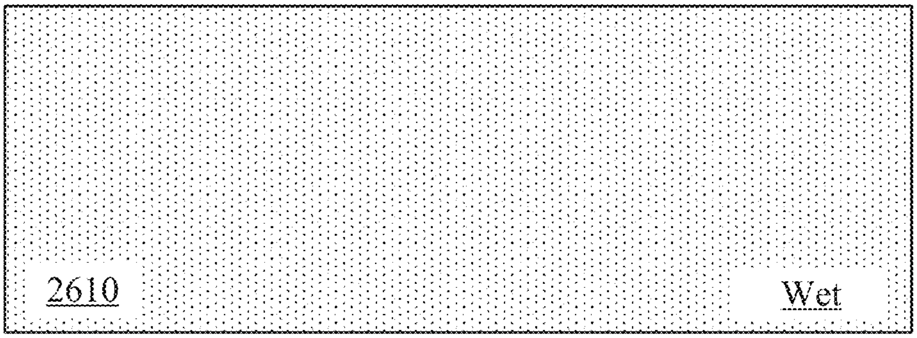
Figure 26F:
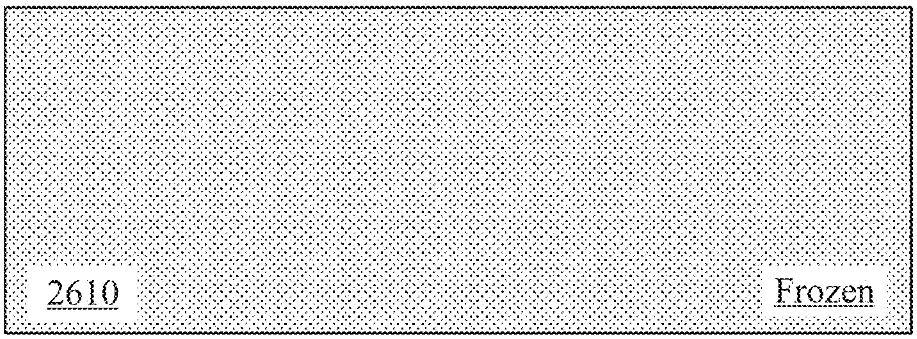
Figure 26G:
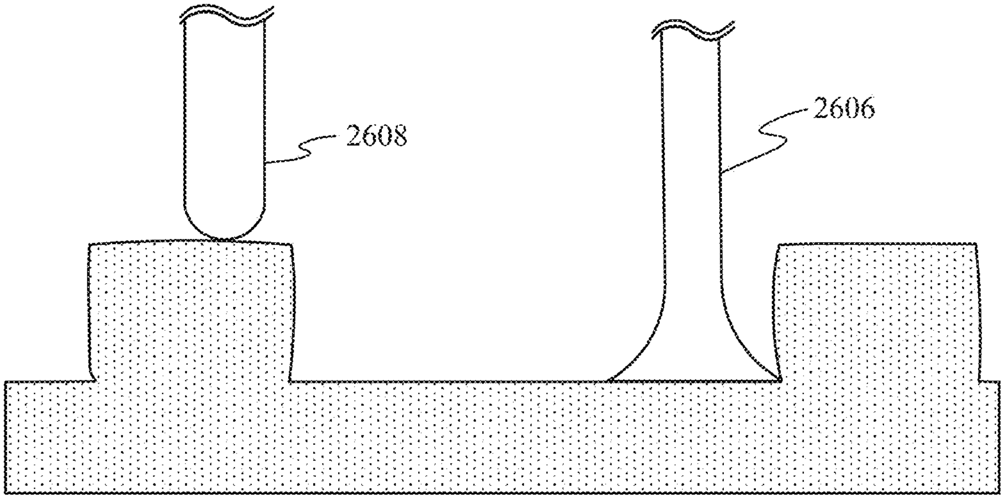

FIG. 26C-26G show various manufacturing operations for forming an earpad from a block of foam. FIG. 26C shows open cell foam block 2604 once it is formed by an extrusion or molding process. In FIG. 26D, profile cutter 2606 and ball end mill 2608 are depicted forming opposing sides of earpad 2602 from foam block 2604. In some embodiments, the cutting and milling process can be made more exact by first soaking foam block 2610 in water as shown in FIG. 26E and then freezing foam block as shown in FIG. 26F. In some embodiments, when profile cutter 2606 and ball end mill 2608 are applied to frozen foam block 2610 the machining operations can be a little more accurate since the foam material is less likely to move and deform under an amount of pressure applied by the machining tools. While the annular earpad is depicted having a substantially rectangular cross-sectional geometry, the CNC process allows for a much broader variety of shapes. For example, tear-drop, circular, square, elliptical, polygonal and other cross-sectional geometries could be realized by varying the machining operations performed by profile cutter 2606 and ball end mill 2608. Non-euclidian surface shapes such as spline geometries are also fully capable realization using the aforementioned machining technique.

Speaker Assembly

Figure 27A:
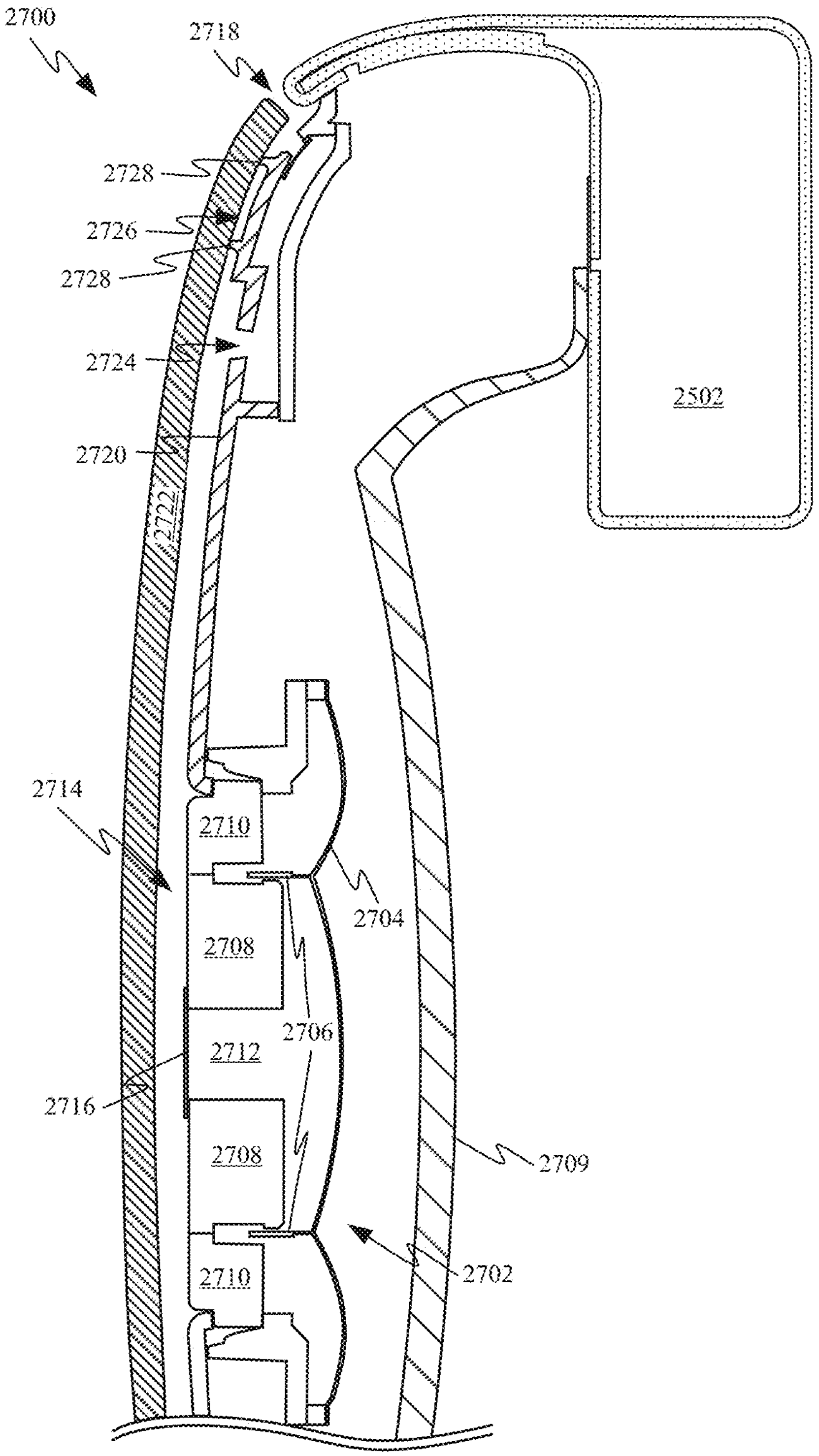
FIG. 27A shows a cross-sectional side view of an exemplary acoustic configuration within an earpiece that could be applied with many of the previously described earpieces.

FIG. 27A shows a cross-sectional side view of an exemplary acoustic configuration within earpiece 2700 that could be applied with any of the previously described earpieces.

The acoustic configuration includes speaker assembly 2702, which includes diaphragm 2704 and electrically conductive coil 2706, which is configured to receive electrical current for generating a shifting magnetic field that interacts with a magnetic field emitted by permanent magnets 2708 and 2710, which causes diaphragm 2704 to oscillate and generate audio waves that exit earpiece assembly through perforated wall 2709. In some embodiments, perforated wall 2709 can include an array of capacitive sensors as depicted in FIGS. 9A-9B. A hole can be drilled through a central region of permanent magnet 2708 to define an opening 2712 that puts a rear volume of air behind diaphragm 2704 in fluid communication with interior volume 2714 through mesh layer 2716, thereby increasing the effective size of the back volume of speaker assembly 2702. Interior volume 2714 extends all the way to air vent 2718. Air vent 2718 can be configured to further increase an effective size of the rear volume of speaker assembly 2702. For example, air vent 2718 can act as a bass reflex vent for augmenting performance of speaker assembly 2702. The rear volume of speaker assembly 2702 can be further defined by speaker frame member 2720 and input panel 2722. In some embodiments, input panel 2722 can be separated from speaker frame member 2720 by about 1 mm. Speaker frame member 2720 defines an opening 2724 that allows audio waves to travel through additional ducting that routes the rear volume. Glue channel 2726 is defined by protrusions 2728 of speaker frame member 2720.

Figure 27B:
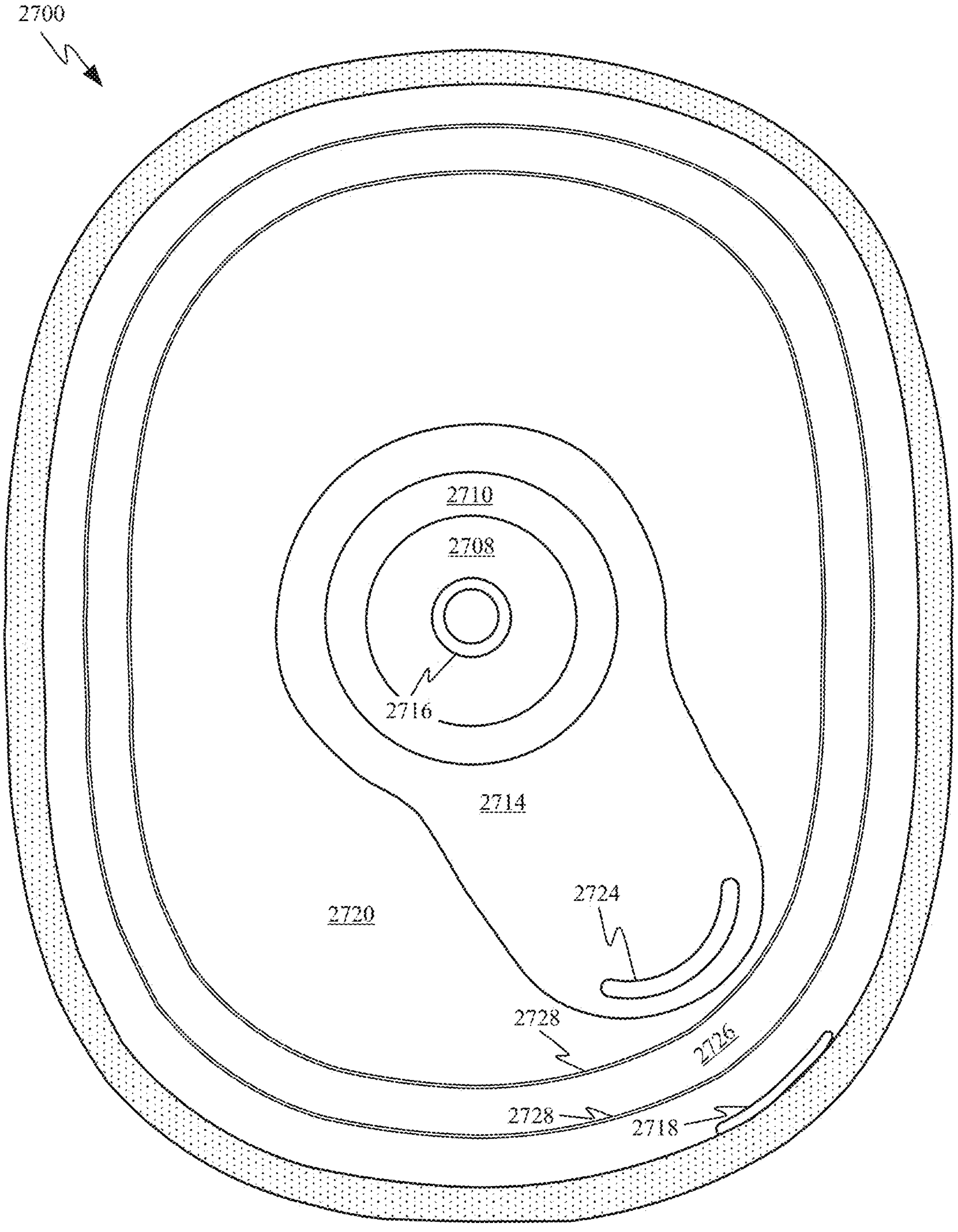
FIG. 27B shows an exterior of the earpiece with an input panel removed to illustrate the shape and size of an interior volume associated with a speaker assembly.

FIG. 27B shows an exterior of earpiece 2700 with input panel 2722 removed to illustrate the shape and size of the interior volume associated with speaker assembly 2702. As depicted, a central portion of earpiece 2700 includes permanent magnets 2708 and 2710. Speaker frame member 2720 includes a recessed region that defines interior volume 2714. Interior volume 2714 can have a width of about 20 mm and a height of about 1 mm as depicted in FIG. 27A. At the end of interior volume 2714 is opening 2724 defined by speaker frame member 2720, which is configured to allow the back volume to continue beneath glue channel 2726 and extend to air vent 2718, which leads out of earpiece 2700.

Figure 27C:
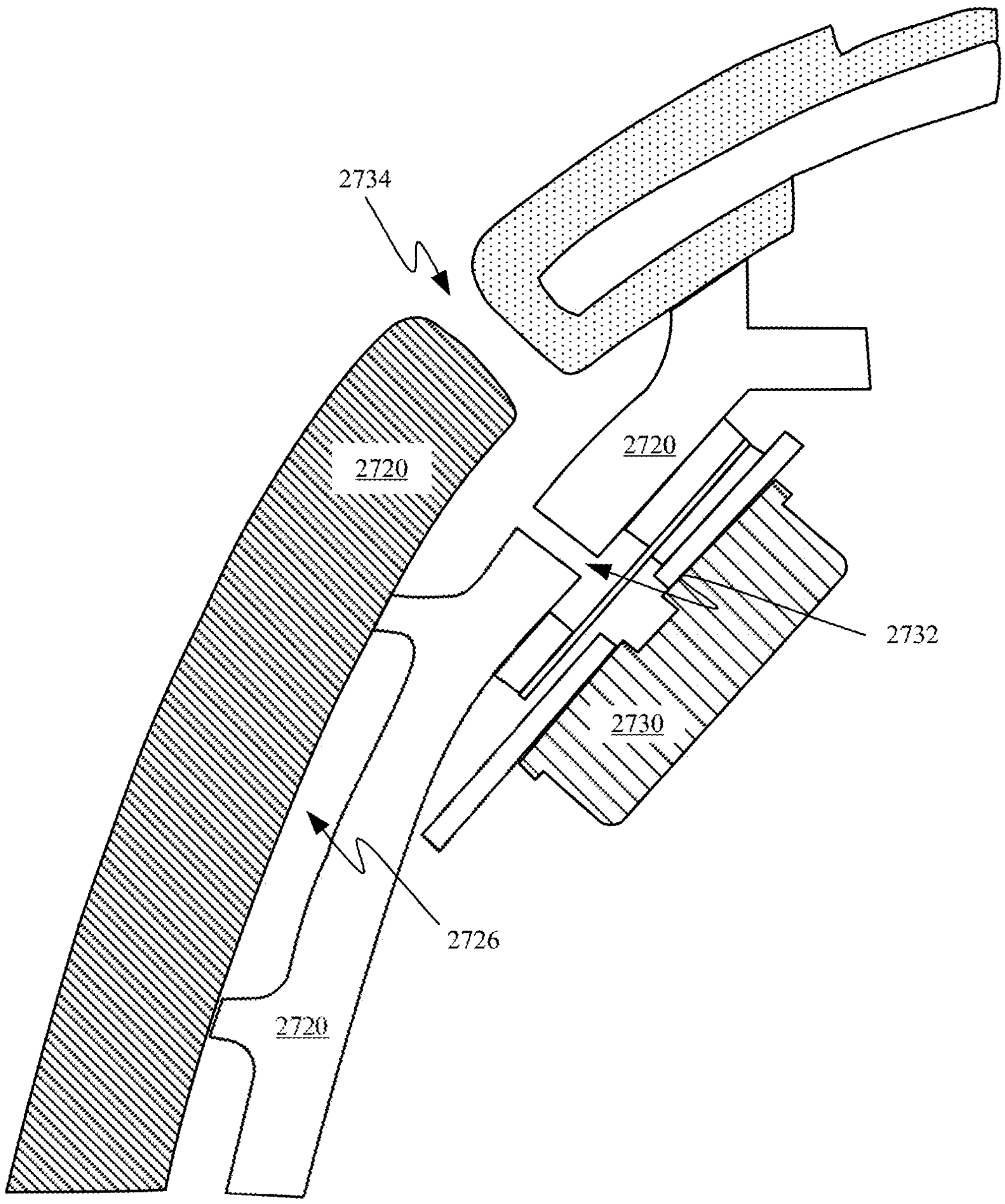
FIG. 27C shows a microphone mounted within an earpiece.

FIG. 27C shows a cross-sectional view of a microphone mounted within earpiece 2700. In some embodiments, microphone 2730 is secured across an opening 3732 defined by speaker frame member 2720. Opening 3732 is offset from microphone intake vent 2734, preventing a user from seeing opening 2732 from the exterior of earpiece 2700. In addition to providing a cosmetic improvement, this offset opening configuration also tends to reduce the occurrence of microphone 2730 picking up noise from air passing quickly by microphone intake vent 2734.

Figure 28:
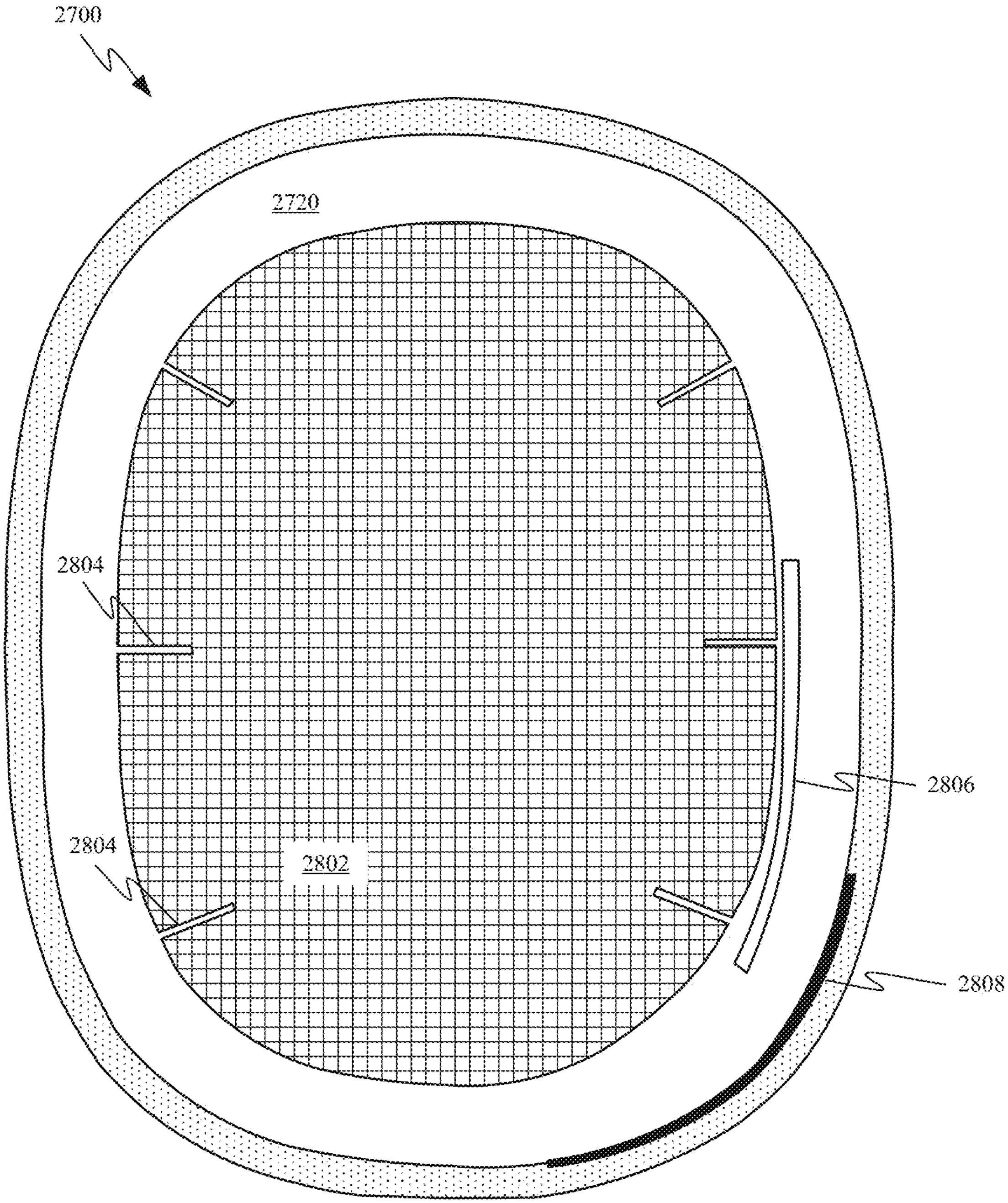
FIG. 28 shows an earpiece having an input panel, which can form an exterior facing surface of earpiece.

FIG. 28 shows earpiece 2700 having input panel 2720, which can form an exterior facing surface of earpiece 2700. A touch sensitive region can be established by touch sensor 2802, which can take the form of a flexible substrate affixed to an interior facing surface of input panel 2720. The flexible substrate can define multiple notches 2804, which function as strain relief features allowing the flexible substrate to conform to a concave shape of the interior-facing surface of input panel 2720. Passive radiator 2806 is depicted adjacent to touch sensor 2802 and also affixed to the interior-facing surface of radio transparent input panel 2720. Passive radiator 2806 can be formed from a stamped sheet of metal or be formed along a flexible printed circuit. This configuration prevents interference between passive radiator 2806 and touch sensor 2802. Passive radiator 2806 can cooperate with internal antenna 2808, which is also positioned within earpiece 2700, to improve wireless performance.

Distributed Battery Configuration

Figure 29A:
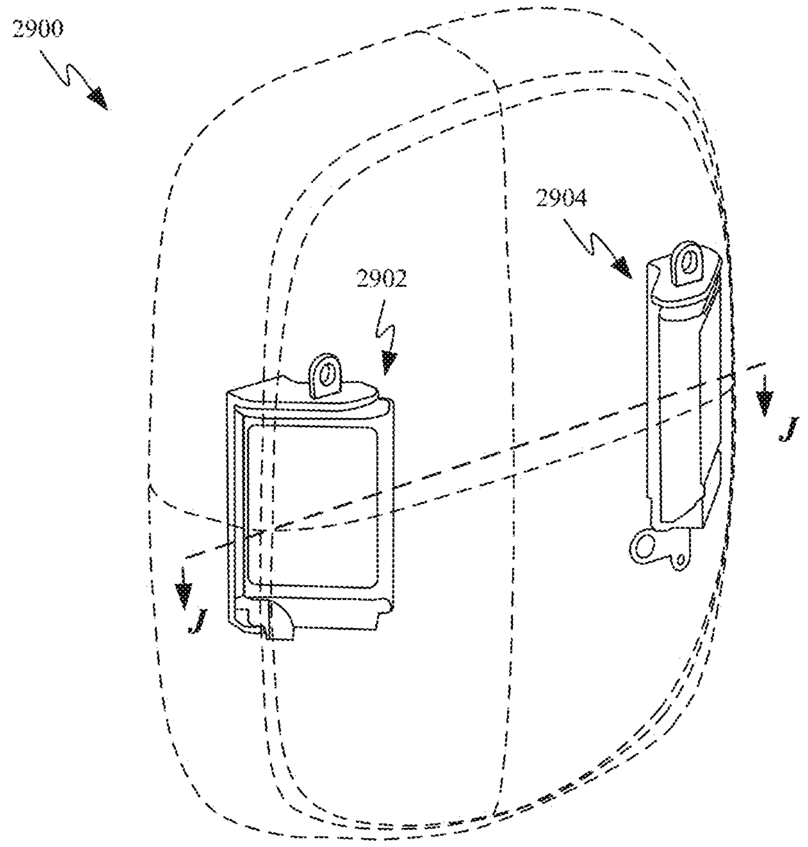
FIGS. 29A-29B show perspective and cross-sectional views of an outline of an earpiece illustrating a position of distributed battery assemblies within the earpiece.
Figure 29B:
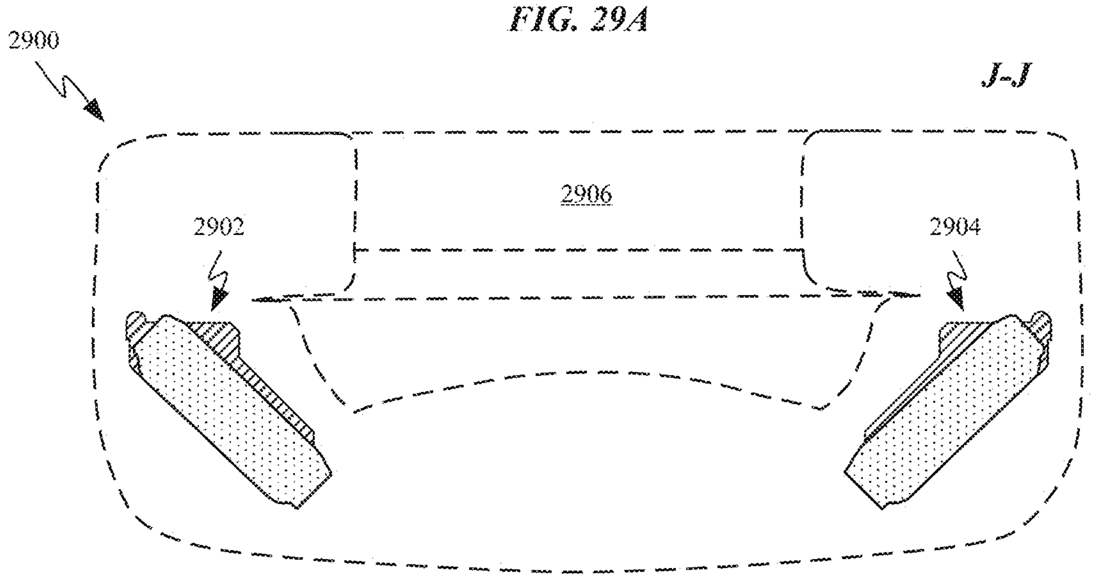
Figure 29C:
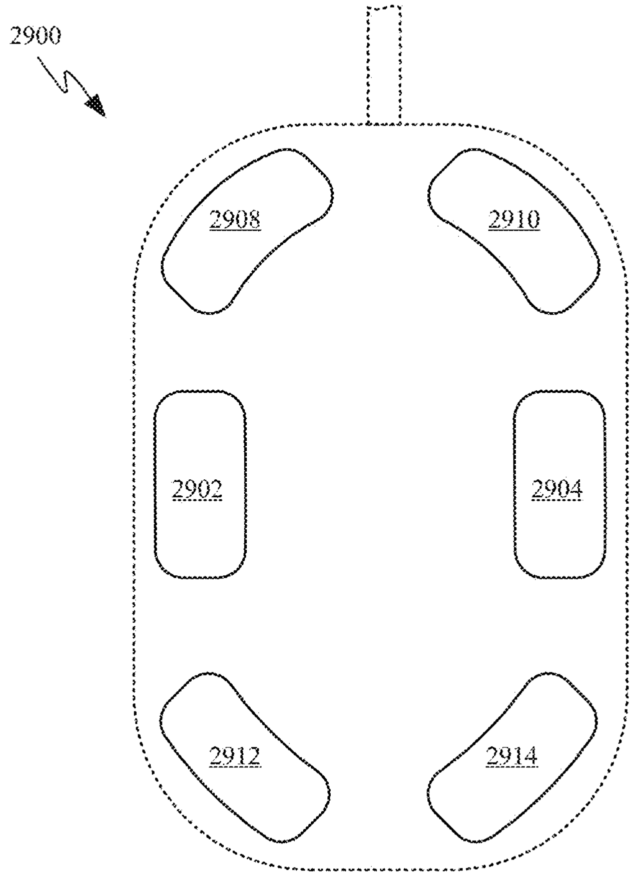
FIG. 29C shows how more than two discrete battery assemblies can be incorporated into a single earpiece housing.

FIGS. 29A-29B show perspective and cross-sectional views of an outline of earpiece 2900 illustrating a position of distributed battery assemblies 2902 and 2904 within earpiece 2900. In particular, FIG. 29A shows how battery assemblies 2902 and 2904 can be positioned on opposing sides of a housing of earpiece 2900. FIG. 29B shows a cross-sectional view of earpiece 2900 in accordance with section line J-J. Battery assemblies 2902 and 2904 can also be tilted diagonally with respect to an ear cavity defined by earpiece 2900, as depicted in FIG. 29B, to maximize a size of an ear cavity 2906 defined by earpiece 2900. FIG. 29C shows how more than two discrete battery assemblies can be incorporated into a single earpiece housing. For example, three, four, five or six discrete battery assemblies could be distributed along a periphery of earpiece 2900 as is shown in FIG. 29C. In some embodiments, and as is shown in FIG. 29C battery assemblies 2908-2914 have a curvature that follows a curvature of an outer periphery of the earpiece housing and more generally the space available within the earpiece housing. Each of the discrete battery assemblies can have their own input and output terminals configured to support operation of various components within earpiece 2900.

Figure 30A:
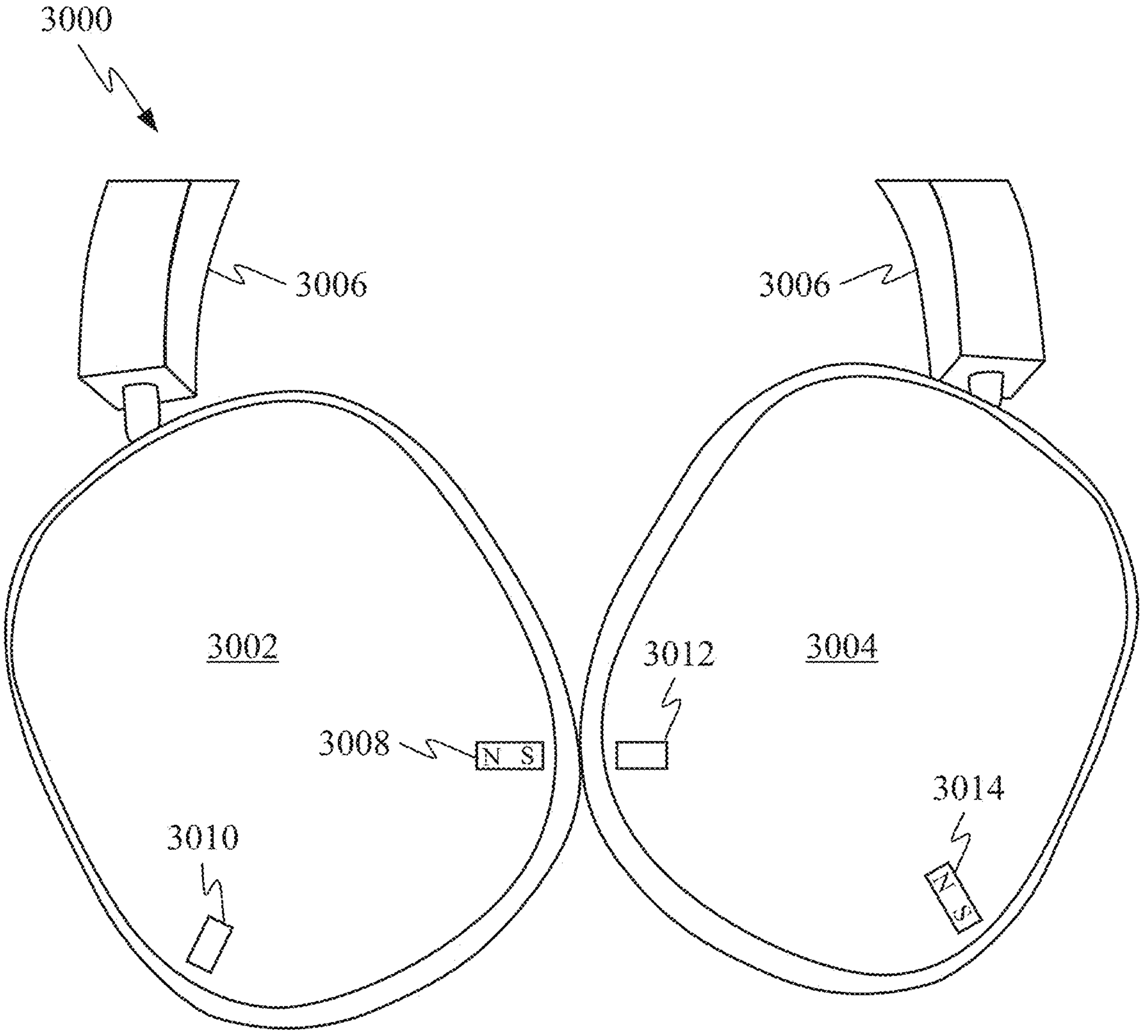
FIG. 30A shows exemplary headphones, which include earpieces joined together by a headband.

FIG. 30A shows headphones 3000, which include earpieces 3002 and 3004 joined together by headband 3006. A central portion of headband 3006 has been omitted to focus on components within earpieces 3002 and 3004. In particular, earpieces 3002 and 3004 can include a mix of Hall Effect sensors and permanent magnets. As depicted, earpiece 3002 includes permanent magnet 3008 and Hall Effect sensor 3010. Permanent magnet 3008 generates a magnetic field extending away from earpiece 3002 with a South polarity. Earpiece 3004 includes Hall Effect sensor 3012 and permanent magnet 3014. In the depicted configuration, permanent magnet 3008 is positioned to output a magnetic field sufficiently strong to saturate Hall Effect sensor 3012. Sensor readings from Hall Effect sensor 3012 can be sufficient to cue headphones 3000 that headphones 3000 are not being actively used and could enter into an energy savings mode. In some embodiments, this configuration could also cue headphones 3000 that headphones 3000 were being positioned within a case and should enter a lower power mode of operation to conserve battery power. Flipping earpieces 3002 and 3004 180 degrees each would result in a magnetic field emitted by permanent magnet 3014 saturating Hall Effect Sensor 3010, which would also allow the device to enter a low power mode. In some embodiments, it could be desirable to use an accelerometer sensor within one or both of earpieces 3002 to confirm that earpieces 3002 and 3004 are facing toward the ground before entering a lower power state as a user could desire to set earpieces 3002 and 3004 facing upward to operate headphones in an off the head configuration and in such a case audio playback should be continued.

Figure 30B:
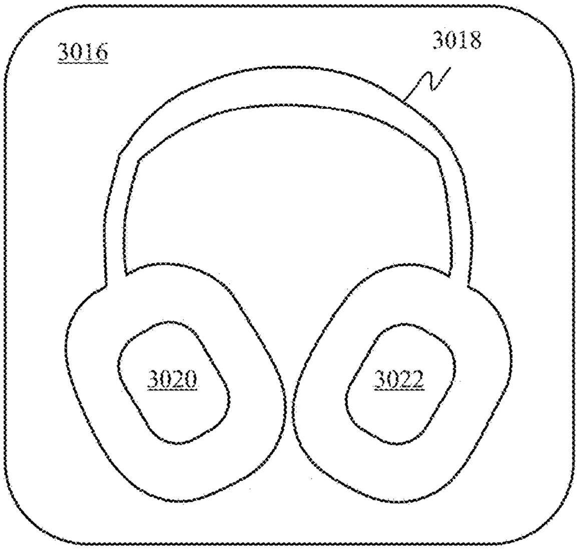
FIG. 30B shows an exemplary carrying/storage case well suited for use with circumaural and supra-aural headphones designs discussed herein.
Figure 30C:
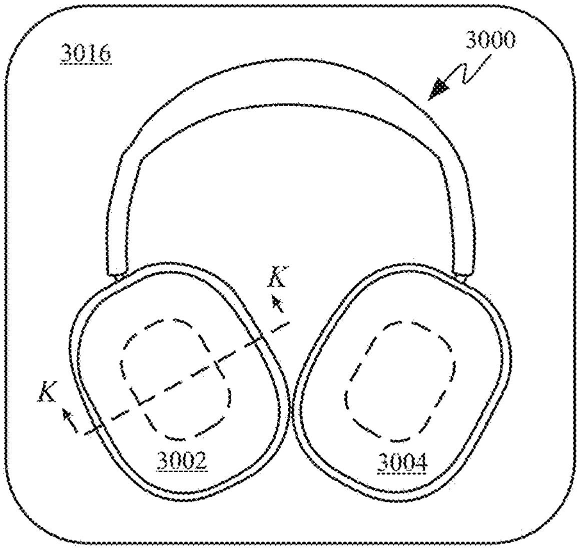
FIG. 30C shows headphones 3000 positioned within a recess of the case.
Figure 30D:
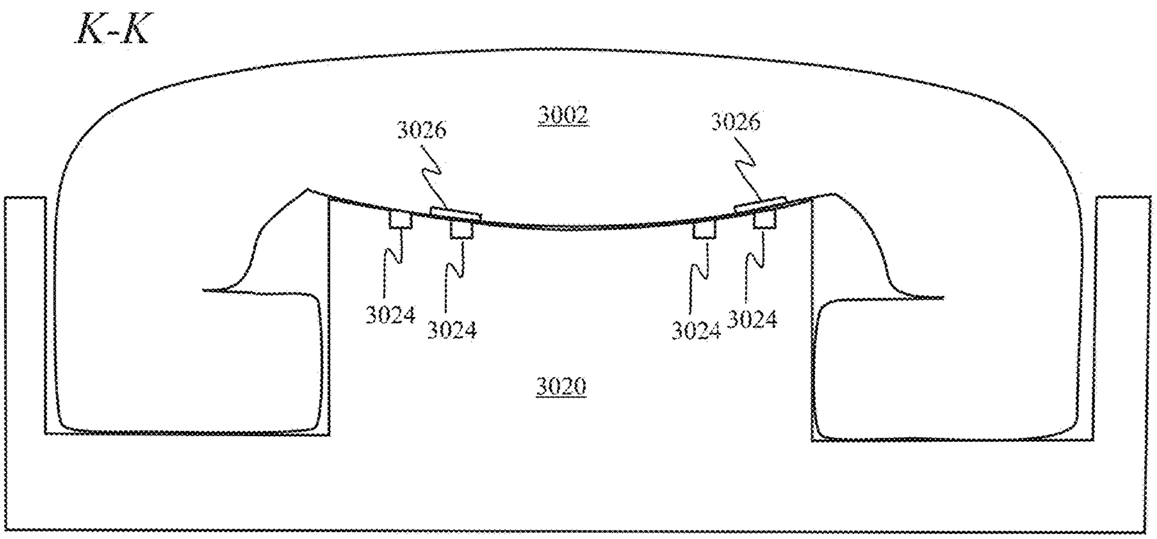
FIG. 30D shows a cross-sectional view of an earpiece in accordance with section line K-K of FIG. 30C.

FIG. 30B shows an exemplary carrying/storage case 3016 well suited for use with circumaural and supra-aural headphones designs. Case 3016 includes a recess 3018 to accommodate a headband assembly and two earpieces. The portions of recess 3018 that accommodate the earpieces can include protrusions 3020 and 3022, which fill recesses of earpieces sized to accommodate the ear of a user. FIG. 30C shows headphones 3000 positioned within recess 3018 and FIG. 30D shows a cross-sectional view of earpiece 3002 in accordance with section line K-K of FIG. 30C. FIG. 30D shows how protrusion 3020 include capacitive elements 3024 arranged along an upward-facing surface of protrusion 3020 in a predefined pattern. Consequently, when headphones 3000 are placed within case 3016 and capacitive sensors 3026 sense capacitive elements in that predefined pattern headphones 3000 can be configured to shut down or go into a lower power mode to conserve power.

Figure 30E:
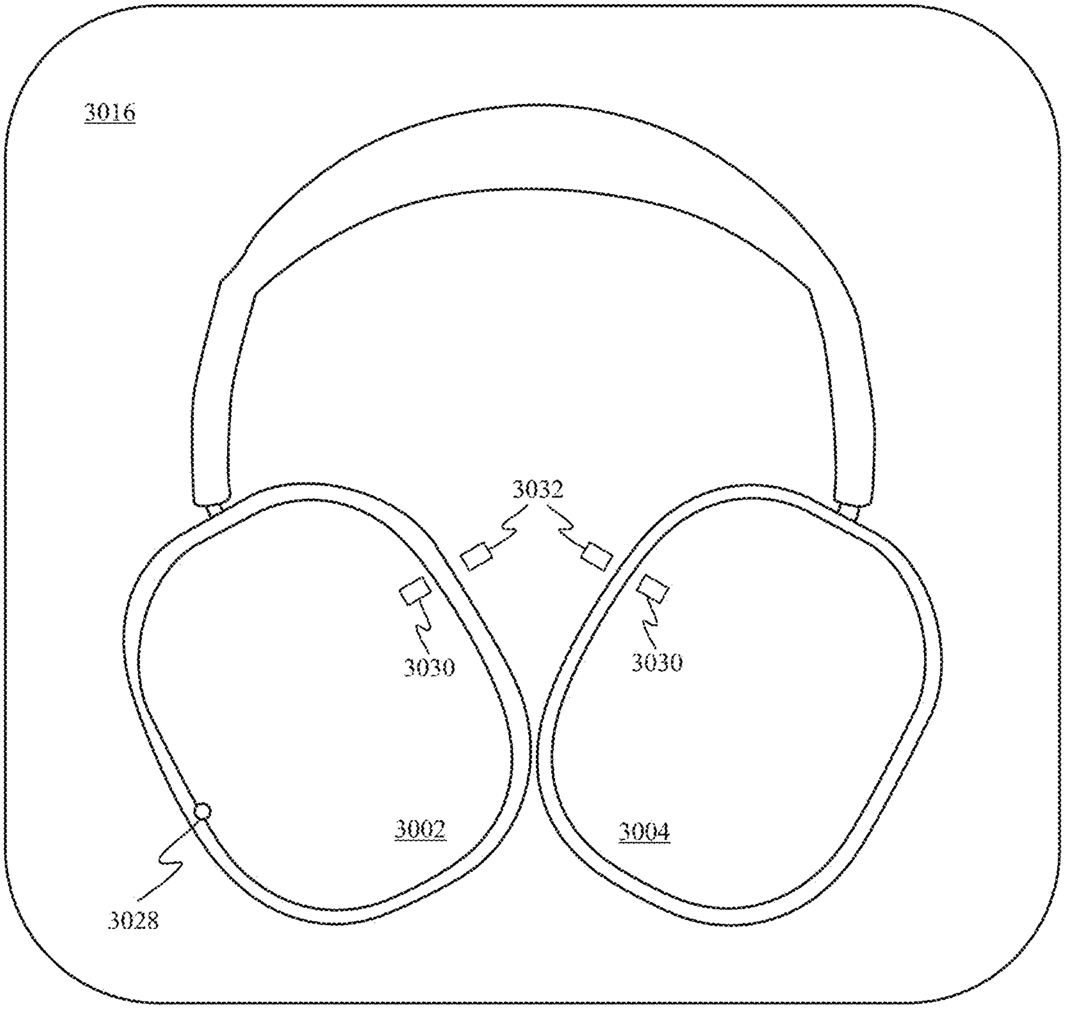
FIG. 30E shows a carrying case with headphones positioned therein.

FIG. 30E shows carrying case 3016 with headphones 3000 positioned therein. Headphones 3000 are depicted including ambient light sensor 3028. In some embodiments, input from ambient light sensor 3028 can be used to determine when case 3016 is closed with headphones disposed within case 3016. Similarly, when sensor readings from ambient light sensor 3028 indicate an amount of light consistent with carrying case 3016 opening, a processor within headphones 3000 can determine that carrying case 3016 has been opened. In some embodiments, when other sensors aboard headphones 3000 indicate headphones 3000 are positioned within a recess defined by carrying case 3016, the sensor data from ambient light source 3028 can be sufficient to determine when carrying case 3016 is open or closed. Examples of other sensors include the capacitive sensors discussed in the text describing FIGS. 30B-30D. Other examples of sensors could take the form Hall Effect sensors 3030 disposed within earpieces 3002 and 3004 that could be configured to detect magnetic fields emitted by permanent magnets 3032 disposed within carrying case 3016. In some embodiments, one or more of magnets 3032 can be configured to emit a magnetic field with one or more recognizable magnetic field characteristics. For example, the two depicted permanent magnets 3032 could have opposing polarities that interact with Hall Effect sensors 3030. Furthermore, one or both of permanent magnets could have a particularly strong magnetic field or a customized magnetic field with a highly varied polarity. Inadvertently experiencing such a magnetic field outside the controlled environment of the case would be unlikely and consequently, headphones configured to enter a low power state in response would be unlikely to do so accidentally. This second set of sensor data provided by Hall Effect sensors 3030 could substantially reduce the incidence of sensor data from ambient light sensor 3028 mistakenly being correlated with case opening and closing events. The use of sensor readings from other types of sensors such as strain gauges, time of flight sensors and other headphone configuration sensors can also be used to make operating state determinations. Furthermore, depending on a determined operating state of headphones 3000 these sensors could be activated with varying frequency. For example, when carrying case 3016 is determined to be closed around headphones 3000 sensor readings can only be made at an infrequent rate, whereas in active use the sensors could operate more frequently.

Illuminated Button Assembly

Figure 31A:
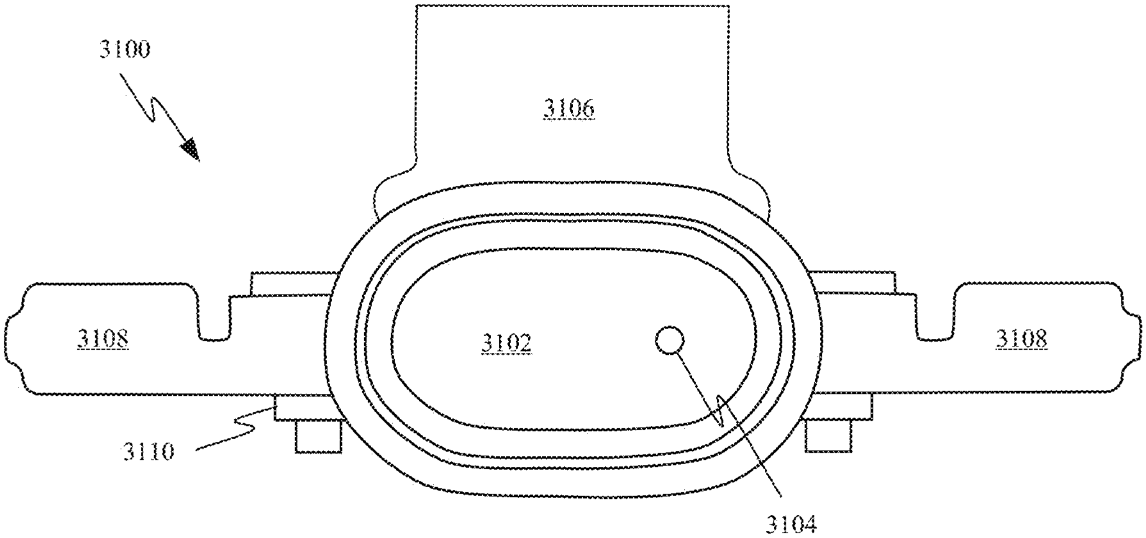
FIGS. 31A-31B show an illuminated button assembly suitable for use with the described headphones.
Figure 31B:
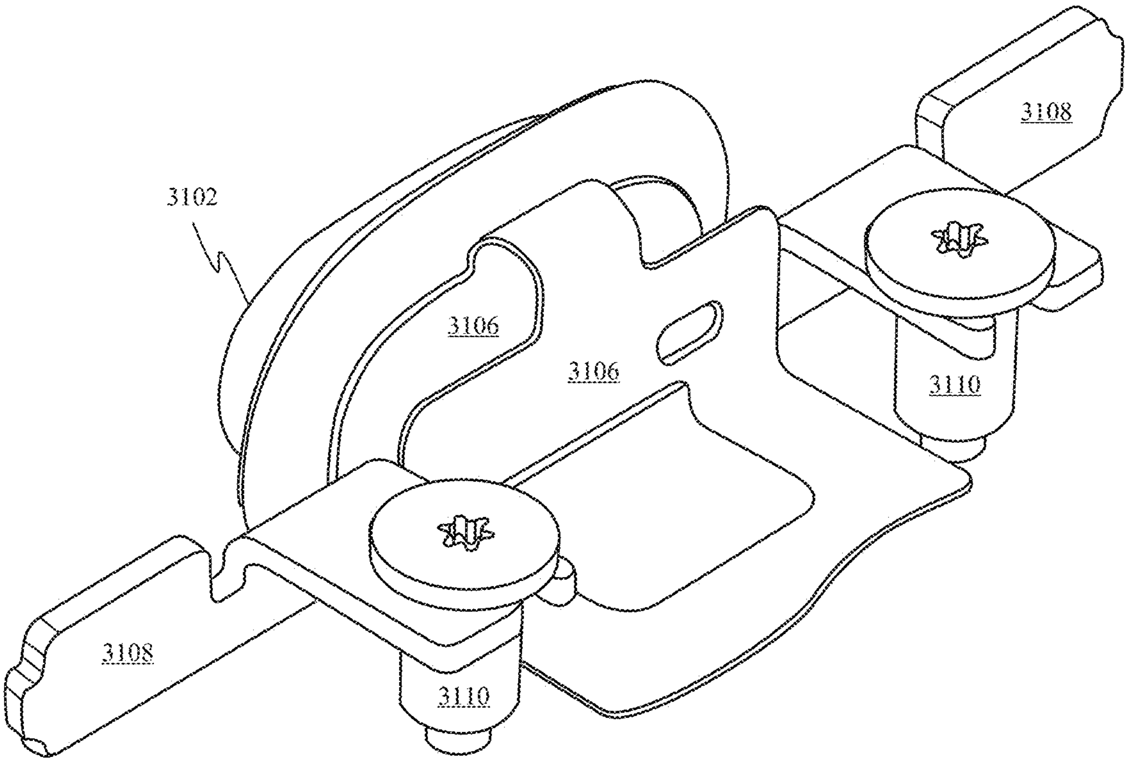

FIGS. 31A-31B show an illuminated button assembly 3100 suitable for use with the described headphones. FIG. 31A shows how illuminated button assembly 3100 includes button 3102 and illuminated window 3104, which can be configured to identify an operating state of headphones. Button 3102 is electrically coupled with other components within headphones by flexible circuit 3106. At least a portion of button assembly 3100 can be secured to a device housing by mounting bracket 3108. FIG. 31B shows a rear view of illuminated button assembly 3100, and how mounting bracket 3108 can be configured to receive fasteners 3110 to secure illuminated button assembly to a device housing.

Figure 31C:
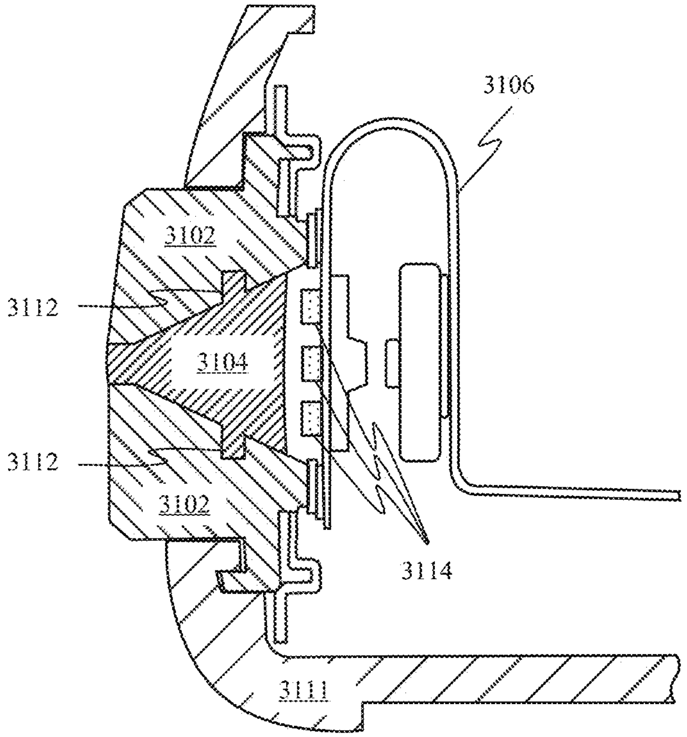
FIGS. 31C-31D show side views of the illuminated button assembly depicted in FIGS. 31A-31B in unactuated and actuated positions, respectively, within a device housing.
Figure 31D:
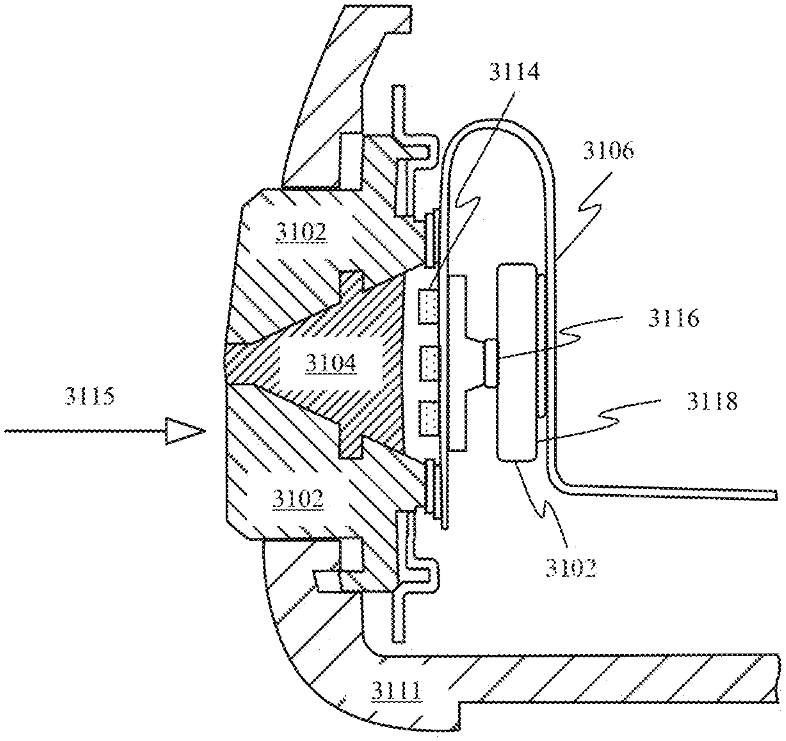

FIGS. 31C-31D show side views of illuminated button assembly 3100 in unactuated and actuated positions, respectively, within a device housing 3111. FIG. 31C shows how illuminated window 3104 of button 3102 can have a tapered shape that directs light emitted by any one of multiple illumination elements 3114. Illuminated window 3104 can also include securing features 3112, which protrude laterally from illuminated window 3104 to prevent illuminated window 3104 from becoming disengaged from button 3102. Illumination elements 3114 can be positioned proximate a rear-facing surface of illuminated window 3104. Illumination elements 3104 can each take the form of a light emitting diode (LED) surface mounted to flexible circuit 3106. In some embodiments, each of illumination elements 3114 can be configured to emit light of a different color, thereby allowing the light received by illuminated window 3104 to be changed to reflect a status or operating state of the device associated with illumination button assembly 3100. In some embodiments, illumination elements 3114 could include red, yellow and blue colors. Selective illumination of two or more of the different colors at varying intensity levels could allow a great number of different colors to be generated informing the user of the illuminated button assembly of many different operating conditions.

FIG. 31D shows how actuation of button 3102 with force 3115 causes a portion of button 3102 to slide into an interior volume defined by housing 3111. Because illumination elements 3114 are affixed directly to a rear surface of button 3102, the amount of light projected through illumination window 3104 remains constant regardless of the amount of movement made by button 3102. This differs from conventional buttons having illumination elements positioned on a printed circuit board that includes an electrical switch. Consequently, in the conventional configuration the amount of illumination increases during button actuation as the button gets closer to the illumination elements during actuation. It should be noted that in the design depicted in FIGS. 31C-31D, electrical switch 3116 is affixed to a bracket 3118 to keep electrical switch 3116 in a fixed position. In this way, when a rear-facing surface of button 3102 comes in contact with electrical switch 3116, bracket 3118 provides an amount of resistance sufficient to register the actuation. Electrical switch 3116 can take the form of a dome switch, which is also helpful in providing tactile feedback to a user of illumination button assembly 3100.

Figure 31E:
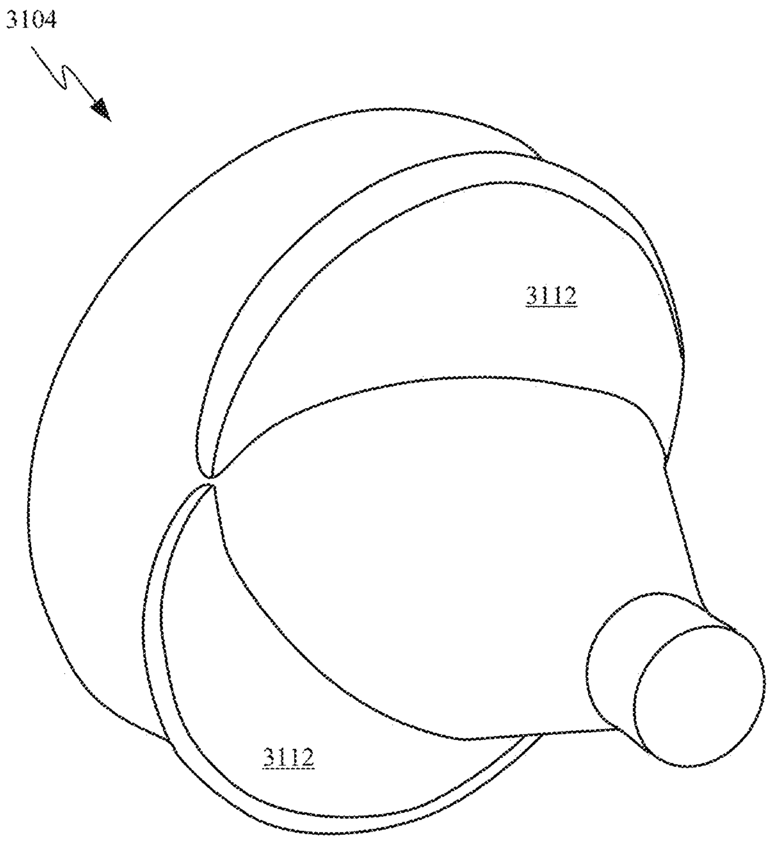
FIG. 31E shows a perspective view of an illuminated window.

FIG. 31E shows a perspective view of illuminated window 3104. Illuminated window 3104 includes securing features 3112 protruding from a tapered body of illuminated window 3104. It should be appreciated that laterally protruding securing features 3112 can take many forms. At minimum, securing features 3112 are engaged with a laterally oriented notch that prevents dislodgment of illuminated window 3104 from button 3102. In some embodiments, illuminated window 3104 can insert molded into an opening defined by button 3102. In this type of insert molding operation, the opening defined by button 3102 could determine the shape and size of illuminated window 3104.

Removable Earpieces

Figure 32A:
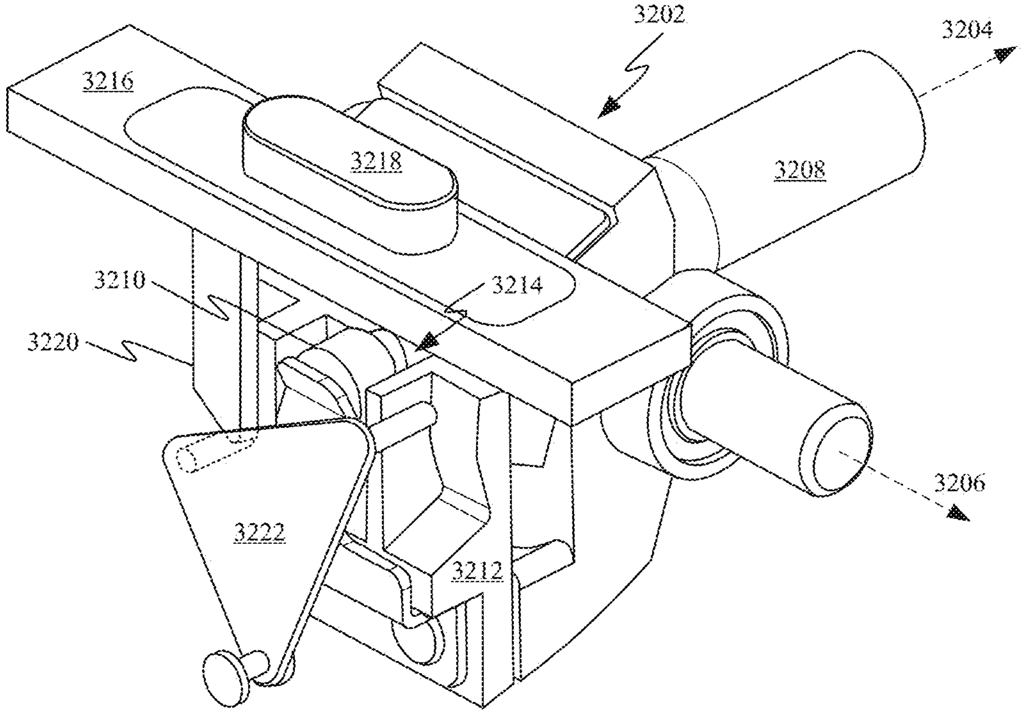
FIGS. 32A-32B show perspective views of a pivot assembly associated with a removable earpiece engaged by a stem base of a headphone band.
Figure 32B:
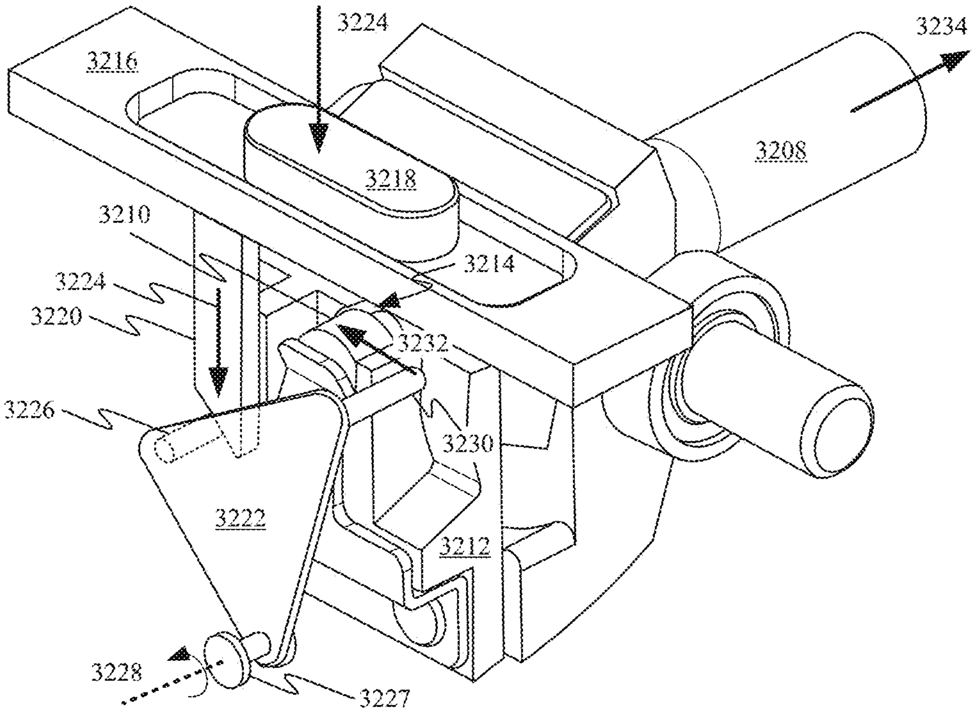

FIGS. 32A-32B show perspective views of a pivot assembly associated with a removable earpiece engaged by a stem base of a headphone band. In particular, pivot assembly 3202 is configured to accommodate rotation of the associated earpiece relative to the headphone band about axes of rotation 3204 and 3206. FIG. 32A depicts stem base 3208 engaged and locked into place within pivot assembly 3202. A distal end 3210 of stem base 3208 is locked in place by latch plate 3212. In particular, latch plate 3212 includes walls that define an aperture 3214 that engages a neck of stem base 3208 to prevent inadvertent removal of stem base 3208 from pivot assembly 3202. FIG. 32A also shows a portion of earpiece housing 3216 that provides an opening accommodating switch mechanism 3218. Switch mechanism 3218 is configured to allow stem base 3208 to be released from pivot assembly 3202. Switch mechanism 3218 includes a protruding engagement member 3220, which is configured to contact force translation member 3222. In some embodiments, switch mechanism 3218 can be concealed beneath a removable earpad assembly.

FIG. 32B shows how a force 3224 exerted upon switch mechanism 3218 is applied to translation member 3222 by engaging member 3220. The angled end of engagement member 3220 transmits force 3224 to a first post 3226 of force translation member 3222, which in turn causes force translation member 3222 to rotate about axis of rotation 3228. Axis of rotation 3228 is defined by a fastener 3227, which pivotally couples one end of force translation member 3222 to an undepicted portion of earpiece housing 3216. Rotation of force translation member 3222 about axis of rotation 3228 results in a second post 3230 applying a force 3232 to a wall of latch plate 3212. Force 3232 applied to latch plate 3212 shifts latch plate 3212 laterally to align aperture 3214 with distal end 3210 of stem base 3208. Once aperture 3214 is aligned with distal end 3210 of stem base 3208 a force 3234 can be applied to stem base 3208 that allows stem base 3208 to be removed from pivot assembly 3202.

Figure 33A:
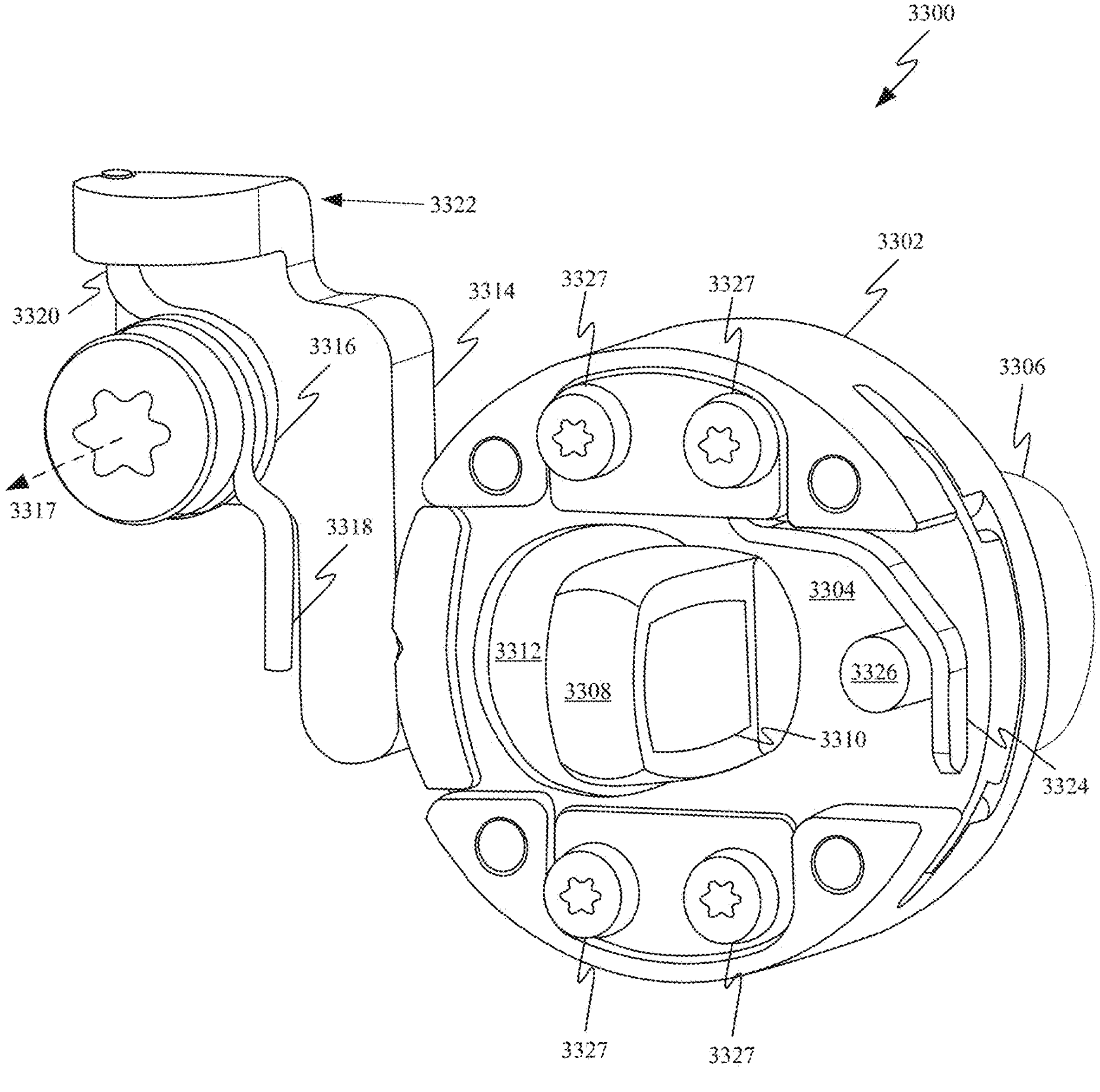
FIGS. 33A-33C show different views of a latching mechanism of a pivot assembly.
Figure 33B:
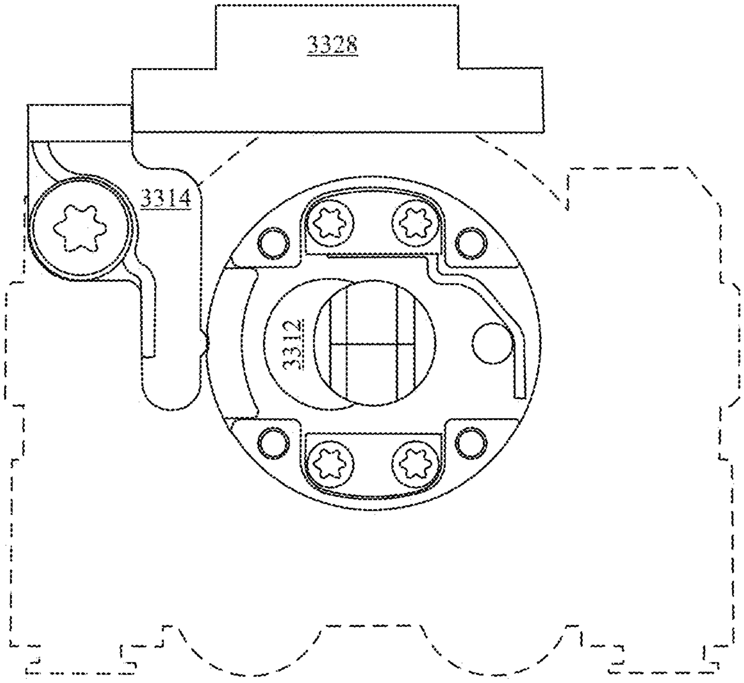
Figure 33C:
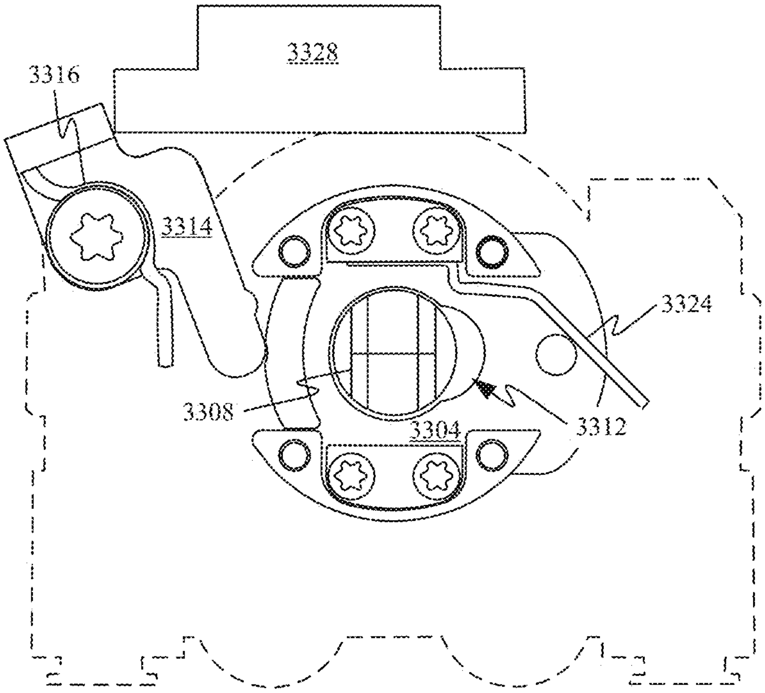

FIGS. 33A-33C show different views of a latching mechanism 3300 of a pivot assembly. FIG. 33A shows how the pivot assembly includes latch body 3302, which defines a channel along which latch plate 3304 is configured to slide. Latch body 3302 has a circular geometry that allows it to rotate with a stem base 3306 and its associated stem plug 3308. Stem plug 3308 includes a contact region 3310. Contact region 3310 can include multiple electrical contacts for interfacing with circuitry and electrical components disposed within the same earpiece as latching mechanism 3300. In some embodiments, contact region 3310 includes a number of different electrical contacts, e.g., two, three or four different electrical contacts are possible electrical contact configurations. In some embodiments, both sides of stem plug 3308 can include contact regions that include multiple electrical contacts for interfacing with circuitry and electrical components of an earpiece. It should be noted that latching mechanism 3300 is generally positioned within an earpiece housing so that aperture 3312 is aligned with a stem opening defined by the earpiece housing to allow for insertion of stem base 3306 into both the earpiece housing and aperture 3312 of latching mechanism 3300.

FIG. 33A also shows how latch plate 3304 defines an asymmetric aperture 3312. In FIG. 33A, latch plate 3304 is in a latched position where a smaller portion of aperture 3312 is engaged with a narrow neck portion separating stem plug 3308 from the rest of stem base 3306. By engaging the narrow neck portion with a smaller portion of aperture 3312, latch plate 3304 can prevent stem base 3306 being removed from latching mechanism 3300. Latching mechanism also includes latch lever 3314, which is configured to rotate about axis of rotation 3317. Torsion spring 3316 is coupled to latch lever 3314 and opposes rotation of latch lever 3314. A first arm 3318 engages a portion of an earpiece housing (not depicted) and a second arm 3320 engages a portion of latch lever 3314. When a force 3322 latch lever 3314 is applied to latch lever 3314 it rotates counter-clockwise and exerts a force upon latch plate 3304 sufficient to cause latch plate 3304 to slide laterally within latch body 3302. When force 3322 is released retaining spring 3324 is configured to exert a force on post 3326 of latch plate 3304 to return latch plate 3304 to the position depicted in FIG. 33A. It should be noted that while stem plug 3308 is depicted as being exposed, this is for descriptive purpose only and in some embodiments a plug receptacle configured to mate with stem plug 3308 can be attached to latching mechanism 3300 by one or more of fasteners 3327.

FIGS. 33B-33C show bottom views of latching mechanism 3300 in locked and unlocked positions. A dotted outline is provided and shows the size and shape of an exemplary pivot mechanism suitable for carrying latching mechanism 3300. FIG. 33B shows a switch mechanism 3328 that can slide along a channel or groove defined by an associated earpiece housing. Switch mechanism can take the form of a horizontal slider switch that allows for engagement and rotation of latch lever 3314. FIG. 33C shows how rotation of latch lever 3314 displaces latch plate 3304 laterally such that a larger portion of aperture 3312 is aligned with stem plug 3308, thereby allowing removal of stem plug 3308 from latching mechanism 3300. FIG. 33C also shows how retaining spring 3324 is able to deform to accommodate the lateral movement of latch plate 3304 when switch mechanism 3328 is actuated. When pressure is released from switch mechanism 3328, retaining spring 3324 and torsion spring 3316 cooperatively bias switch mechanism 3328 back to its starting position as depicted in FIG. 33B. In some embodiments, it may be desirable to position switch mechanism within a channel of the earpiece housing located such that the switch mechanism is concealed by a removable earpad assembly. For example, in some embodiments, the earpad assembly can be coupled to the earpiece housing by magnets or a series of snaps.

Telescoping Stem Mechanism

Figure 34A:
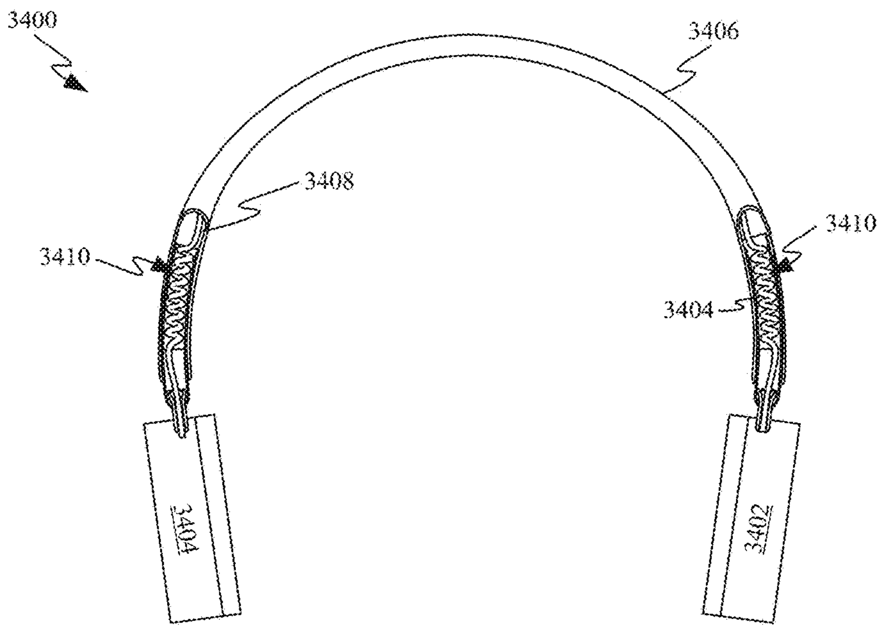
FIG. 34A shows headphones, which includes earpieces mechanically coupled together by a headband assembly.

FIG. 34A shows headphones 3400 which includes earpieces 3402 and 3404 mechanically coupled together by headband assembly 3406. Headband assembly includes signal cable 3408, which electrically couples electrical components within earpieces 3402 and 3404 together. Portions of signal cable 3408 near its opposing ends are arranged in coils 3410, which are configured to expand and contract to accommodate increases and decreases in the size of headband assembly 3406. In some embodiments, it can be helpful to include mechanisms that help keep coils 3410 from tangling after undergoing multiple headband assembly telescoping operations.

Figure 34B:
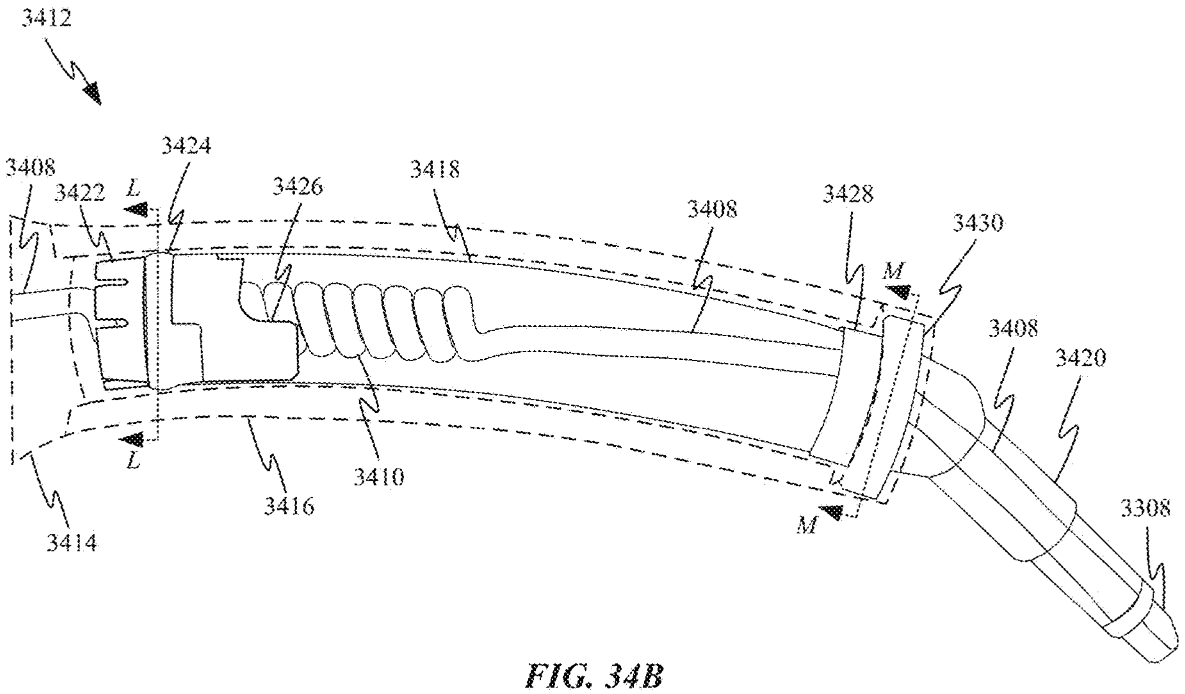
FIG. 34B shows a close up view of a stem region of a headband assembly.

FIG. 34B shows a close up view of a stem region 3412 of headband assembly 3406. In some embodiments, stem region 3412 is made up of multiple different housing components. As depicted, stem region 3412 includes a portion of an upper housing component 3414, lower housing component 3416 and telescoping component 3418 and stem base 3420. In some embodiments, telescoping component 3418 and stem base 3420 can be welded together or otherwise permanently coupled together to form a hollow stem defining a channel that accommodates the passage of a coiled portion of cable 3408. Telescoping component 3418 is shown retracted entirely within an interior volume defined by lower housing component 3416. In this position, coils 3410 of signal cable 3408 are compressed together to accommodate the shortened length of stem region 3412. A distal end of telescoping component 3418 includes a funnel element 3422 configured to help guide signal cable 3408 back into the depicted configuration of coils 3410. Directly behind funnel element 3422 is a first stabilizing element 3424. First stabilizing element has an outer diameter that is about equal to an inner diameter of lower housing component 3416. This helps create a slight interference fit between first stabilizing element 3424 and lower housing component 3416 that helps keep the distal end of telescoping component 3418 centered within the interior volume defined by lower housing component 3416. Directly behind first stabilizing element 3424 is first bearing element 3426, which has a slightly smaller diameter than first stabilizing element 3424 but is formed of a harder, less resilient material than first stabilizing element 3424. In this way, first bearing element 3426 can set a hard stop that prevents telescoping component from getting too close to an interior of the interior-facing surface of the walls making up lower housing component 3416.

FIG. 34B also shows how a distal end of lower housing component 3416 includes a second bearing element 3428 and a second stabilizing element 3430. Second stabilizing element has a smaller inner diameter than second bearing element 3428, allowing second stabilizing element 3430 to help bias telescoping component 3418 toward a central portion of lower housing component 3416 while second bearing element 3428 creates a hard stop that keeps the rest of telescoping component 3418 out of direct contact with other portions of lower housing component 3416. In this way, both the distal end and proximal ends of telescoping component 3418 are constrained. As telescoping component 3418 telescopes out of lower housing component these constraints help establish a desired amount of friction between the two components and prevent any binding or scraping that could result in undesirable operation or even damage of headband assembly 3406. It should also be noted that FIG. 34B also depicts stem plug 3308 positioned at a distal end of stem base 3420. Stem plug 3308 can include two or more electrical contacts for interfacing/electrically coupling with circuitry and electrical components of earpiece 3402 or 3404.

Figure 34C:
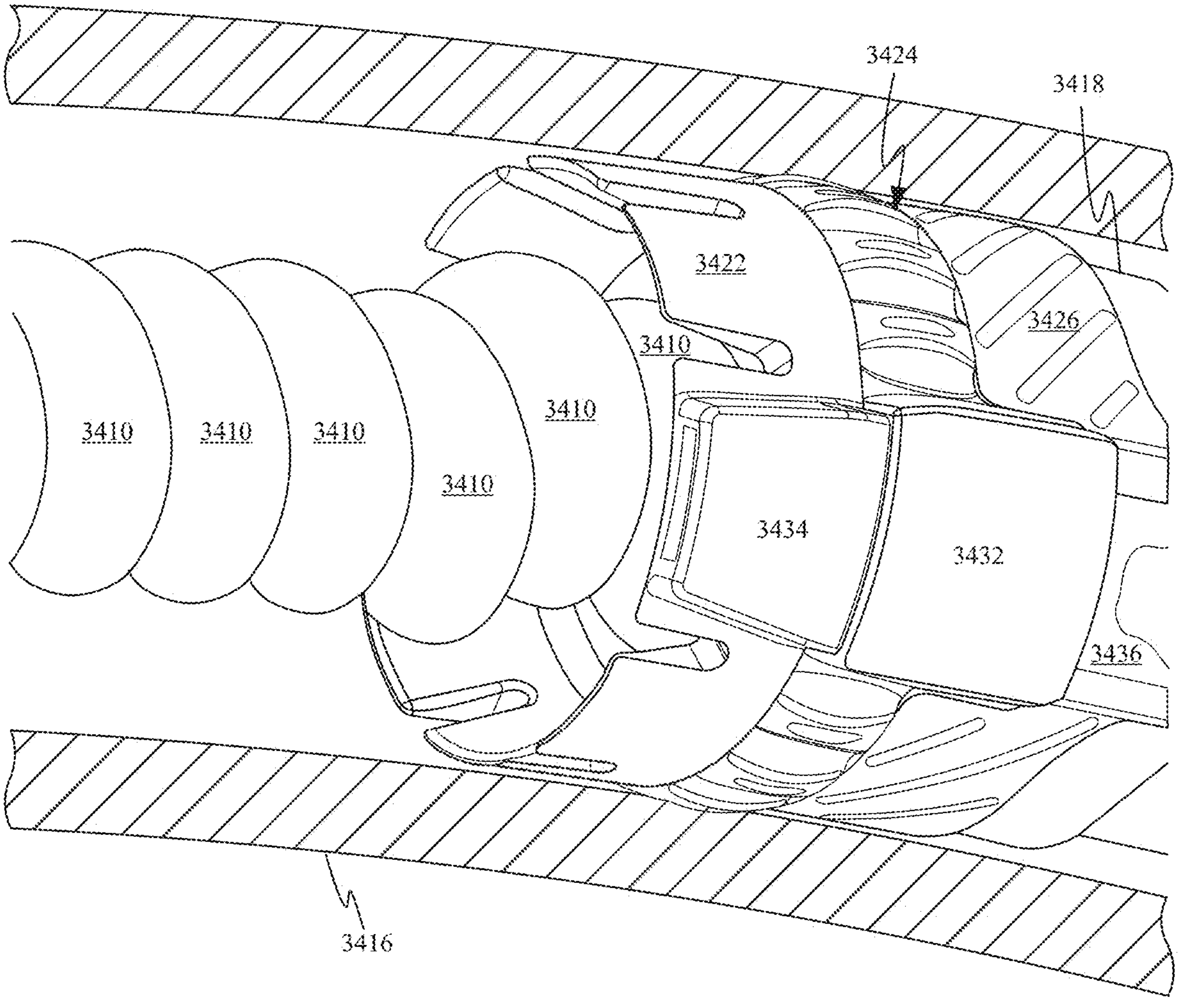
FIG. 34C shows a close up view of a distal end of a telescoping component.

FIG. 34C shows a close up view of the distal end of telescoping component 3418. In particular, funnel element 3422 is depicted having tapered protrusions that extend past the end of telescoping component 3418. The tapered geometry of the protrusions helps align adjacent coils 3410 as they pass through funnel element 3422 and into telescoping component 3418. As depicted, some of adjacent coils are misaligned. This misalignment can be corrected at least in part by the tapered geometry of funnel element 3422. First stabilizing element 3424 is depicted immediately behind funnel element 3422. First stabilizing element 3424 can include a series of axially aligned ribs that interface with and cause minor amounts of friction with interior-facing surfaces of lower housing component 3416. In some embodiments, a layer of lubricant can be applied within lower housing component 3416 in order to reduce an amount of resistance generated by friction between the components. It should be noted that a number, thickness and spacing between the axially aligned ridges can be tuned to achieve a desired amount of friction between the components. First stabilizing element 3424 and funnel element 3422 both includes radial stabilization elements 3432 and 3434 that protrude radially from telescoping component 3418 to engage an axially aligned channel defined by interior-facing surfaces of lower housing component 3416. By engaging this channel, radial stabilization elements 3432 and 3434 are able to prevent unwanted rotation of telescoping component 3418 relative to lower housing component 3416.

FIG. 34C also shows first bearing element 3426, which can also include a radial stabilizing element 3436. In some embodiments, radial stabilizing element 3436 can also include a spring that helps keep telescoping component 3418 stabilized within lower housing component 3416. It should be noted that first bearing element has an outer diameter that is slightly smaller than first stabilizing element 3424 and a slightly larger outer diameter than the rest of telescoping component 3418, which can take the form of a hollow tube formed from aluminum, stainless steel or other robust lightweight materials.

Figure 34D:
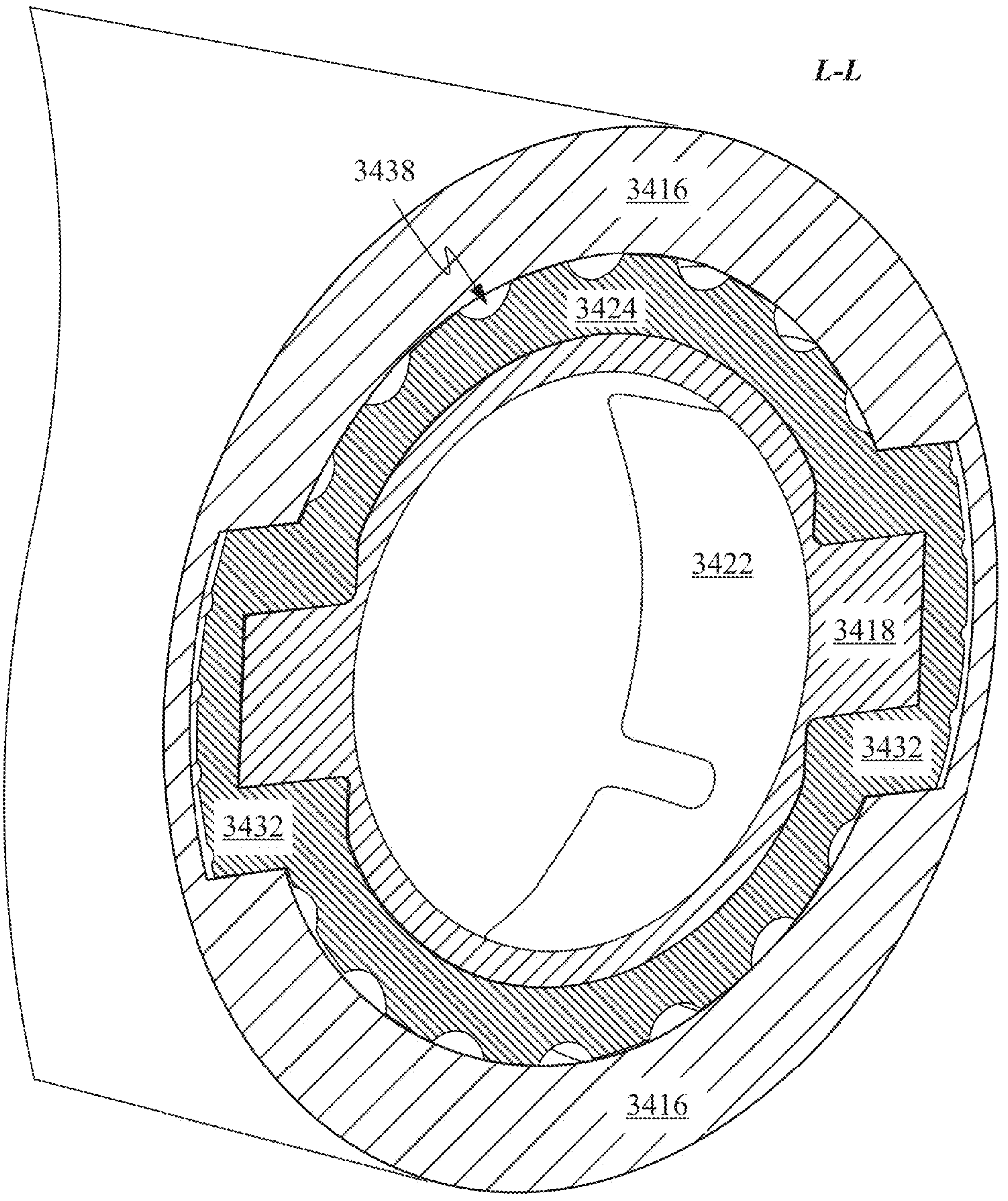
FIG. 34D shows a cross-sectional view of a distal end of a telescoping component in accordance with section line L-L as depicted in FIG. 34B.

FIG. 34D shows a cross-sectional view of a distal end of telescoping component 3418 in accordance with section line L-L as depicted in FIG. 34B. In particular, lower housing component 3416 is shown defining multiple axially aligned channels configured to accommodate radial stabilization elements 3432. As depicted, telescoping component also include ridges that support a portion of and provide a robust support for radial stabilization elements 3432. FIG. 34D also depicts how the ridges of first stabilization element 3424 define multiple channels that reduce the total surface area contact between first stabilization element 3424 and an interior-facing surface of lower housing component 3416.

Figure 34E:
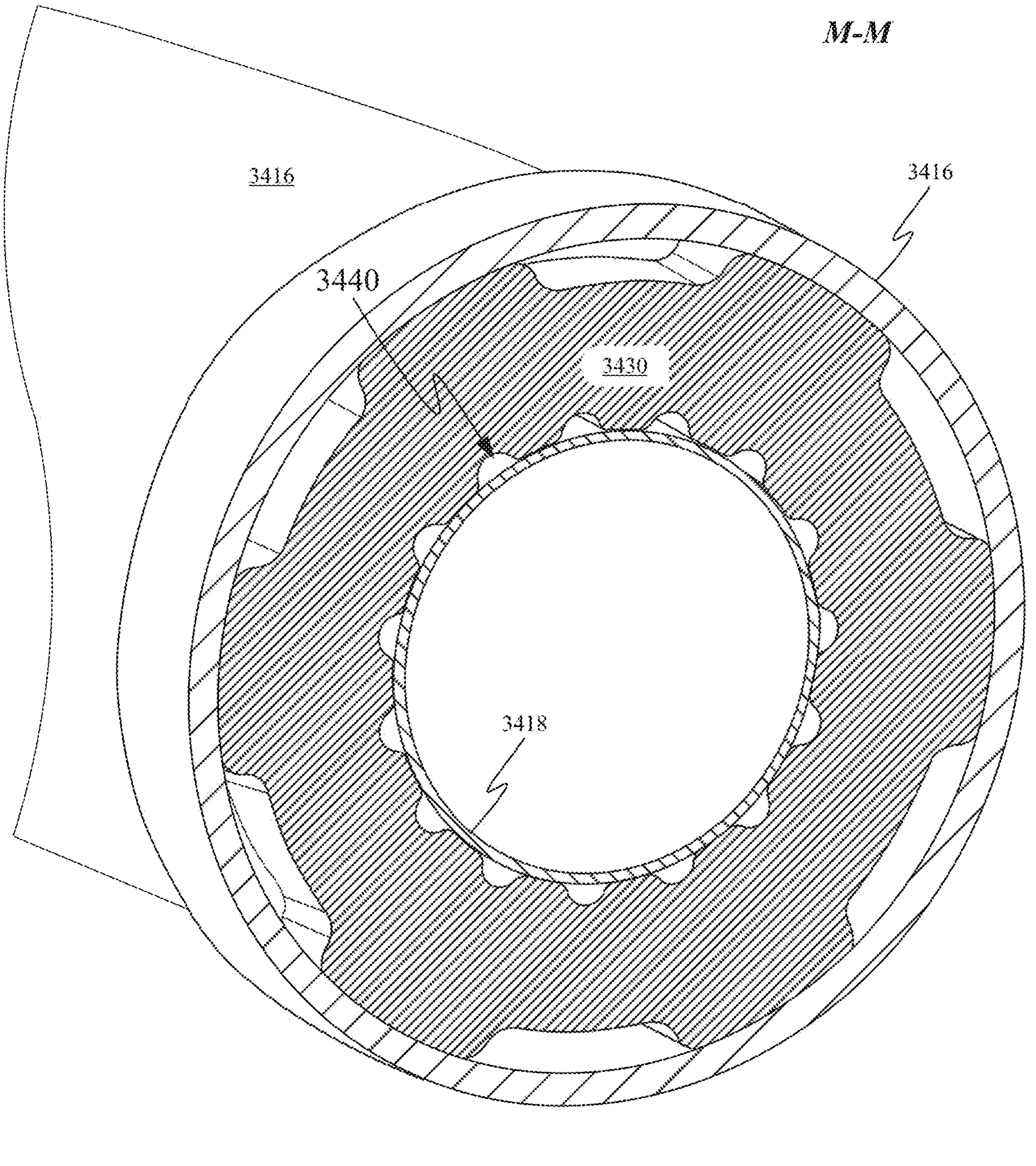
FIG. 34E shows a cross-sectional view of a distal end of a lower housing component in accordance with section line M-M as depicted in FIG. 34B.

FIG. 34E shows a cross-sectional view of a distal end of lower housing component 3416 in accordance with section line M-M as depicted in FIG. 34B. In particular, lower housing component 3416 is shown having a wider diameter at its distal end than the rest of the length of lower housing component 3416. This wider diameter end of lower housing component 3416 allows for second stabilizing element 3430 to have a greater amount of compliant material positioned between telescoping component 3418 and lower housing component 3416. This larger amount of material can beneficially provide a greater amount of compliance if desired. By rapidly reducing the cross-sectional area of lower housing component 3416, the large diameter of second stabilizing element 3430 is prevented from being pushed too far into lower housing component during use or assembly. Furthermore, an amount of friction between second stabilizing element 3430 and telescoping component 3418 can be reduced or tuned by the number and size of the channels 3440 formed by ridges arranged along an inner diameter of stabilizing element 3430.

Figure 34F:
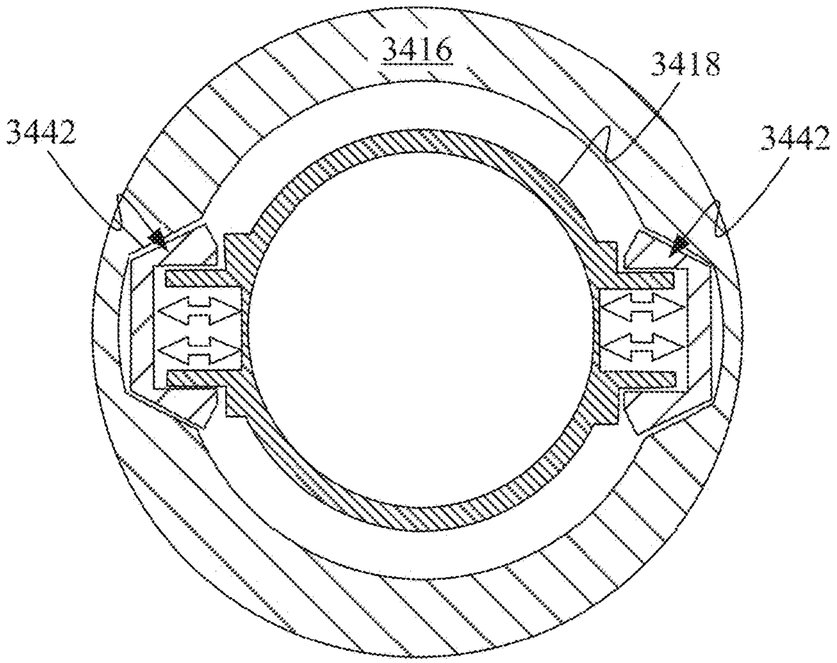
FIGS. 34F-34H show a number of alternative embodiments that allow for a larger or smaller amount of play to be established between a lower housing component and a telescoping component.
Figure 34G:
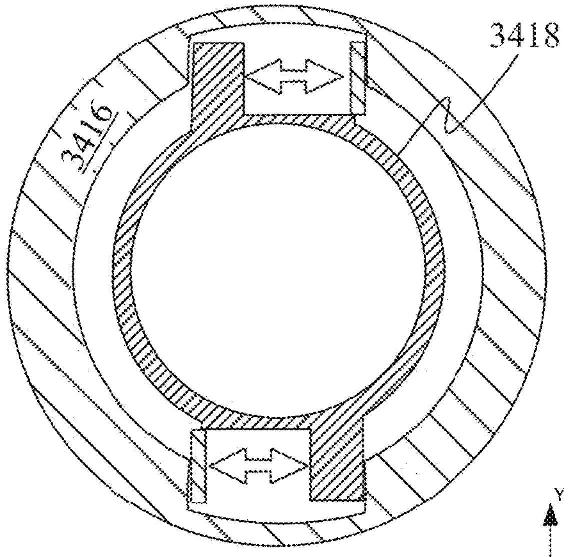
Figure 34H:
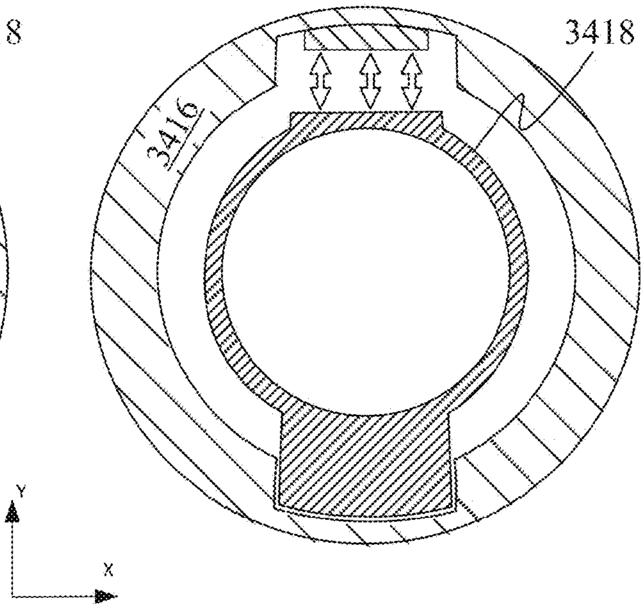

FIGS. 34F-34H show a number of alternative embodiments that allow for a larger or smaller amount of play to be established between lower housing component 3416 and telescoping component 3418. In FIG. 34F, wedge-shaped radial stabilization elements can be used to counter play in all degrees of freedom. A small gap can be established between radial stabilization elements 3442 and telescoping component 3418. The small gap can be used to create extra play in a single direction to add additional play needed to accommodate any differences in the curvature of lower housing component 3416 and telescoping component 3418. In such a configuration a radial location of radial stabilization elements 3442 and its supporting channels correspond to a direction of curvature of lower housing component 3416 and telescoping component 3418. The configuration shown in FIG. 34G accommodates a certain amount of rotation of telescoping component 3418 relative to lower housing component 3416 and also accommodates movement in the X-axis. The configuration shown in FIG. 34H shows how telescoping component 3418 can be constrained both radially and in the X-axis direction allowing movement of telescoping component 3418 only in the Y-axis.

Figure 34I:
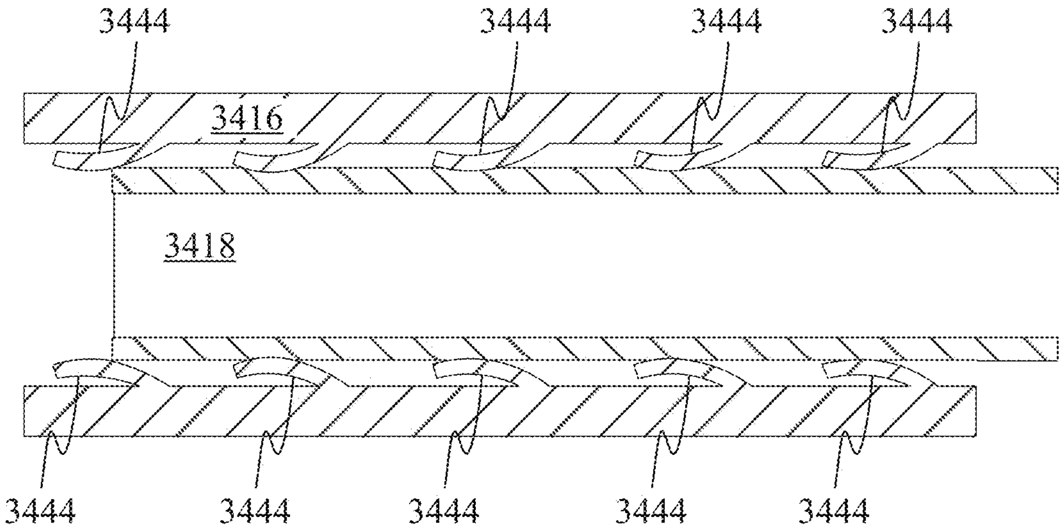
FIGS. 34I-34J show configurations including a telescoping component disposed within an interior volume defined by a lower housing component.
Figure 34J:
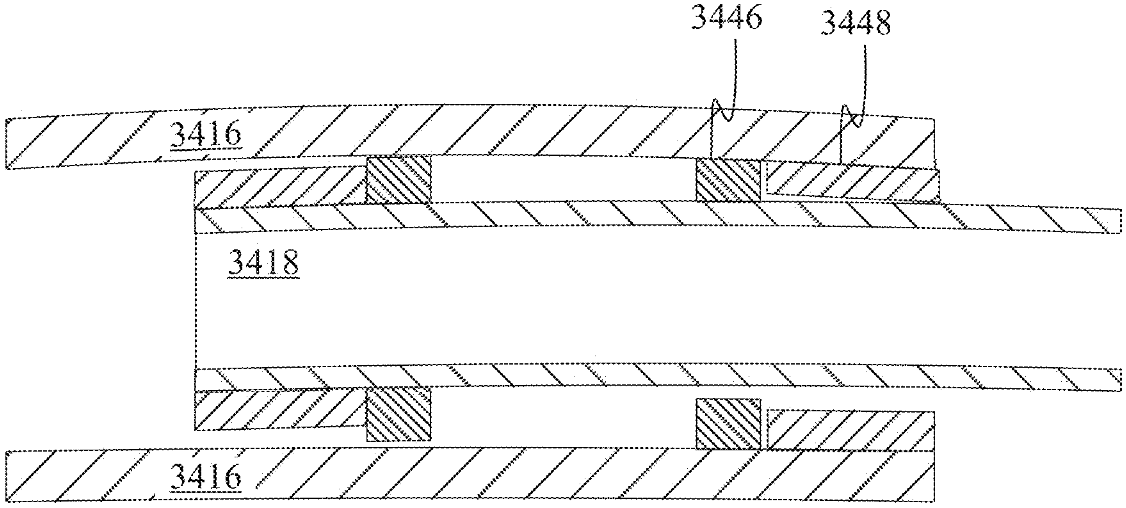

FIGS. 34I-34J show telescoping component 3418 disposed within an interior volume defined by lower housing component 3416. In FIG. 34I, lower housing component includes multiple compliant members 3444 arranged at a regular interval along an interior surface of lower housing component 3416. Compliant members 3444 could take many forms including compliant spring members that while allowing for displacement do not unduly add friction during movement of telescoping component 3418. In FIG. 34J, telescoping component 3418 is shown compressing a stabilization element 3446 until it is stopped when it contacts bearing element 3448 which can be constructed from material that is substantially more rigid than stabilization element 3446. In some embodiments, stabilization element 3446 can be formed from a material such as an FKM (fluoroelastomers) while bearing element 3448 can be formed from a material such as PEEK (polyether ether ketone).

While each of the aforementioned improvements has been discussed in isolation it should be appreciated that any of the aforementioned improvements can be combined. For example, the synchronized telescoping earpieces can be combined with the low spring-rate band embodiments. Similarly, off-center pivoting earpiece designs can be combined with the deformable form-factor headphones designs. In some embodiments, each type of improvement can be combined together to produce headphones with the described advantages from the incorporated types of improvements.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data, which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

The following paragraphs list numbered claims describing embodiments disclosed herein.

1. An earpiece, comprising: a housing defining a cavity for accommodating an ear of a user; an active noise cancelling system; an annular earpad coupled to the housing; and a textile layer wrapped around the annular earpad, the textile layer including a first region and a second region, the first region having a lower porosity than the second region of the textile layer.

2. The earpiece as recited in claim 1, wherein the textile layer is formed from a single layer of material and the porosity of the first region is lowered by applying a heat treatment to the first region.

3. The earpiece as recited in claim 1, wherein the annular earpad has an undercut geometry.

4. The earpiece as recited in claim 1, wherein the annular earpad has an asymmetric geometry that conforms with cranial contours of a head of the user.

5. The earpiece as recited in claim 1, wherein the active noise cancelling system comprises a microphone disposed within the earpiece, and wherein the housing defines an audio entrance opening for the microphone that is laterally offset from the microphone.

6. The earpiece as recited in claim 5, wherein the housing comprises an aluminum housing component that defines the audio entrance opening.

7. The earpiece as recited in claim 1, wherein the cavity has an undercut geometry that is cooperatively defined by the annular earpad and the housing.

8. A portable listening device, comprising: an earpiece housing defining a cavity for accommodating an ear of a user; a headband assembly coupled to the earpiece housing; an active noise cancelling system; an earpad assembly coupled to the earpiece housing; and a textile layer wrapped around the earpad assembly, the textile layer including a first region and a second region, the first region having a lower porosity than the second region of the textile layer.

9. The portable listening device as recited in claim 8, wherein the first region has an annular geometry positioned over a portion of the textile layer positioned along a periphery of the earpad assembly to improve passive noise attenuation characteristics of the earpad.

10. The portable listening device as recited in claim 8, wherein the earpad assembly comprises an annular earpad formed by performing a subtractive machining operation on an open cell foam block.

11. The portable listening device as recited in claim 10, wherein the annular earpad has a non-rectangular cross-sectional geometry.

12. The portable listening device as recited in claim 10, wherein the earpad assembly comprises a compliant structural member that couples the annular earpad to the earpiece housing.

13. A portable listening device, comprising: a first earpiece; a second earpiece; a headband assembly coupling the first earpiece to the second earpiece; a magnetic field sensor assembly disposed within the first earpiece and configured to measure an amount of rotation of the first earpiece relative to the headband assembly; and a processor configured to change an operating state of the portable listening device based on the amount of rotation measured by the magnetic field sensor assembly.

14. The portable listening device as recited in claim 13, wherein at least a portion of the magnetic field sensor assembly is coupled to a portion of a stem of the headband assembly and disposed within the first earpiece.

15. The portable listening device as recited in claim 13, wherein the processor is configured to change the operating state when the measured amount of rotation exceeds a predetermined threshold.

16. The portable listening device as recited in claim 14, wherein the magnetic field sensor assembly comprises: first and second permanent magnets coupled to the portion of the stem; and a magnetic field sensor coupled to a housing of the first earpiece.

17. The portable listening device as recited in claim 14, wherein the magnetic field sensor assembly comprises: a magnetic field sensor coupled to the portion of the stem; and first and second permanent magnets coupled to a housing of the first earpiece.

18. The portable listening device as recited in claim 16, wherein a polarity of a first magnetic field emitted by the first permanent magnet is oriented in a first direction and a polarity of a second magnetic field emitted by the second permanent magnet is oriented in a second direction opposite the first direction.

19. The portable listening device as recited in claim 13, wherein the processor is configured to control the operating state based on the amount of rotation measured by the magnetic field sensor assembly, the magnetic field sensor assembly being configured to identify three or more different locations of the headband assembly relative to the first earpiece.

20. The portable listening device as recited in claim 15, wherein the headphones enter a low power state when the amount of rotation detected by the magnetic field sensors assembly is below the predetermined threshold.

21. The portable listening device as recited in claim 13, further comprising an optical sensor assembly disposed within the first earpiece and configured to direct light waves at an ear of a user, wherein the processor is configured to confirm the change in operating state based on output from the optical sensor assembly.

22. The portable listening device as recited in claim 13, wherein the portable listening device comprises headphones.

23. A carrying case, comprising: a case housing defining first and second earpiece recesses configured to receive first and second earpieces of corresponding headphones; and a permanent magnet positioned adjacent to a portion of the first earpiece recess corresponding to the first earpiece of the corresponding headphones, the permanent magnet being positioned to emit a magnetic field that interacts with a sensor within the first earpiece of the headphones.

24. The carrying case as recited in claim 23, wherein the magnetic field emitted by the permanent magnet includes one or more characteristics detectable by the sensor within the first earpiece.

25. The carrying case as recited in claim 23, wherein the first and second earpiece recesses are configured to receive respective first and second earcups of the corresponding headphones.

26. A system, comprising: a carrying case, comprising: a case housing defining first and second earcup recesses configured to receive first and second earcups of corresponding headphones, the carrying case comprising a permanent magnet positioned proximate a periphery of the first earcup recess; and headphones, comprising: first and second earpieces; a headband assembly coupling the first and second earpieces together; a magnetic field sensor positioned along a periphery of the first earpiece; and a processor configured to change an operating state of the headphones in response to detecting a magnetic field emitted by the permanent magnet.

27. The system as recited in claim 26, wherein the headphones further comprise an ambient light sensor, wherein the processor is configured to change the operating state of the headphones to a low power state in response to detecting the magnetic field and receiving low light readings from the ambient light sensor.

28. An earpiece, comprising: an earpiece housing comprising a back wall and side walls that cooperatively define an interior volume; a speaker assembly disposed within the interior volume, the speaker assembly comprising: a permanent magnet defining a channel extending therethrough; a diaphragm; an electrically conductive coil coupled to the diaphragm and configured to generate a first magnetic field that interacts with a second magnetic field emitted by the permanent magnet to induce oscillation of the diaphragm; and a speaker frame member extending across a portion of the back wall of the earpiece housing to further define a rear volume of air that extends through the channel.

29. The earpiece as recited in claim 28, wherein the speaker frame member defines the rear volume such that it extends to a peripheral portion of the earpiece housing that defines an air vent.

30. The earpiece as recited in claim 28, wherein the portion of the back wall is a majority of the back wall.

31. The earpiece as recited in claim 28, wherein an average distance between the speaker frame member and the back wall of the earpiece housing is about 1 mm.

32. The earpiece as recited in claim 28, wherein portions of the speaker frame member are glued to the back wall of the earpiece housing and wherein the rear volume is routed around the portions of the speaker frame member glued to the back wall.

33. The earpiece as recited in claim 28, wherein the permanent magnet is a first permanent magnet and the earpiece further comprises a second permanent magnet surrounding the first permanent magnet and cooperatively forming a channel shaped to accommodate the electrically conductive coil.

34. A portable listening device, comprising: a headband assembly; an earpiece housing defining an interior volume, the earpiece housing being coupled to the headband assembly; a speaker assembly disposed within the interior volume, the speaker assembly comprising: a diaphragm; a permanent magnet defining a channel extending therethrough that connects a rear volume of air disposed directly behind the diaphragm to another volume of air extending radially outward from the diaphragm; and an electrically conductive coil coupled to the diaphragm and configured to generate a first magnetic field that interacts with a second magnetic field emitted by the permanent magnet to induce oscillation of the diaphragm.

35. The portable listening device as recited in claim 34, wherein the other volume of air extends across a majority of a rear wall of the earpiece housing.

36. The portable listening device as recited in claim 34, further comprising a speaker frame member that defines the other volume of air extending radially outward from the diaphragm.

37. An earpiece, comprising: a housing defining a cavity configured to accommodate an ear of a user; a speaker disposed within the housing; a first battery disposed within the housing; and a second battery disposed within the housing, the cavity being positioned between the first and second batteries.

38. The earpiece as recited in claim 37, wherein the first and second batteries are tilted diagonally away from the cavity.

39. The earpiece as recited in claim 37, further comprising third and fourth batteries disposed within the housing.

40. The earpiece as recited in claim 39, wherein the first, second, third and fourth batteries are each discrete battery assemblies.

41. The system as recited in claim 26, wherein the carrying case further comprises a second permanent magnet positioned proximate a periphery of the second earcup recess.

What is claimed is:

1. An earpiece suitable for use with headphones, the earpiece comprising:

an earpiece housing defining an interior volume having a central region surrounded by an annular region, the earpiece housing including a cover plate disposed over the central region and having a plurality of apertures formed there through;

an array of capacitive sensors disposed within the interior volume and coupled to the cover plate;

an annular earpad coupled to the earpiece housing and surrounding the plurality of apertures formed through the cover plate; and an acoustic driver disposed within the interior volume and aligned to emit sound through the plurality of apertures formed in the cover plate.

2. The earpiece set forth in claim 1 wherein the array of capacitive sensors extends across the plurality of apertures.

3. The earpiece set forth in claim 2 wherein the array of capacitive sensors has a plurality of openings formed there through, each opening in the plurality of openings being aligned with one of the apertures in the plurality of apertures.

4. The earpiece set forth in claim 1 wherein the array of capacitive sensors is configured to detect a pattern formed by one or more physical features.

5. The earpiece set forth in claim 1 wherein the array of capacitive sensors is configured to, when the earpiece is worn over a human ear, detect whether the earpiece is worn over a left ear or a right ear.

6. The earpiece set forth in claim 1 wherein the array of capacitive sensors is configured to, when the earpiece is worn over a human ear, detect contours of the ear.

7. The earpiece set forth in claim 1, wherein the array of capacitive sensors defines multiple openings that allow audio waves generated by an acoustic driver to exit the earpiece housing through the multiple openings.

8. The earpiece set forth in claim 1 further comprising a frame disposed within the interior volume and coupling the acoustic driver to the earpiece housing.

9. The earpiece set forth in claim 1 further comprising one or more proximity sensors arranged to, when the earpiece is worn by a user, emit infrared light towards an ear of the user.

10. An earpiece suitable for use with headphones, the earpiece comprising:

an earpiece housing defining an interior volume having a central region surrounded by an annular region, the earpiece housing including a cover plate disposed over the central region and having a plurality of apertures formed there through;

an array of capacitive sensors coupled to the cover plate and arranged in a grid pattern that extends across the plurality of apertures, the array of capacitive sensors having a plurality of openings formed there through, each opening in the plurality of openings being aligned with one of the apertures in the plurality of apertures;

an annular earpad coupled to the earpiece housing and surrounding the plurality of apertures formed through the cover plate; and an acoustic driver disposed within the interior volume and aligned to emit sound through the plurality of apertures formed in the cover plate and through the openings of the array of capacitive sensors.

11. The earpiece set forth in claim 10 wherein the array of capacitive sensors is configured to, when the earpiece is worn over a human ear, detect whether the earpiece is worn over a left ear or a right ear.

12. The earpiece set forth in claim 10 wherein the array of capacitive sensors is configured to, when the earpiece is worn over a human ear, detect contours of the ear.

13. Headphones comprising:

a headband having first and second opposing ends;

a first earpiece coupled to the first end of the headband; and a second earpiece coupled to the second end of the headband;

wherein each of the first and second earpieces comprises:

an earpiece housing defining an interior volume having a central region surrounded by an annular region, the earpiece housing including a cover plate disposed over the central region and having a plurality of apertures formed there through;

an array of capacitive sensors disposed within the interior volume and coupled to the cover plate;

an annular earpad coupled to the earpiece housing and surrounding the plurality of apertures formed through the cover plate; and an acoustic driver disposed within the interior volume and aligned to emit sound through the plurality of apertures formed in the cover plate.

14. The headphones set forth in claim 13 wherein, in each of the first and second earpieces, the array of capacitive sensors extends across the plurality of apertures.

15. The headphones set forth in claim 14 wherein, in each of the first and second earpieces, the array of capacitive sensors has a plurality of openings formed there through, each opening in the plurality of openings being aligned with one of the apertures in the plurality of apertures.

16. The headphones set forth in claim 13 wherein, in each of the first and second earpieces, the array of capacitive sensors is configured to, when the earpiece is worn over a human ear, whether the earpiece is worn over a left ear or a right ear.

17. The headphones set forth in claim 13 wherein, in each of the first and second earpieces, the array of capacitive sensors is configured to, when the earpiece is worn over a human ear, detect contours of the ear.

18. The headphones set forth in claim 13 wherein, in each of the first and second earpieces, the array of capacitive sensors defines multiple openings that allow audio waves generated by an acoustic driver to exit the earpiece housing through the multiple openings.

19. The headphones set forth in claim 13 further comprising one or more proximity sensors arranged to, when the earpiece is worn by a user, emit infrared light towards an ear of the user.

20. The headphones set forth in claim 13 wherein, in each of the first and second earpieces, the array of capacitive sensors is arranged in a grid pattern that extends across the plurality of apertures.

* * * * *